(12) United States Patent
Kane et al.

(10) Patent No.: US 6,362,784 B1
(45) Date of Patent: Mar. 26, 2002

(54) ANTENNA UNIT AND DIGITAL TELEVISION RECEIVER

(75) Inventors: Joji Kane, Nara; Takasi Yosida, Ikoma; Noboru Nomura, Kyoto; Toyokazu Ikeda, Fujisawa; Tosiro Sugiyama, Hiratsuka; Hideto Majima, Yokohama, all of (JP)

(73) Assignee: Matsuda Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/424,115

(22) PCT Filed: Dec. 10, 1998

(86) PCT No.: PCT/JP98/05578

§ 371 Date: Nov. 19, 1999

§ 102(e) Date: Nov. 19, 1999

(87) PCT Pub. No.: WO99/50932

PCT Pub. Date: Oct. 7, 1999

(30) Foreign Application Priority Data

| Mar. 31, 1998 | (JP) | 10-087510 |
| Apr. 30, 1998 | (JP) | 10-121067 |
| Apr. 30, 1998 | (JP) | 10-162362 |
| Jul. 3, 1998 | (JP) | 10-189099 |

(51) Int. Cl.$^7$ ............................................. H01Q 1/38
(52) U.S. Cl. ............................... 343/700 MS; 343/713; 343/806
(58) Field of Search .................. 343/702, 700 MS, 343/711, 713, 750, 725, 752, 794, 744, 806, 810, 812, 815, 853, 860, 895

(56) References Cited

U.S. PATENT DOCUMENTS

| 2,520,988 A | 9/1950 | Everitt | 250/33 |
| 2,935,746 A | 5/1960 | Marston et al. | 343/761 |
| 3,568,206 A | 3/1971 | Sisson et al. | 343/750 |

(List continued on next page.)

FOREIGN PATENT DOCUMENTS

| AU | 55898 / 73 | 11/1974 |
| DE | 37 32 994 A1 | 4/1989 |
| EP | 0 777 293 A1 | 6/1997 |

(List continued on next page.)

OTHER PUBLICATIONS

Patent Abstracts of Japan, 016:546 Nov. 16, 1992, JP 4–207 593 (Jul. 29, 1992).
Patent Abstracts of Japan, 013:470 Oct. 24, 1989, JP 1–185 076 (Jul. 24, 1989).
Patent Abstracts of Japan, 1994:04 Apr. 30, 1996, JP 7–322 156.
Patent Abstracts of Japan, 18:623 Nov. 28, 1994, JP 6–237 418.
Patent Abstracts of Japan, 12:375 Oct. 7, 1988, JP 63–122 367.

(List continued on next page.)

Primary Examiner—Don Wong
Assistant Examiner—Shih-Chao Chen
(74) Attorney, Agent, or Firm—Smith, Gambrell & Russell, LLP

(57) ABSTRACT

The present invention provides an antenna device comprising a conductive substrate and an antenna element located in the proximity of the conductive substrate, in which a portion of the antenna element is formed of a coil or zigzag conductor and an end of the antenna element is connected to the conductive substrate for grounding. In addition, the coil or zigzag conductor is formed at an end of the antenna element and the coil or zigzag conductor and the other end of the antenna element are connected together on an insulator provided on the conductive substrate.

33 Claims, 127 Drawing Sheets

U.S. PATENT DOCUMENTS

| | | | |
|---|---|---|---|
| 3,858,220 A | 12/1974 | Arnow | 343/794 |
| 4,207,574 A | 6/1980 | Toia | 343/752 |
| 4,571,596 A | 2/1986 | Hodgkinson | 343/860 |
| 4,737,991 A | 4/1988 | Sugai et al. | 381/13 |
| 4,801,944 A | 1/1989 | Madnick et al. | 343/744 |
| 4,823,143 A | 4/1989 | Bockrath | 343/781 |
| 4,873,530 A | 10/1989 | Takeuchi et al. | 343/711 |
| 4,958,167 A | 9/1990 | Schroeder | 343/853 |
| 5,138,451 A | 8/1992 | Shinkawa et al. | 358/148 |
| 5,177,493 A | 1/1993 | Kawamura | 343/713 |
| 5,303,396 A | 4/1994 | Ooyagi et al. | 455/134 |
| 5,311,315 A | 5/1994 | Sakata | 346/614 |
| 5,335,010 A | 8/1994 | Lindemeier et al. | 348/706 |
| 5,442,368 A | 8/1995 | Harada et al. | 343/713 |
| 5,457,467 A | 10/1995 | Schenkyr et al. | 343/713 |
| 5,486,836 A | 1/1996 | Kuffner et al. | 343/700 |
| 5,517,206 A | 5/1996 | Boone et al. | 343/806 |
| 5,572,266 A | 11/1996 | Tuttle | 343/726 |
| 5,585,807 A | 12/1996 | Takei | 343/702 |
| 5,710,568 A | 1/1998 | Shirazi et al. | 343/719 |
| 5,818,390 A * | 10/1998 | Hill | 343/700 MS |
| 5,926,139 A * | 7/1999 | Korisch | 343/702 |

FOREIGN PATENT DOCUMENTS

| | | |
|---|---|---|
| FR | 2 553 584 | 4/1985 |
| GB | 1 020 727 | 2/1966 |
| JP | 60-51008 | 3/1985 |
| JP | 1-246903 | 2/1989 |
| JP | 3-346210 | 4/1991 |
| JP | 4-18913 | 2/1992 |
| JP | 4-144405 | 5/1992 |
| JP | 4-78811 | 7/1992 |
| JP | 5-259725 | 10/1993 |
| JP | 5-347507 | 12/1993 |
| JP | 6-23311 | 3/1994 |
| JP | 6-69715 | 3/1994 |
| JP | 6-77722 | 3/1994 |
| JP | 6-261019 | 9/1994 |
| JP | 7-30321 | 1/1995 |
| JP | 9-55617 | 2/1997 |
| JP | 3041690 | 7/1997 |
| JP | 9-181699 | 7/1997 |
| JP | 9-260925 | 10/1997 |
| JP | 9-326632 | 12/1997 |
| JP | 10-41741 | 2/1998 |
| JP | 10-56314 | 2/1998 |
| JP | 10-75229 | 3/1998 |
| JP | 10-107777 | 4/1998 |
| WO | WO85-02719 | 6/1985 |
| WO | WO93-12559 | 6/1993 |

OTHER PUBLICATIONS

Patent Abstracts of Japan, 16:104 Mar. 13, 1992, JP 3–280 674.

Biofat, A.M., Shortened, Directive Dipole for Array Antennas, *International Journal of Electronics*, 71:1 127–137 (Jul. 1, 1991) London.

Fujimoto et al., Small Antennas, pp. 116–127.

* cited by examiner

Fig. 1 (a)    Fig. 1 (b)
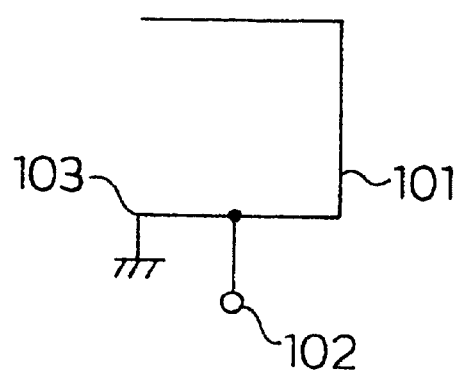
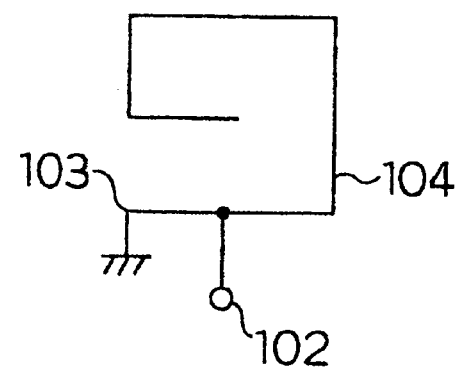

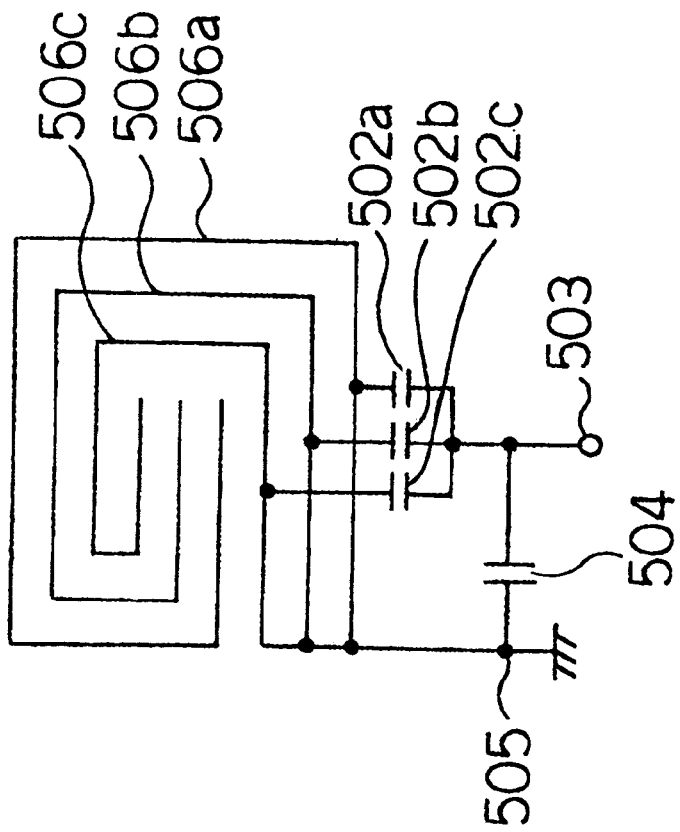
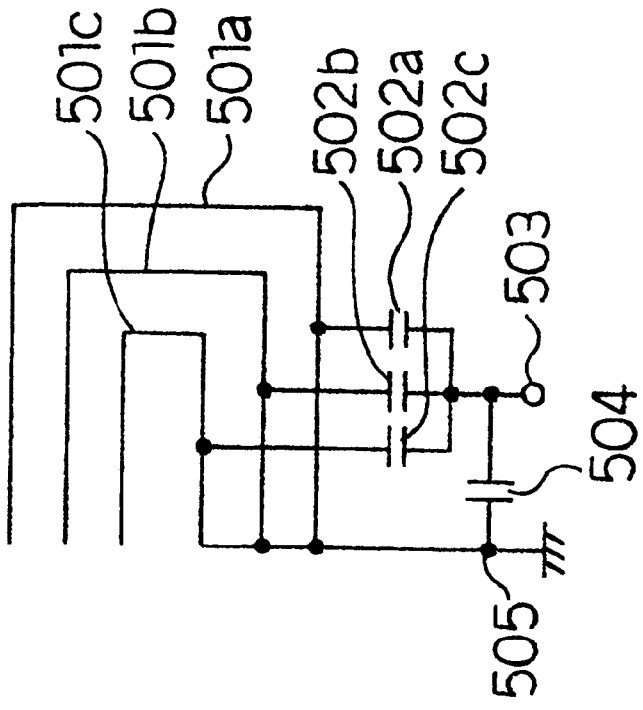
Fig. 5 (a)
Fig. 5 (b)

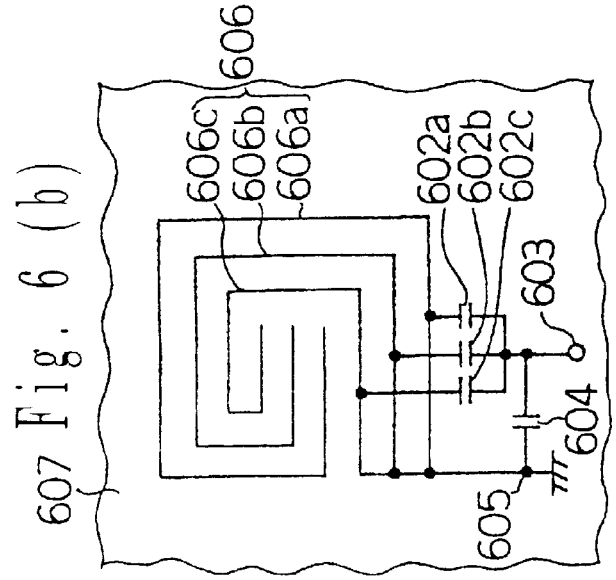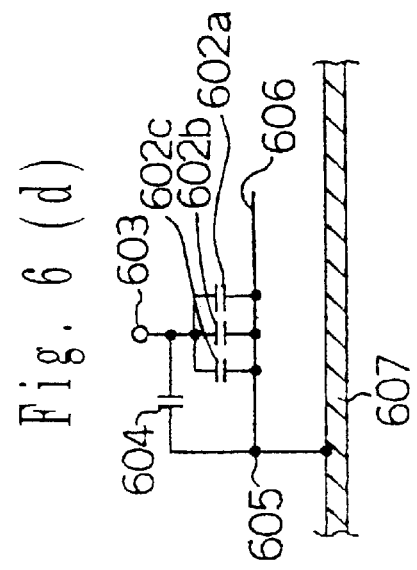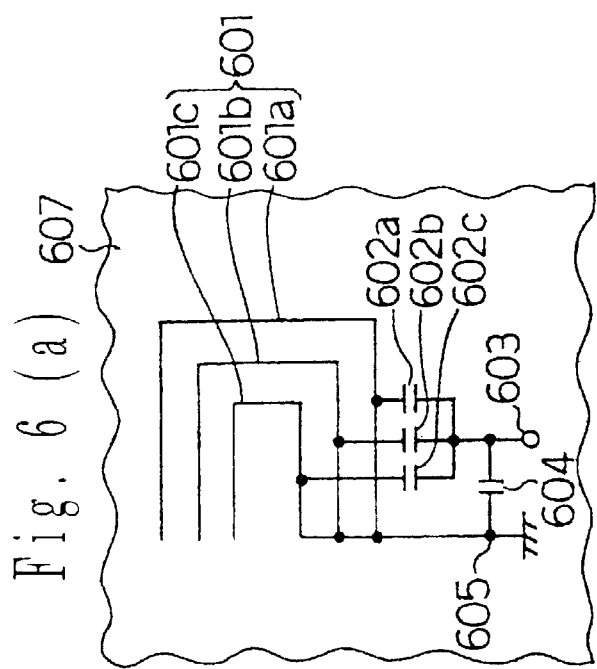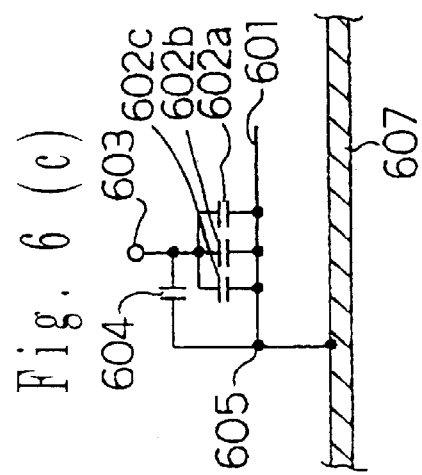

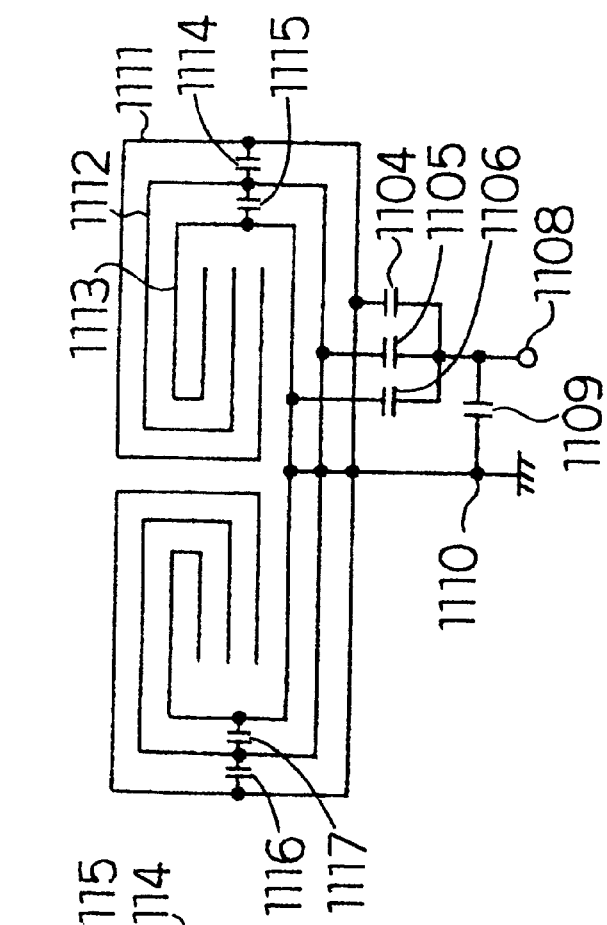
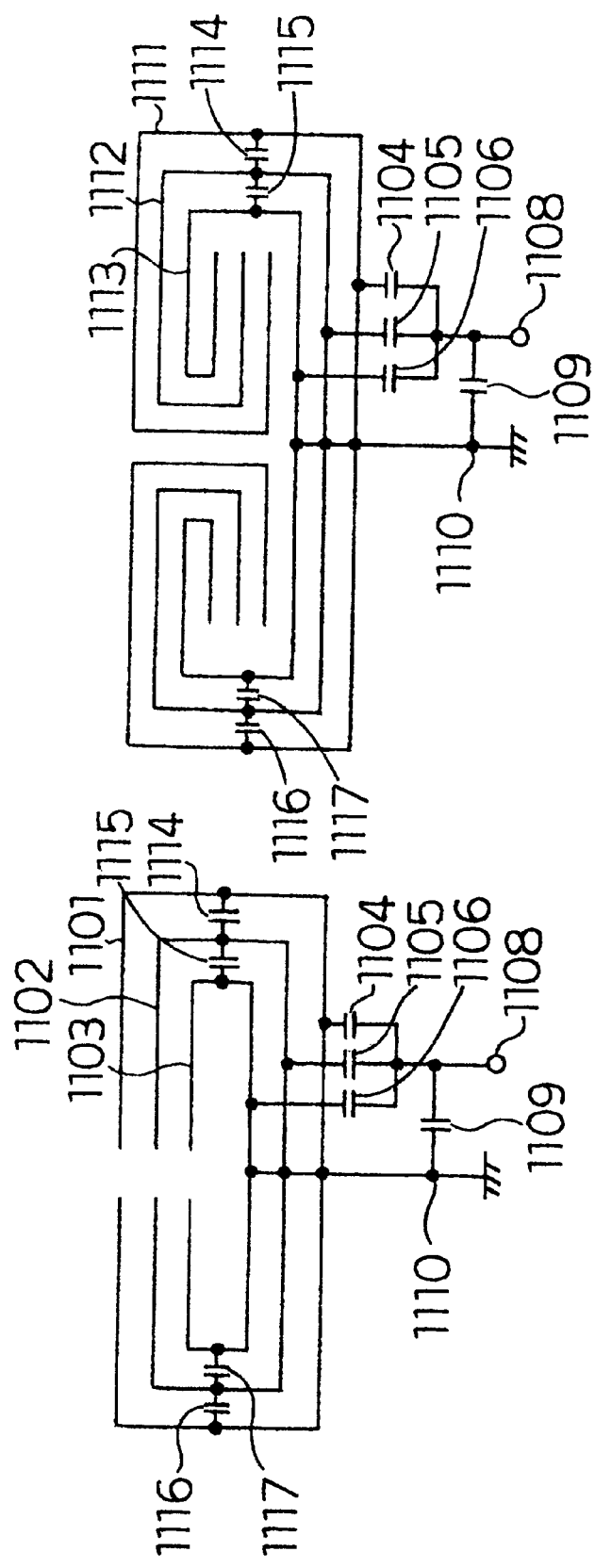
Fig. 11(a)
Fig. 11(b)

Fig. 21 (a)
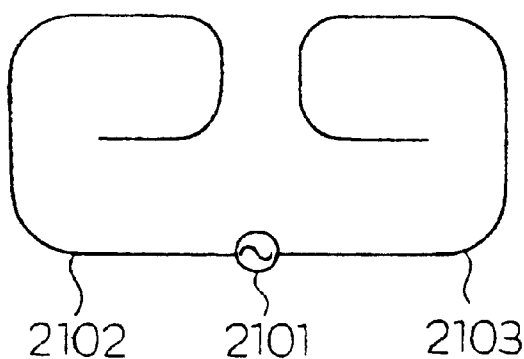
Fig. 21 ($a_1$)
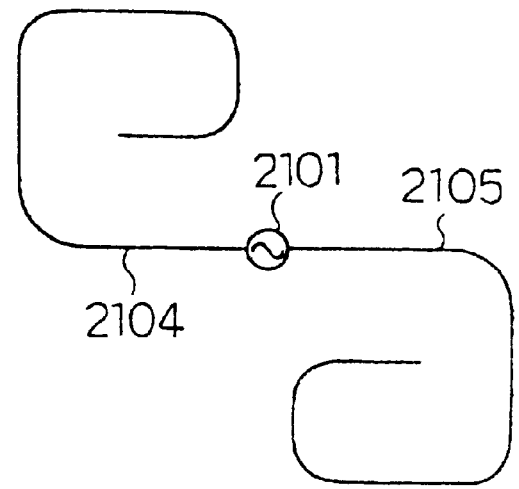
Fig. 21 (b)
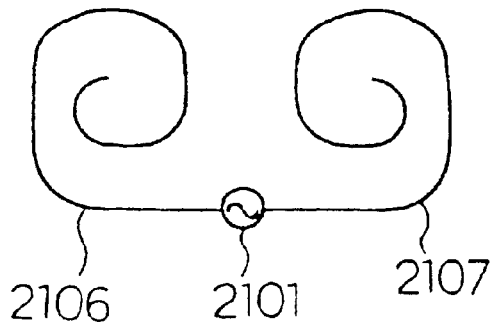
Fig. 21 ($b_1$)
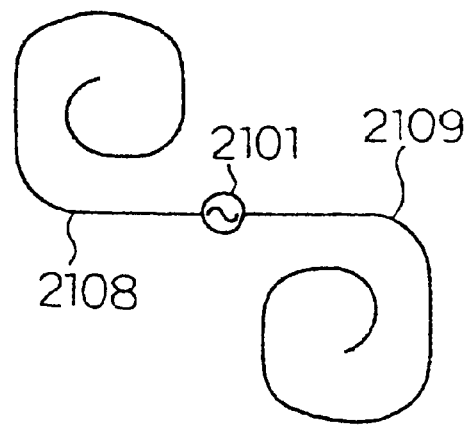

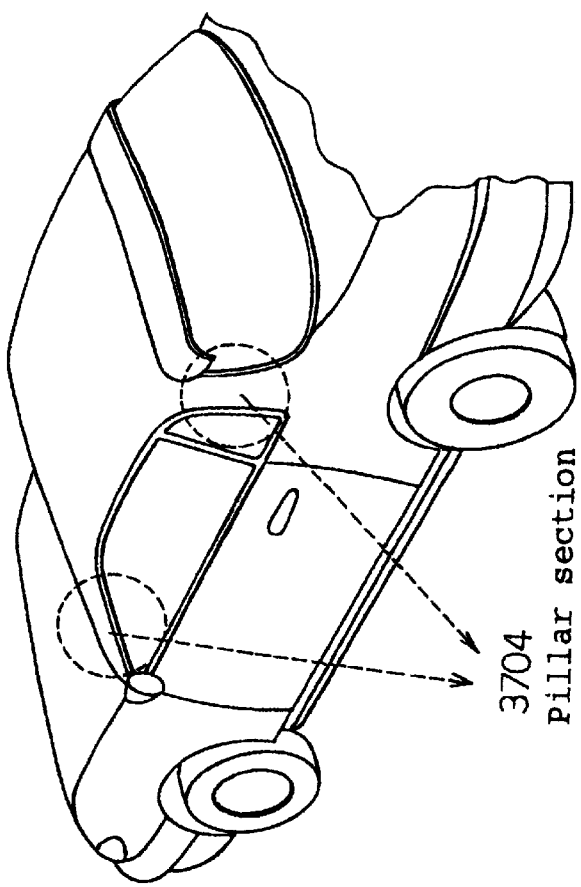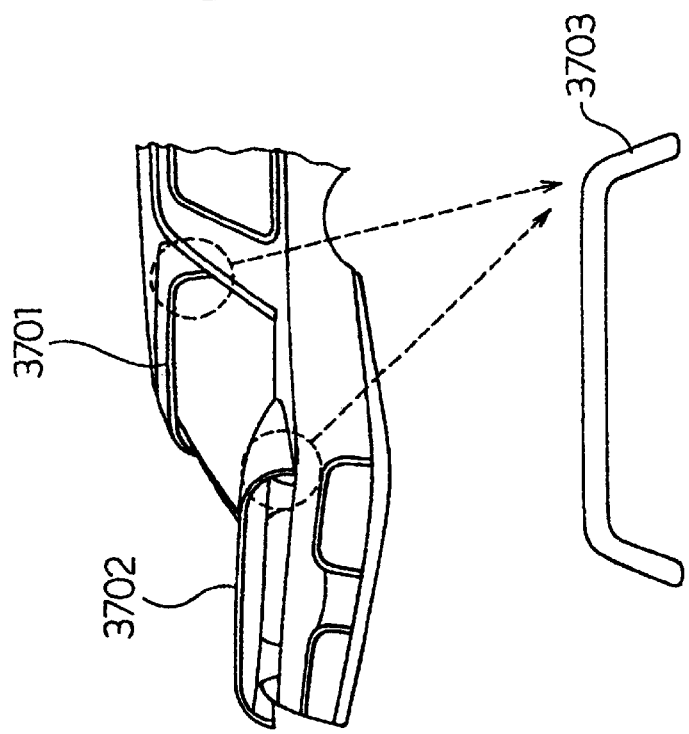
Fig. 37(a)
Fig. 37(b)

Fig. 43 (a)
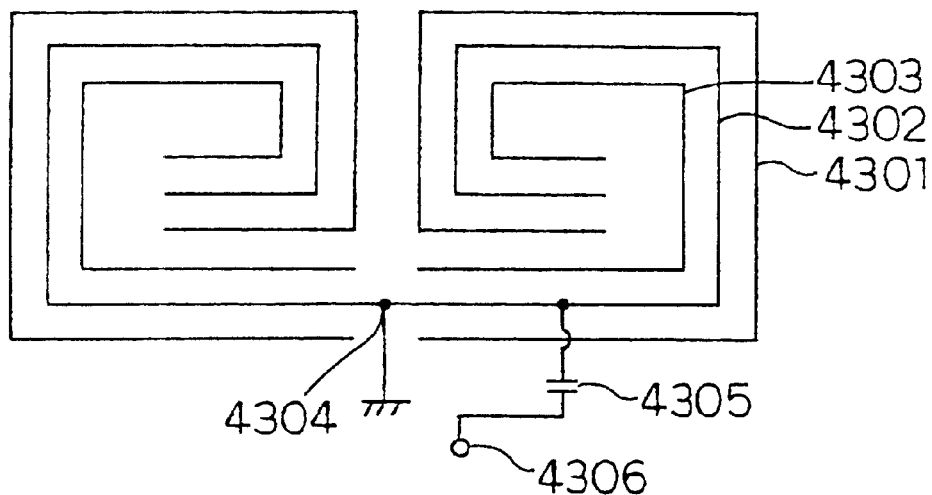
Fig. 43 (b)
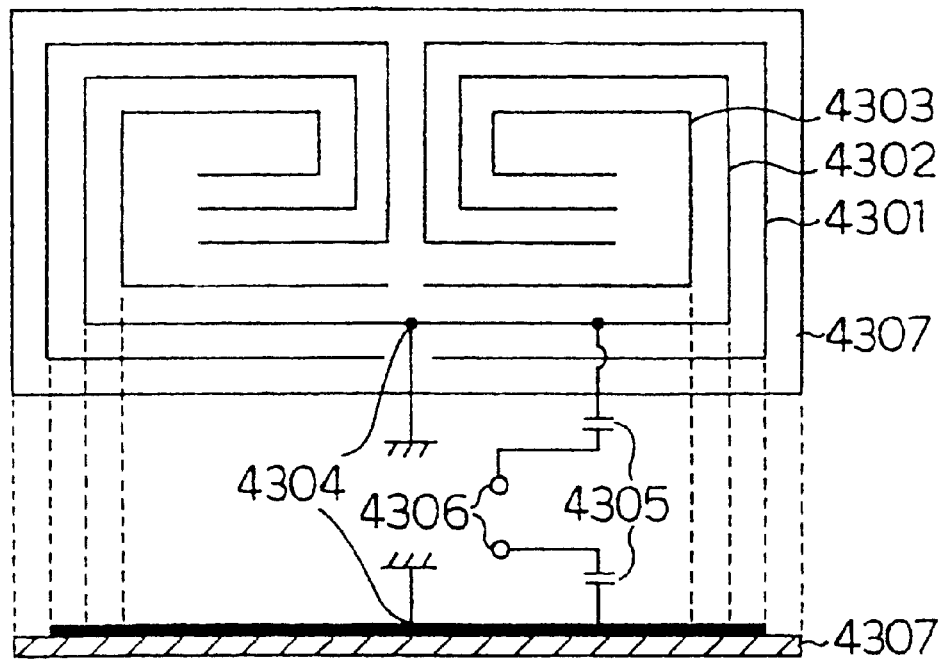
Fig. 43 (c)

Fig. 44 (a)
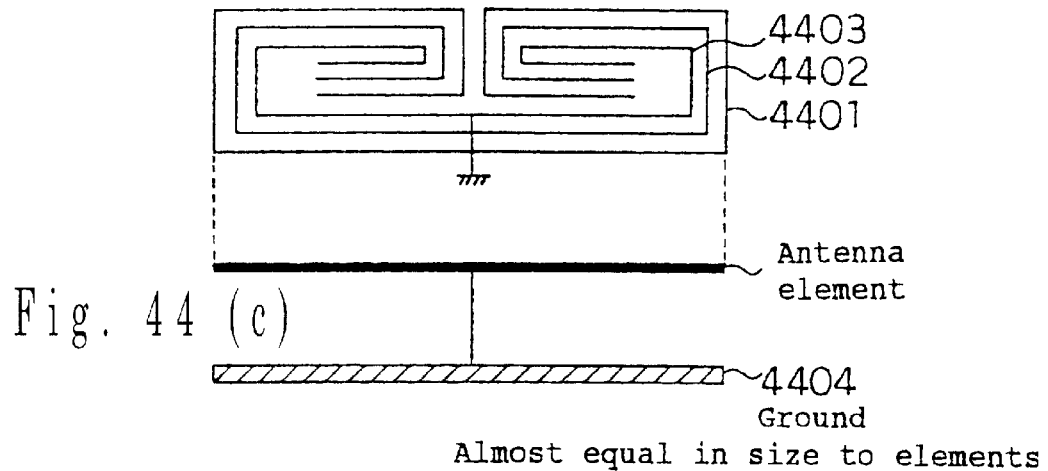
Fig. 44 (c)
Ground
Almost equal in size to elements
Fig. 44 (b)
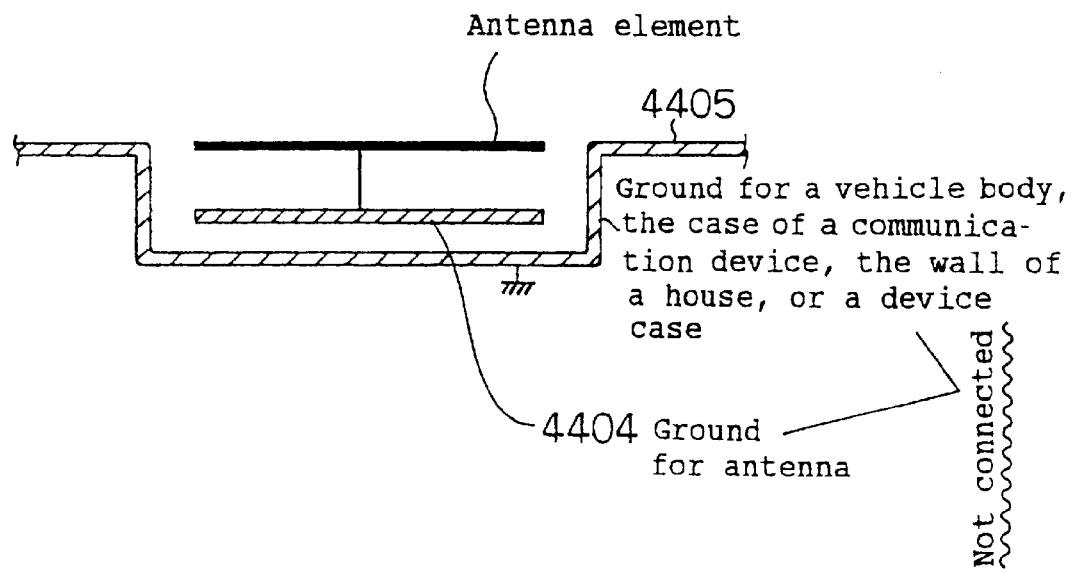

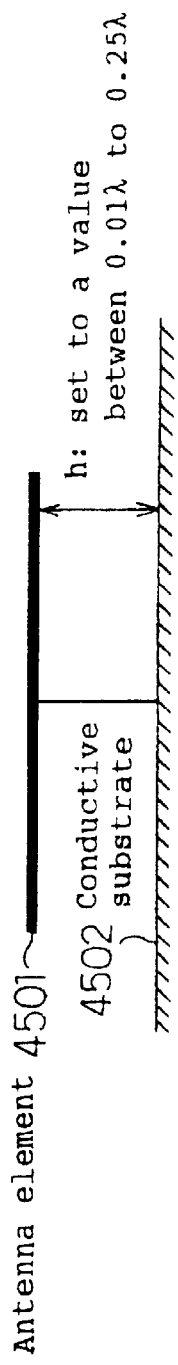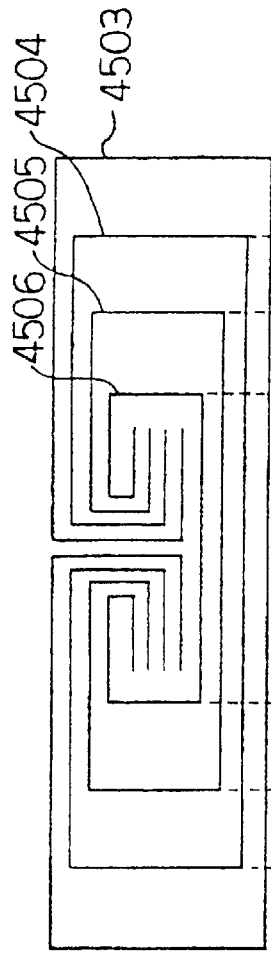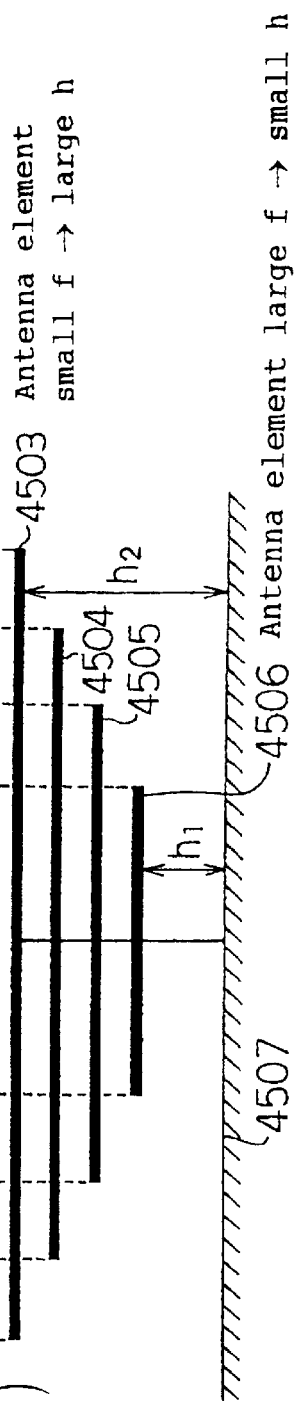
Fig. 45 (a)
Fig. 45 (b)
Fig. 45 (c)

Fig. 55 (a) Fig. 55 (c)
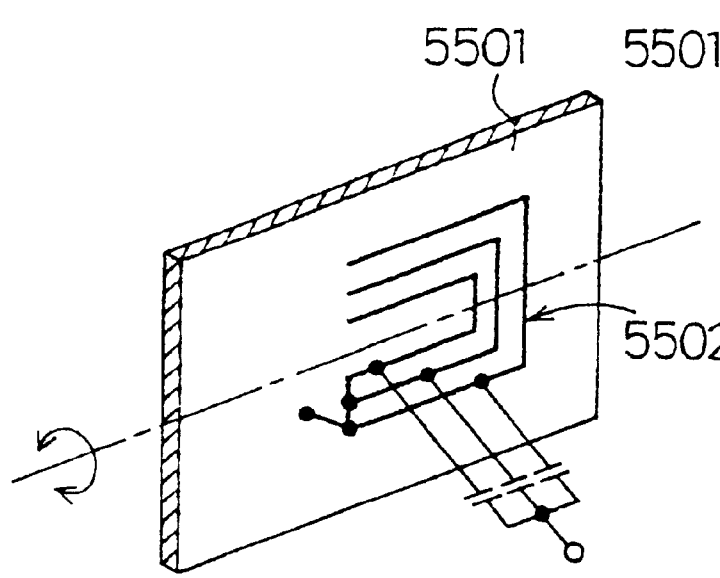
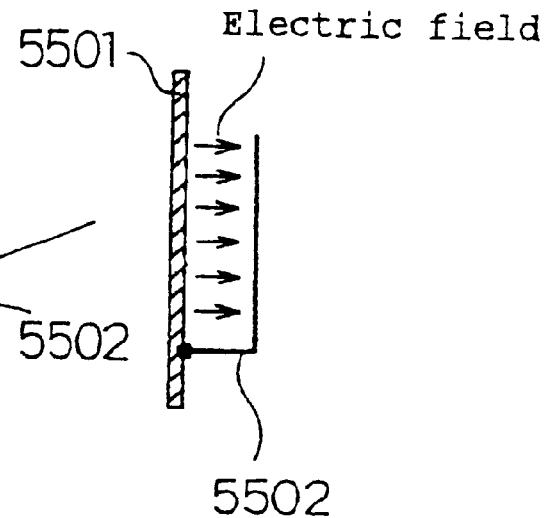
Fig. 55 (b) Fig. 55 (d)
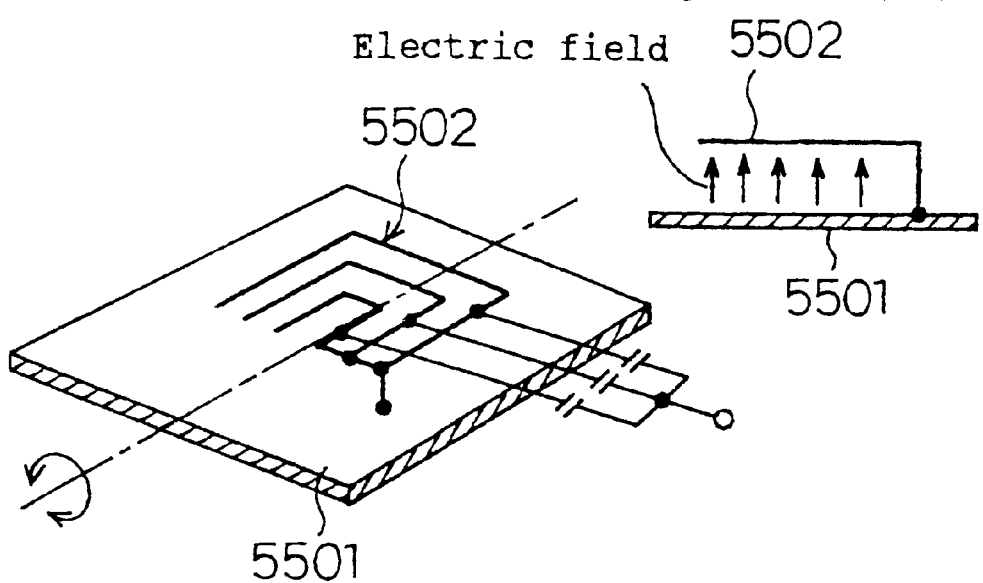

Fig. 56 (a)
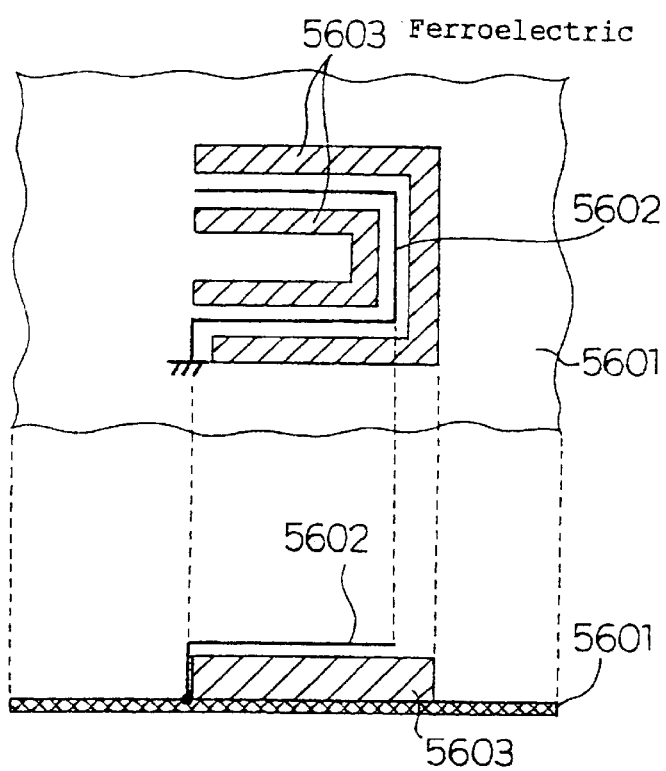
Fig. 56 (c)
Fig. 56 (b)
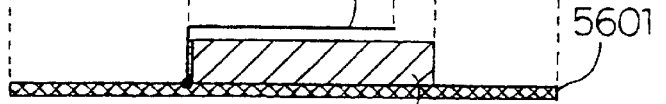

Fig. 60 (a)
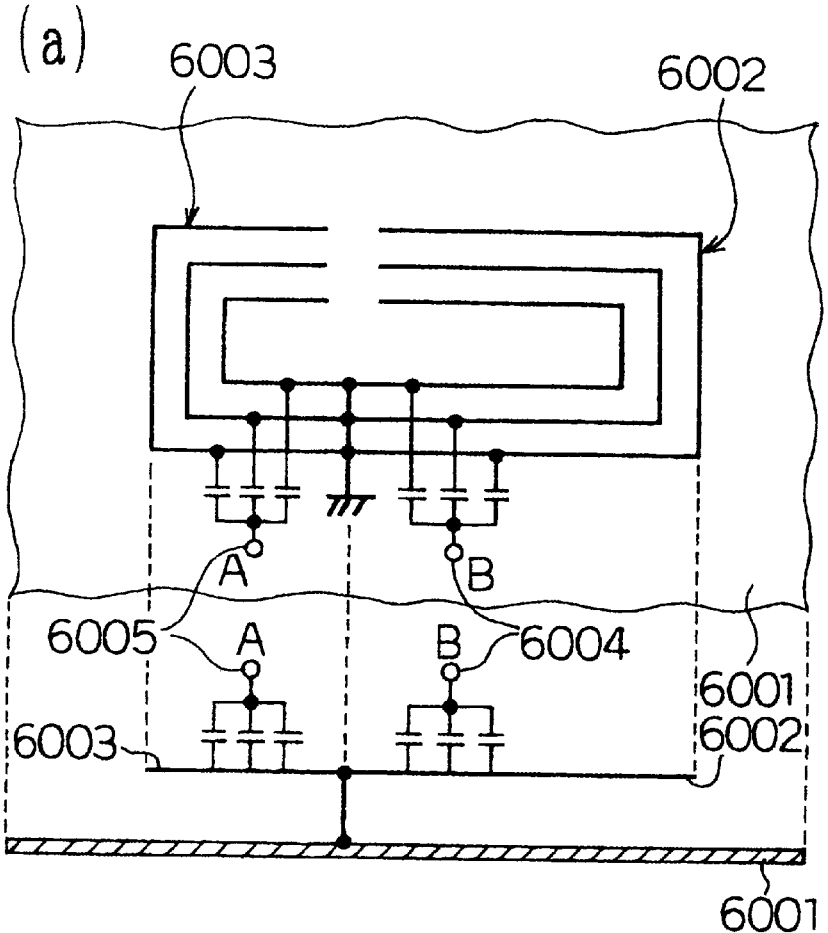
Fig. 60 (b)
Fig. 60 (c)
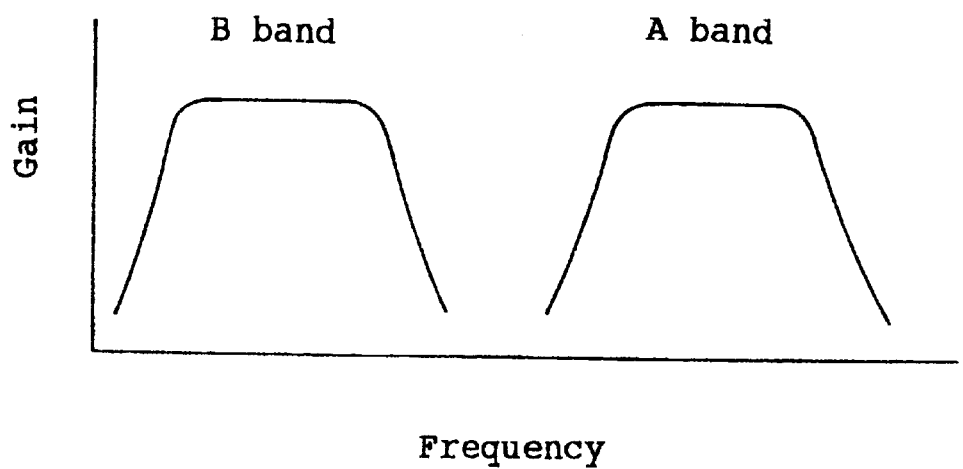

Fig. 61 (a)
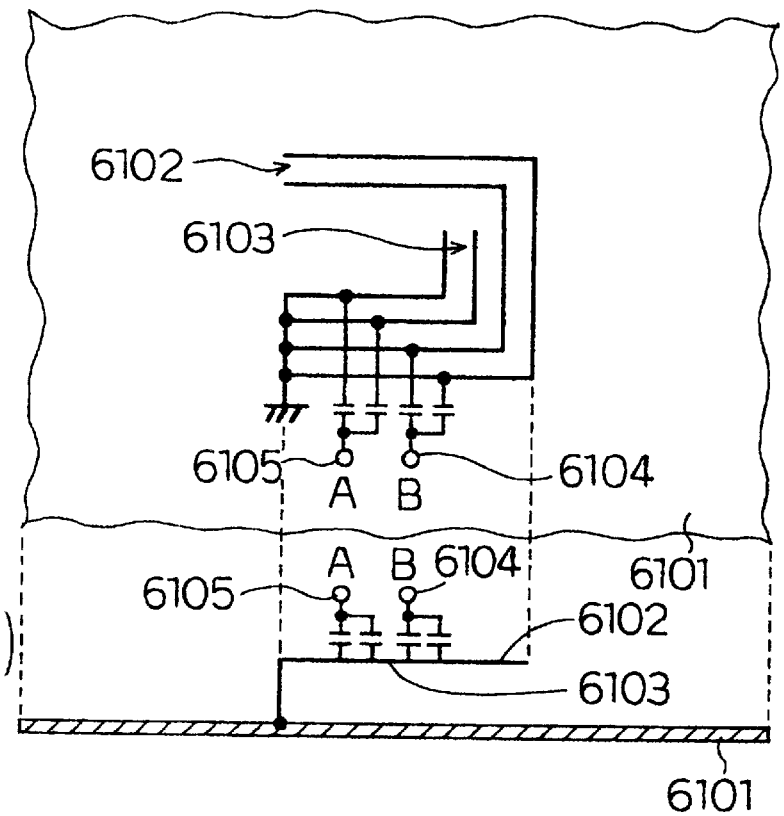
Fig. 61 (b)
Fig. 61 (c)
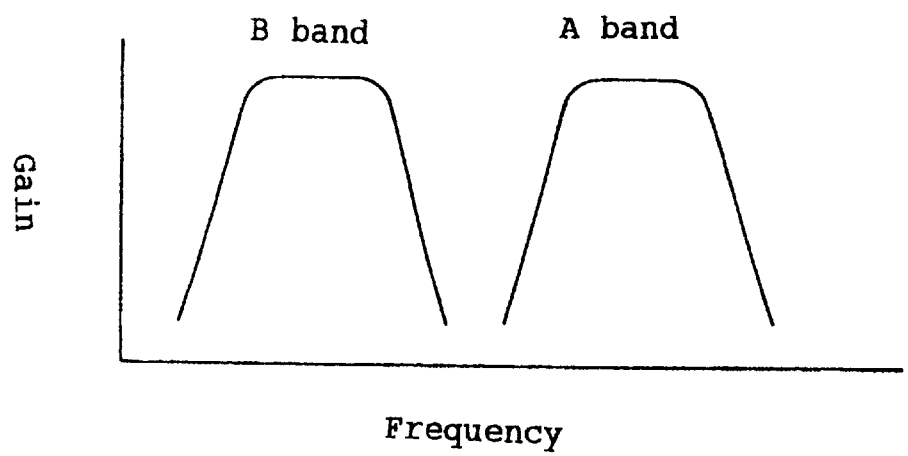

Fig. 62 (a)
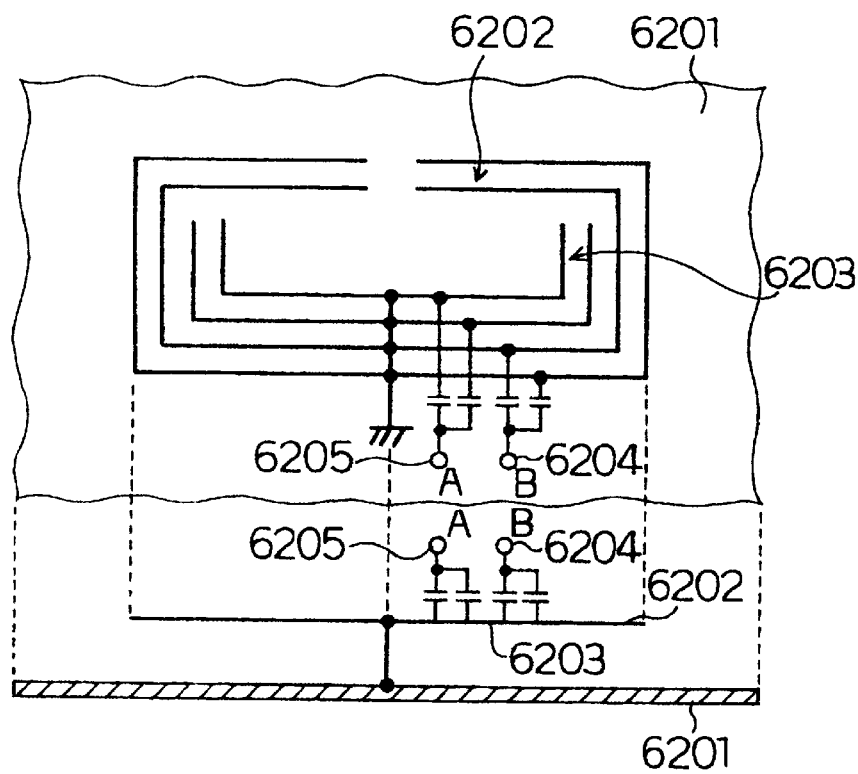
Fig. 62 (b)
Fig. 62 (c)
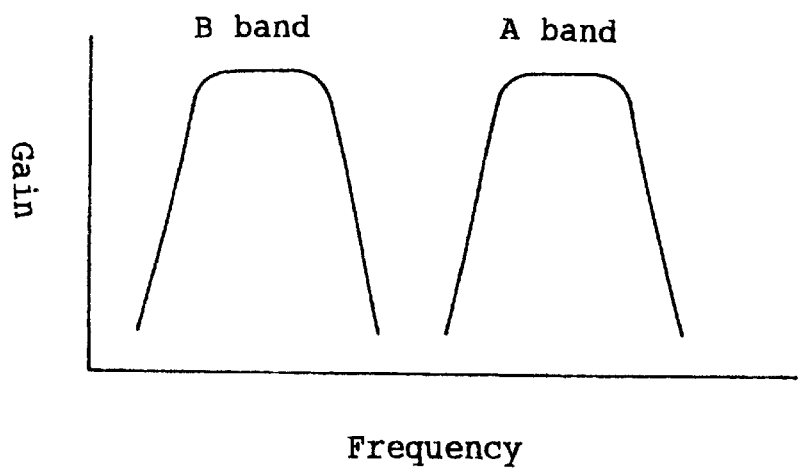

Vertically polarized wave

Distance: 10 mm

Directional gain characteristics
Vertically polarized waves

Distance: 30 mm

Distance: 80 mm

Distance: 150 mm

Fig. 95
Directional gain characteristics
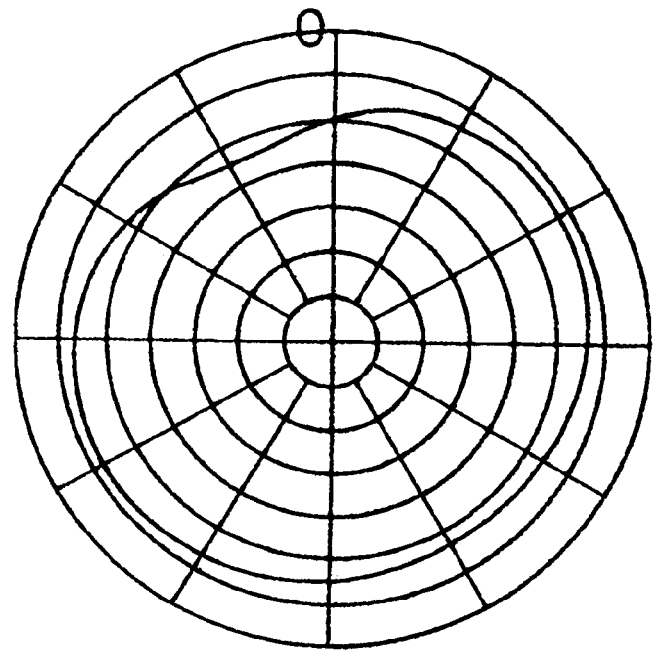
Vertically polarized waves
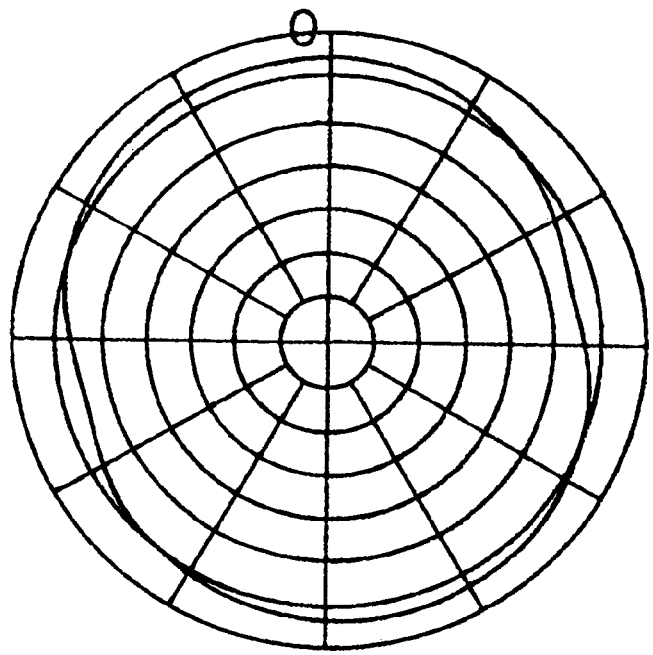
Horizontally polarized waves

Fig. 96
Directional gain characteristics
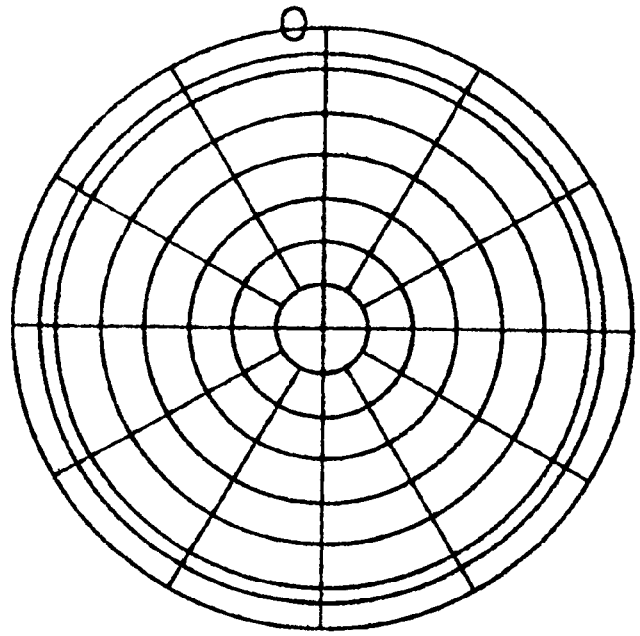
Vertically polarized waves
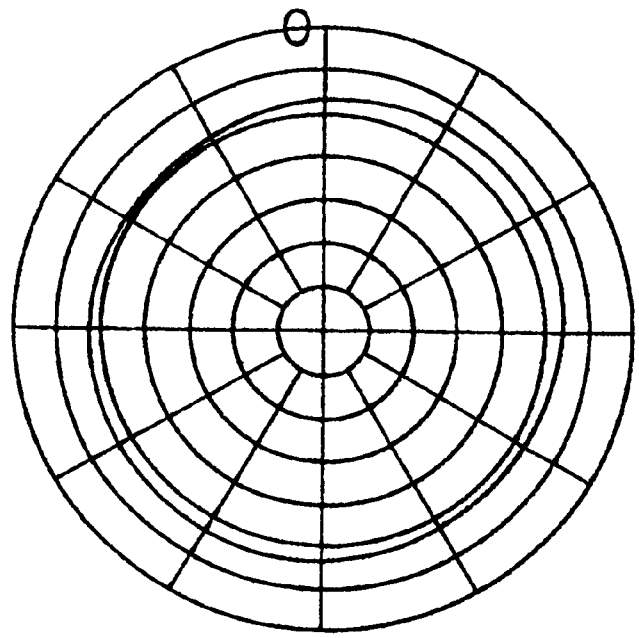
Horizontally polarized waves

ANTENNA UNIT AND DIGITAL TELEVISION RECEIVER

TECHNICAL FIELD

The present invention relates to an antenna device and in particular, to the antenna device to be attached to the body of an automobile for receiving, for example, AM, FM, or TV broadcasting or wireless telephone or the like.

BACKGROUND ART

With the advance of car multimedia era, in addition to an AM/FM radio, various radio equipment such as a TV receiver, a wireless telephone set, and a navigation system has been recently installed in an automobile. Also hereafter, information and services may be increasingly provided through radio wave and the importance of an antenna will grow accordingly.

In general, when the antenna is attached to the automobile and so on, the body configured by a conductive substrate may have some influence on the antenna performance such as directional gain or the like. Conventional antennas which have been used for automobiles include, for example, a monopole antenna, a rod antenna, and a V-shaped dipole antenna, taking account of the attachment to the automobile body. Many of these antennas, when attached, have a long stick-like antenna element protruding on the surface of the automobile body.

As described above, however, such an antenna with a long stick-like antenna element protruding on the automobile body disfigures the appearance, and furthermore has various other problems such as wind soughing brought about around it, a risk of its being stolen, and labors involved in removing it before car wash.

In view of these problems concerning the conventional antennas, the present invention aims to provide an antenna device which can be installed in the vicinity of the automobile body or incorporated into the automobile body to form a plane containing it and can be downsized enough to be placed in a narrow area, and which is also capable of correctly receiving vertically polarized wave.

And in the recent ground wave digital television broadcasting, there exists radio disturbance such as frequency-selective fading caused by interference such as reflected wave from surrounding buildings. In addition, for the ground wave digital television broadcasting, in order to take advantage of the bandwidth effectively, a scheme referred to as SFN has been proposed, which uses a plurality of transmitting stations to broadcast the same program at the same frequency. This SFN broadcasting scheme may also result in radio disturbance caused by interference between signals transmitted by adjacent stations, because there exists always a delay time between them.

The present invention has been achieved to solve the problems of radio disturbance described above and thus provides a digital television broadcasting receiving device which can improve radio disturbance in movably receiving digital data.

DISCLOSURE OF THE INVENTION

The present invention is an antenna device comprising a conductive substrate and an antenna element located in a proximity of said conductive substrate, wherein a portion of said antenna element is formed of a coil or zigzag conductor and an end of said antenna element is connected to said conductive substrate for grounding.

The present invention is an antenna device comprising a conductive substrate and two or more antenna elements of different lengths located in a proximity of said conductive substrate, wherein a portion of each of said antenna elements is formed of a coil or zigzag conductor and an end of each of said antenna elements is commonly connected to said conductive substrate for grounding.

The present invention is an antenna device comprising a conductive substrate, two or more antenna elements of different lengths located in a proximity of said conductive substrate, and a coil or zigzag conductor connected to a common connection at an end of each of said antenna elements, wherein the other end of said coil or zigzag conductor is connected to said conductive substrate for grounding.

The present invention is an antenna device comprising an antenna element formed of a coil or zigzag conductor as a whole and having at least one bend or curve.

The present invention is an antenna device comprising a conductive substrate and an antenna element having an end connected to said conductive substrate for grounding and located in a proximity of said conductive substrate, wherein a feeding section is connected to an insulator provided on said conductive substrate as a relay point.

The present invention is an antenna device comprising a conductive substrate and an antenna element having an end connected to said conductive substrate for grounding and located in the proximity of said conductive substrate, wherein a through-hole is formed in said conductive substrate, an insulator is provided an opposite side of said conductive substrate to said antenna element, at said through-hole, and a feeding section is connected on said insulator by using said through-hole.

The present invention is an antenna device comprising a conductive substrate, an antenna element located in a proximity of said conductive substrate, and a conductive case provided between said antenna element and said conductive substrate and having a through-hole in a certain place, wherein
  an end of said antenna element is connected to said conductive case for grounding, a feeding section is connected to one of a plurality of insulators provided on said conductive substrate within said conductive case by using said through-hole, and circuit components are connected between said plurality of insulators.

The present invention is an antenna device comprising a conductive substrate, an insulation plate located in a proximity of said conductive substrate, an antenna element formed on said insulation plate at the side farther from said conductive substrate, a conductor running from said antenna element through said insulation plate, and a conductive material connected to said conductor and formed on the opposite side of said insulation plate to said antenna element, wherein
  an end of said antenna element is connected to said conductive substrate for grounding and a feeding section is connected to said conductive material near said grounded antenna element end.

The present invention is an antenna device comprising
  a conductive substrate, an insulation plate provided on said conductive substrate, a conductive plate provided on said insulation plate and having an area smaller than said conductive substrate, and an antenna element located in a proximity of said conductive plate and having an end connected to said conductive plate for grounding.

The present invention is an antenna device comprising a conductive substrate provided with an antenna grounding conductive plate in a certain place thereon and an antenna element located in a proximity of said conductive substrate and having an end connected to said antenna grounding conductive plate.

The present invention is an antenna device comprising
a planar antenna having at least one antenna element having at least one bend or curve and an end connected to a conductive substrate and
a cylindrical antenna located in a proximity of said planar antenna, wherein
an end of said planar antenna is connected to said conductive substrate at a side of said planar antenna farther from said cylindrical antenna.

The present invention is an antenna device comprising
a planar antenna having at least one antenna element having at least one bend or curve and an end connected to a conductive substrate and
a cylindrical antenna located in a proximity of said planar antenna, wherein
an end of said planar antenna is connected to said conductive substrate at a side of said planar antenna closer to said cylindrical antenna.

The present invention is an antenna device comprising a cylindrical antenna provided in a proximity of a conductive substrate and a planar antenna provided between said cylindrical antenna and said conductive substrate and having at least one antenna element having at least one bend or curve and an end connected to a conductive substrate.

The present invention is an antenna device comprising
a planar antenna having at least one antenna element having at least one bend or curve and an end connected to a conductive substrate and
a printed antenna located in a proximity of said planar antenna and having a zigzag conductive pattern formed on a printed circuit board.

The present invention is an antenna device comprising
a planar antenna having at least one antenna element with at least one bend or curve and a printed antenna having a zigzag conductive pattern, both antennas being formed in a proximity of each other on the same board,
a conductive plate connected to an end of said antenna element and corresponding to said planar antenna, and
an insulation member which insulates said conductive plate from a conductive substrate which is larger than said planar antenna and said printed antenna, wherein
said planar antenna, said printed antenna and said conductive plate are capable to turn together to a direction perpendicular to the plane of said conductive substrate.

The present invention is a digital television broadcasting receiving device comprising
an input means which is an antenna device of the present invention as mentioned above,
a delay means for receiving a signal from said input means and delaying it,
a synthesis means for synthesizing a signal from said delay means and a signal from said input means,
a reception means for performing frequency conversion on a signal from said synthesis means, and
a demodulation means for converting a signal from said reception means into a baseband signal, wherein
the delay time used in said delay means and the synthesis ratio used in said synthesis means can be established arbitrarily.

The present invention is a digital television broadcasting receiving device comprising
an input means which is an antenna device of the present invention as mentioned above,
a delay means for receiving a signal from said input means and delaying it,
a synthesis means for synthesizing a signal from said delay means and a signal from said input means,
a reception means for performing frequency conversion on a signal from said synthesis means,
a demodulation means for converting a signal from said reception means into a baseband signal,
a delayed wave estimation means for receiving a signal indicating the demodulation conditions from said demodulation means and estimating a delayed wave contained in a signal from said input means, and
a synthesis control means for controlling said synthesis means and said delay means in accordance with a signal from said delayed wave estimation means, wherein
either the signal synthesis ratio used in said synthesis means or the delay time used in said delay means can be controlled in accordance with a signal from said synthesis control means.

The present invention is a digital television broadcasting receiving device comprising
an input means which is an antenna device of the present invention as mentioned above,
a reception means for performing frequency conversion on a signal from said input means,
a delay means for receiving a signal from said reception means and delaying it,
a synthesis means for synthesizing a signal from said delay means and a signal from said reception means, and
a demodulation means for converting a signal from said synthesis means into a baseband signal, wherein
the delay time used in said delay means and the synthesis ratio used in said synthesis means can be established arbitrarily.

The present invention is a digital television broadcasting receiving device comprising
an input means which is an antenna device of the present invention as mentioned above,
a reception means for performing frequency conversion on a signal from said input means,
a delay means for receiving a signal from said reception means and delaying it,
a synthesis means for synthesizing a signal from said delay means and a signal from said reception means,
a demodulation means for converting a signal from said synthesis means into a baseband signal,
a delayed wave estimation means for receiving a signal indicating the demodulation conditions from said demodulation means and estimating a delayed wave contained in a signal from said input means, and
a synthesis control means for controlling said synthesis means and said delay means in accordance with a signal from said delayed wave estimation means, wherein
either the signal synthesis ratio used in said synthesis means or the delay time used in said delay means can be controlled in accordance with a signal from said synthesis control means.

The present invention is a digital television broadcasting receiving device comprising
- an input means which is an antenna device of the present invention as mentioned above,
- a reception means for performing frequency conversion on a signal from said input means,
- a demodulation means for converting a signal from said reception means into a baseband signal,
- a delayed wave estimation means for receiving information on the demodulation conditions from said demodulation means and estimating a delayed wave contained in a signal from said input means, and
- a demodulation control means for controlling said demodulation means based on delayed wave information from said delayed wave estimation means, wherein
    - a transfer function to be handled by said demodulation means is controlled based on a control signal from said demodulation control means.

BRIEF DESCRIPTION OF THE DRAWINGS

FIG. 1 is a schematic diagram showing an example of an antenna device according to a first embodiment of the present invention;

FIG. 5 is a schematic diagram showing an example of an antenna device according to a third embodiment of the present invention;

FIG. 6 is a schematic diagram showing another example of the antenna device according to the third embodiment;

FIG. 11 is a schematic diagram showing another example of the antenna device according to the fourth embodiment;

FIG. 21 is a schematic diagram showing another example of the antenna device according to the seventh embodiment;

FIG. 37 is a perspective view showing another example of locations where the antenna device according to the eighteenth embodiment is to be installed;

FIG. 43 is a schematic diagram showing another example of the antenna device according to the twenty-first embodiment;

FIG. 44 is a schematic diagram showing an example of an antenna device according to a twenty-second embodiment of the present invention;

FIG. 45 is a schematic diagram showing an example of an antenna device according to a twenty-third embodiment of the present invention;

FIG. 55 is a schematic diagram showing the configuration of an antenna according to a twenty-eighth embodiment of the present invention;

FIG. 56 (a) is a schematic diagram showing the configuration of another example of the antenna according to the twenty-eighth embodiment and FIG. 56 (b) is an explanatory drawing therefor;

FIGS. 60 (a) and 60(b) are schematic diagrams showing the configuration of an example of an antenna according to a thirtieth embodiment of the present invention and FIG. 60 (c) is a graph for explaining the frequency characteristics thereof;

FIGS. 61(a) and 61(b) are schematic diagrams showing the configuration of another example of the antenna according to the thirtieth embodiment and FIG. 61(c) is a graph for explaining the frequency characteristics thereof;

FIGS. 62(a) and 62(b) are schematic diagrams showing the configuration of still another example of the antenna according to the thirtieth embodiment and FIG. 62(c) is a graph for explaining the frequency characteristics thereof;

FIG. 95 shows the directional gain characteristics in the antenna of FIG. 55(a);

FIG. 96 shows the directional gain characteristics in the antenna of FIG. 55(b);

FIG. 120 is a block diagram showing the configuration of a digital television broadcasting receiving device according to still another embodiment of the present invention;

FIG. 121 is a block diagram showing the configuration of a digital television broadcasting receiving device according to still another embodiment of the present invention;

FIG. 122 is a block diagram showing the configuration of a digital television broadcasting receiving device according to still another embodiment of the present invention;

FIG. 123 is a block diagram showing the configuration of a digital television broadcasting receiving device according to still another embodiment of the present invention;

FIG. 124 shows the result of frequency analysis performed on a received signal which is affected by disturbance of a delayed wave;

FIG. 125 shows the gain control performed by a synthesis means;

FIG. 126 shows the delay time and error rate of a delayed wave; and

FIG. 127 is a flow chart for explaining antenna switching conditions for changing over from one antenna to another.

DESCRIPTION OF SYMBOLS

Figure 2:
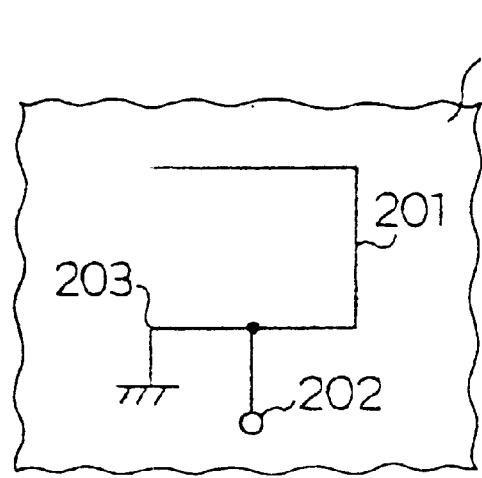
FIG. 2 is a schematic diagram showing another example of the antenna device according to the first embodiment.
Figure 2:
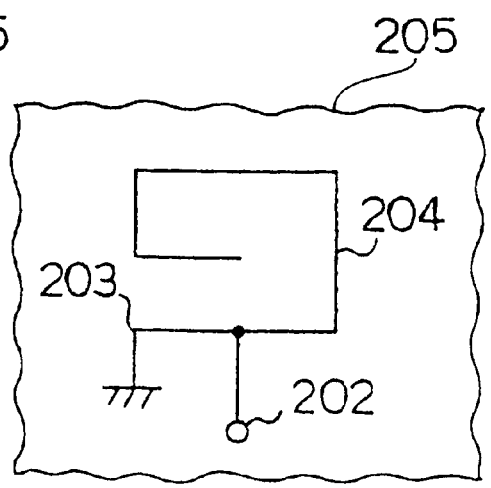
Figure 2:
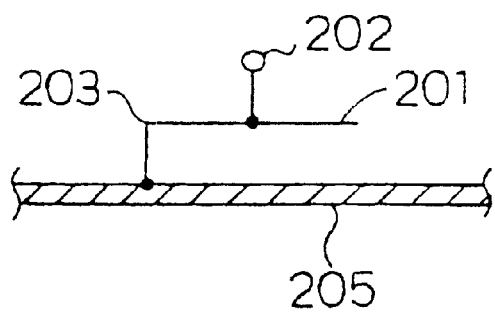
Figure 2:
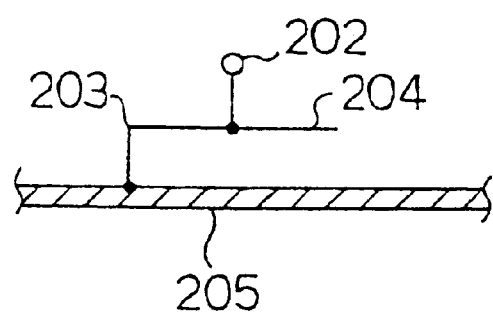

101, 104 Antenna element (linear conductor)
102 Feeding terminal
151 Conductive substrate
152 Monopole antenna
153 Feeding section
154 Antenna element
155 Feeding section 205 Conductive substrate
254, 255 Antenna element
256, 257 Reactance
258 Feeding section
502, 504 Reactance element
1304 Printed circuit board
1505 Recess
1806 Multilayer printed circuit board
1901 Feeding point
3003 Dielectric
3203 Coil
3503 Diversity changeover switch
3804 Communication device
3804 Body
3902 Shield case
4603 High-permittivity material
5603, 5606 Ferroelectric
9001 Input means
9002 Delay means
9003 Synthesis means
9004 Reception means
9005 Demodulation means
9006 Synthesis control means
9007 Delayed wave estimation means
9008 Positional information determination means
9009 Vehicle information detection means
9011 Antenna
9012 Amplification means
9061 Gain control means
9062 Delay time control means
9091 Speed detection means
9092 Position detection means

BEST MODE FOR CARRYING OUT THE INVENTION

Now, the present invention will be described below with respect to the accompanying drawings which show embodiments thereof.

To begin with, the principle of those embodiments will be described. As described in the section "BACKGROUND ART" above, when a conventional antenna like a monopole antenna is installed in the proximity to a conductive substrate, the body configured by the conductive substrate may have some influence on the antenna performance such as directional gain. By taking advantage of such an influence of the conductive substrate on the antenna, the present invention can implement a high-selectivity antenna with no directivity and an improved directional gain.

(Embodiment 1)

FIG. 1 is a schematic diagram showing the configuration of an antenna device according to a first embodiment of the present invention. Namely, FIG. 1(a) shows an antenna device which comprises an antenna element 101 configured by a linear conductor with two bends, a feeding terminal 102 provided in place on the antenna element 101, and a grounded end 103. FIG. 1(b) shows antenna device which comprises an antenna element 104 configured by a linear conductor with four bends, a feeding terminal 102 provided in place on the antenna element 104, and a grounded end 103. In this way, the antenna devices according to the present embodiment can reduce the installation area because the antenna elements of the monopole antennas are bent.

FIG. 2 is a schematic diagram showing such example that antenna devices having the configurations similar to those described above are located in the proximity to conductive substrates, respectively. Namely, FIG. 2(a) shows an antenna device which comprises an antenna element 201 configured by a linear conductor with two bends and located in the proximity to a conductive substrate 205 with the antenna plane parallel to the substrate, a feeding terminal 202 provided in place on the antenna element 201, and an end 203 connected to the conductive substrate 205 for grounding. FIG. 2(b) shows another antenna device which comprises an antenna element 204 configured by a linear conductor with four bends and located in the proximity to a conductive substrate 205 with the antenna plane parallel to the substrate, a feeding terminal 202 provided in place on the antenna element 204, and an end 203 connected to the conductive substrate 205 for grounding. In this way, the antenna devices according to the present embodiment can reduce the installation area as well as improve their directional gain performance because the antenna devices according to the first embodiment as described above are located in the proximity to the conductive substrates with their antenna planes parallel to the conductive substrates 205, respectively. It should be noted that the number of bends in an antenna element is not limited to that described with respect to the above embodiment. This may also apply to succeeding embodiments described below.

Figure 85:
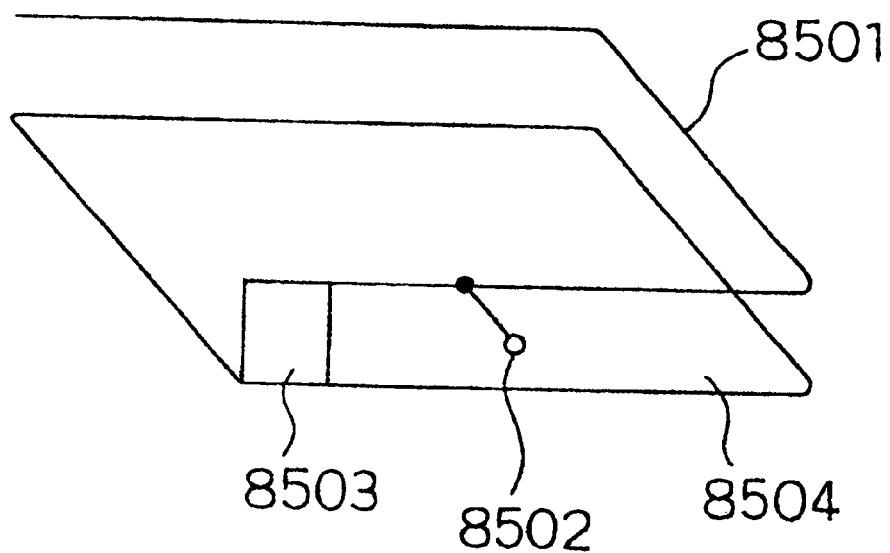
FIG. 85 is a perspective view showing a specific configuration of the antenna device shown in FIG. 2.

A specific configuration of the antenna of FIG. 2(a) is shown in FIG. 85. In FIG. 85, an antenna element 8501 configured by a linear conductor with two bends is located at a distance from a conductive substrate 8504 with the antenna plane almost parallel to the substrate and an end of the antenna element 8501 is connected to an end of a conductive plate 8503 provided almost perpendicular to the conductive substrate 8504 for antenna grounding. It should be noted that, in this case, the area formed by the antenna element 8501 is almost equal to that of the conductive substrate 8504. It should be also noted that a feeding section 8502 is provided in the way of the antenna element 8501.

The conductive plate 8503 has a width sufficiently larger than that of the antenna element 8501, that is, a width which may not be practically affected by any reactance determined from the tuning frequency of the antenna element 8501. This allows the conductive plate to serve as a ground. A smaller width may cause the conductive plate to couple to the antenna element 8501 thus to form a single antenna element as a wholes which will deviate from the scope of the present invention. The antenna element 8501 is, for example, 220 mm long and 2 mm wide for a wavelength of 940 mm and this may make the antenna device more compact. It should be noted that the antenna plane and the conductive substrate plane may be tilted to the extent that there exists an effective potential difference between the antenna element and the substrate. It should be also noted that if the area of the conductive substrate is larger than that of the antenna plane (for example, by quadruple), the gain may remain unchanged for a vertically polarized wave but decrease for a horizontally polarized wave.

The antenna according to the present embodiment differs from conventional antennas in that, for example, a smaller distance between the antenna element and the ground plate may degrade the performance of a conventional inverted F-shaped antenna, while such a smaller distance may improve the performance of the antenna according to the present invention.

Figure 86A:
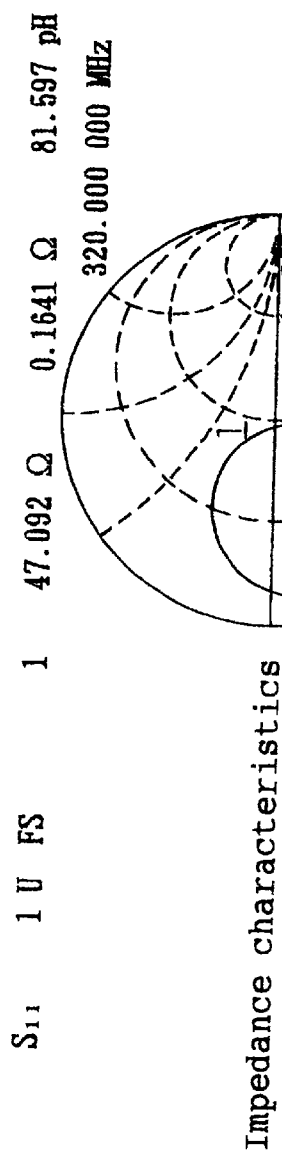
FIG. 86 shows the impedance and VSWR characteristics of the antenna shown in FIG. 85.
Figure 86B:
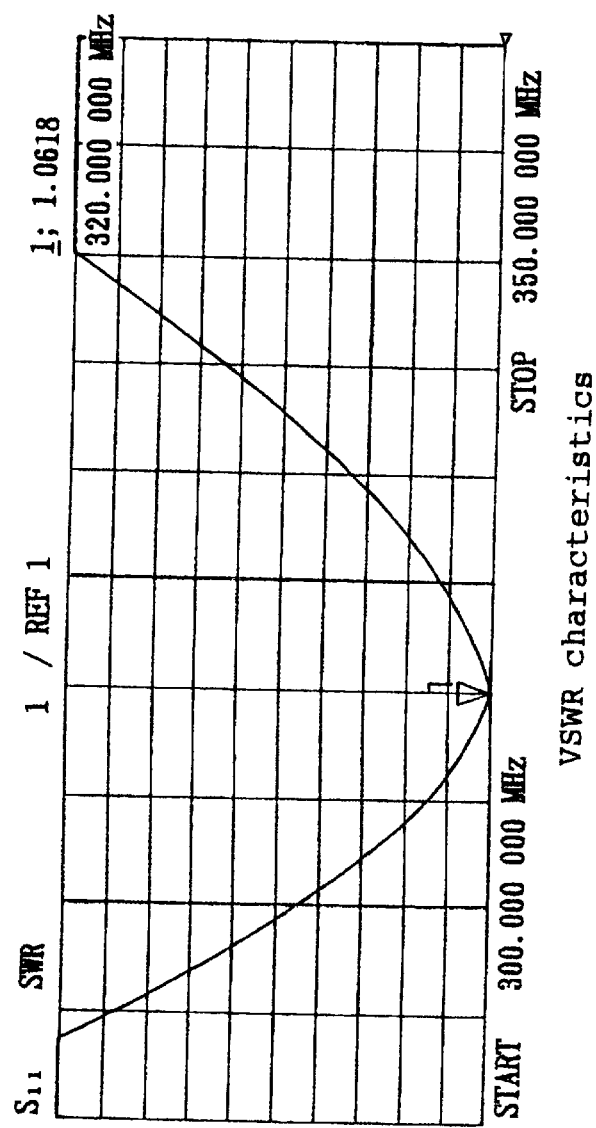
Figure 87:
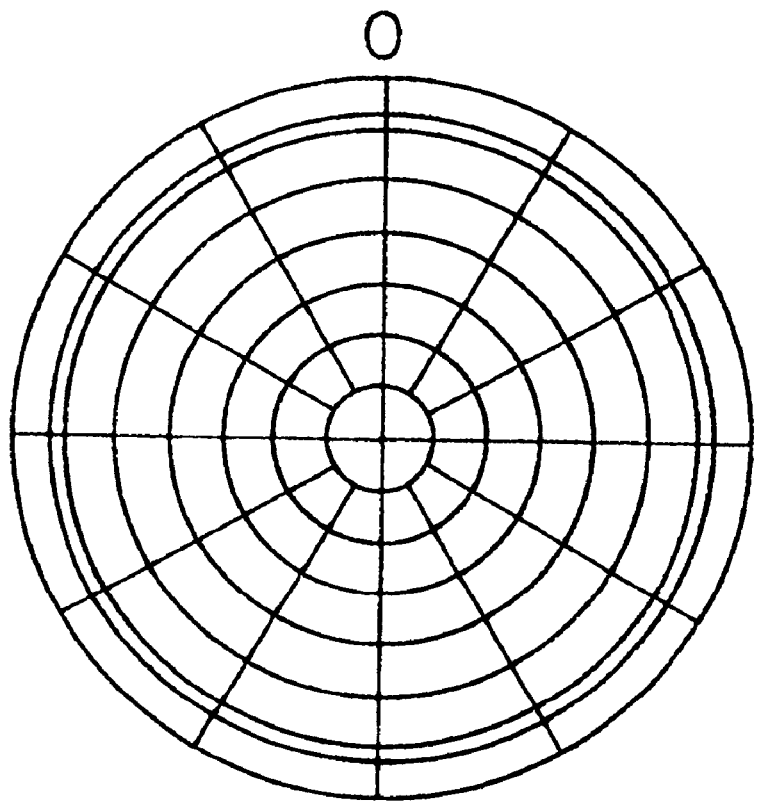
FIG. 87 shows the directional gain characteristics of the antenna shown in FIG. 85.
Figure 88:
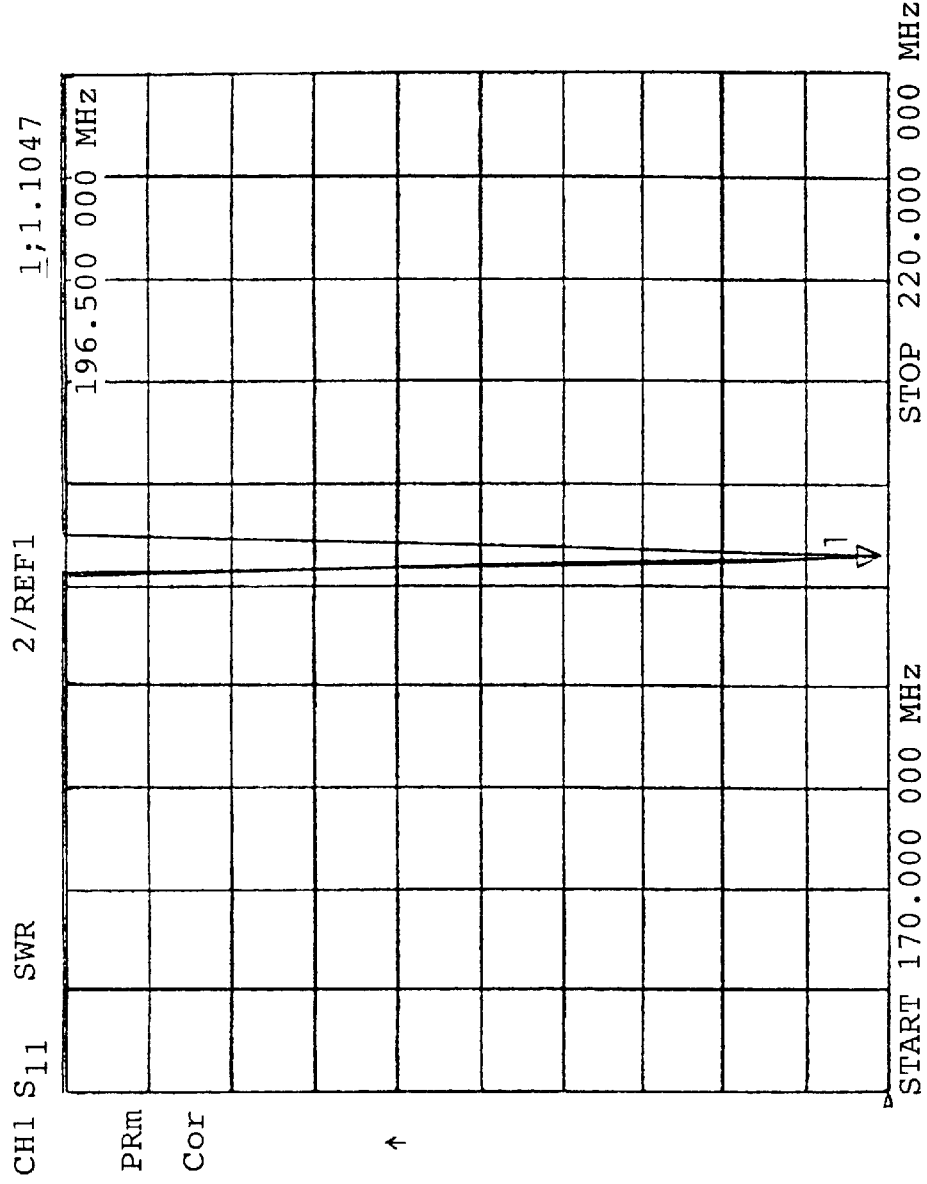
FIG. 88 shows the VSWR characteristics of an element for explaining band synthesis in a 4-element antenna.
Figure 89:
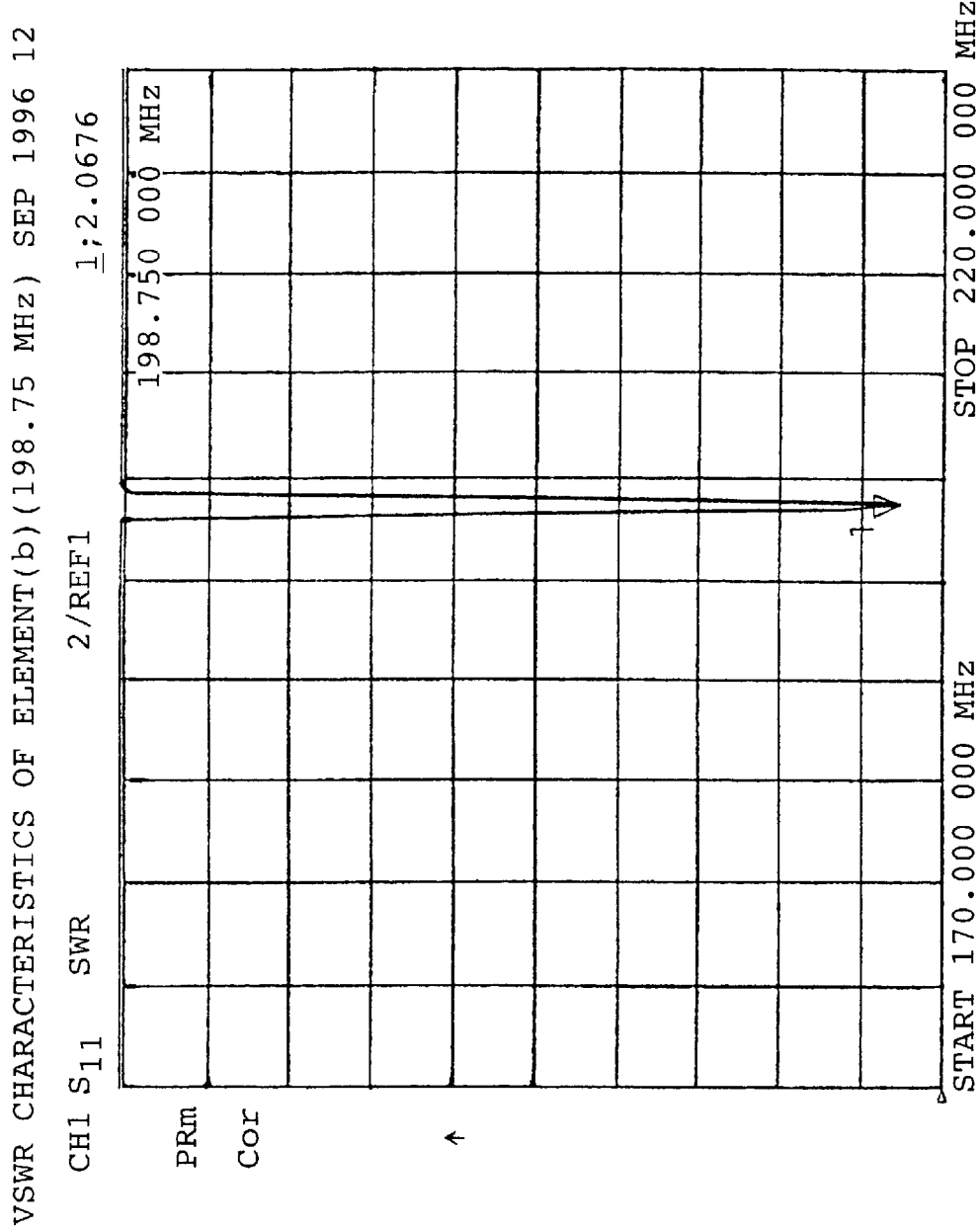
FIG. 89 shows the VSWR characteristics of another element for explaining band synthesis in the 4-element antenna.
Figure 90:
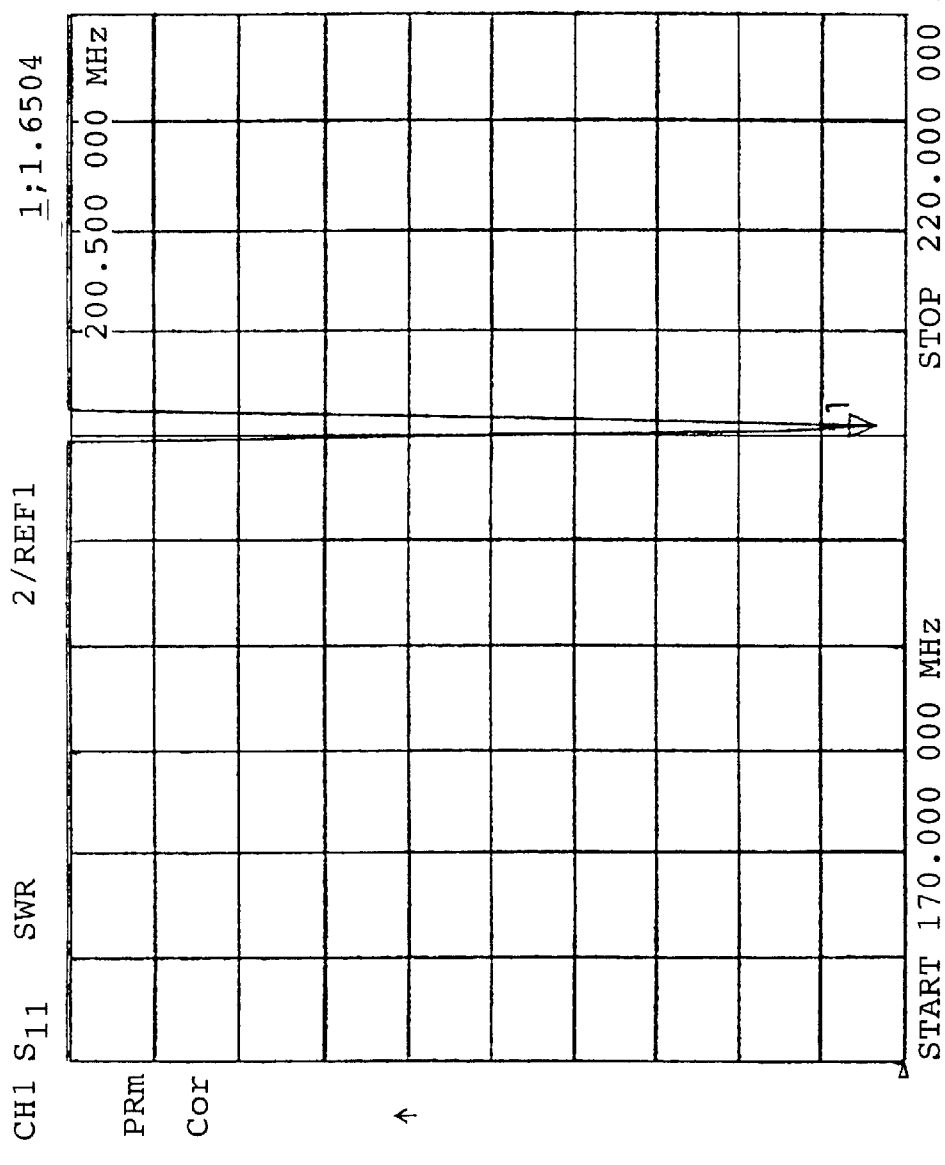
FIG. 90 shows the VSWR characteristics of still another element for explaining band synthesis in the 4-element antenna.
Figure 91:
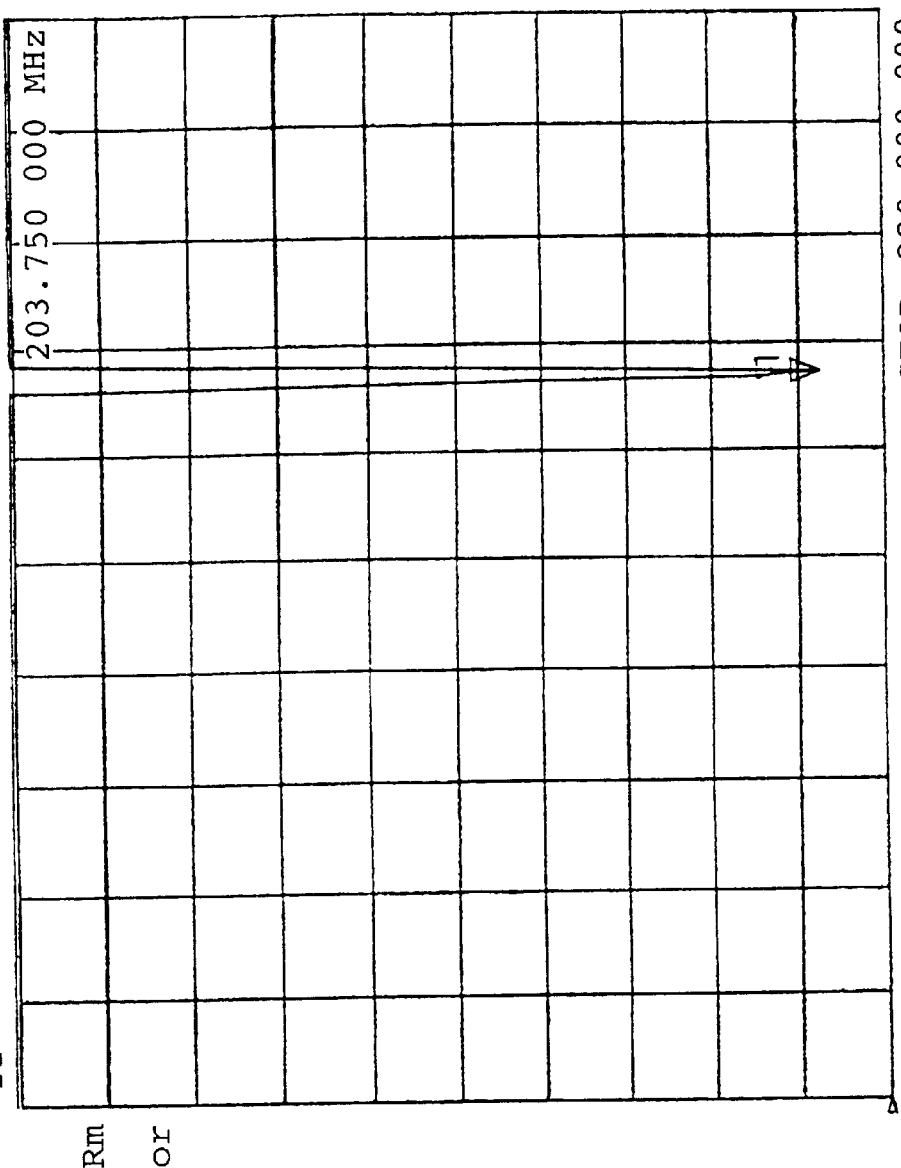
FIG. 91 shows the VSWR characteristics of still another element for explaining band synthesis in the 4-element antenna.

The impedance and VSWR characteristics of the antenna of FIG. 85 are shown in FIG. 86. Its directional gain characteristics are shown in FIG. 87. As shown in FIG. 87, the antenna of FIG. 85 has a generally circular directivity with respect to a vertically polarized wave.

Needless to say, the shape and number of antenna elements are not limited to those described with respect to the above embodiment.

It should be more preferable that the distance between the conductive substrate and the antenna element is a fortieth of the wavelength or more.

(Embodiment 2)

Figure 3:
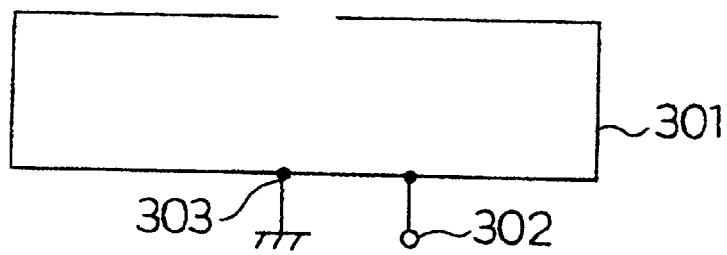
FIG. 3 is a schematic diagram showing an example of an antenna device according to a second embodiment of the present invention.
Figure 3:
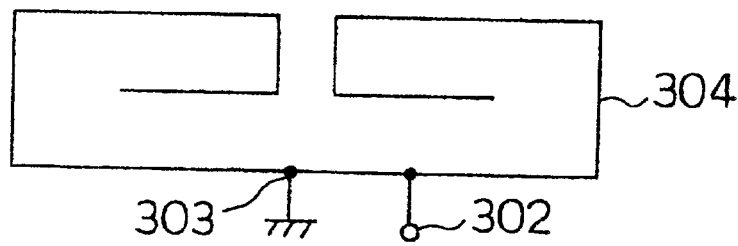

FIG. 3 is a schematic diagram showing the configuration of an antenna device according to a second embodiment of the present invention. Namely, FIG. 3(a) shows an antenna device which comprises an antenna element 301 configured by being a dipole antenna configured by a linear conductor with four bends, a feeding terminal 302 provided in place on the antenna element 301, and a grounded point 303. FIG. 3(b) shows another antenna device which comprises an antenna element 304 configured by being a dipole antenna configured by a linear conductor with eight bends, a feeding terminal 302 provided in place on the antenna element 304, and a grounded point 303. In this way, the antenna devices according to the present embodiment can reduce the installation area because the antenna elements of the dipole antennas are bent like a winding.

Figure 4:
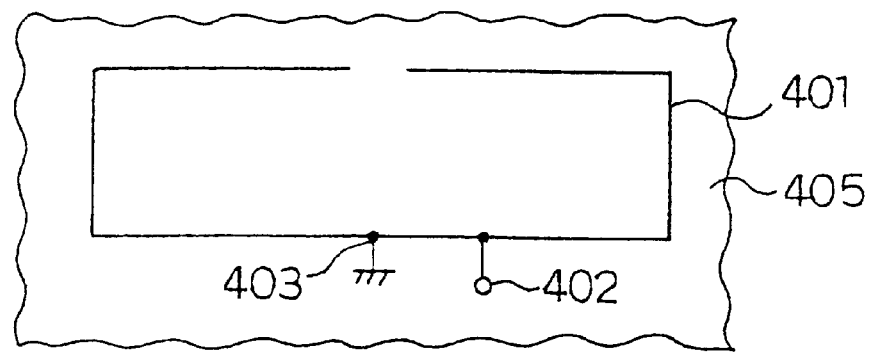
FIG. 4 is a schematic diagram showing another example of the antenna device according to the second embodiment.
Figure 4:
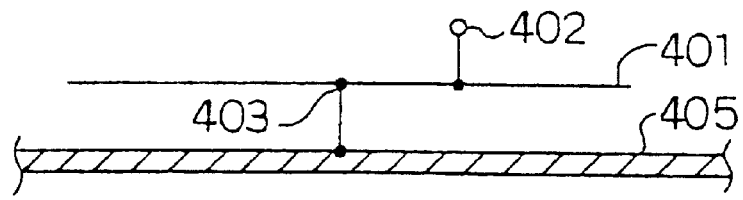
Figure 4:
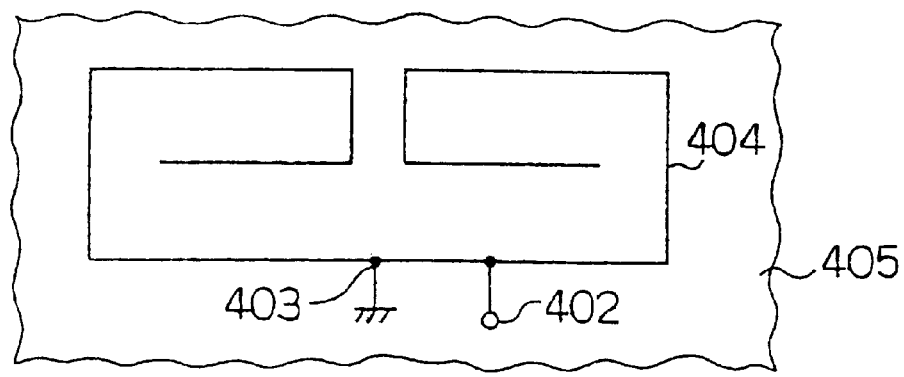
Figure 4:
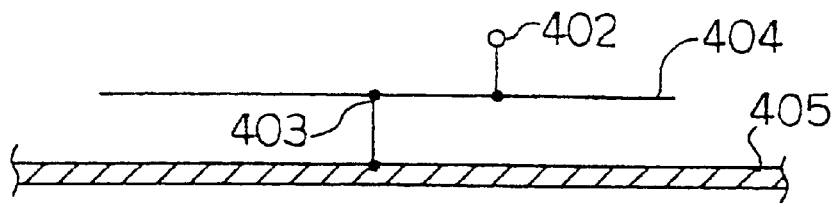

FIG. 4 is a schematic diagram showing that antenna devices having the configurations similar to those described above are located in the proximity to conductive substrates, respectively. Namely, FIG. 4(a) shows an antenna device which comprises an antenna element 401 configured to be a dipole antenna configured by a linear conductor with four bends and located in the proximity to a conductive substrate 405 with the antenna plane parallel to the substrate, a feeding terminal 402 provided in place on the antenna element 401, and a point 403 connected to the conductive substrate 405 for grounding. FIG. 4(b) shows another antenna device which comprises an antenna element 404 configured by being a dipole antenna configured by a linear conductor with eight bends and located in the proximity to a conductive substrate 405 with the antenna plane parallel to the substrate, a feeding terminal 402 provided in place on the antenna element 401, and a point 403 connected to the conductive substrate 405 for grounding. In this way, the antenna devices according to the present embodiment can reduce the installation area as well as further improve their directional gain performance when the antenna devices are located in the proximity to the conductive substrates with their antenna planes parallel to the conductive substrates 405, respectively.

(Embodiment 3)

FIG. 5 is a schematic diagram showing the configuration of an antenna device according to a third embodiment of the present invention. Namely, FIG. 5(a) shows an antenna device which comprises three monopole antenna elements 501a, 501b, and 501c having two bends and different lengths and being located on the same plane, and reactance elements 502a, 502b, 502c, and 504 connected between the taps of the antenna elements 501a, 501b, and 501c and a feeding terminal 503 and between the feeding terminal 503 and a ground terminal 505, respectively, to adjust their impedance. FIG. 5(b) shows another antenna device which substitutes antenna elements 506a, 506b, and 506c having four bends for the antenna elements 501a, 501b, and 501c of the antenna device of FIG. 5(a) described above.

Figure 40:
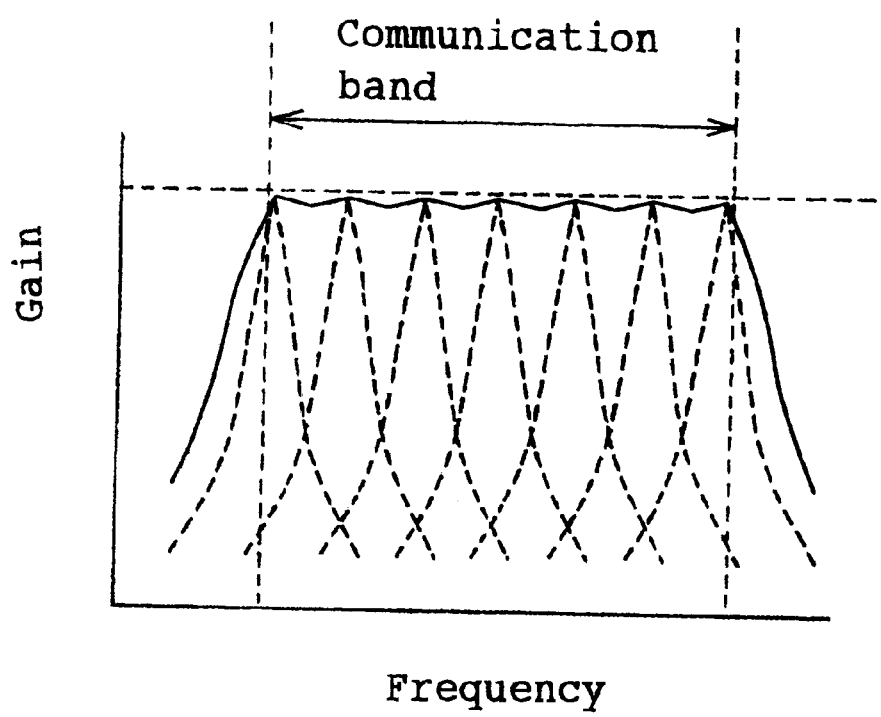
FIG. 40 shows an example of band synthesis according to the present invention.

With the configurations described above, an antenna device having a desirable bandwidth can be implemented by setting the tuning frequencies of the antenna elements at regular intervals. FIG. 40 shows an example of band synthesis performed by an antenna having seven antenna elements and it may be seen from the figure that a broadband frequency characteristic can be achieved through such band synthesis even when each antenna element has a small bandwidth.

Figure 92:
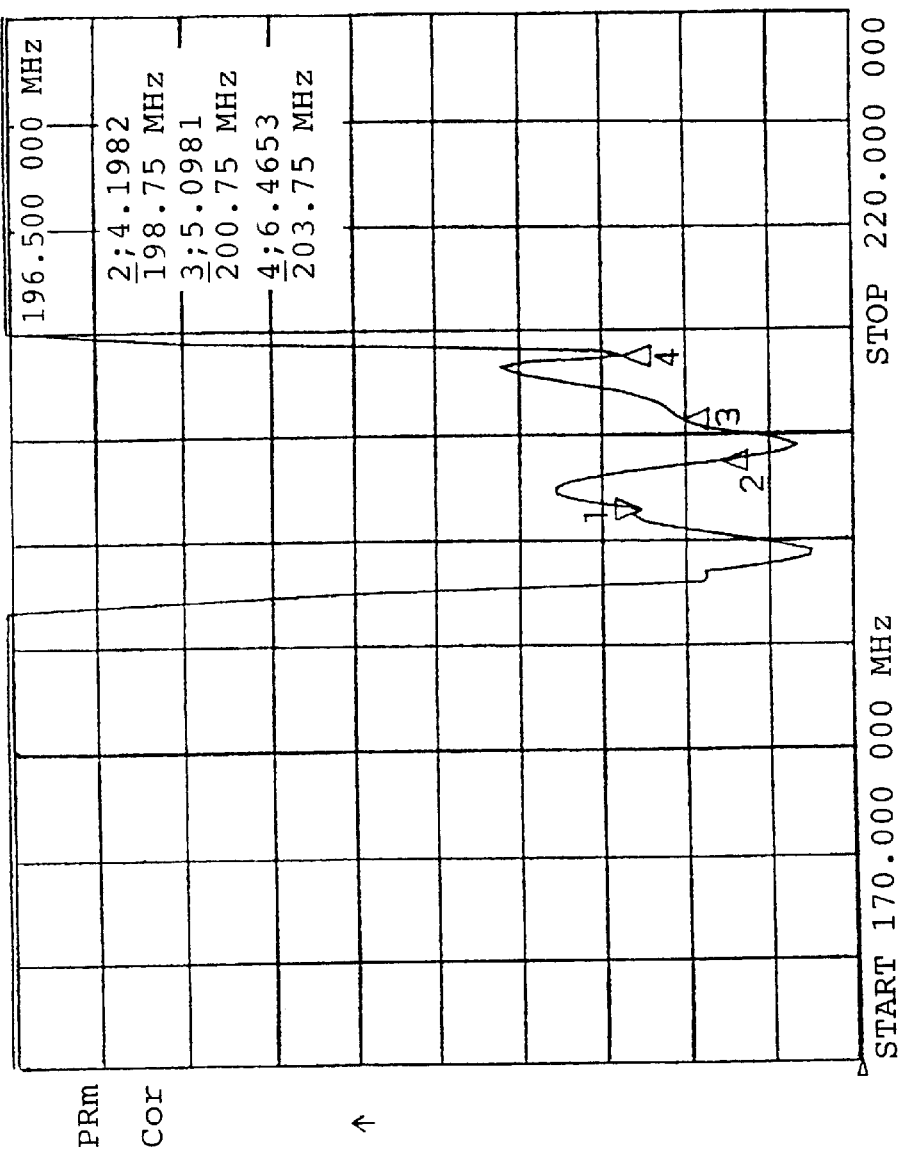
FIG. 92 shows the VSWR characteristics after band synthesis of the 4-element antenna shown in FIGS. 88 through 91.
Figure 93:
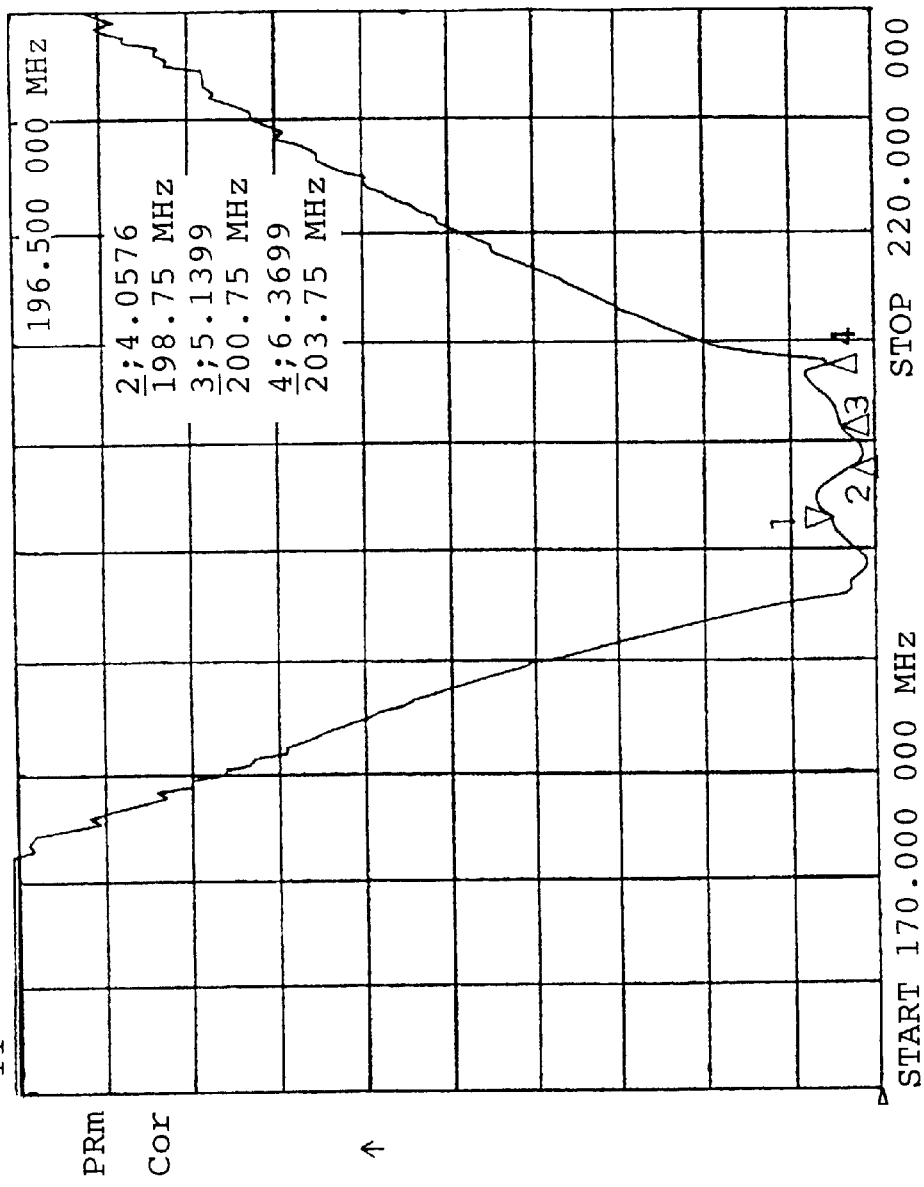
FIG. 93 shows the VSWR characteristics when the range of ordinates in FIG. 92 is extended.
Figure 94A:
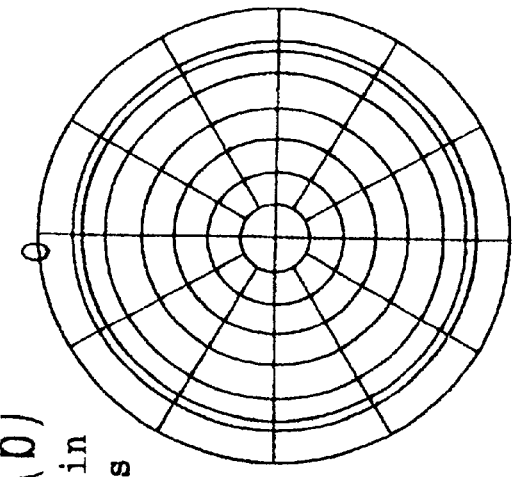
FIG. 94 shows the directional gain characteristics when the antenna ground is located at different distances from the device ground in the antenna of FIG. 44(b)
Figure 94B:
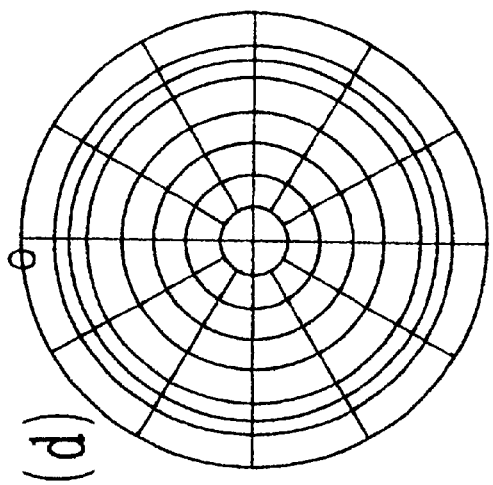
Figure 94C:
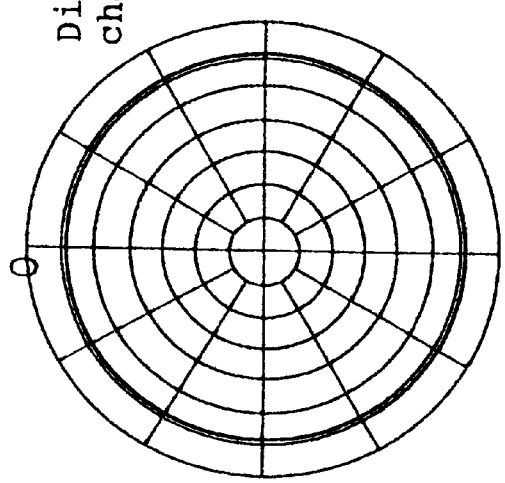
Figure 94D:
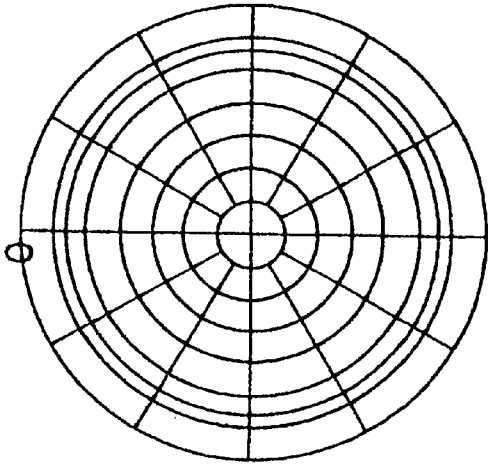

Specific examples of such band synthesis will be described with respect to the VSWR characteristics shown in FIGS. 88 through 93. Namely, these examples use four antenna elements with different tuning frequencies, that is, 196.5 MHz (FIG. 88), 198.75 MHz (FIG. 89), 200.5 MHz (FIG. 90), and 203.75 MHz (FIG. 91), respectively. FIG. 92 shows the VSWR characteristics after band synthesis of these antenna elements and it can be seen that the band has become wider than before. FIG. 93 shows the VSWR characteristics when the range of ordinates in FIG. 92 is extended (by quintuple).

FIG. 6 is a schematic diagram showing that antenna devices having the configurations similar to those of FIG. 5 described above are located in the proximity to conductive substrates, respectively. In the figure, antenna devices having the configurations similar to those of FIG. 5 described above are located in the proximity to conductive substrates 607 with their antenna planes parallel to the substrates. Namely, FIG. 6(a) shows an antenna device which comprises three monopole antenna elements 601a, 601b, and 601c having two bends and different lengths and being located on the same plane in the proximity to a conductive substrate 607, and reactance elements 602a, 602b, 602c, and 604 connected between the taps of the antenna elements 601a, 601b, and 601c and a feeding terminal 603 and between the feeding terminal 603 and a ground terminal 605, respectively, to adjust their impedance. FIG. 6(b) shows another antenna device which substitutes antenna elements 606a, 606b, and 606c having four bends for the antenna elements 601a, 601b, and 601c of the antenna device of FIG. 6(a) described above.

Figure 7:
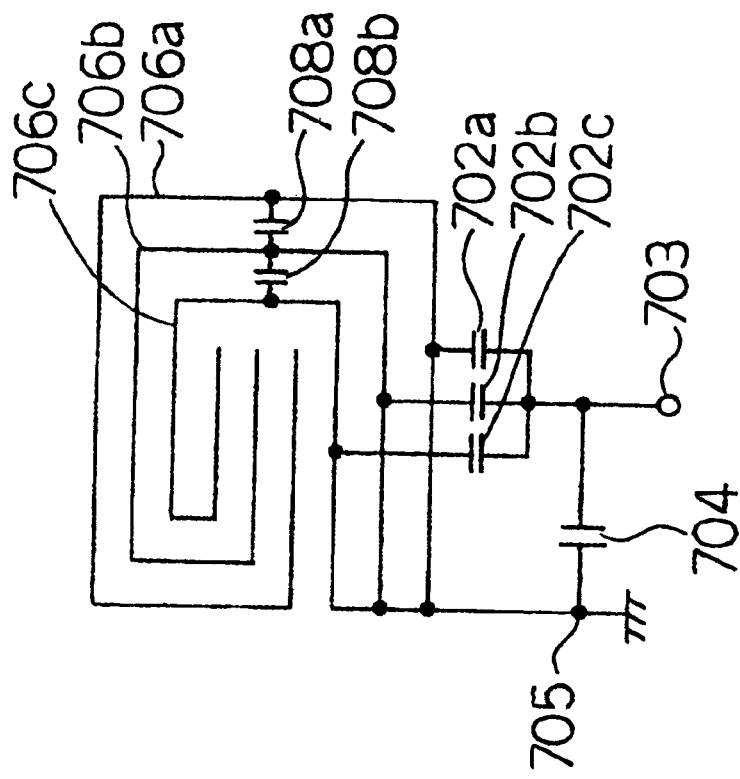
FIG. 7 is a schematic diagram showing another example of the antenna device according to the third embodiment.
Figure 7:
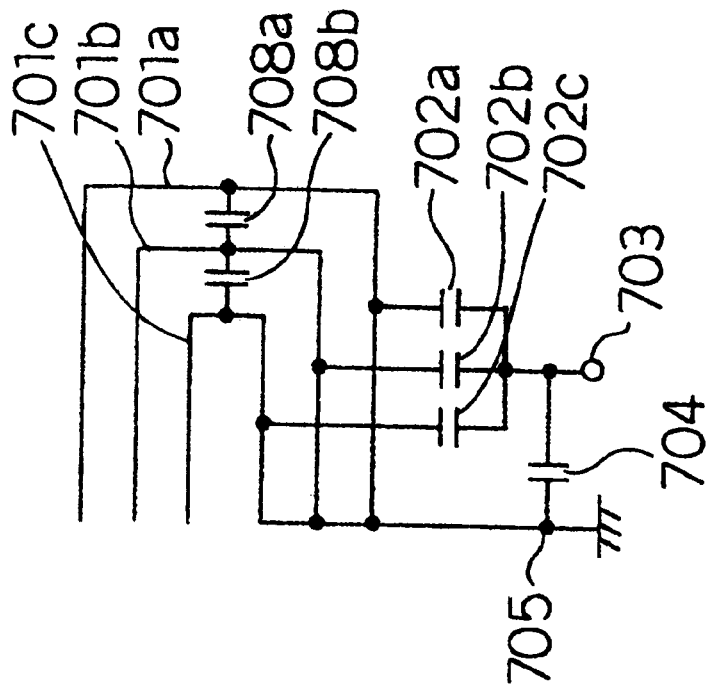

FIG. 7 is a schematic diagram showing the configuration of still another example of the antenna device according to the present embodiment. Namely, FIG. 7(a) shows that reactance elements 708a and 708b for band synthesis are provided between antenna elements 701a, 701b, and 701c in an antenna device having the configuration similar to that of FIG. 5(a) described above. FIG. 7(b) shows that reactance elements 708a and 708b for band synthesis are provided between antenna elements 706a, 706b, and 706c in an antenna device having the configuration similar to that of FIG. 5(b) described above. While in the configurations of FIGS. 5(a) and (b), each reactance element 502a, 502b, or 502c performs the band synthesis in addition, the present embodiment can facilitate the impedance adjustment and band synthesis because the band synthesis function is separated from the impedance adjustment.

FIG. 8 is a schematic diagram showing the configuration of still another example of the antenna device according to the present embodiment. In the figure, antenna devices having the configurations similar to those of FIG. 7 described above are located in the proximity to conductive substrates 807 with their antenna planes parallel to the substrates. Namely, FIG. 8(a) shows that reactance elements 808a and 808b for band synthesis are provided between antenna elements 801a, 801b, and 801c in an antenna device having the configuration similar to that of FIG. 6(a) described above. FIG. 8(b) shows that reactance elements 808a and 808b for band synthesis are provided between antenna elements 806a, 806b, and 806c in an antenna device having the configuration similar to that of FIG. 6(b) described above.

(Embodiment 4)

Figure 9B:
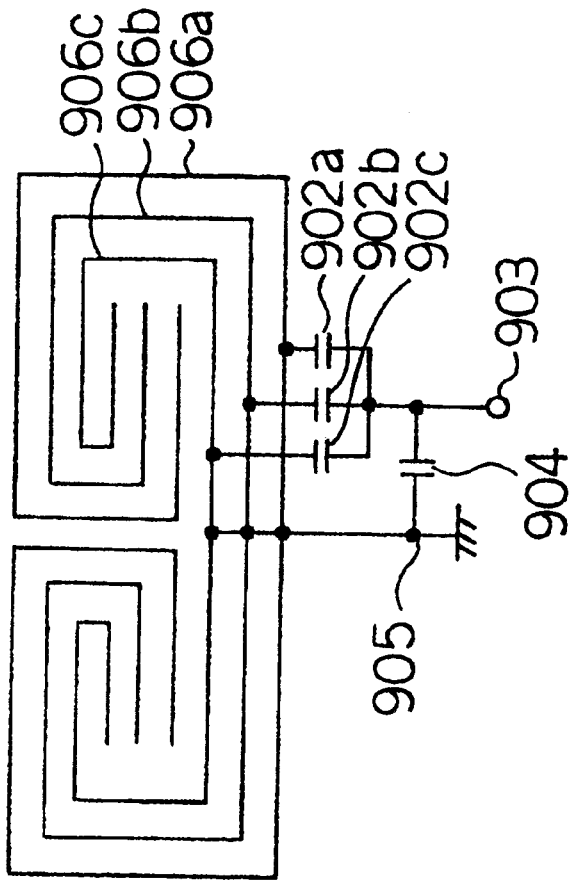
FIG. 9 is a schematic diagram showing an example of an antenna device according to a fourth embodiment of the present invention.
Figure 9A:
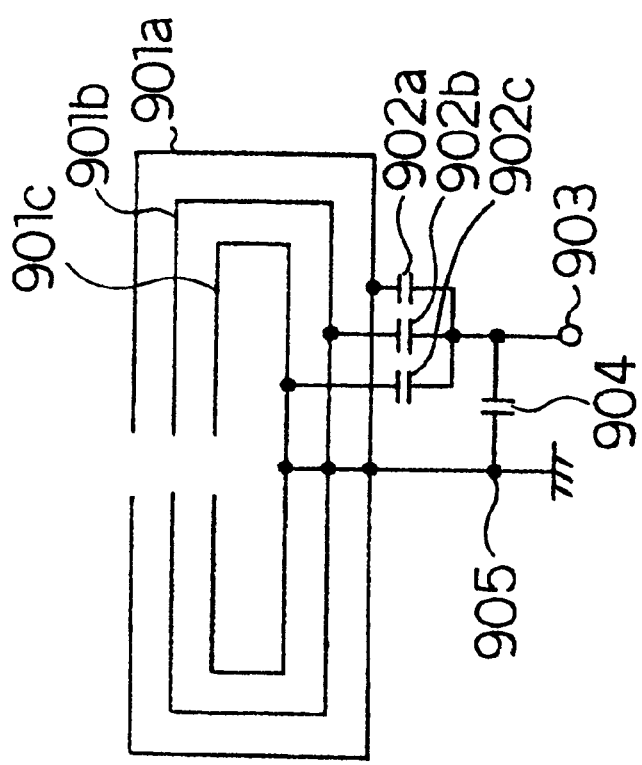

FIG. 9 is a schematic diagram showing the configuration of an antenna device according to a fourth embodiment of the present invention. Namely, FIG. 9(a) shows an antenna device which comprises three dipole antenna elements 901a, 901b, and 901c having four bends and different lengths and being located on the same plane, and reactance elements 902a, 902b, 902c, and 904 connected between the taps of the antenna elements 901a, 901b, and 901c and a feeding terminal 903 and between the feeding terminal 903 and a ground terminal 905, respectively, to adjust their impedance. FIG. 9(b) shows another antenna device which substitutes antenna elements 906a, 906b, and 906c having eight bends for the antenna elements 901a, 901b, and 901c of the antenna device of FIG. 9(a) described above.

With the configurations described above, an antenna device having a desirable bandwidth can be implemented by setting the tuning frequencies of the antenna elements at regular intervals.

Figure 10:
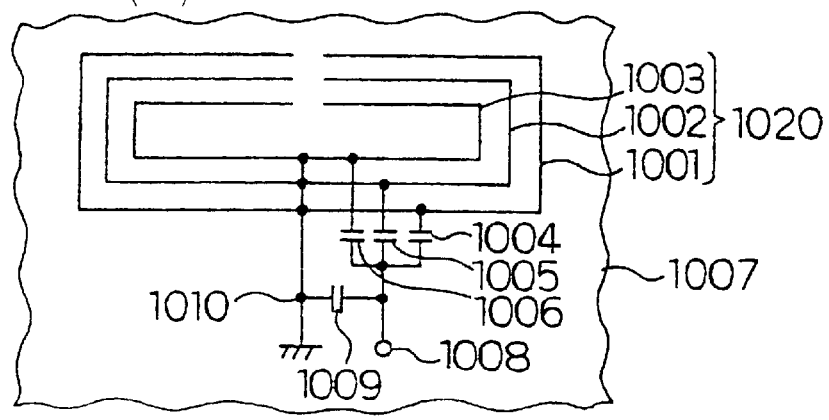
FIG. 10 is a schematic diagram showing another example of the antenna device according to the fourth embodiment.
Figure 10:
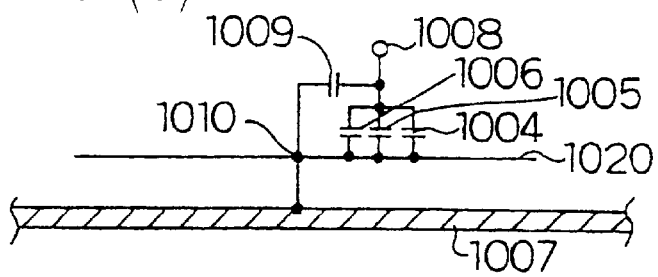
Figure 10:
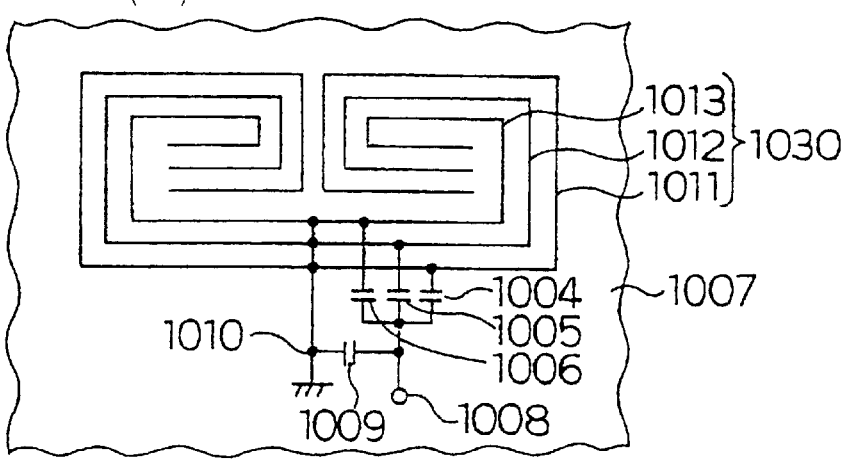
Figure 10:
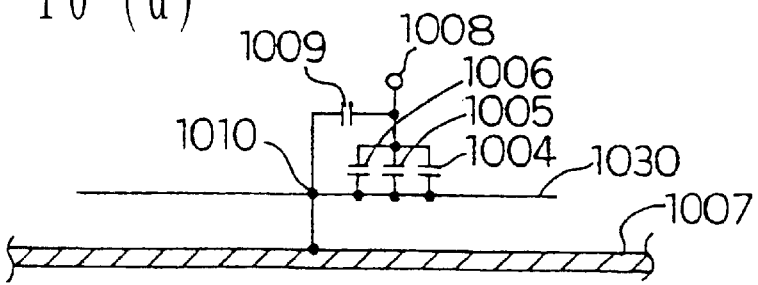

FIG. 10 is a schematic diagram showing the configuration of another example of the antenna device according to the present embodiment. In the figure, antenna devices having the configurations similar to those of FIG. 9 described above are located in the proximity to conductive substrates 1007 with their antenna planes parallel to the substrates. Namely, FIG. 10(a) shows an antenna device which comprises three dipole antenna elements 1001, 1002, and 1003 having four bends and different lengths and being located on the same plane in the proximity to a conductive substrate 1007, and reactance elements 1004, 1005, 1006, and 1009 connected between the taps of the antenna elements 1001, 1002, and 1003 and a feeding terminal 1008 and between the feeding terminal 1008 and a ground terminal 1010, respectively, to adjust their impedance. FIG. 10(b) shows another antenna device which substitutes antenna elements 1011, 1012, and 1013 having eight bends for the antenna elements 1001, 1002, and 1003 of the antenna device of FIG. 10(a) described above.

FIG. 11 is a schematic diagram showing the configuration of still another example of the antenna device according to the present embodiment. Namely, FIG. 11(a) shows that additional reactance elements 1114, 1115, 1116, and 1117 for band synthesis are provided between antenna elements 1101, 1102, and 1103 at two separate locations in an antenna device having the configuration similar to that of FIG. 9(a) described above. FIG. 11(b) shows that reactance elements 1114, 1115, 1116, and 1117 for band synthesis are provided between antenna elements 1111, 1112, and 1113 at two separate locations in an antenna device having the configuration similar to that of FIG. 9(b) described above. While in the configurations of FIGS. 9(a) and (b), each reactance element 902a, 902b, or 902c performs the band synthesis in addition, the present embodiment can facilitate the impedance adjustment and band synthesis because the band synthesis function is separated from the impedance adjustment.

Figure 12:
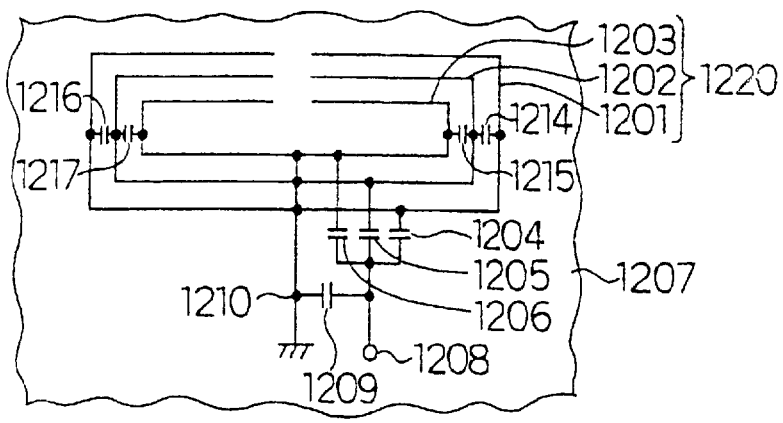
FIG. 12 is a schematic diagram showing another example of the antenna device according to the fourth embodiment.
Figure 12:
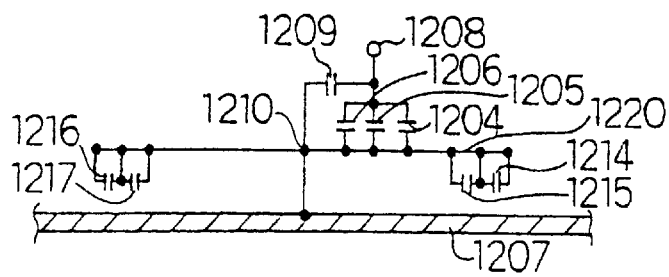
Figure 12:
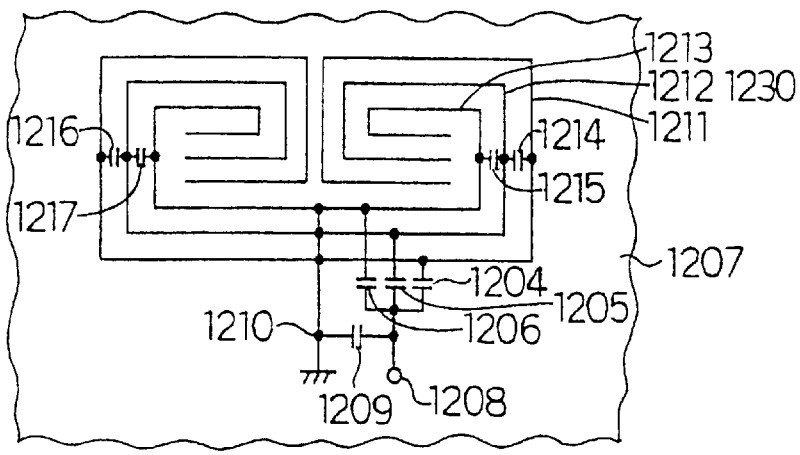
Figure 12:
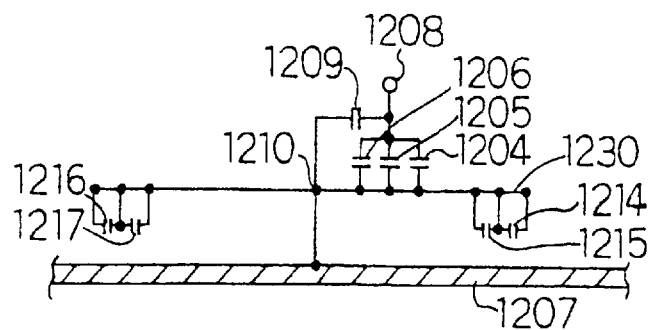

FIG. 12 is a schematic diagram showing the configuration of still another example of the antenna device according to the present embodiment. In the figure, antenna devices having the configurations similar to those of FIG. 11 described above are located in the proximity to conductive substrates 1207 with their antenna planes parallel to the substrates. Namely, FIG. 12(a) shows that reactance elements 1214, 1215, 1216, and 1217 for band synthesis are provided between antenna elements 1201, 1202, and 1203 at two separate locations in an antenna device having the configuration similar to that of FIG. 10(a) described above. FIG. 12(b) shows that reactance elements 1214, 1215, 1216, and 1217 for band synthesis are provided between antenna elements 1211, 1212, and 1213 at two separate locations in an antenna device having the configuration similar to that of FIG. 10(b) described above.

(Embodiment 5)

Figure 13:
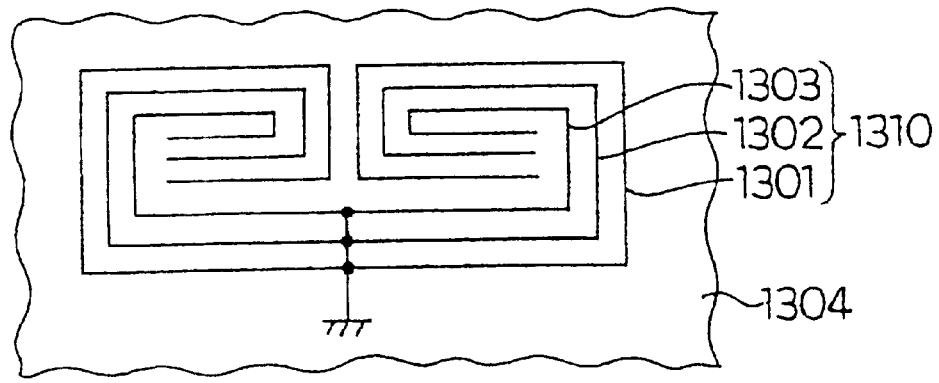
FIG. 13 is a schematic diagram showing an example of an antenna device according to a fifth embodiment of the present invention.
Figure 13:
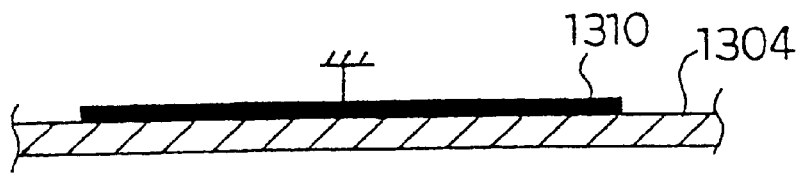
Figure 13:
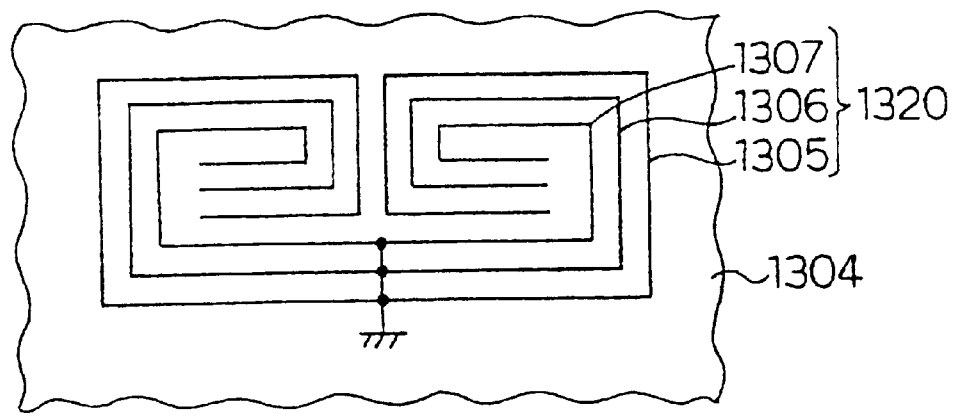
Figure 13:
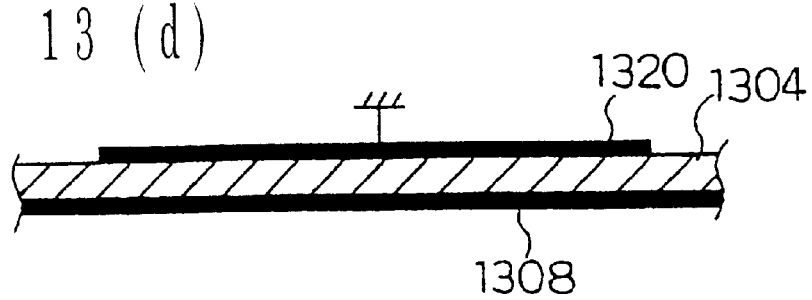

FIG. 13 is a schematic diagram showing the configuration of an antenna device according to a fifth embodiment of the present invention. Namely, FIG. 13(a) shows an antenna device which comprises three dipole antenna elements 1301, 1302, and 1303 having different lengths and being formed on a printed circuit board 1304. FIG. 13(b) shows another antenna device of the configuration similar to that of FIG. 13(a) described above, which has a conductive substrate 1308 formed on the opposite side of the printed circuit board 1304 to the antenna element 1320. Such a configuration where a printed circuit board is used to form the antenna elements 1301, 1302, and 1303 (1305, 1306, 1307) and the conductive substrate 1308 can save the space necessary for an antenna as well as allow easy fabrication of the antenna with improved performance reliability and stability.

Figure 14:
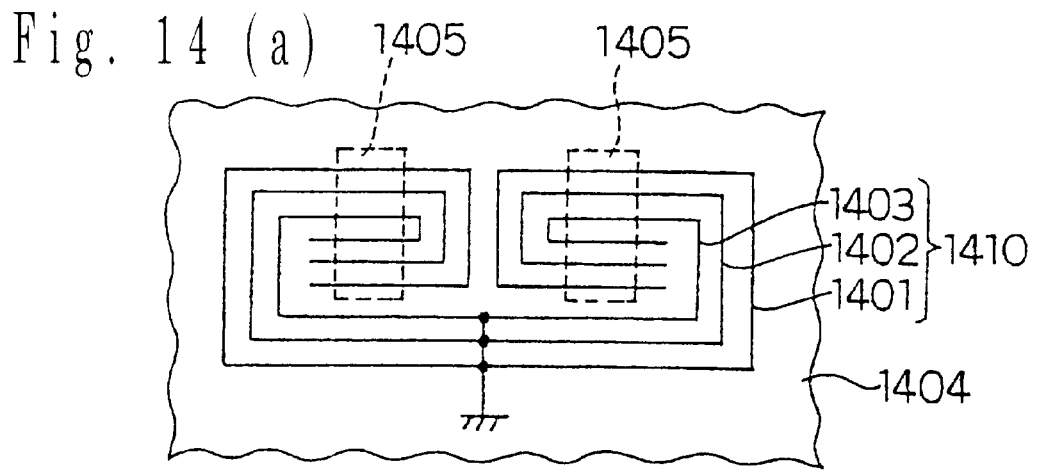
FIG. 14 is a schematic diagram showing another example of the antenna device according to the fifth embodiment.
Figure 14:
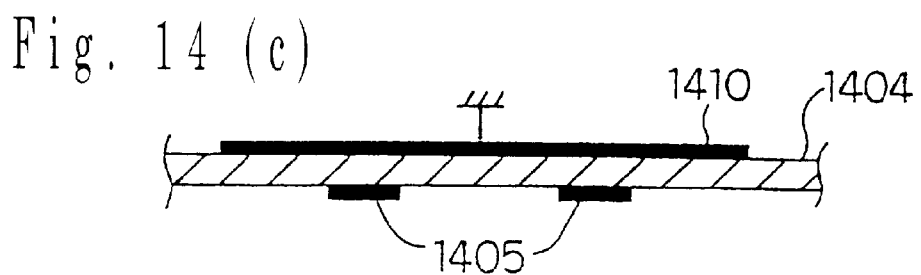
Figure 14:
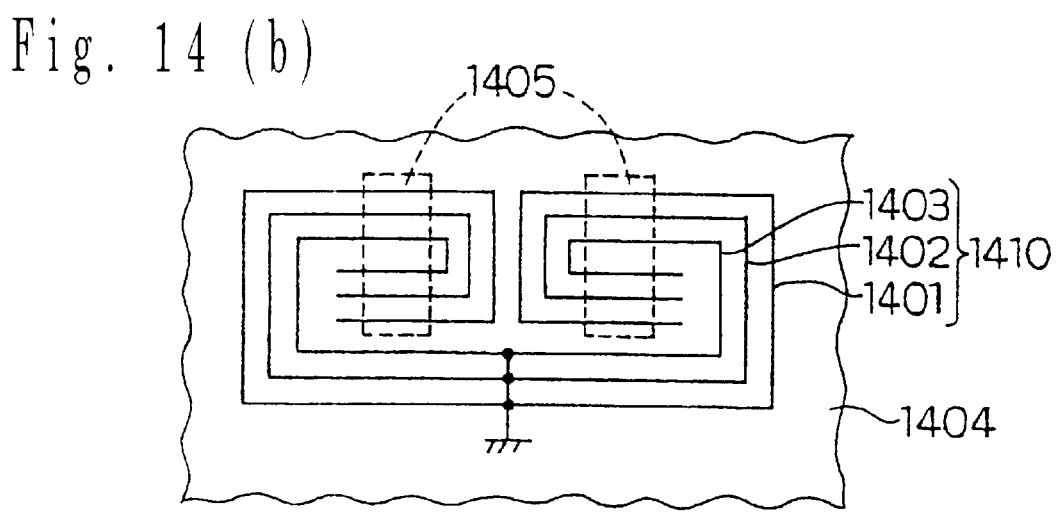
Figure 14:
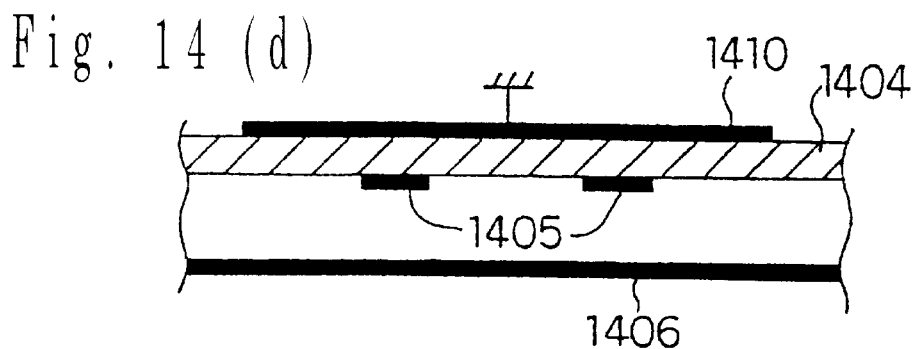

FIG. 14 is a schematic diagram showing the configuration of another example of the antenna device according to the present embodiment. In the figure, antenna devices of the configurations similar to those of FIG. 13(a) described above have a conductor for band analysis formed on the opposite side of a printed circuit board to antenna elements in a direction perpendicular to the antenna elements. Namely, FIG. 14(a) shows an antenna device which comprises three dipole antenna elements 1401, 1402, and 1403 having different lengths and being formed on a printed circuit board 1404 and two conductors 1405 formed on the opposite side of the printed circuit board 1404 to the antenna element 1410 in a direction perpendicular to the antenna element. FIG. 14(b) shows another antenna device of the configuration similar to that of FIG. 14(a) described above, which has a conductive substrate 1406 located in close proximity on the opposite side to the antenna element 1410. This conductive substrate 1406 may be formed on the printed circuit board through a multilayer printing technique. The configuration described above can allow easy fabrication of elements for band synthesis.

(Embodiment 6)

Figure 15:
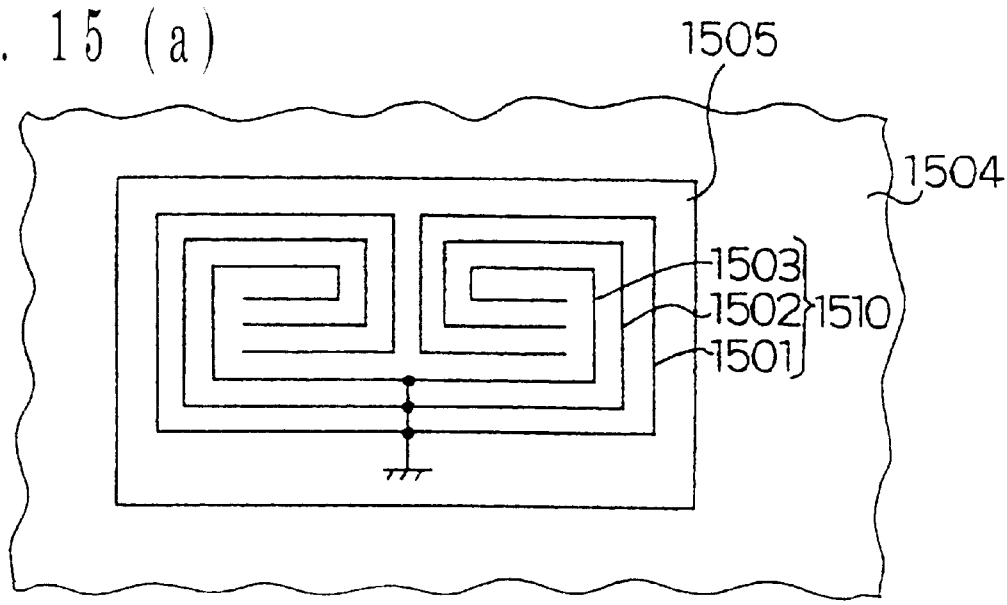
FIG. 15 is a schematic diagram showing an example of an antenna device according to a sixth embodiment of the present invention.
Figure 15:
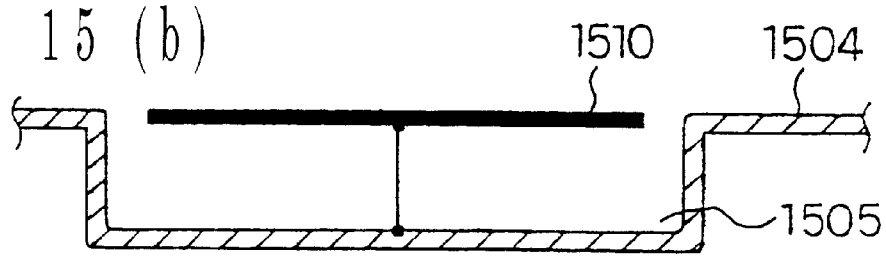

FIG. 15 is a schematic diagram showing the configuration of an antenna device according to a sixth embodiment of the present invention. The antenna device according to the present embodiment has antenna elements 1501, 1502, and 1503 located within a recess 1505 in a conductive substrate 1504. This configuration can eliminate any protrusion from an automobile body and improve the directional gain performance through interaction between the edge of the antenna element 1510 and the conductive substrate 1504.

Figure 16:
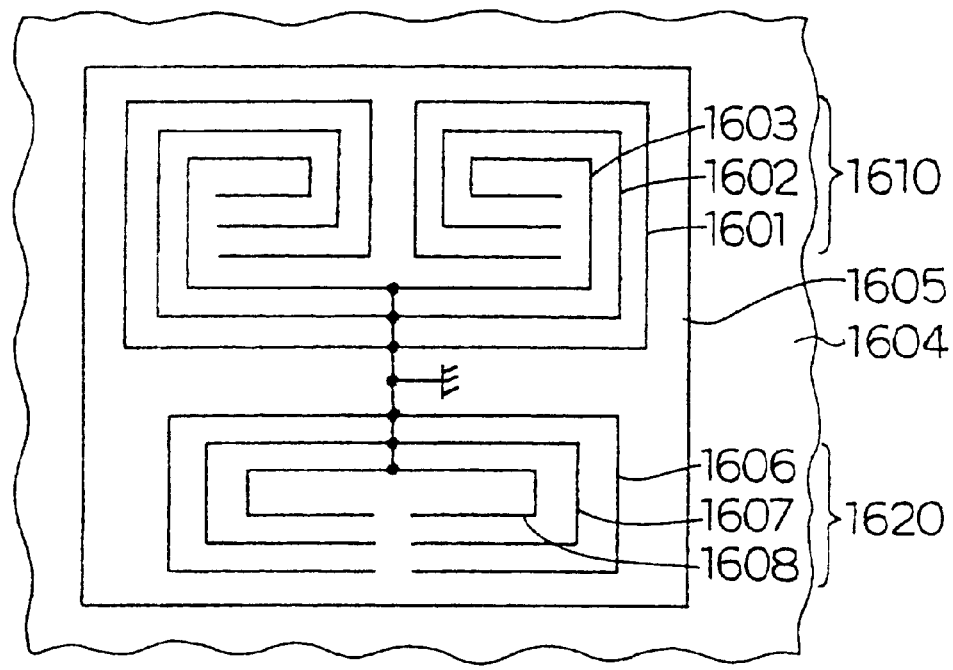
FIG. 16 is a schematic diagram showing another example of the antenna device according to the sixth embodiment.
Figure 16:
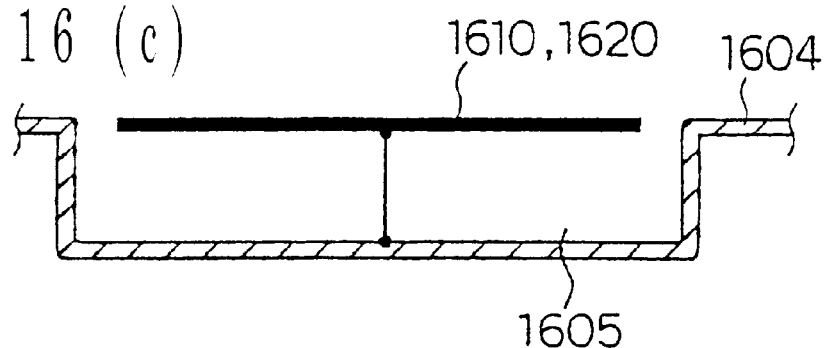
Figure 16:
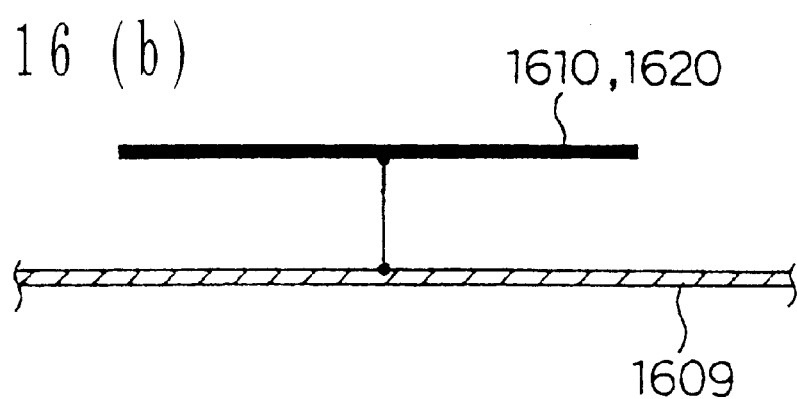

FIG. 16 is a schematic diagram showing the configuration of another example of the antenna device according to the present embodiment. The antenna device of FIG. 16(a) comprises an antenna 1610 consisting of antenna elements 1601, 1602, and 1603 and an antenna 1620 consisting of antenna elements 1606, 1607, and 1608 and these antennas 1610 and 1620 are located in the same plane and within a recess 1605 in a conductive substrate 1604. It should be noted that the antennas 1610 and 1620 of the present embodiment are different from each other in size and shape but they may be of the same size and shape. Feeding sections of these antennas are located in the proximity of each other. FIG. 16(b) shows that a similar antenna is located in the proximity of a planar conductive substrate 1609.

Figure 17:
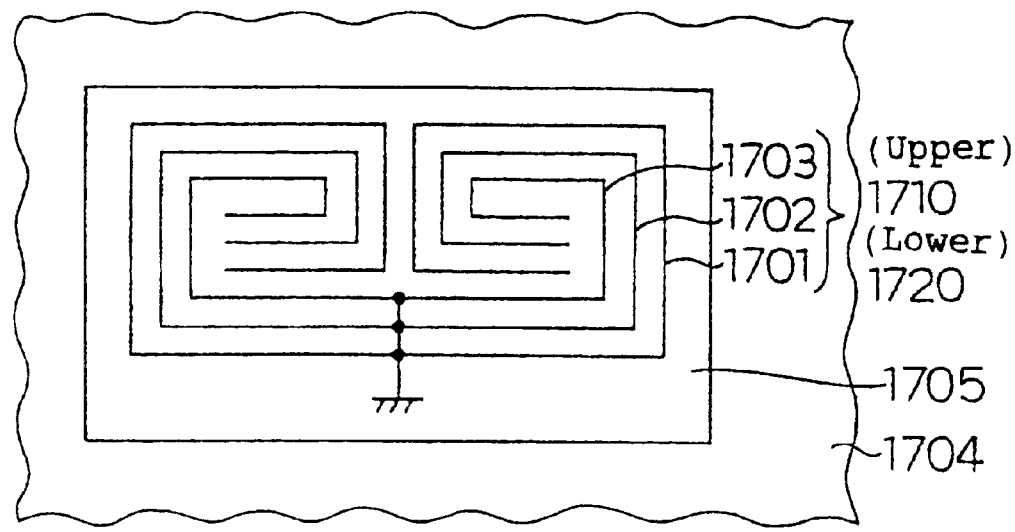
FIG. 17 is a schematic diagram showing another example of the antenna device according to the sixth embodiment.
Figure 17:
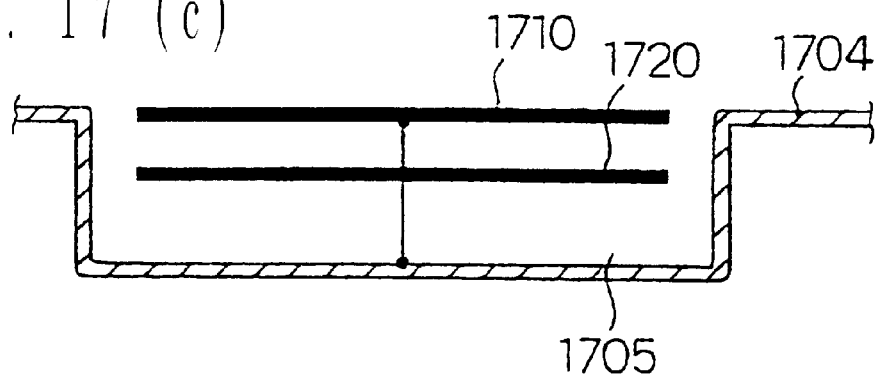
Figure 17:
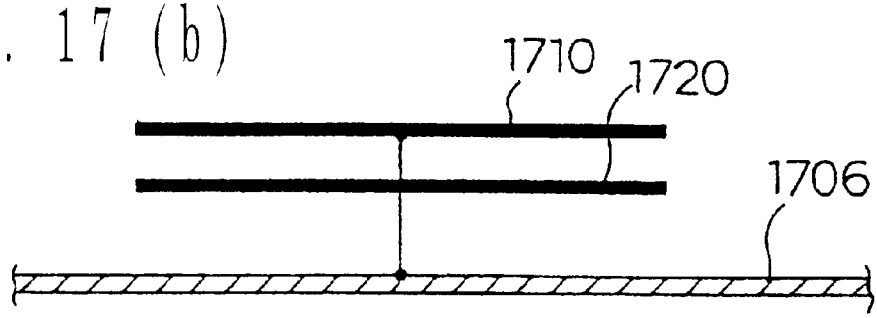
Figure 41:
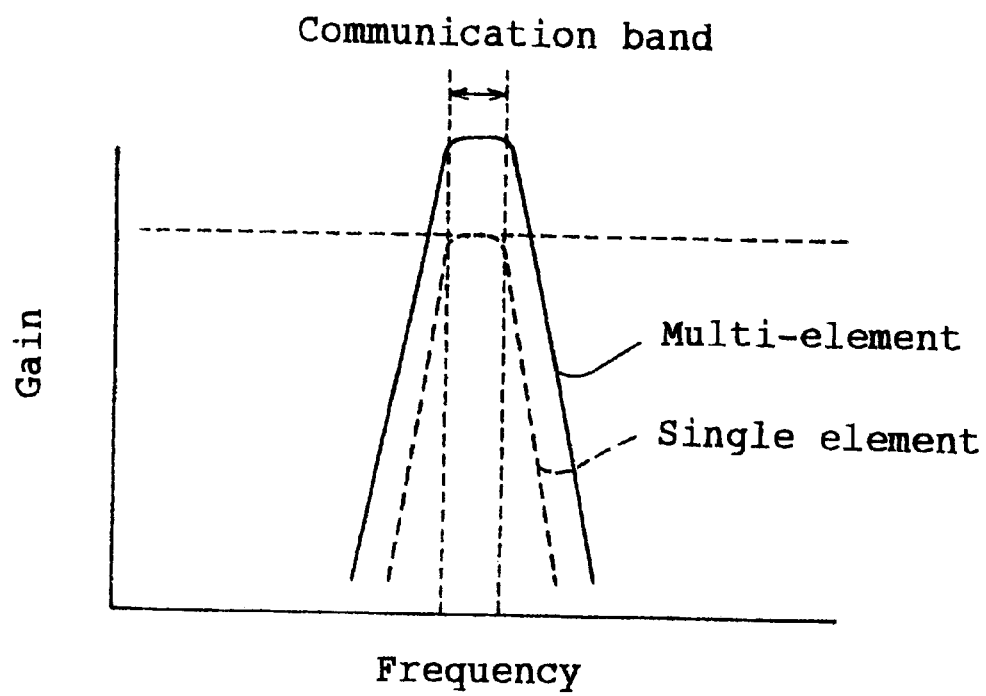
FIG. 41 shows an example of gain accumulation according to the present invention.

FIG. 17 is a schematic diagram showing the configuration of still another example of the antenna device according to the present embodiment. The antenna device of FIG. 17(a) comprises an upper antenna 1710 consisting of antenna elements 1701, 1702, and 1703 and a lower antenna 1720 also consisting of antenna elements 1701, 1702, and 1703 and these antennas 1710 and 1720 are located at two levels and within a recess 1705 in a conductive substrate 1704. It should be noted that the antennas 1710 and 1720 of the present embodiment are of the same size and shape but they may be different from each other in size and shape. FIG. 17(*b*) shows an example that a similar antenna is located in the proximity of a planar conductive substrate 1706. If the antenna elements are of the same size, they will have the same tuning frequency. Therefore, the bandwidth of the whole antenna device is the same as that of a single element but the present embodiment can implement a high-gain and high-selectivity antenna because the overall gain of the antenna device can be improved as compared with a single-element implementation by accumulating the gain of each antenna element, as shown FIG. 41.

Figure 18:
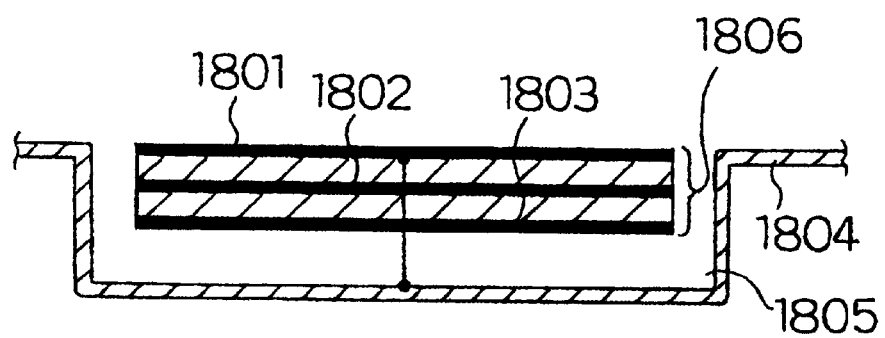
FIG. 18 is a schematic diagram showing an example of the antenna device according to the sixth embodiment.
Figure 18:
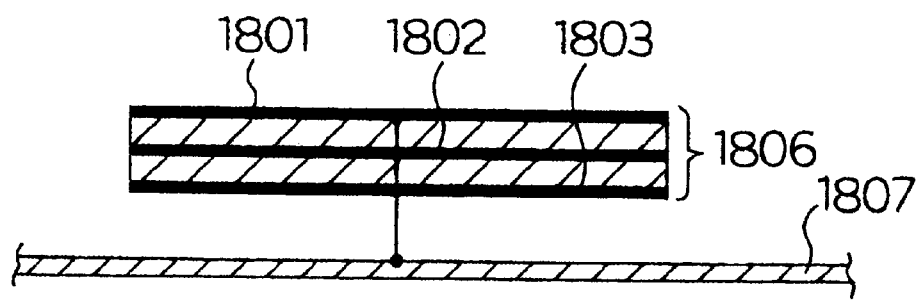

FIG. 18 is a schematic diagram showing the configuration of still another example of the antenna device according to the present embodiment. The antenna device of FIG. 18(*a*) comprises three antennas 1801, 1802, and 1803 each having one or more bends and a plurality of dipole antenna elements and these antennas are formed to be a multilayer printed circuit board 1806 and located within a recess 1805 in a conductive substrate 1804. It should be noted that the three antennas 1801, 1802, and 1803 of the present embodiment are of the same size and shape but they may be different from each other in size and shape. It should be also noted that the three antennas are layered in the present embodiment but four or more antennas may be layered. FIG. 18(*b*) shows that a similar antenna is located in the proximity of a planar conductive substrate 1807. As described above, the present embodiment can implement a high-gain and high-selectivity antenna easily by forming a plurality of antennas as a multilayer printed circuit board.

(Embodiment 7)

Figure 19:
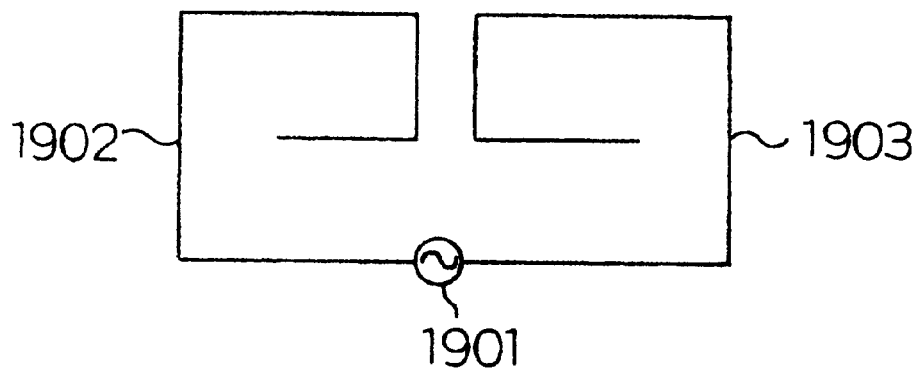
FIG. 19 is a schematic diagram showing an example of an antenna device according to a seventh embodiment of the present invention.
Figure 19:
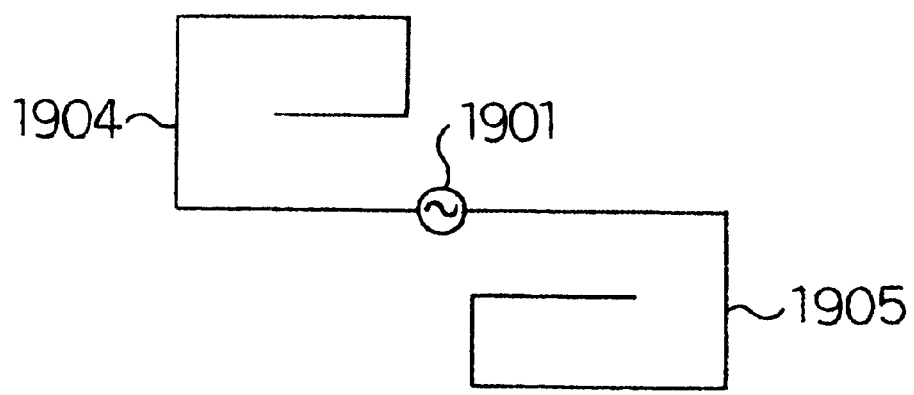

FIG. 19 is a schematic diagram showing the configurations of two examples of an antenna according to a seventh embodiment of the present invention. The antenna according to the present embodiment has two linear conductors each having four bends and these conductors are located opposite to each other with respect to a feeding section. Namely, FIG. 19(*a*) shows an antenna device similar to that of FIG. 3(*b*) described above, which has two linear conductors 1902 and 1903 bending in opposite directions to each other with respect to a feeding point 1901 and FIG. 19(*b*) shows another antenna device which has two linear conductors 1904 and 1905 bending in the same direction with respect to a feeding point 1901. This shape can allow implementation of a compact planar nondirectional antenna.

Figure 20:
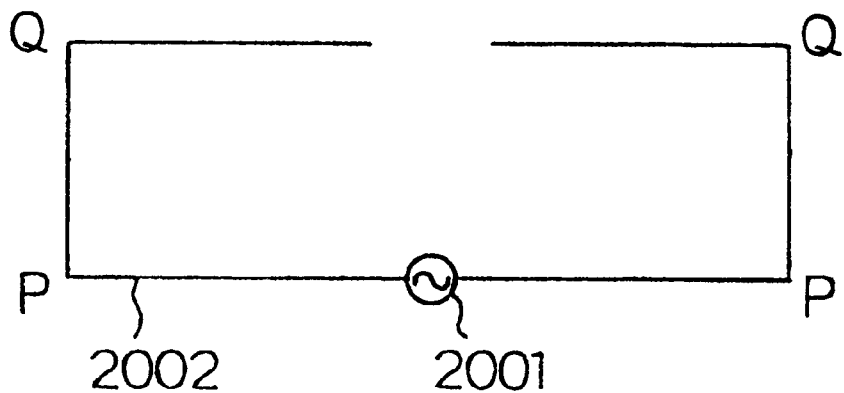
FIG. 20 is a schematic diagram showing another example of the antenna device according to the seventh embodiment.
Figure 20:
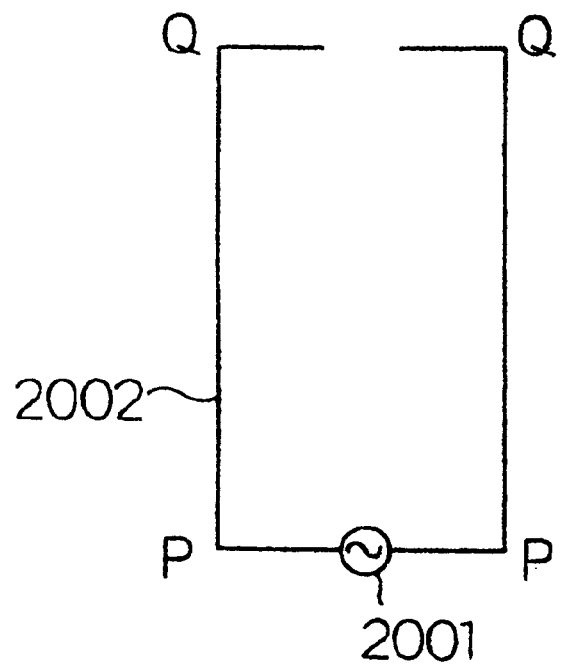

FIG. 20(*a*) shows an antenna device having an antenna element 2002 in which the length between a feeding section 2001 and a first bend P is relatively longer than the length between the first bend P and a second bend Q. FIG. 20(*b*) shows an antenna device having an antenna element 2002 in which the length between a feeding section 2001 and a first bend P is relatively shorter than the length between the first bend P and a second bend Q. This shape can allow the antenna device to be installed in a narrow area.

It should be noted that the present embodiment has two linear conductors located opposite to each other with respect to a feeding section but the number of linear conductors is not limited to that of the present embodiment and may be only one. In addition, the number of bends is not limited to that of the present embodiment.

It should be noted that the present embodiment has two linear conductors located opposite to each other with respect to a feeding section but the number of linear conductors is not limited to that of the present embodiment and may be only one. In addition, the number of bends is not limited to that of the present embodiment.

It should be also noted that the linear conductors in the present embodiment are bent but they may be curved or spiralled. For example, as shown in FIG. 21(*a*), the present embodiment may have two linear conductors 2102 and 2103 curving in opposite directions to each other with respect to a feeding section 2101 or two linear conductors 2104 and 2105 curving in the same direction with respect to a feeding section 2101. Also, as shown in FIG. 21(*b*), the present embodiment may have two linear conductors 2106 and 2107 spiralling in opposite directions to each other with respect to a feeding section 2101 or two linear conductors 2108 and 2109 spiralling in the same direction with respect to a feeding section 2101.

When an antenna according to the present embodiment is fabricated, an antenna element can be formed, of course, by working metal members but it may be formed through printed-wiring on a circuit board. Such a printed-wiring technique can allow easy fabrication of an antenna as well as provide a more reliable compact antenna at a reduced cost.

The antenna according to the present embodiment may also apply to succeeding embodiments described below.

(Embodiment 8)

Figure 22:
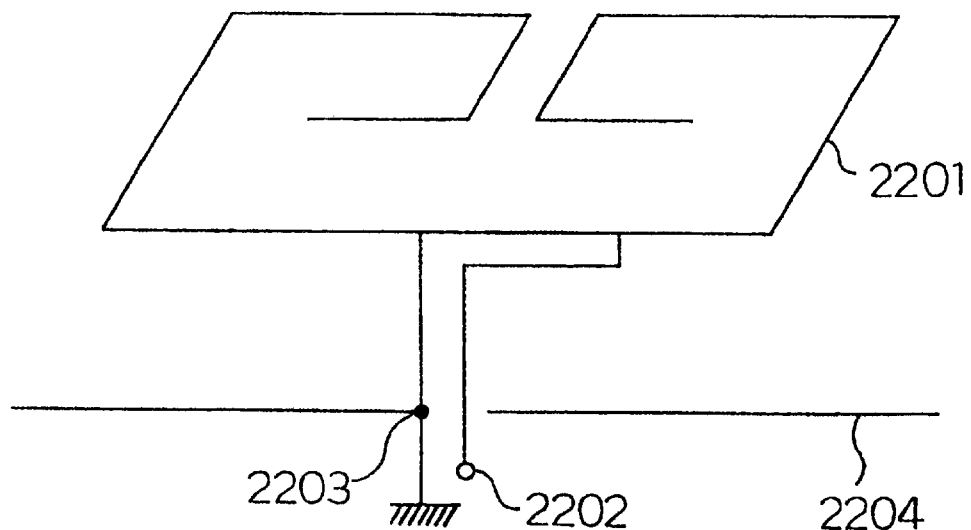
FIG. 22 is a schematic diagram showing an example of an antenna device according to an eighth embodiment of the present invention.
Figure 22:
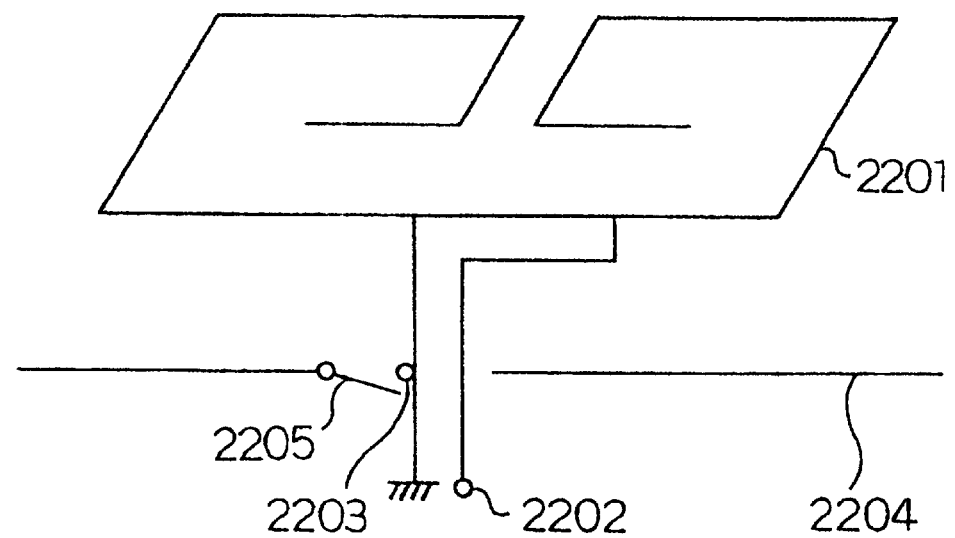

FIG. 22 is a schematic diagram showing the configuration of an example of an antenna device according to an eighth embodiment of the present invention. The antenna device according to the present embodiment is located in the proximity of a conductive substrate with its ground terminal connected to the substrate. For example, as shown in FIG. 22(*a*), an antenna element 2201 is located in the proximity of a substrate 2204 with its ground terminal 2203 connected to the substrate 2204. It should be noted that this antenna device is similar to that of FIG. 4(*b*) but differs in that a feeding terminal 2202 is provided at such position via a through-hole of the conductive substrate 2204. Such a configuration can provide a desired impedance characteristic and directivity.

FIG. 22(*b*) shows that a switching element is provided between a ground terminal and a conductive substrate in the antenna. As shown in the figure, a switching element 2205 is provided between a ground terminal 2203 of an antenna element 2201 and a conductive substrate 2204 to select such state that can effect the optimum radio-wave propagation among such cases whether the ground terminal is connected to the conductive substrate or not. For this purpose, the switching element 2205 may be remotely operated to control the antenna device depending on the state of a received wave. The antenna device of the present embodiment is used for a vertically polarized wave if the ground terminal 2203 is connected to the substrate, while it is used for a horizontally polarized wave if the ground terminal is not connected to the substrate.

Figure 23:
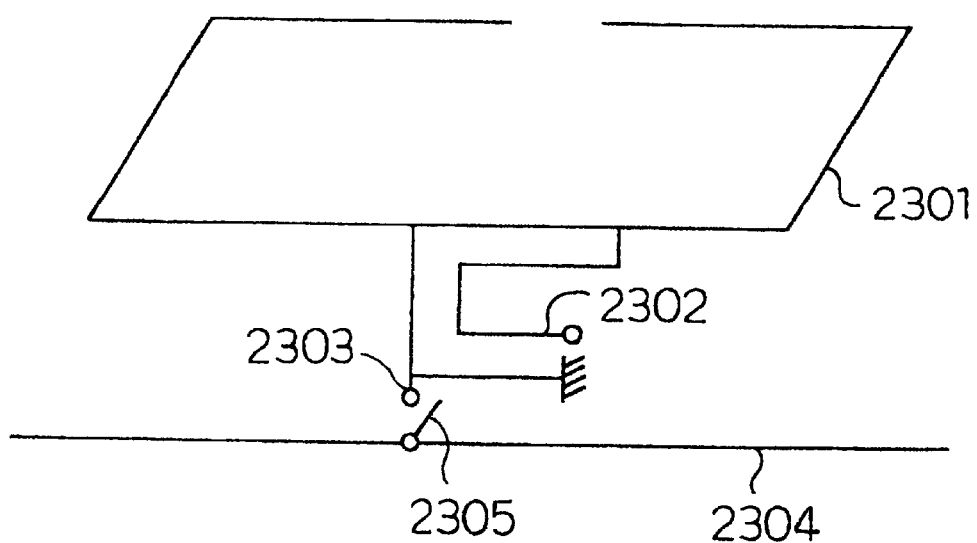
FIG. 23 is a schematic diagram showing another example of the antenna device according to the eighth embodiment.

It should be noted that the feeding terminal 2202 is via a through-hole of the conductive substrate 2204 in FIG. 22(*b*) but its location is not limited to this embodiment and that, as shown in FIG. 23, a feeding terminal 2302 and a ground terminal 2303 may be not penetrating the conductive substrate 2304.

Figure 24:
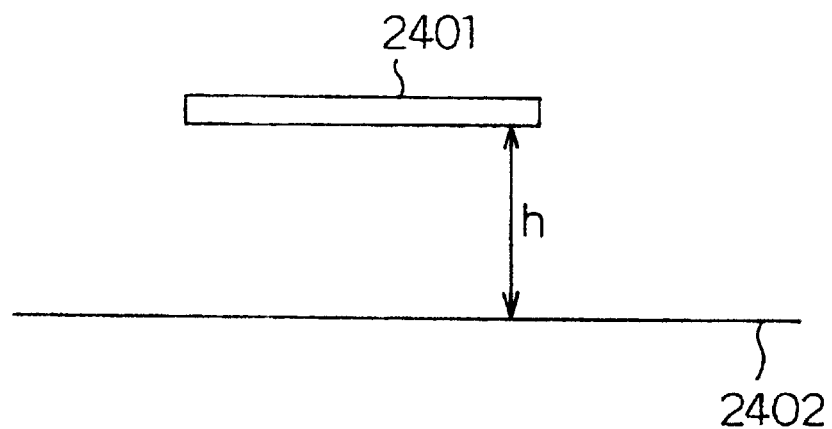
FIG. 24 shows the positional relationship between the antenna and the conductive substrate in the antenna device according to the eighth embodiment.
Figure 24:
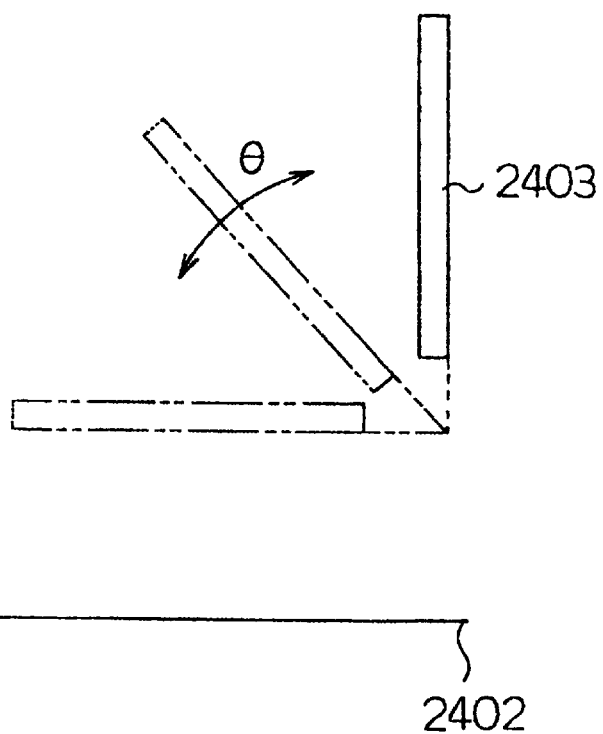

FIG. 24 shows the positional relationship between the antenna and the conductive substrate according to the present embodiment. As shown in FIG. 24(*a*), a plane of a conductive substrate 2402 and a plane of an antenna 2401 are located parallel to each other at a distance of h. The directivity of the antenna 2401 can be changed to a desired direction by controlling the distance h. The tuning frequency is raised if the antenna 2401 is closer to the conductive substrate 2402, while the tuning frequency is lowered if the antenna is further distant from the substrate. Therefore, the antenna device may be configured to control the distance h depending on the state of a received wave of the propagation. The control of the distance h may be accomplished, for example, by using a feed or slide mechanism (not shown) to move the antenna 2401 in a direction perpendicular to the antenna plane or by inserting an insulation spacer (not shown) between the antenna 2401 and the conductive substrate 2402 and moving the spacer in a direction parallel to the antenna plane to adjust the length of the spacer insertion. Also, the size of the spacer may be determined to obtain a desired antenna performance during the fabrication of the antenna. It should be noted that a spacer between the substrate and the antenna may be made of a low-permittivity material such as expanded styrol.

As shown in FIG. 24(*b*), the plane of the conductive substrate 2402 and the plane of the antenna 2403 may be located in a 3 D dimension to form a predetermined angle θ (in this case, 90 degrees) between them. The directivity of the antenna 2403 can be controlled by adjusting the angle θ through a hinge mechanism.

It should be further noted that the number of antenna elements is one according to the present embodiment but it is not limited to this embodiment and may be two or more. It should be also noted that the substrate consists of a single conductor but the body or the like of an automobile may be used as the substrate.

(Embodiment 9)

Figure 25:
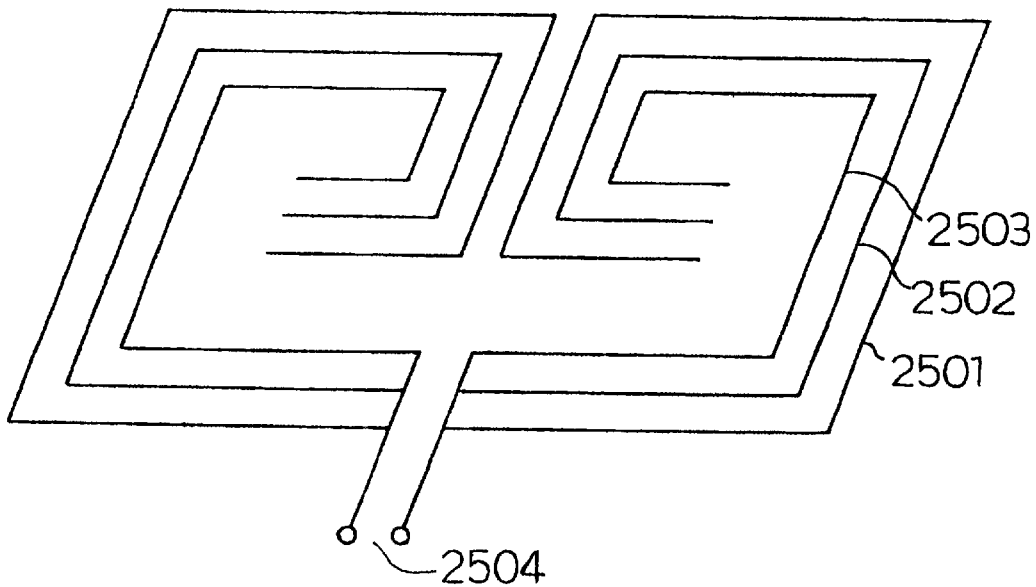
FIG. 25 is a schematic diagram showing an example of an antenna device according to a ninth embodiment of the present invention.
Figure 25:
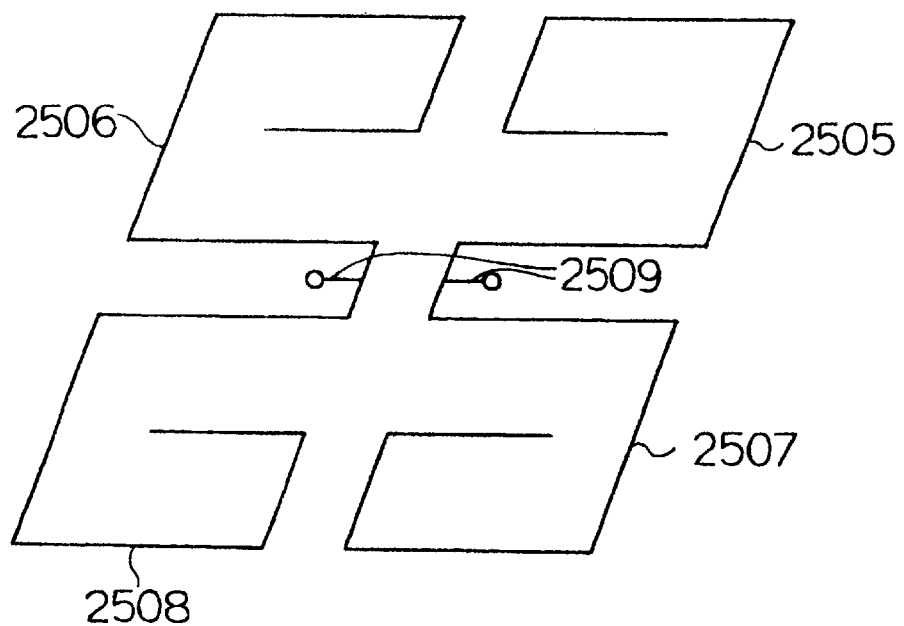

FIG. 25 is a schematic diagram showing an example of an antenna device according to the ninth embodiment of the present invention. One antenna consists of a group of antenna elements where a plurality of antenna elements are arranged in a predetermined area and served by a single feeding mechanism. As shown in FIG. 25(*a*), a plurality of antenna elements 2501, 2502, and 2503 are served by a single feeding mechanism to provide an antenna consisting of the group of antenna elements. For example, a broadband antenna which covers a desired bandwidth as a whole can be implemented by covering a different bandwidth with each of the antenna elements. Particularly, in the arrangement of FIG. 25(*a*), the outer antenna element 2501 is necessarily longer than the inner antenna element 2503 and it is easy to set the longer antenna element 2501 to a lower tuning frequency and the shorter antenna element 2503 to a higher tuning frequency, so that an antenna covering a broad band as a whole can be implemented.

As shown in FIG. 25(*b*), a plurality of antenna elements may be separately arranged while these elements have a common antenna plane.

If each of the antenna elements covers the same band, the efficiency of the antenna can be improved.

To provide isolation between the antenna elements, a distance between them may be determined to keep them in predetermined isolation or an isolator or reflector may be connected to each of the antenna elements.

It should be noted that the number of antenna elements is two or three according to the present embodiment but it is not limited to the present embodiment and may be any number equal to or more than two.

(Embodiment 10)

Figure 26:
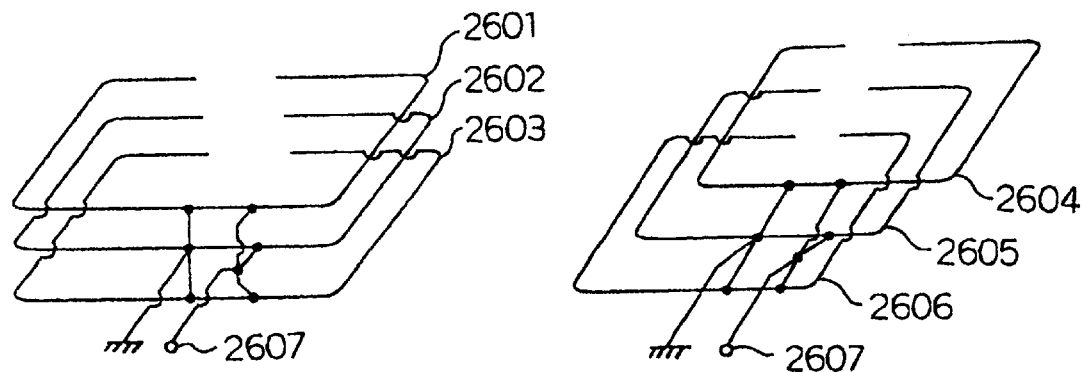
FIG. 26 is a schematic diagram showing a n example of an antenna device according to a tenth embodiment of the present invention.
Figure 26:
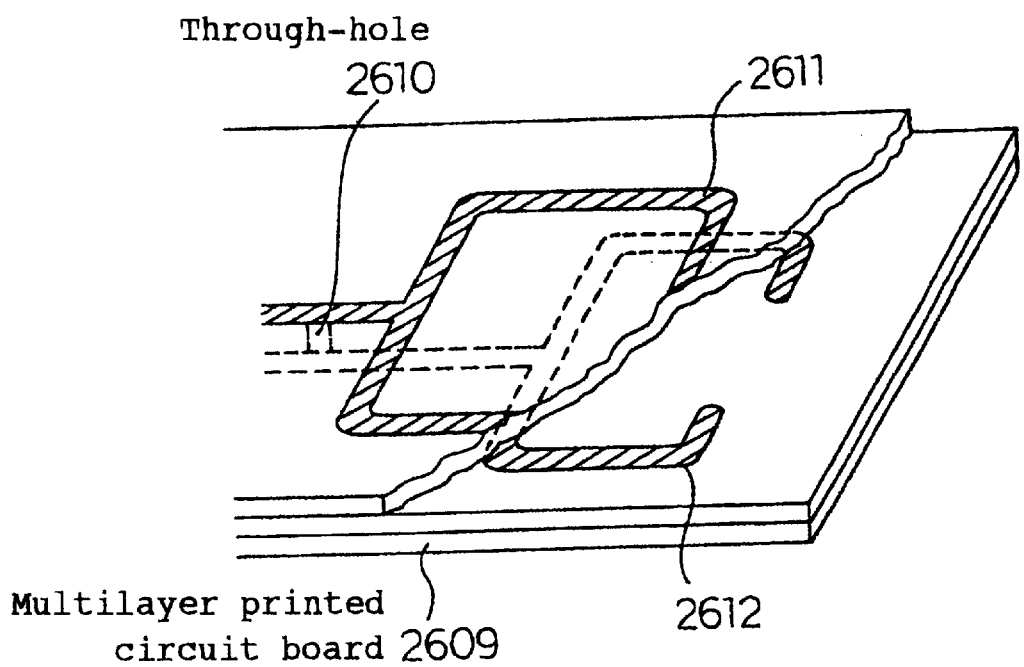

FIG. 26 is a schematic diagram showing an example of an antenna device according to the tenth embodiment of the present invention. It differs from the ninth embodiment of the present invention in that as shown in FIG. 26(*a*), antenna elements 2601, 2602, and 2603 or antenna element 2604, 2605, and 2606 are layered in a direction perpendicular to the reference plane. It should be noted that the antenna elements may be arranged so that they are all exactly overlaid on the surface of projection as shown in the left of the figure or so that they are partially overlaid as shown in the right of the figure or so that they are separate from each other. FIG. 26(*b*) is a partial broken view showing an application of the present embodiment, in which antennas 2611 and 2612 are formed on a multilayer printed circuit board 2609 through a printed-wiring technique and the antennas are arranged to be partially overlaid on the horizontal plane. Both elements can be coupled in place by running a conductor through a through-hole 2610.

(Embodiment 11)

FIG. 27 is a schematic diagram showing an example of an antenna device according to the eleventh embodiment of the present invention and FIG. 27(*a*) shows an example of an antenna feeding section obtained by making a plurality of antenna elements having a single antenna feeding means. As shown in FIG. 27(*a*), antenna elements 2701, 2702, and 2703 have taps 2704, 2705, and 2706 formed in place thereon, respectively, to connect them to a feeding terminal 2707. It should be noted that the direction for tapping is identical for all the antenna elements but it may be arbitrarily determined for each of them.

FIG. 27(*b*) shows an antenna having a common electrode between the tap of each antenna element and a feeding terminal. As shown in the figure, taps 2704, 2705, and 2706 are formed in place on antenna elements 2701, 2702, and 2703, respectively and a common electrode 2708 is provided between the taps and a feeding terminal 2707. This makes the configuration simple and in addition, a more compact antenna can be implemented by placing the electrode 2708, for example, parallel to the outermost antenna element 2701.

Figure 28:
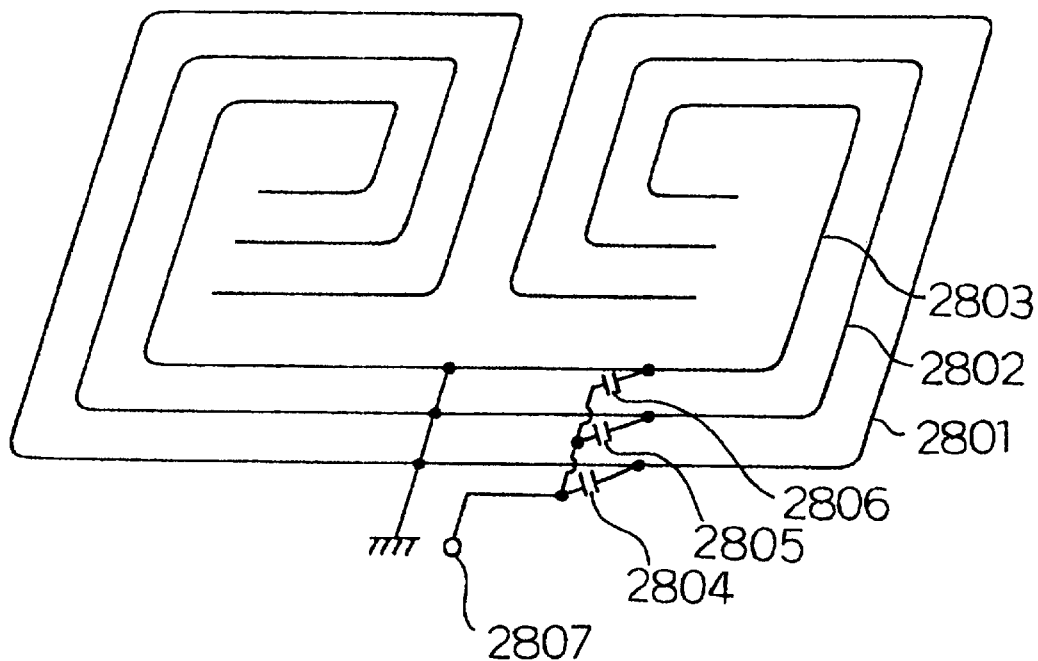
FIG. 28 is a schematic diagram showing another example of the antenna device according to the eleventh embodiment.
Figure 28:
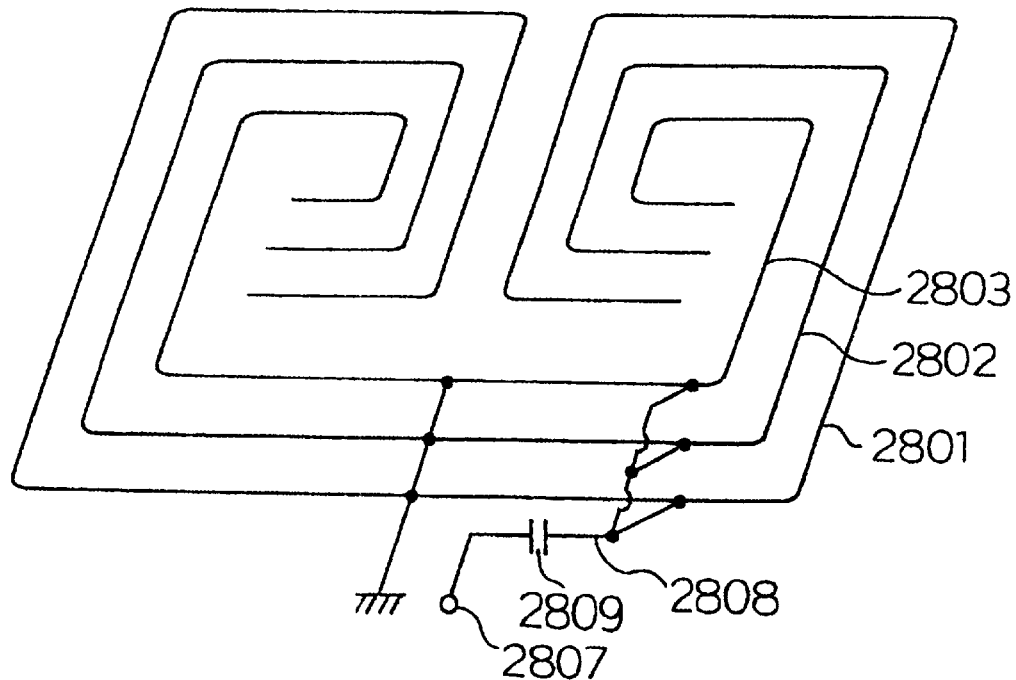

FIG. 28 shows an antenna with each antenna element tapped through a reactance element. As shown in FIG. 28(*a*), antenna elements 2801, 2802, and 2803 may be separately connected to a feeding terminal 2807 through reactance elements 2804, 2805, and 2806, respectively, or as shown in FIG. 28(*b*), a reactance element 2809 may be provided within a common electrode 2808 between a feeding terminal 2807 and taps. In the latter case, a reactance element may be provided between the feeding terminal and a ground terminal as shown in FIG. 9 described above. By using a proper reactance element in this way, a desired impedance, band, and maximum efficiency can be achieved. It should be noted that a variable reactance element may be used as such a reactance element for adjustment.

(Embodiment 12)

Figure 29:
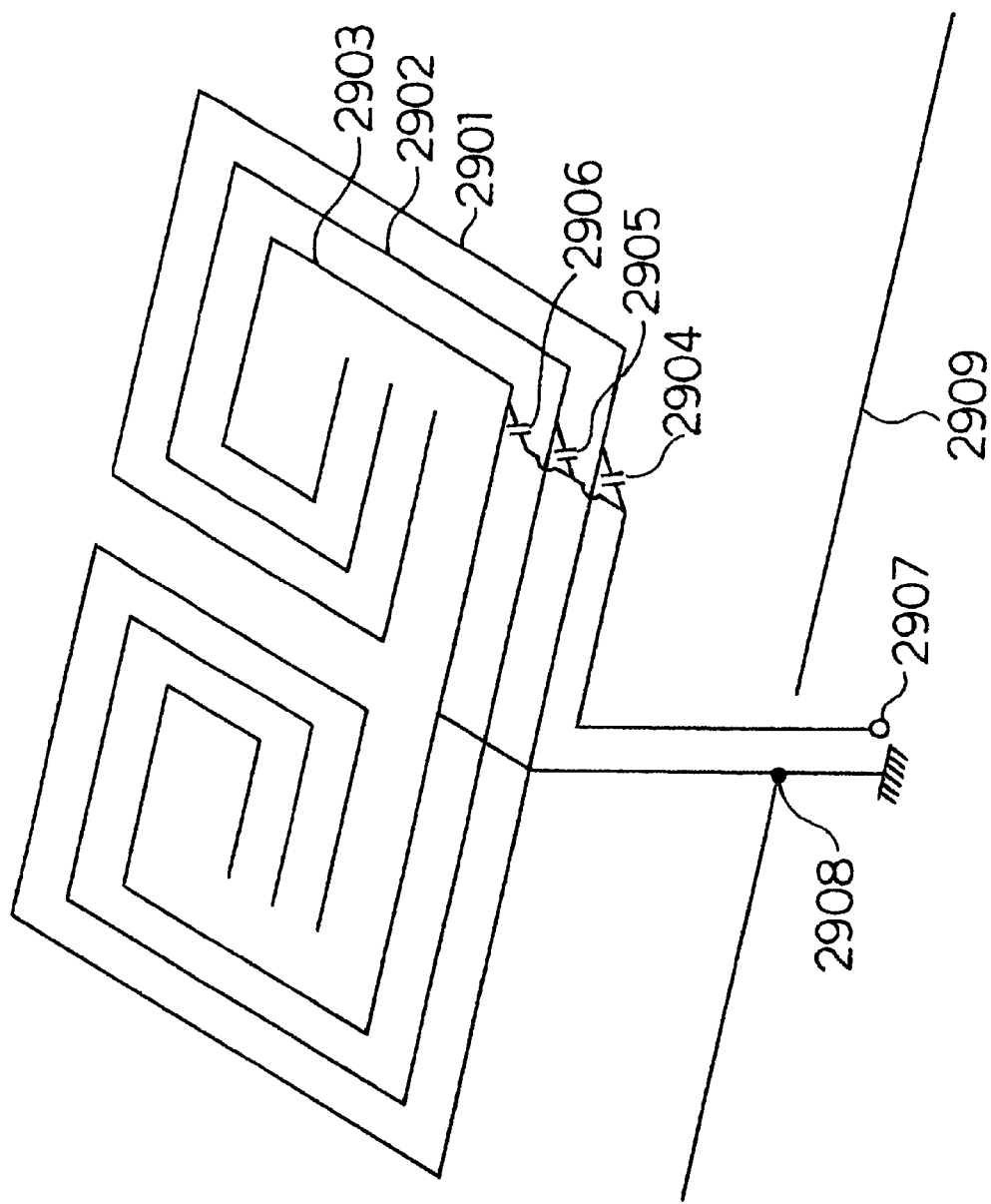
FIG. 29 is a schematic diagram showing an example of an antenna device according to a twelfth embodiment of the present invention.

FIG. 29 is a schematic diagram showing an example of an antenna device according to the twelfth embodiment of the present invention. According to the present embodiment, an antenna consists of a plurality of antenna elements arranged in a predetermined range in the proximity of a conductive substrate and served by a single feeding mechanism, a ground terminal of which is connected to the conductive substrate. As shown in FIG. 29, a plurality of antenna elements 2901, 2902, and 2903 are served by a single feeding terminal 2907 provided on the opposite side of a conductive substrate 2909 to the antenna elements to provide an antenna consisting of the group of antenna elements and a ground terminal 2908 of the feeding section is connected to the conductive substrate 2909. This configuration can allow a compact high-gain antenna to be provided in a plane in the proximity of the conductive substrate.

(Embodiment 13)

Figure 30:
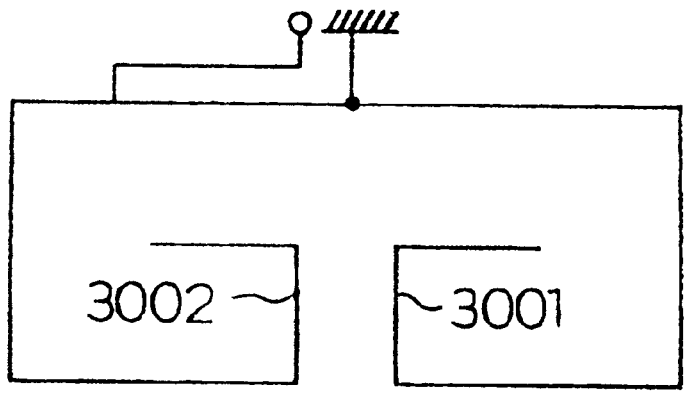
FIG. 30 is a schematic diagram showing an example of an antenna device according to a thirteenth embodiment of the present invention.
Figure 30:
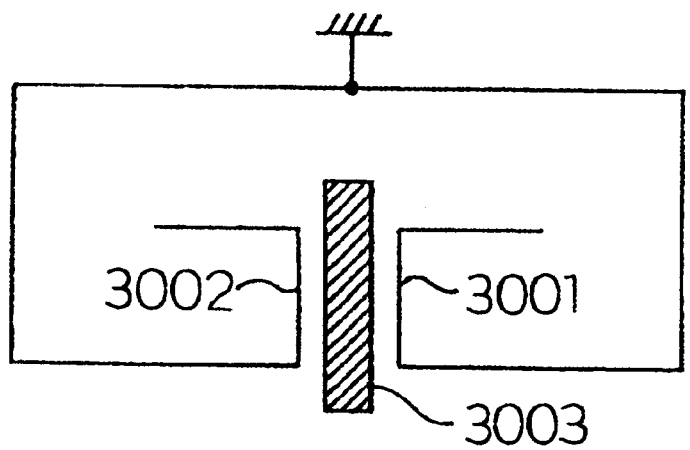
Figure 30:
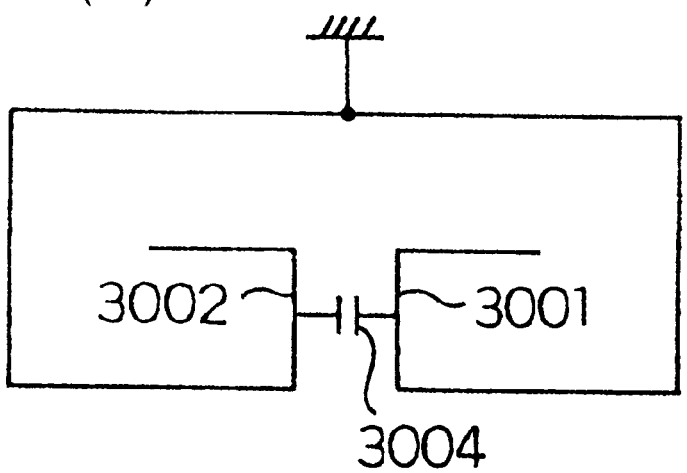

FIG. 30 is a schematic diagram showing an example of an antenna device according to the thirteenth embodiment of the present invention.

As shown in FIG. 30(a), the tuning frequency is controlled by setting a distance between opposed portions 3001 and 3002 of an antenna element near its open terminals to a predetermined value to control the coupling between them.

The coupling between the opposed portions 3001 and 3002 of the antenna element near its open terminals can be established by providing a dielectric 3003 as shown in FIG. 30(b) or by connecting them through a reactance element 3004 as shown in FIG. 30(c). For this purpose, the dielectric 3003 may be movably provided to control the coupling or the reactance element 3004 may be implemented with a variable reactance to control the coupling.

It should be noted that the number of antenna elements is one according to the present embodiment but it is not limited to this embodiment and may be two or more like the antenna shown in FIG. 25 described above.

(Embodiment 14)

Figure 31:
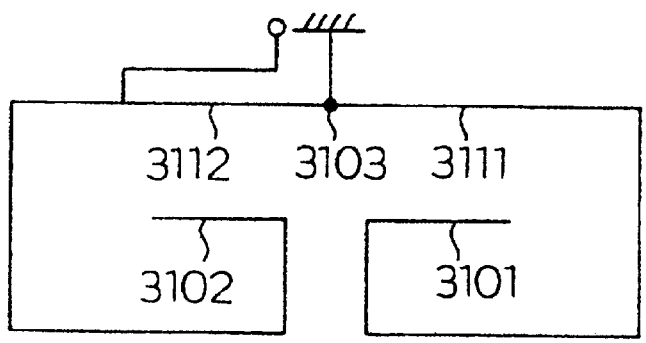
FIG. 31 is a schematic diagram showing an example of an antenna device according to a fourteenth embodiment of the present invention.
Figure 31:
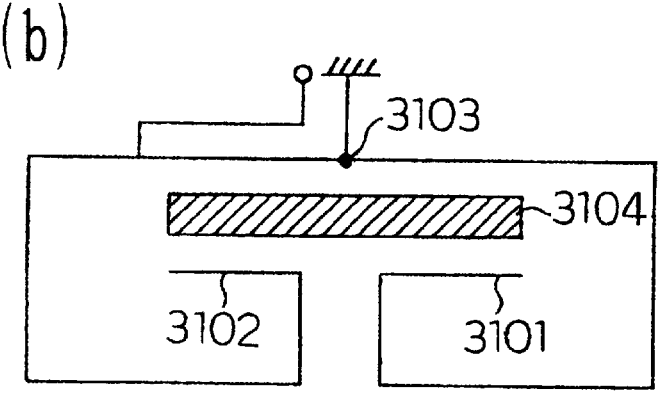
Figure 31:
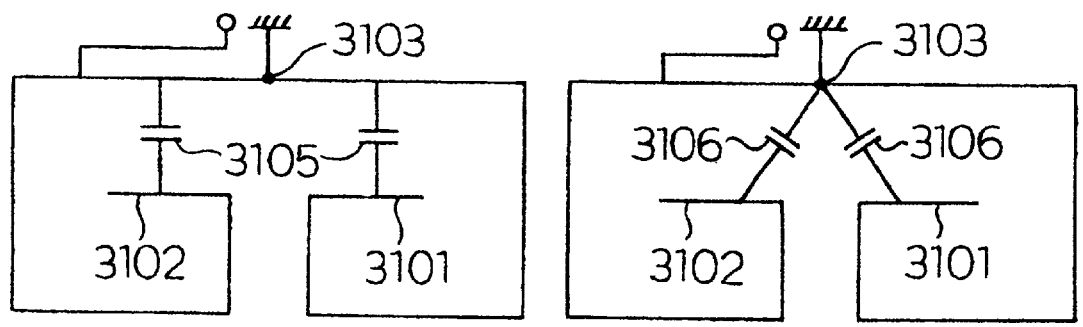

FIG. 31 is a schematic diagram showing an example of an antenna device according to the fourteenth embodiment of the present invention.

As shown in FIG. 31(a), the tuning frequency is controlled by setting a distance between open-terminal portions 3101 and 3102 of an antenna element and the neutral point 3103 or their opposed portions 3111 and 3112 near the neutral point to a predetermined value.

The coupling between the open-terminal portions of the antenna element and the neutral point or their opposed portions near the neutral point can be established, as shown in FIGS. 31(b) and (c), by providing a dielectric 3104 or by connecting them through a reactance element 3105 or 3106. For this purpose, like the thirteenth embodiment described above, the dielectric 3104 may be movably provided to control the coupling or the reactance element 3101 or 3102 may be implemented with a variable reactance to control the coupling.

It should be noted that the number of antenna elements is one according to the present embodiment but it is not limited to this embodiment and may be two or more like the antenna shown in FIG. 25 described above.

(Embodiment 15)

Figure 32:
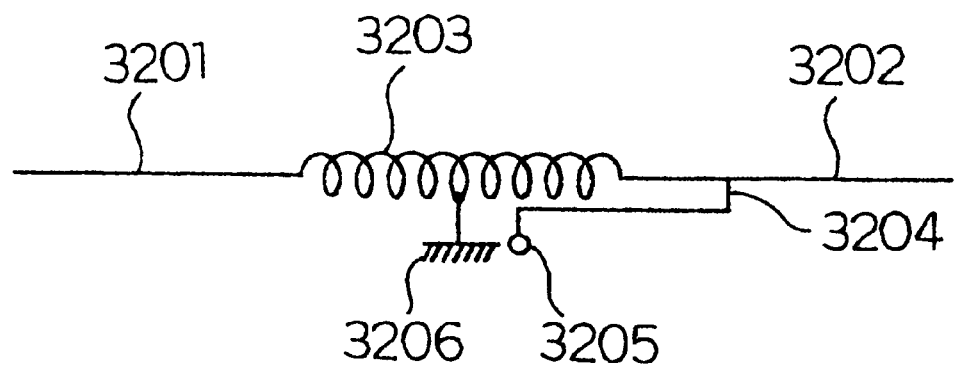
FIG. 32 is a schematic diagram showing an example of an antenna device according to a fifteenth embodiment of the present invention.
Figure 32:
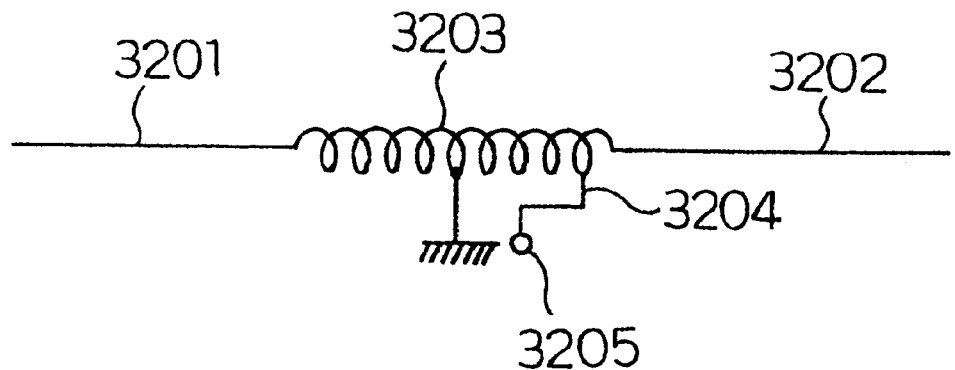

FIG. 32 is a schematic diagram showing an example of an antenna device according to the fifteenth embodiment of the present invention. In the antenna device according to the present embodiment, at least one linear conductor is connected to each end of a coil, a ground terminal is pulled out of the neutral point of the coil, and a tap is formed in place on the linear conductor or the coil to provide a feeding terminal at the end of the tapping cable. As shown in FIG. 32(a), a coil 3203 has a linear conductor 3201 or 3202 at each end of the coil, a ground terminal 3206 is pulled out of the neutral point of the coil 3203, and a tap 3204 is formed in place on the linear conductor (in this case, 3202) to provide a feeding terminal 3205 at the end of the tapping cable. As shown in FIG. 32(b), a tap 3204 may be formed in place on a coil 3203 to provide a feeding terminal 3205.

This configuration can allow the tuning frequency of the antenna to be adjusted by controlling the number of turns of coil winding and in addition, it can allow the implementation of a more compact and broadband antenna.

Figure 33:
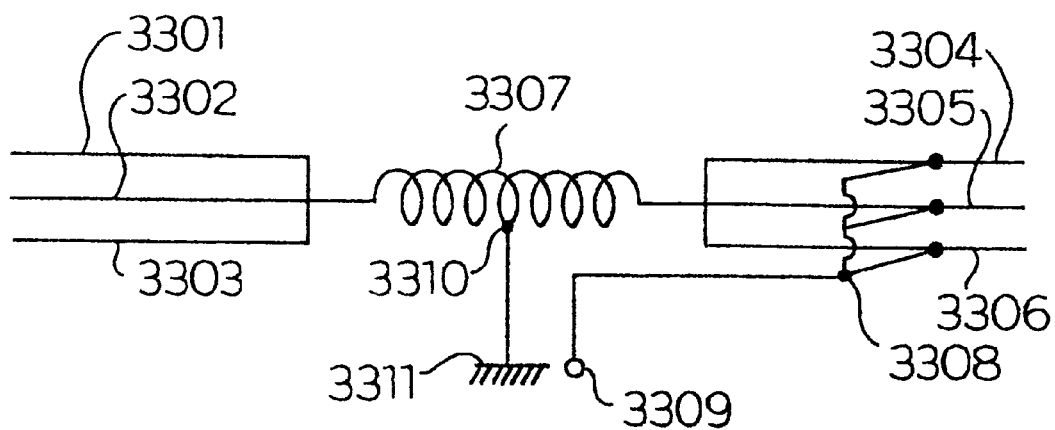
FIG. 33 is a schematic diagram showing another example of the antenna device according to the fifteenth embodiment.
Figure 33:
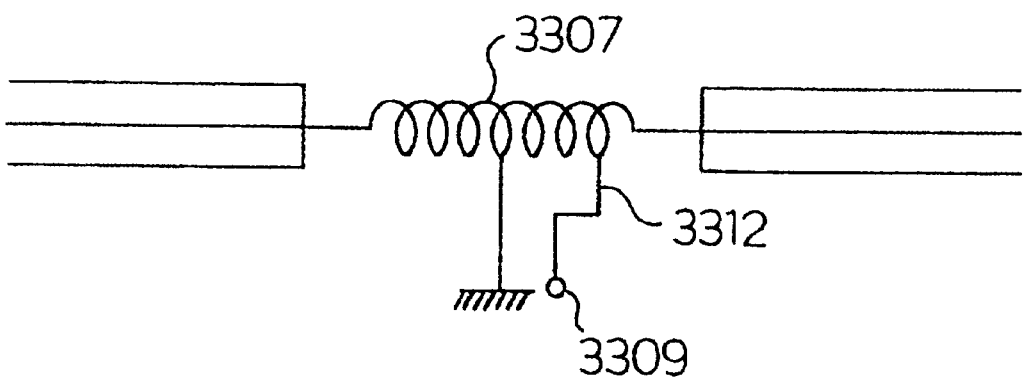

FIG. 33 shows that an antenna device has a plurality of linear conductors connected to a coil. As shown in FIG. 33(a), a coil 3307 has a plurality of linear conductors 3301, 3302, and 3303 or 3304, 3305, and 3306 at each end of the coil, a ground terminal 3311 is pulled out of the neutral point 3310 of the coil 3307, and a tap 3308 is formed in place on the linear conductors (in this case, 3304, 3305, and 3306) to provide a feeding terminal 3309 at the end of the tapping cable. As shown in FIG. 33(b), a tap 3312 may be formed in place on a coil 3307 to provide a feeding terminal 3309. It should be noted that the three linear conductors are provided on each side of the coil according to the present embodiment but it is not limited to this embodiment and may be any number equal to or more than two.

It should be also noted that the conductors used as antenna elements in the present embodiment are all linear but the shape of each conductor is not limited to this embodiment and any conductor may have at least one bend or curve or may be spiral.

(Embodiment 16)

Figure 34:
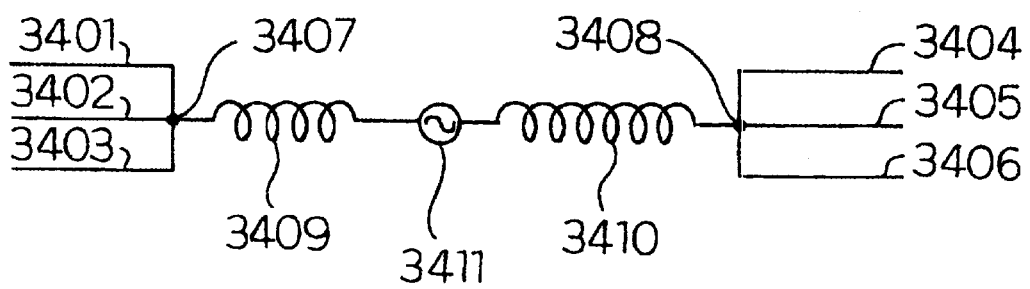
FIG. 34 is a schematic diagram showing an example of an antenna device according to a sixteenth embodiment of the present invention.

FIG. 34 is a schematic diagram showing an example of an antenna device according to the sixteenth embodiment of the present invention. The antenna device according to the present embodiment has one or two groups of linear conductors and each group of them is connected to a feeding section through a coil. As shown in FIG. 34, a group of linear conductors 3401, 3402, and 3403 and another group of linear conductors 3404, 3405, and 3406 are connected to common electrodes 3407 and 3408, respectively, and these electrodes are connected to a feeding section 3411 through coils 3409 and 3410, respectively. This configuration can allow the tuning frequency of the antenna to be adjusted by controlling the number of turns of coil winding and in addition, it can allow the implementation of a more compact and broadband antenna.

(Embodiment 17)

Figure 35:
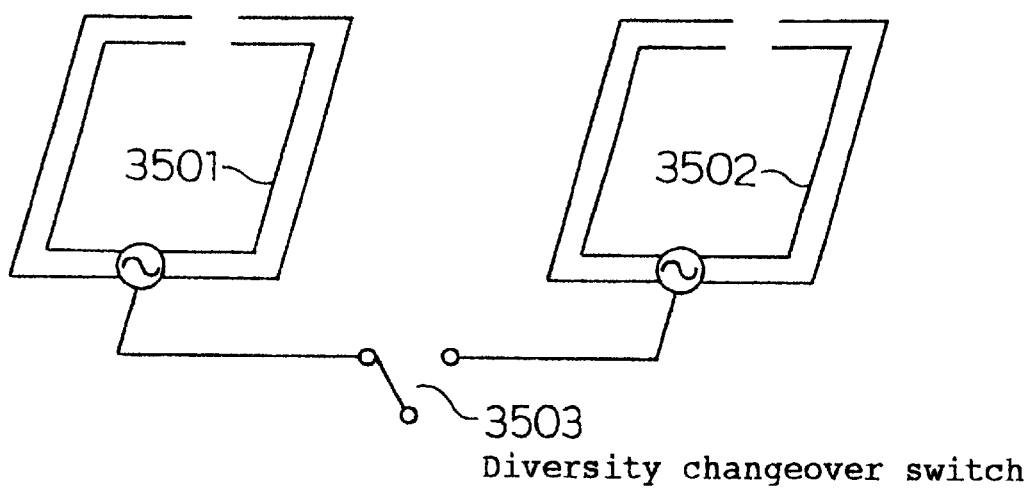
FIG. 35 is a schematic diagram showing an example of an antenna device according to a seventeenth embodiment of the present invention.

FIG. 35 is a schematic diagram showing the configuration of an example of an antenna device according to the seventeenth embodiment of the present invention. The antenna device according to the present embodiment comprises a plurality of antennas consisting of a plurality of antenna element groups and these antennas are provided within a predetermined range for diversity reception to select one of them which can achieve the optimum receiving state. For example, in FIG. 35, two antennas 3501 and 3502 are switched by a diversity changeover switch 3503 connected to a feeding section of each antenna to select one of the antennas which can achieve the optimum radio-wave propagation. It should be noted that the number of antennas is not limited to two as described for the present embodiment but it may be three or more. It should be also noted that the type of antennas is not limited to that shown in FIG. 35 but other types of antennas as described for the preceding embodiments or different types of antennas may be used.

In addition, selection of the optimum antenna from a plurality of antennas may be accomplished by selecting one which can achieve the maximum receiver input or by selecting one which can achieve the minimum level of multipath disturbance.

It should be further noted that a feeding section for serving each antenna element or each antenna consisting of a plurality of antenna element groups according to the preceding embodiments 1 through 17 described above may have a balance-to-unbalance transformer, a mode converter, or an impedance converter connected to it.

(Embodiment 18)

Figure 36:
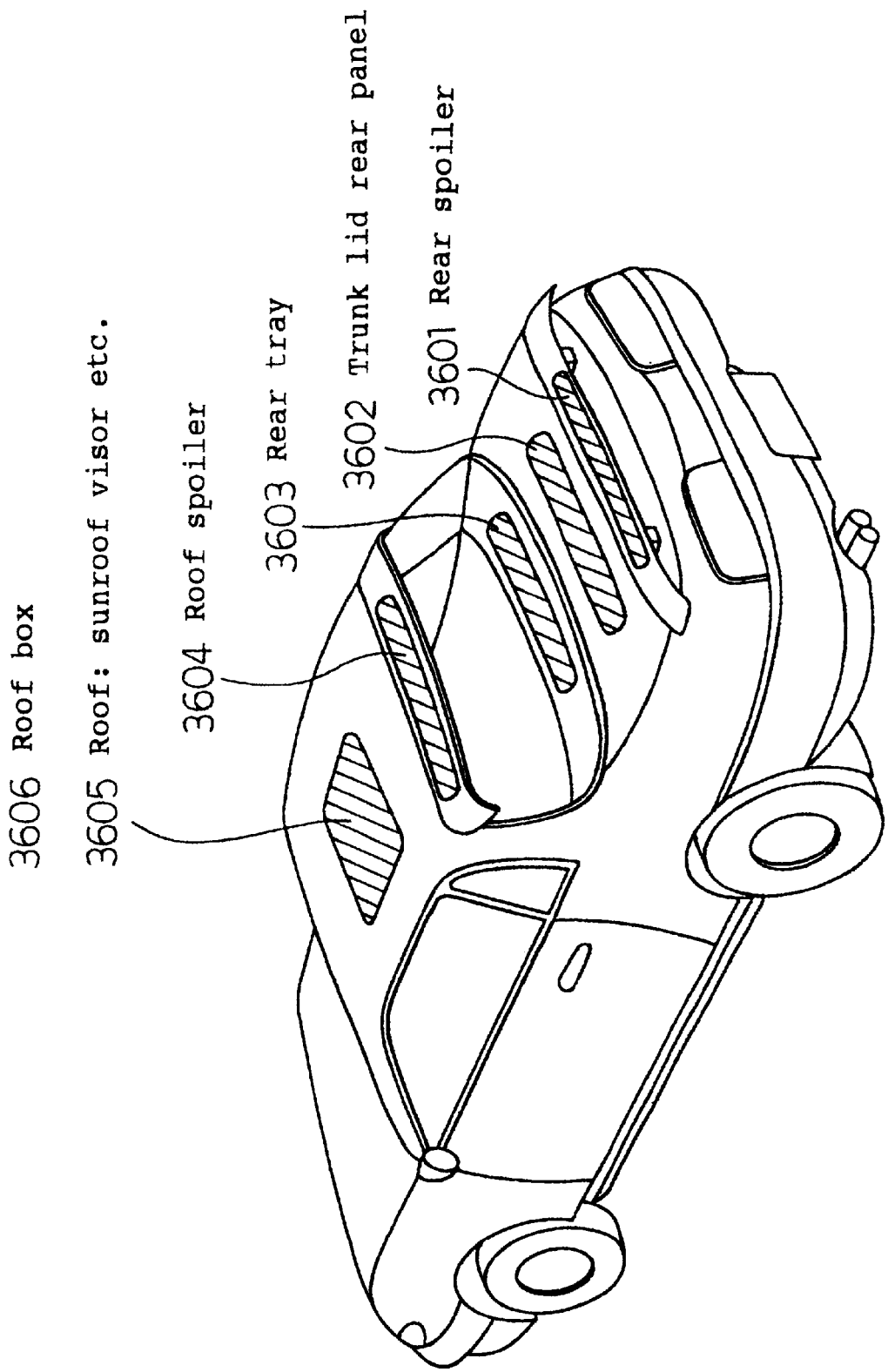
FIG. 36 is a perspective view showing a example of locations where an antenna device according to an eighteenth embodiment of the present invention is to be installed.

FIG. 36 is a schematic diagram showing possible locations where an antenna device according to the eighteenth embodiment of the present invention is to be installed. In the description of the present embodiment, it is assumed that the antenna is installed on an automobile and the antenna to be installed is as described for the preceding embodiments. As shown in FIG. 36, possible locations for installation include a rear spoiler 3601, a trunk lid rear panel 3602, a rear tray 3603, a roof spoiler 3604, a roof box 3606, and a roof 3605 such as a sunroof visor.

If an antenna is to be installed in a vertical position, for example, it may be installed on the end 3703 of an automobile spoiler 3701 or 3702 or the end 3703 of a sun visor as shown in FIG. 37(a) or on a pillar section 3704 as shown in FIG. 37(b). Of course, installation locations are not limited to them and the antenna may be installed on any other locations which are tilted to some extent with respect to any horizontal plane. Therefore, the reception of a desired polarized wave can be made very easy by positioning the antenna at such locations.

As described above, each antenna device according to the present invention can be installed without any portion protruding from the body plane of an automobile because it can be located with its antenna plane parallel to and in the proximity of the body plane which is a conductive substrate and in addition, it can be installed even in a narrow space because it takes up only a small area. Therefore, its appearance can be improved with little wind soughing brought about around it and in addition, some other problems such as a risk of its being stolen and labors involved in removing it before car wash can be eliminated.

(Embodiment 19)

Figure 38:
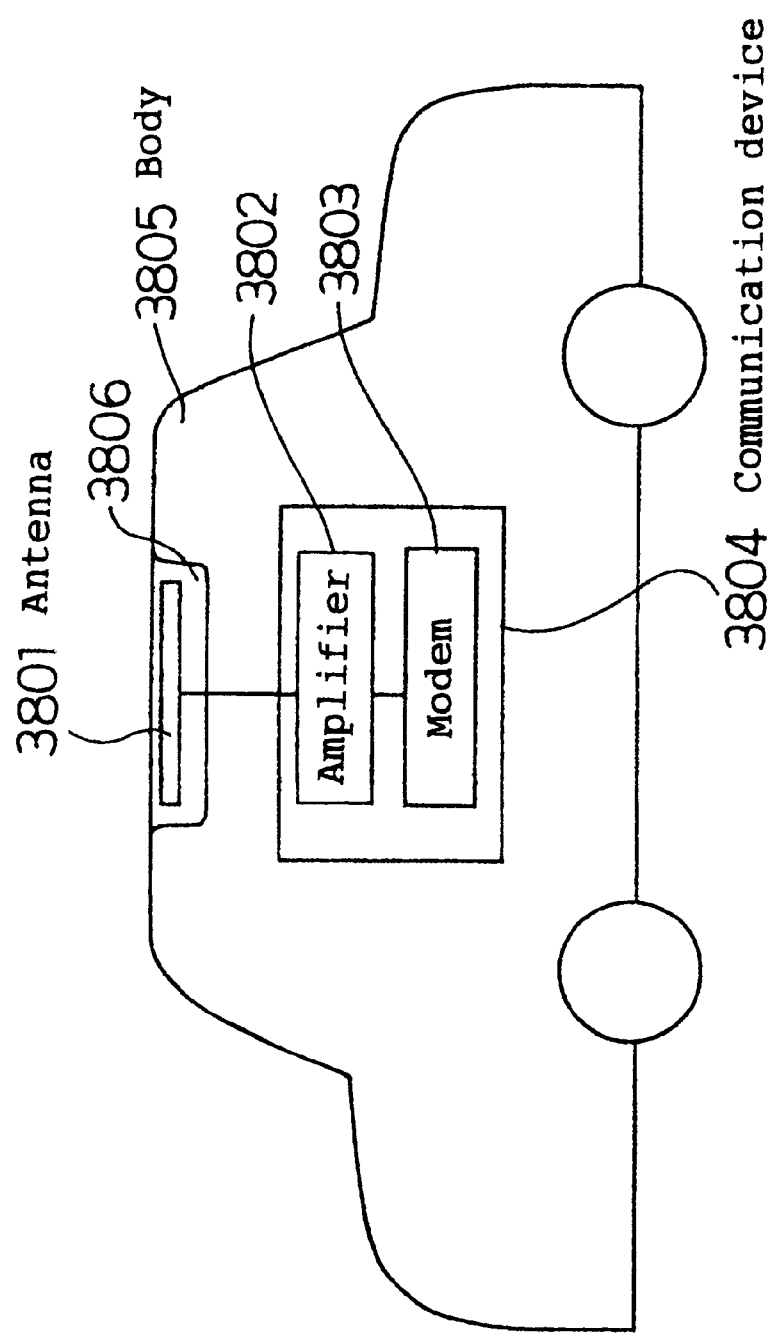
FIG. 38 is a schematic diagram showing an example of a mobile communication device with an antenna device according to a nineteenth embodiment of the present invention.

FIG. 38 is a schematic diagram showing an example of a mobile communication device with an antenna device according to the nineteenth embodiment of the present invention. As shown in FIG. 38, an antenna 3801 according to any one of the preceding embodiments described above is installed on the ceiling of an automobile body 3805. In this case, if the antenna 3801 is located within a recess 3806 in the ceiling, any portion of the antenna will not protrude from the outline of the body 3805. As seen from the figure, the antenna 3801 is connected to a communication device 3804 which is installed inside the body 3805 and consists of an amplifier 3802 and a modem 3803.

(Embodiment 20)

Figure 39A:
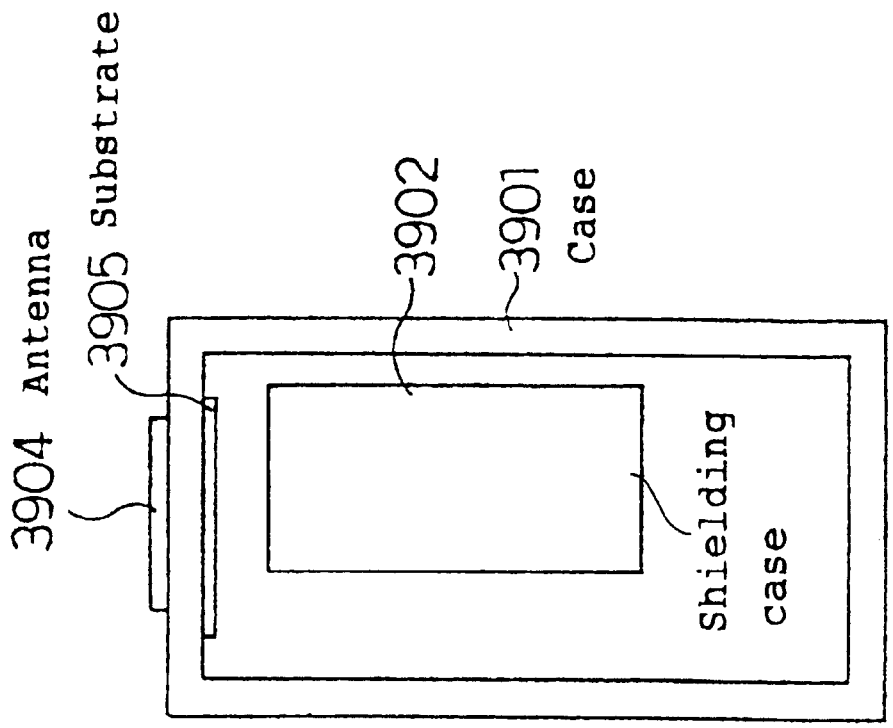
FIG. 39 is a schematic diagram showing an example of a portable telephone with an antenna device according to a twentieth embodiment of the present invention.
Figure 39B:
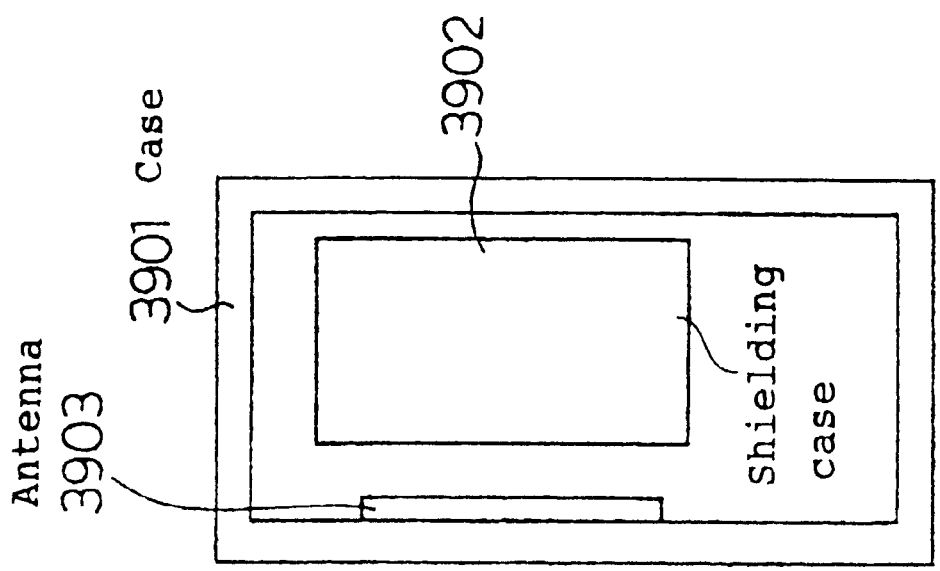

FIG. 39 is a schematic diagram showing an example of a portable telephone with an antenna device according to the twentieth embodiment of the present invention. FIG. 39(a) shows an example in which a conductive shielding case 3902 provided inside a resinous case 3901 of a portable telephone is used as a conductive substrate and an antenna 3903 is located along the inner side of the case 3901 to be parallel to the shielding case 3902. FIG. 39(b) shows another example in which an antenna 3904 is located on the top surface outside a resinous case 3901 of a portable telephone and a conductive substrate 3905 is provided on the inner wall of the case 3901 opposite to the antenna 3904. In the latter case, the top of a shielding case 3902 is too small to be used as a conductive substrate. The antennas used in FIGS. 39(a) and (b) are preferably those having more bends or more turns of winding which can easily allow the implementation of a compact antenna.

With these configurations, the directional gain on the conductive substrate side is very small from the side of the antenna and therefore, possible influence of electromagnetic waves on human body can be reduced without any degradation of antenna efficiency if the antenna device is used with the conductive substrate side turned to the user.

It should be noted that the antenna device according to the eighteenth embodiment described above is installed on an automobile but it may be installed on other vehicles such as an airplane or ship. Alternatively, it may be installed not only on such vehicles but also on the roadbed, shoulder, tollgate, or tunnel wall of any expressway or highway, or on the wall or window of any building.

It should be also noted that the antenna device according to the nineteenth embodiment described above is used with a mobile communication device but it may be used with any other device which receives or transmits radio waves, for example, a television set, a radiocassette player, or a radio set.

It should be further noted that the antenna device according to the twentieth embodiment is implemented in a portable telephone but it may apply to other portable radio sets, for example, a PHS device, a pager, or a navigation system.

(Embodiment 21)

Figure 42:
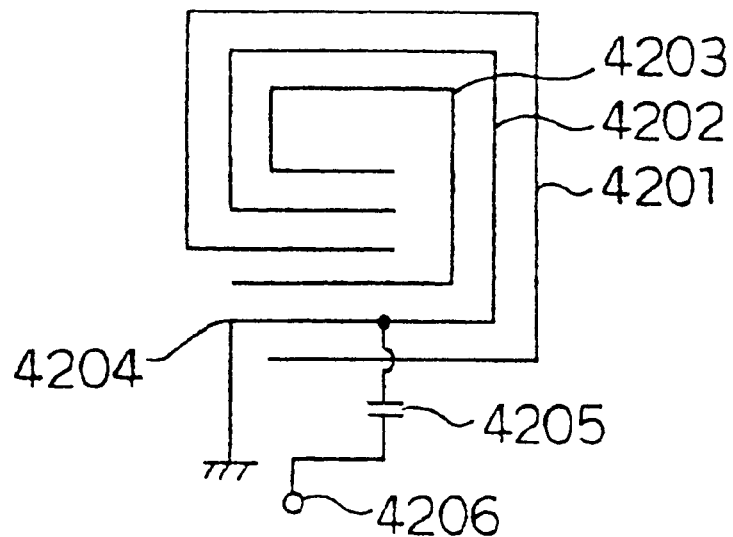
FIG. 42 is a schematic diagram showing an antenna device according to a twenty-first embodiment of the present invention.
Figure 42:
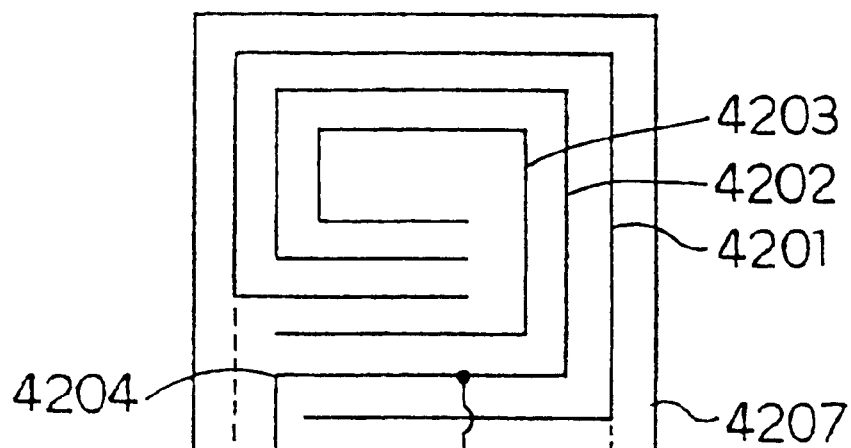
Figure 42:
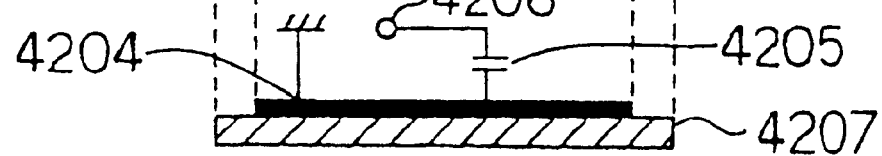

FIG. 42 is a schematic diagram showing the configuration of an antenna device according to the twenty-first embodiment of the present invention. Namely, FIG. 42(a) shows a monopole-type broadband antenna which comprises a main antenna element 4202 having an end connected to a ground 4204, an antenna element 4201 located in the proximity of the main antenna element 4202 and having a length longer than the antenna element 4202 and no end connected to a ground, and an antenna element 4203 having a length shorter than the antenna element 4202 and no end connected to a ground. The main antenna element 4202 is provided with a tap which is connected to a feeding point 4206 through a reactance element 4205 for impedance adjustment. FIG. 42(b) shows another antenna device which is obtained by forming on a printed circuit board 4207 antenna elements 4201, 4202, and 4203 of the antenna device of FIG. 42(a) described above through a printed-wiring technique.

FIG. 43 is a schematic diagram showing a dipole-type antenna device according to the embodiment described above. Namely, FIG. 43(a) shows a dipole-type broadband antenna which comprises a main antenna element 4302 having the center connected to a ground 4304, an antenna element 4301 located in the proximity of the main antenna element 4302 and having a length longer than the antenna element 4302 and no portion connected to a ground, and an antenna element 4303 having a length shorter than the antenna element 4302 and no portion connected to a ground. The main antenna element 4302 is provided with a tap which is connected to a feeding point 4306 through a reactance element 4305 for impedance adjustment. FIG. 43(b) shows another antenna device which is obtained by forming on a printed circuit board 4307 antenna elements 4301, 4302, and 4303 of the antenna device of FIG. 43(a) described above through a printed-wiring technique.

These configurations can implement a broadband and high-gain antenna device which is very simple and easy to adjust.

It should be noted that a shorter antenna element and a longer antenna element are located in the proximity of a main antenna element according to the present embodiment described above but two or more antenna elements may be located on each side of the main antenna.

(Embodiment 22)

FIG. 44 is a schematic diagram showing the configuration of an antenna device according to the twenty-second embodiment of the present invention. Namely, FIG. 44(a) shows an antenna device similar to those shown in FIG. 10 or other figures described above, in which a conductive substrate is located in the proximity of antenna elements and the antenna device according to the present embodiment differs from those devices in that a conductive substrate 4404 located in the proximity of antenna elements 4401, 4402, and 4403 is almost equal in size to or smaller than the outermost antenna element 4401. Such a configuration can improve the gain for horizontally polarized waves as compared with the case where a conductive substrate is larger than an antenna element.

FIG. 44(b) shows that the antenna device of FIG. 44(a) described above is located within a recess in a vehicle body, the case of a communication device, the wall of a house, or any other device case and that an antenna ground (conductive substrate) 4404 is not connected to a ground for such a case. This configuration can provide a higher gain for both horizontally and vertically polarized waves. The directional gain characteristics of this antenna device are shown in FIG. 94 for vertically polarized waves. As seen from the figure, when the distance (that is, separation) between an antenna ground and a case ground is (a) 10 mm, (b) 30 mm, (c) 80 mm, or (d) 150 mm, the shorter distance can provide the higher gain. Namely, when the antenna ground is closer to the case ground, the better performance can be obtained. It should be noted that in the example, the antenna ground 4404 is located within a recess in a vehicle body, the case of a communication device, the wall of a house, or any other device case to prevent the antenna from popping out of the outer case but the antenna ground may be located in the proximity of the flat plane of the case ground at a distance. Even in the latter case, the antenna can provide the same effect as the former and it falls within the scope of the present invention.

It should be also noted that an antenna element of balanced type is used according to the present embodiment but an antenna element of unbalanced type may result in similar effects.

(Embodiment 23)

FIG. 45 is a schematic diagram showing the configuration of an antenna device according to the twenty-third embodiment of the present invention. The present embodiment shows how far adjacent to a conductive substrate an antenna element is to be located and FIG. 45(a) is an example where a single antenna element is located. Namely, the distance h between an antenna element 4501 (to speak properly, an antenna grounding connection) and a conductive substrate 4502 is set to a value within 0.01 to 0.25 times as large as a wavelength $\lambda$ for the resonance frequency f of the antenna (that is, $0.01\lambda$ to $0.25\lambda$). This configuration can implement a high-gain antenna which is very easy to adjust.

FIG. 45(b) is another example where four antenna elements 4503, 4504, 4505, and 4506 are located at different distances from a conductive substrate 4507, respectively. As shown in FIG. 45(b), when the antenna elements have different lengths, the shorter element can have the higher resonance frequency and the shorter wavelength. Therefore, the distance h1 for the shortest antenna element 4506 may be set to the smallest value, the distance h2 for the longest antenna element 4503 may be set to the largest value, the distances for the medium antenna elements 4504 and 4505 may be set to values depending on the wavelengths at their resonance frequencies, respectively. Then the distance between each of the antenna elements 4503, 4504, 4505, and 4506 and the conductive substrate 4507 must satisfy the condition that it falls within the range of 0.01 to 0.25 times as large as a wavelength $\lambda$ for the resonance frequency f of each antenna element (that is, $0.01\lambda$ to $0.25\lambda$).

(Embodiment 24)

Figure 46:
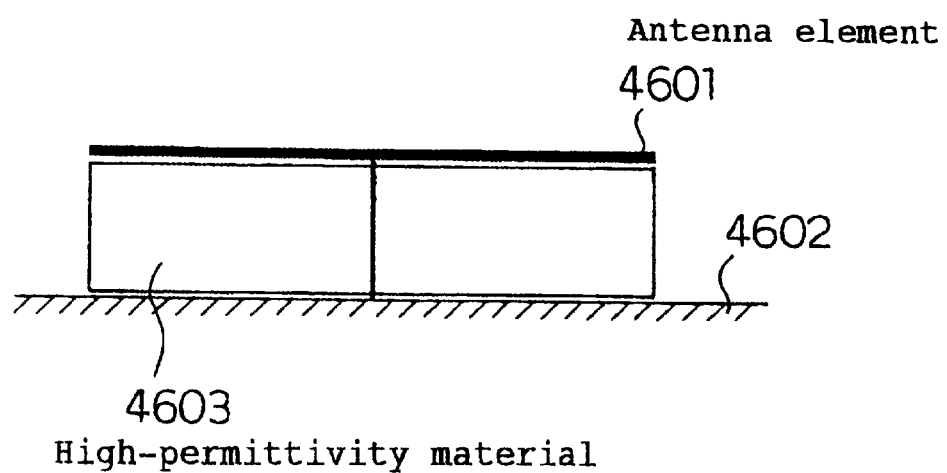
FIG. 46 is a schematic diagram showing an example of an antenna device according to a twenty-fourth embodiment of the present invention.

FIG. 46 is a schematic diagram showing the configuration of an antenna device according to the twenty-fourth embodiment of the present invention. In the present embodiment, a high-permittivity material is provided between an antenna element 4601 and a conductive substrate 4602. Therefore, this configuration can apply to any other embodiment where a conductive substrate is located in the proximity of an antenna element. It should be also noted that the distance between the antenna element and the conductive substrate can be reduced equivalently by providing such a high-permittivity material between them.

(Embodiment 25)

Figure 47:
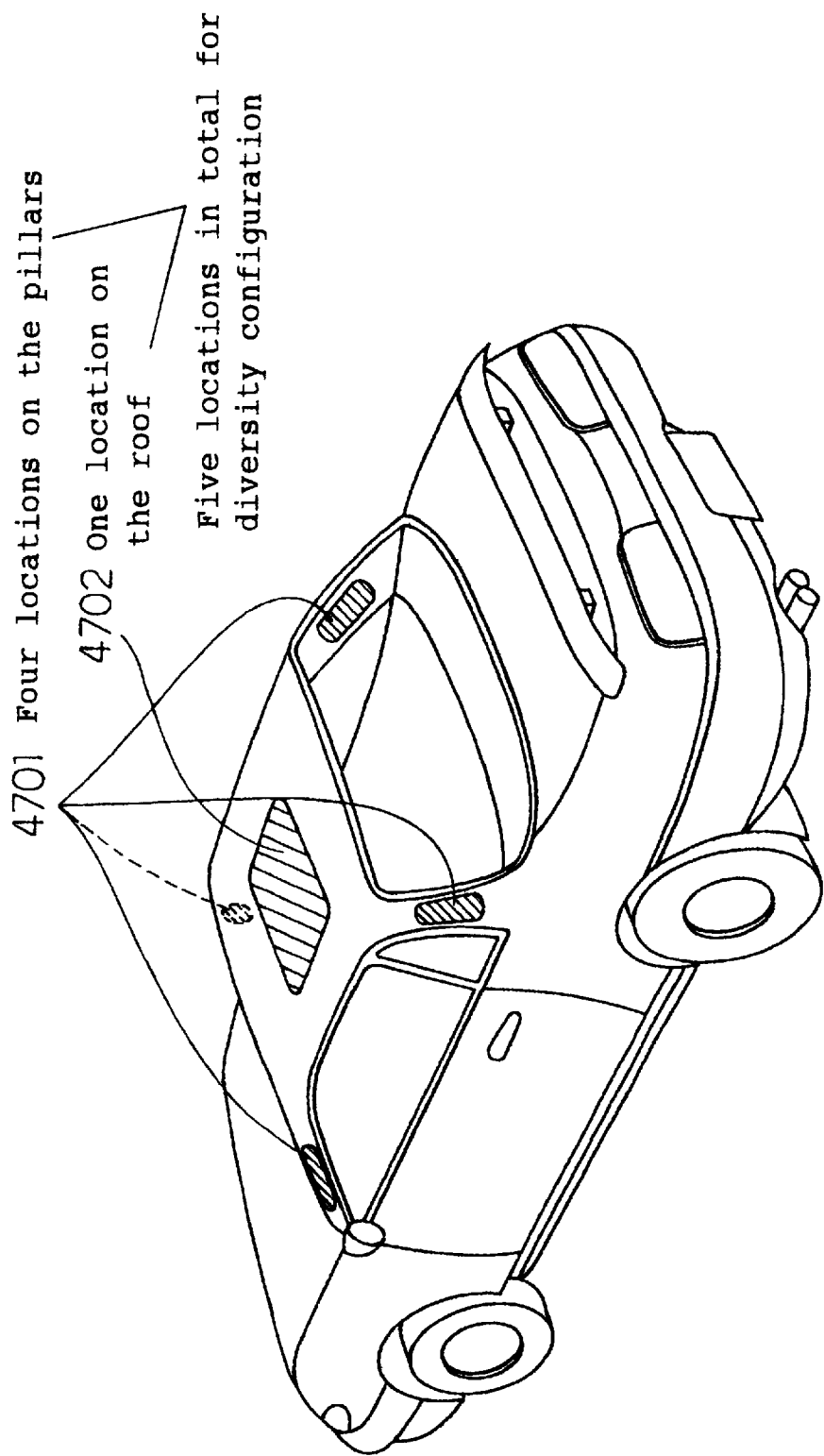
FIG. 47 is a perspective view showing a possible automobile application of an antenna device according to a twenty-fifth embodiment of the present invention.

FIG. 47 is a schematic diagram showing a possible automobile application of an antenna device according to the twenty-fifth embodiment of the present invention. Namely, any one of the antenna devices according to the preceding embodiments described above is installed at five locations in total, that is, one on each of the four pillars 4701 of the front, back, right and left of the automobile, and one on the roof, to provide a diversity configuration of these flat antennas. This configuration can offer a good capability of receiving and transmitting both horizontally and vertically polarized waves. It should be noted that the antenna device is installed at five locations according to the present embodiment but it may be installed at more or less locations.

(Embodiment 26)

Figure 48:
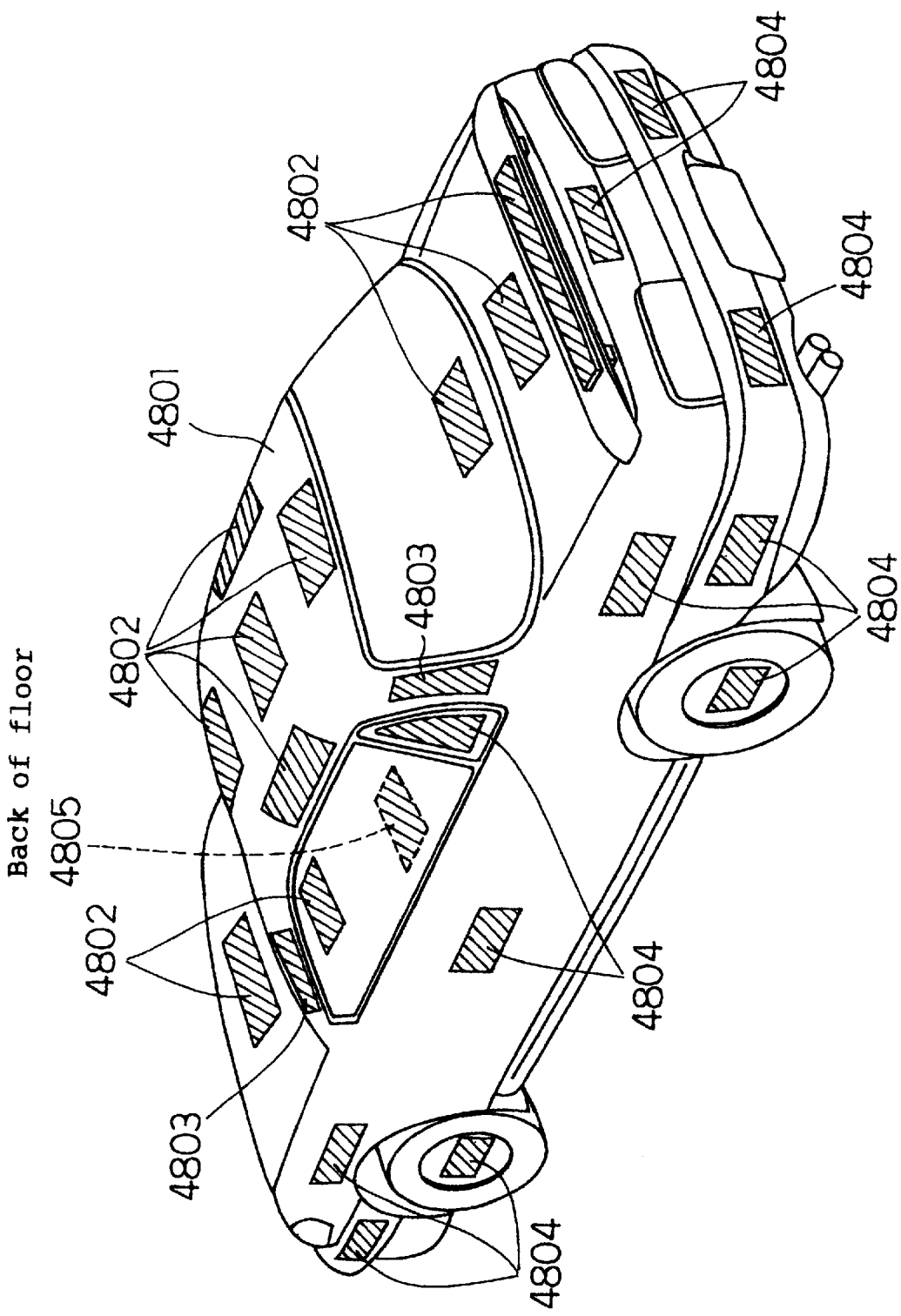
FIG. 48 is a perspective view showing possible locations where an antenna according to a twenty-sixth embodiment of the present invention is to be installed for automobile applications.

FIG. 48 is a schematic diagram showing possible locations where an antenna device according to the twenty-sixth embodiment of the present invention is to be installed for automobile applications. Namely, any one of the antenna devices according to the preceding embodiments described above is installed at any one or more locations on the roof panel, hood, pillars, side faces, bumpers, wheels, floor, or other surface portions of an automobile body 4801. In FIG. 48, an antenna 4802 is installed at a location where the antenna plane is almost in a horizontal position, an antenna 4803 is installed at a location where the antenna plane is in a tilted position, and an antenna 4804 is installed at a location where the antenna plane is almost in a vertical position. It should be noted that this figure shows possible locations for antenna installation by way of example and all the locations shown are not provided with antennas. Of course, it should be also noted that an antenna may be installed at any location other than those shown. It should be further noted that the automobile type is not limited to such a passenger car as shown and an antenna according to the present invention may be installed on a bus, truck, or any other type of automobile.

In addition, since an antenna 4805 is installed at a location where the antenna plane is in a horizontal position, and specifically, on the back (undersurface) of the floor with its directivity facing the roadbed, it is suitable for communication with a wave source installed on the road (or embedded therein) which is to be used for communication or detection of vehicle positions.

Generally, airwaves for TV or FM broadcasting mainly consist of horizontally polarized waves, while waves for portable telephone or radio communication mainly consist of vertically polarized waves. Whether an antenna is suitable for horizontally polarized waves or vertically polarized waves depends on the direction of its installation. As shown in FIG. 49(a), an antenna 4902 which is installed parallel to a conductive substrate 4901, that is, a vertical surface portion of an automobile body 4801 and comprises three antenna elements of unbalanced type with their grounded ends connected together is effective for horizontally polarized waves, since its sensitivity to horizontally polarized waves can be raised because of the horizontal electric field as shown in the right of the figure. This can be accomplished by installing an antenna 4804 as shown in FIG. 48. On the other hand, an antenna 4802 which is installed parallel to a horizontal surface portion of the automobile body 4801 is effective for vertically polarized waves, since its sensitivity to vertically polarized waves can be raised because of the vertical electric field. In addition, an antenna 4803 which is installed in a tilted position can be used regardless of the direction of polarization, since its sensitivity is balanced between horizontally and vertically polarized waves depending on the degree of tilt. FIG. 49(b) shows an example of antenna of balanced type, which is effective for horizontally polarized waves in a similar manner to that described above.

(Embodiment 27)

Figure 50:
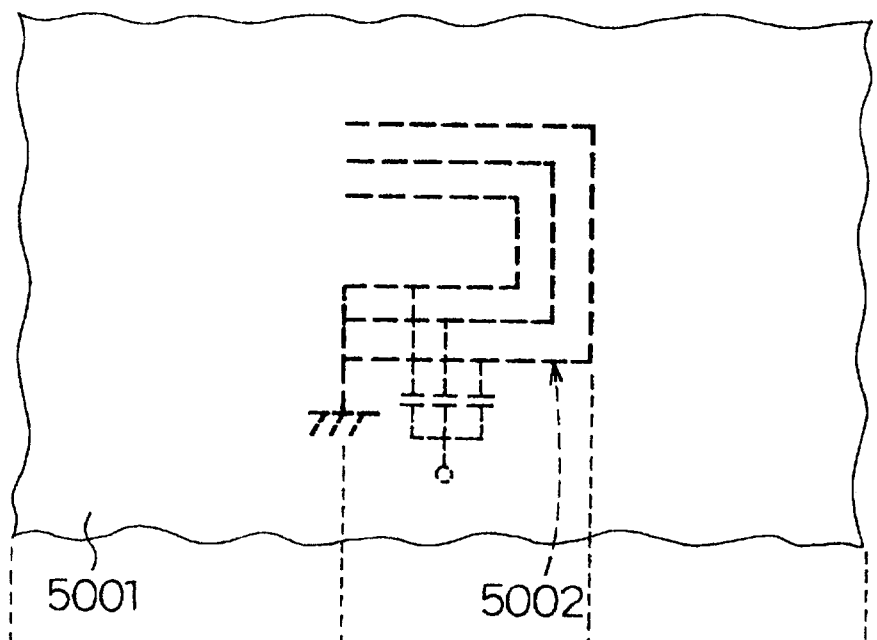
FIG. 50 is a schematic diagram showing the configuration of an antenna according to a twenty-seventh embodiment of the present invention.
Figure 50:
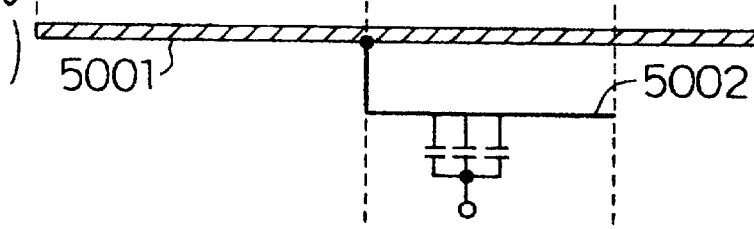
Figure 50:
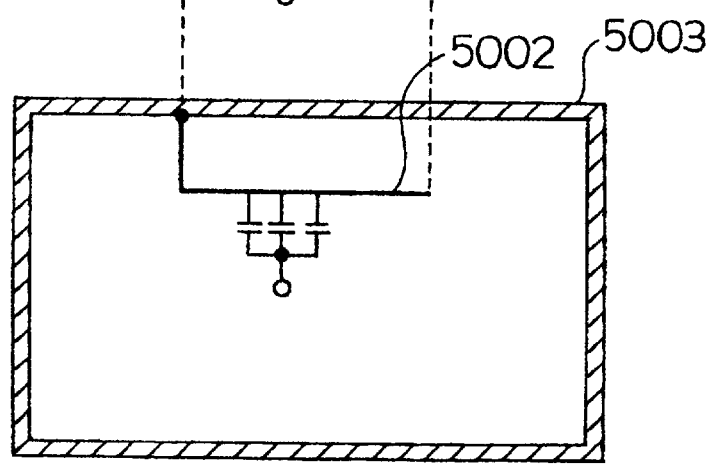

FIG. 50 is a schematic diagram showing the configuration of an antenna device according to the twenty-seventh embodiment of the present invention. The antenna device according to the present embodiment differs from the antenna devices according to the preceding embodiments described above in that it receives or transmits waves from the side of its conductive substrate rather than from the side of its antenna elements. As shown in FIG. 50(a), an antenna 5002 of three antenna elements is installed parallel to a conductive substrate 5001 at a distance and a grounded end of the antenna 5002 is connected to the conductive substrate 5001, which faces toward the outside. This antenna has symmetrical directional characteristics on the upper region of the conductive substrate 5001 corresponding to the area covered by the antenna 5002 (on the opposite side to the antenna 5002) and on the lower region thereof as shown in FIG. 50(b). Therefore, even if the antenna 5002 and the conductive substrate 5001 are located inversely, it can achieve the same effect as those of the antennas according to the preceding embodiments described above. In addition, even if a conductive substrate 5003 is formed as a sealed case as shown in FIG. 50(c), an antenna 5002 inside the conductive substrate 5003 can have similar characteristics and communicate with the outside through the conductive substrate 5003 when it is fed.

Figure 51:
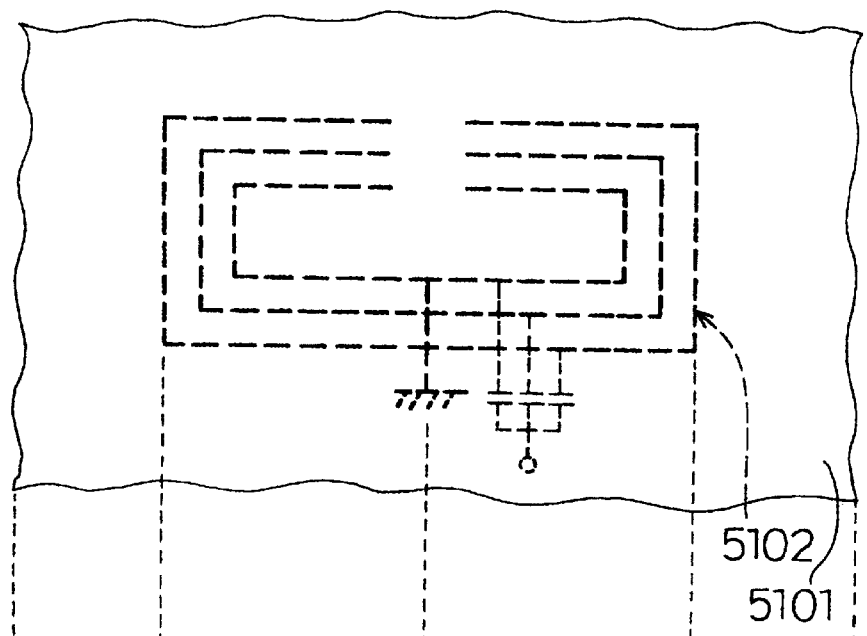
FIG. 51 is a schematic diagram showing another configuration of the antenna according to the twenty-seventh embodiment.
Figure 51:
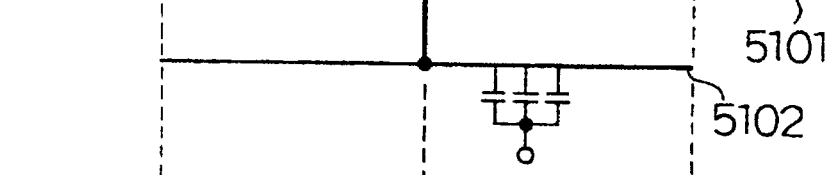
Figure 51:
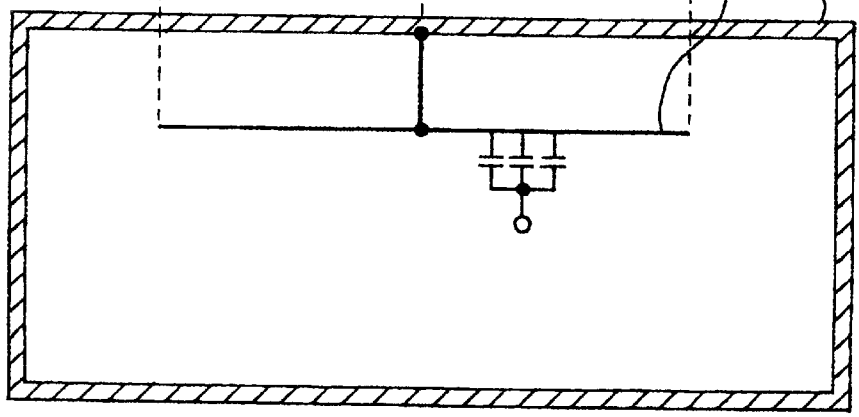

FIG. 51 shows an example of an antenna device of balanced type which can achieve the same effect as those described above, while FIG. 50 shows an antenna device of unbalanced type.

Figure 52:
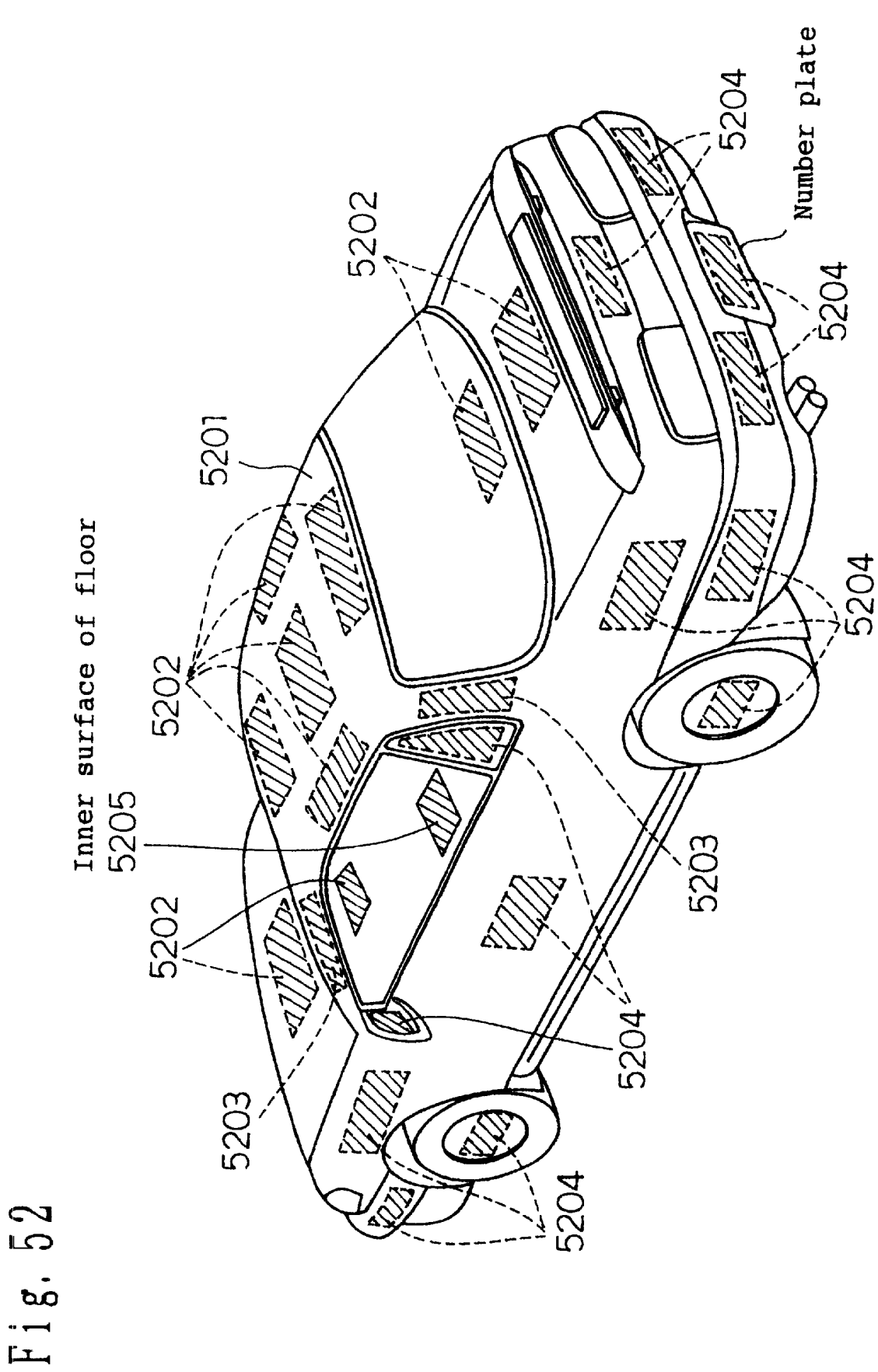
FIG. 52 is a schematic diagram showing possible locations where the antenna according to the twenty-seventh embodiment is to be installed for automobile applications.

FIG. 52 is a schematic diagram showing possible locations where the antenna device according to the present embodiment is to be installed for automobile applications similar to those of FIG. 48. In FIG. 52, like in FIG. 48, an antenna 5202 is installed at a location where the antenna plane is almost in a horizontal position, an antenna 5203 is installed at a location where the antenna plane is in a tilted position, and an antenna 5204 is installed at a location where the antenna plane is almost in a vertical position. In addition, since an antenna 5205 is installed at a location where the antenna plane is in a horizontal position, and specifically, on the inner surface of the floor, it is suitable for communication with a wave source installed on the road in a similar manner to that of FIG. 48. Although these antennas shown are all installed inside an automobile body 5201, they can achieve the same performance as that for the antennas installed on the outer surface of the automobile body for the reasons described above and in addition, they are very advantageous in appearance, damages, or risk of being stolen because they are not exposed to the outside of the body. Moreover, as shown in FIG. 52, the antenna device according to the present embodiment may be installed on a rearview mirror, in-car sun visor, number plate, or any other location where it cannot be otherwise installed on the outer surface, by embedding it within the inside space of such a component.

Figure 53:
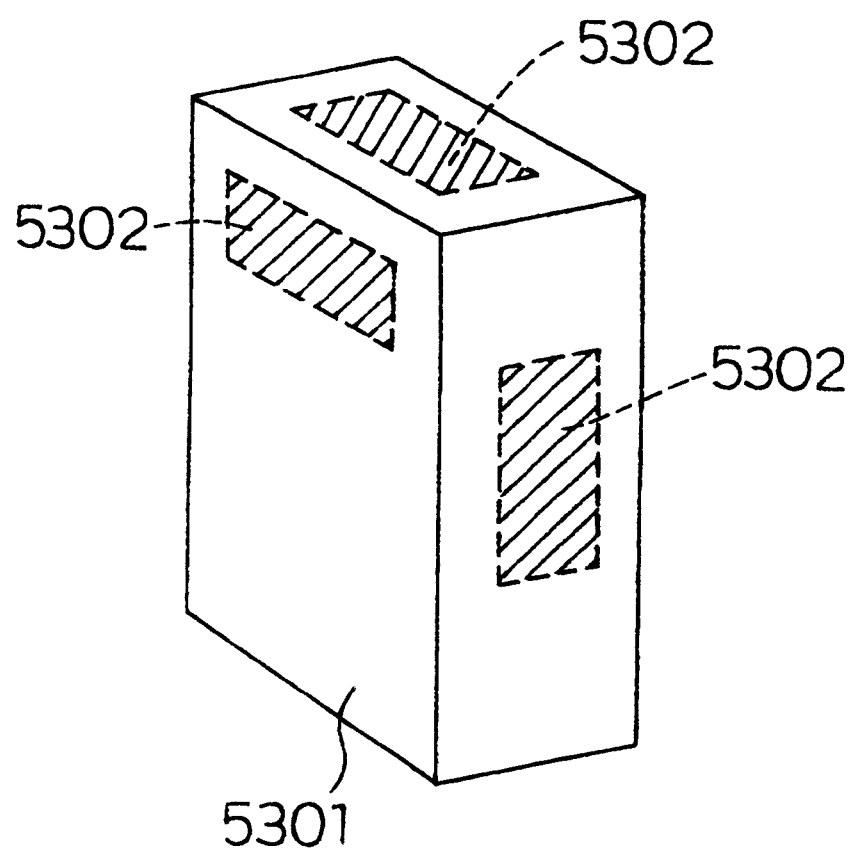
FIG. 53 is a schematic diagram showing a possible application to a portable telephone of the antenna according to the twenty-seventh embodiment.

FIG. 53 is a schematic diagram showing a possible application to a portable telephone of the antenna according to the present embodiment, in which an antenna 5302 is installed inside a conductive grounded case 5301 with an antenna ground connected to the the conductive grounded case 5301. This configuration can allow the antenna to be used in a similar manner to the case where the antenna is installed outside the grounded case 5301 and it can make the antenna very advantageous in handling because the antenna is not exposed to the outside. It should be noted that the antenna is used with a portable telephone according to the present embodiment but it can also apply to a TV, PHS, or other radio set.

Figure 54:
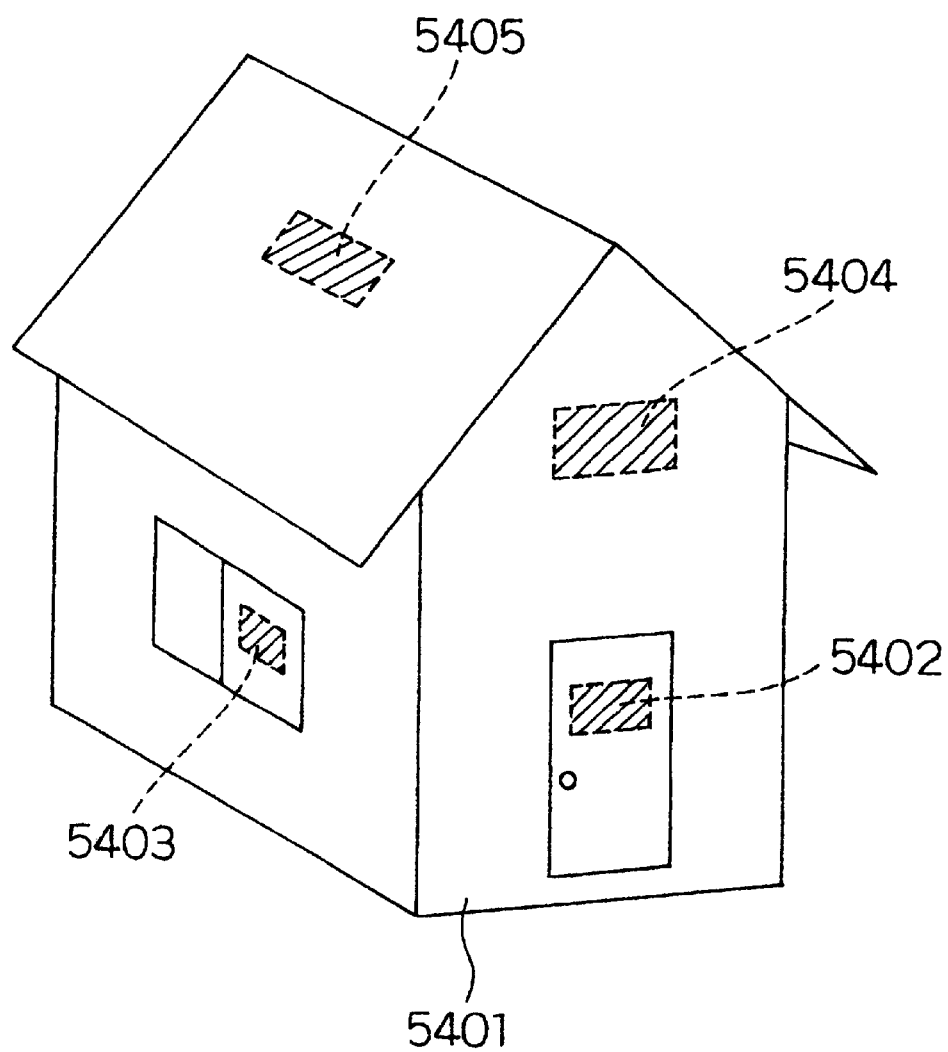
FIG. 54 is a schematic diagram showing a possible application to an ordinary house of the antenna according to the twenty-seventh embodiment.

FIG. 54 is a schematic diagram showing a possible application to an ordinary house of the antenna according to the present embodiment. Namely, an antenna 5402 is installed inside a conductive door of a house 5401, an antenna 5403 is installed inside a conductive window (for example, storm window), an antenna 5404 is installed inside a conductive wall, and an antenna 5405 is installed inside a conductive roof. Therefore, when an antenna is installed inside a conductive structure of the house 5401 in this way, the antenna can be protected against weather-induced damage or degradation with an elongated service life because it is not exposed to the outside.

It should be further noted that even if a house consists of nonconductive structures, such an antenna can be installed at any location by attaching a conductor to the outer surface thereof.

(Embodiment 28)

FIG. 55 is a schematic diagram showing the configuration of an antenna according to the twenty-eighth embodiment of the present invention. In the present embodiment, a conductive substrate 5501 and an antenna 5502 installed parallel to and in the proximity of the substrate can be turned (or rotated) together on the axis as shown by a dash-dot line. As shown in FIG. 55(a), when an antenna 5502 is in a vertical position, the electric field is horizontal as shown in the right of the figure and its sensitivity for horizontally polarized waves becomes high. As shown in FIG. 55(b), when the antenna 5502 is in a horizontal position, the electric field is in turn vertical as shown in the right of the figure and its sensitivity for vertically polarized waves becomes high and therefore, the antenna can be directed in the optimum position depending on the state of polarized waves. Of course, it may be directed in a tilted position. The directional gain characteristics of the antenna installed as shown in FIG. 55(a) are shown in FIG. 95 and the directional gain characteristics of the antenna installed as shown in FIG. 55(b) are shown in FIG. 96. As apparent from these figures, an antenna in a vertical position can exhibit a high sensitivity to horizontally polarized waves, while an antenna in a horizontal position can exhibit a high sensitivity to vertically polarized waves.

It should be noted that the conductive substrate 5501 and the antenna 5502 can be turned manually by operating the handle by hand or automatically by using a motor or any other drive.

FIG. 56(a) is a schematic diagram showing the configuration of another antenna device which can achieve the same effects as those described above without turning the antenna. Namely, a ferroelectric 5603 is located between a conductive substrate 5601 and an antenna 5602 so that it can sandwich the antenna 5602. As shown in the right of FIG. 56(b), this configuration can allow the electric field between a conductive substrate 5604 and an antenna 5605 to be extended in a horizontal direction through a ferroelectric 5606, so that the vertical component is decreased and the horizontal component is increased as compared with the case where no ferroelectric is used as shown in the left of the figure. The antenna can be set for vertically polarized waves or horizontally polarized waves depending on whether a ferroelectric is used or not. It should be noted that if the antenna is installed in a vertical position, such a ferroelectric will have an inverse effect on the antenna. It should be further noted that the ferroelectric 5603 may be installed during the manufacture or later and it may be made easily removable by providing grooves for this purpose.

(Embodiment 29)

Figure 57:
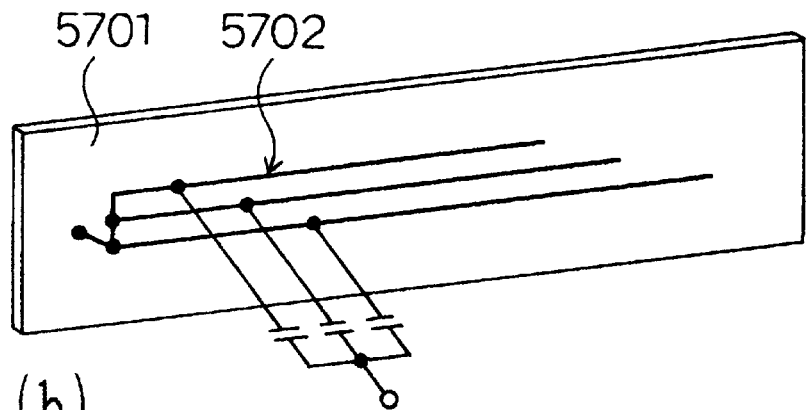
FIG. 57 is a schematic diagram showing the configuration of an example of an antenna according to a twenty-ninth embodiment of the present invention.
Figure 57:
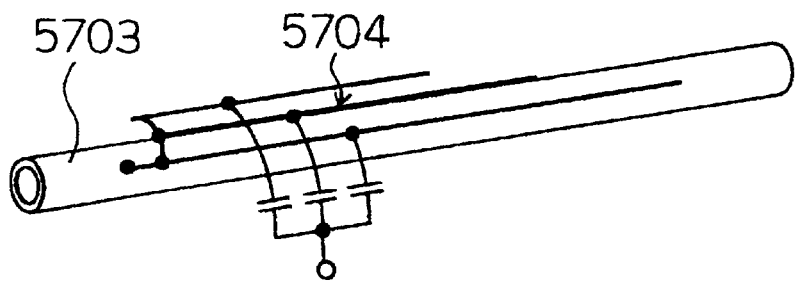
Figure 57:
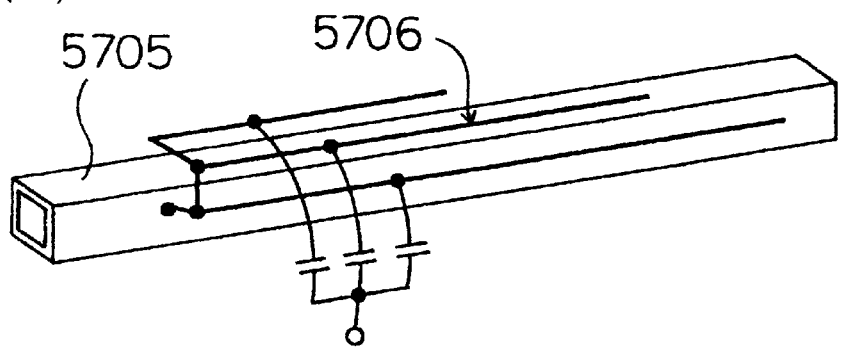

FIG. 57 is a schematic diagram showing the configuration of an example of an antenna device according to the twenty-ninth embodiment of the present invention. Although the antenna devices according to the preceding embodiments described above use bent elements which can be installed even in a narrow space, an antenna device according to the present embodiment uses a linear element which can be installed on an elongate component of an automobile or an element shaped to a component.

FIG. 57(a) shows that a linear antenna 5702 with three elements is located in the proximity of the surface of an elongate plate like conductive substrate 5701. FIG. 57(b) shows that a linear antenna 5704 with three elements is located in the proximity of the surface of a cylindrical conductive substrate 5703 so that each element is at the same distance from the conductive substrate 5703. FIG. 57(c) shows that a linear antenna 5706 with three elements is located in the proximity of the surface of a quadrangular-prism conductive substrate 5705 so that each element is at the same distance from the conductive substrate 5705.

Figure 58:
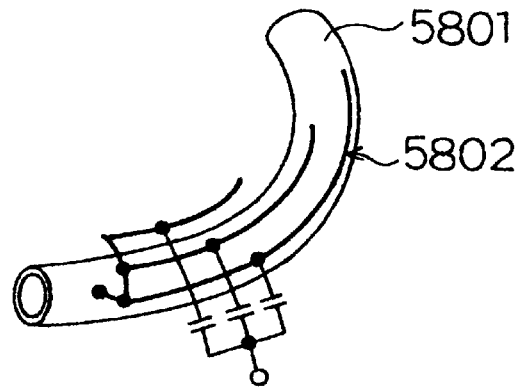
FIG. 58 is a schematic diagram showing the configuration of another example of the antenna according to the twenty-ninth embodiment.
Figure 58:
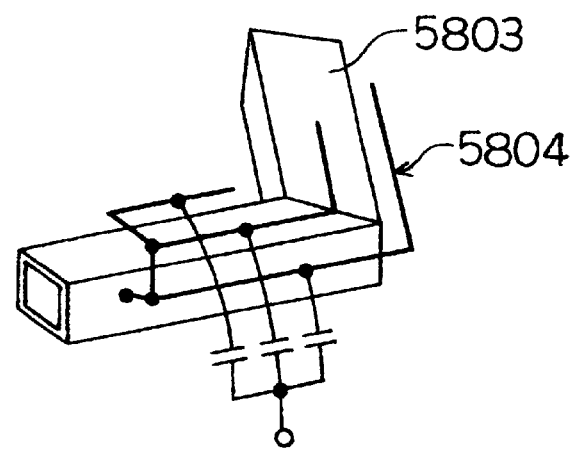
Figure 58:
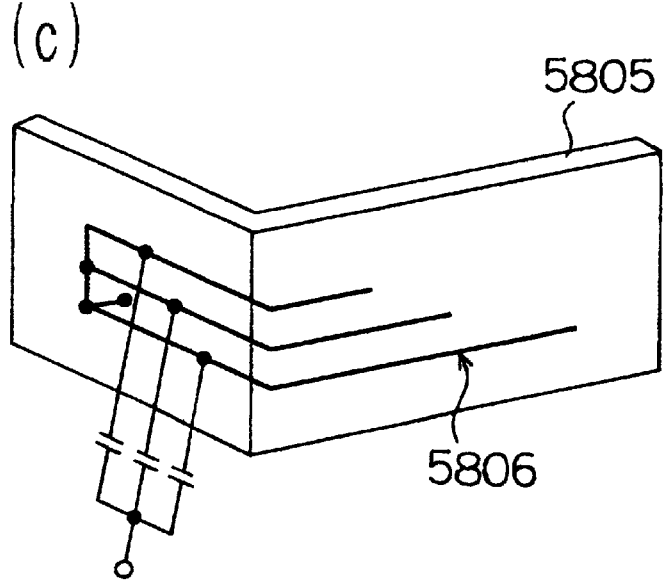

FIG. 58 shows variations of the present embodiment shown in FIG. 57, in which elements are curved or bent in accordance with a curved or bent conductive substrate. FIG. 58(a) shows that an antenna 5802 with three curved elements is located in the proximity of the surface of a curved cylindrical conductive substrate 5801 so that each element is at the same distance from the conductive substrate 5801. FIG. 58(b) shows that an antenna 5804 with three bent elements is located in the proximity of the surface of a bent quadrangular-prism conductive substrate 5803 so that each element is at the same distance from the conductive substrate 5803. FIG. 58(c) shows that an antenna 5806 with three bent elements is located in the proximity of the surface of a bent plate like conductive substrate 5805.

In addition, FIG. 59(a) shows that an antenna 5902 is located along the surface of a cylindrical conductive substrate 5901 and FIG. 59(b) shows that an antenna 5904 is located along the surface of a spherical conductive substrate 5903.

It should be noted that the antenna according to the present embodiment is located outside a component which constitutes a conductive substrate but it is not limited to this example and it may be located inside a plate like component or on the inner surface of a cylindrical component.

Figure 63:
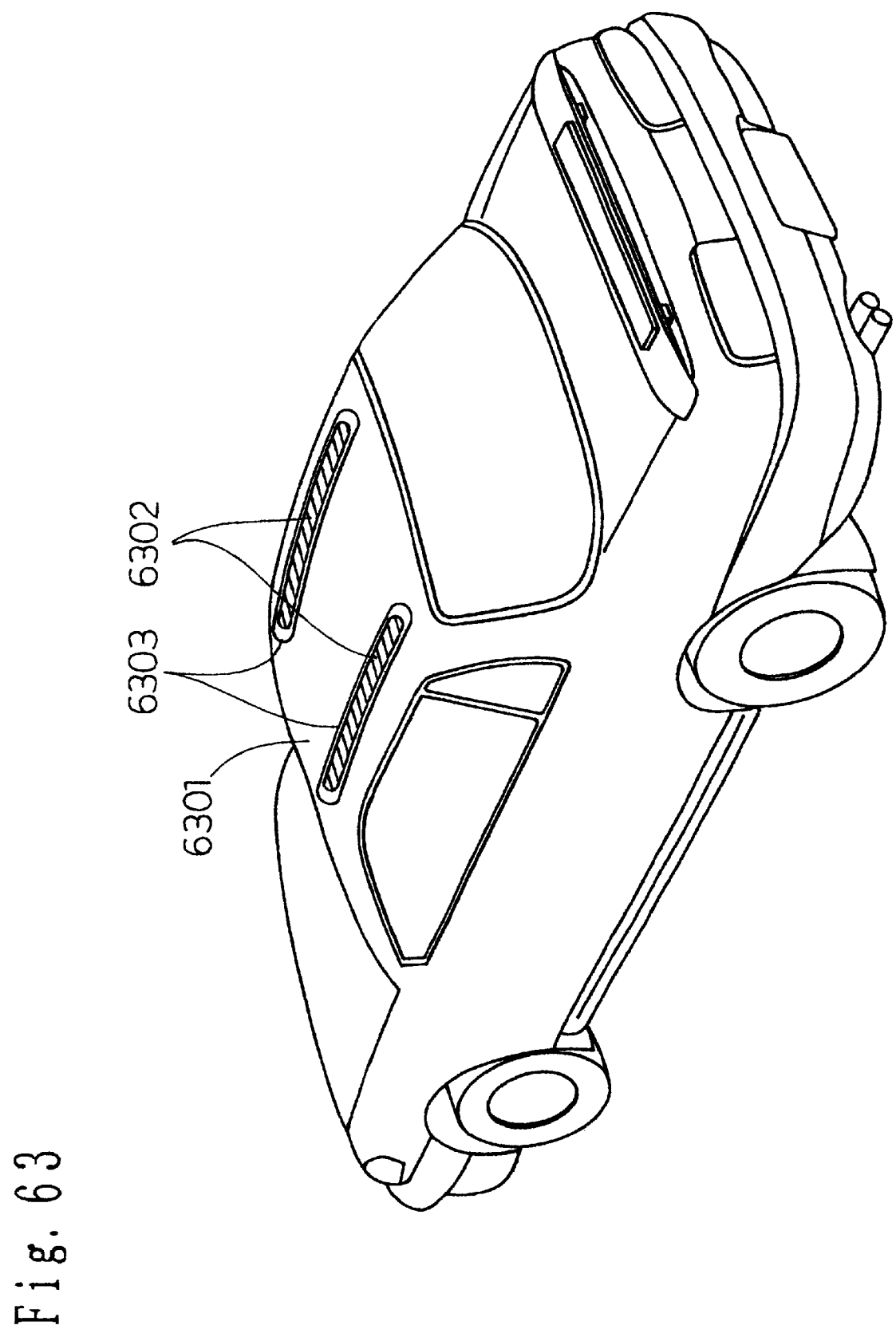
FIG. 63 shows an application of the antenna device according to the twenty-ninth embodiment.
Figure 65:
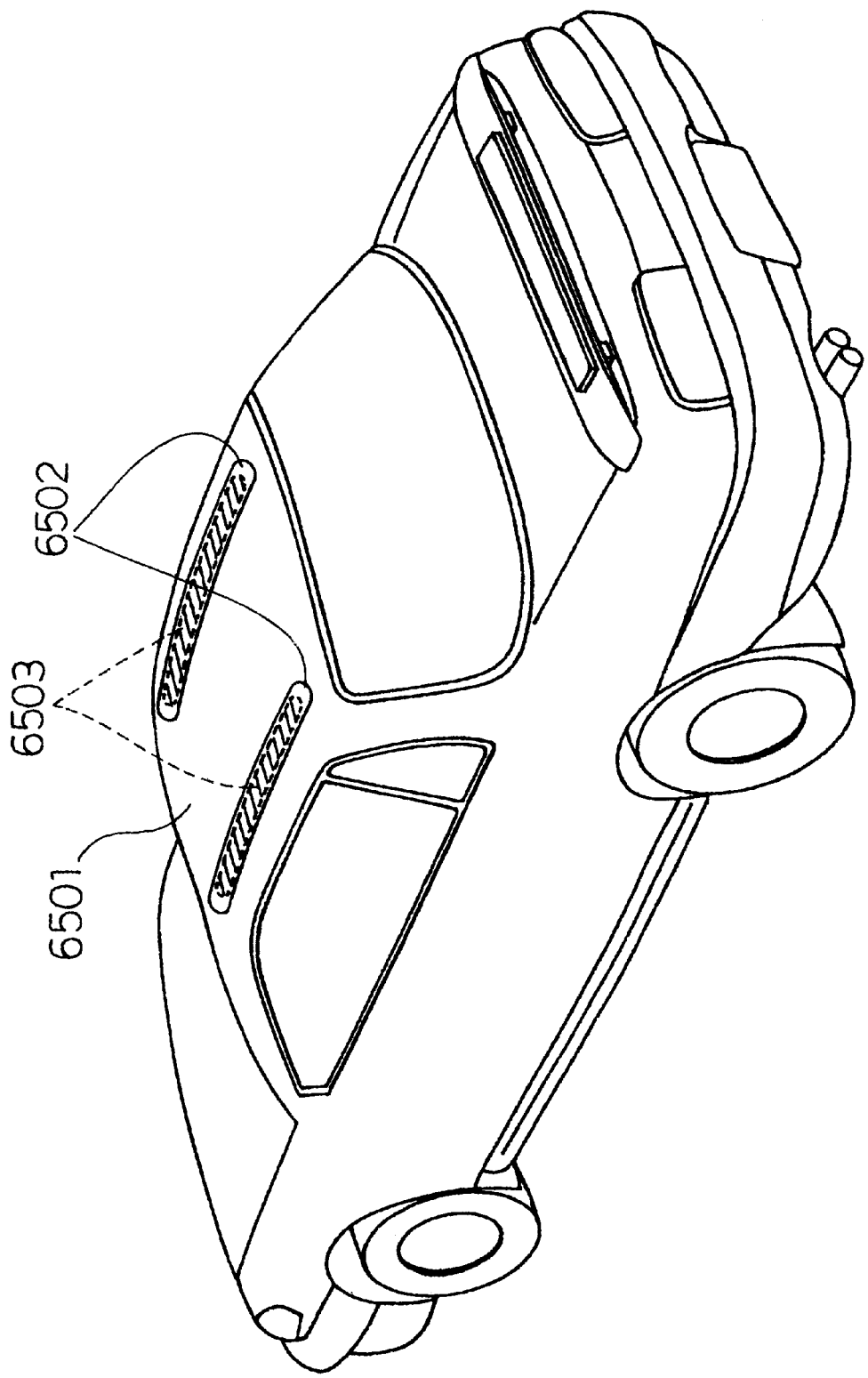
FIG. 65 shows still another application of the antenna device according to the twenty-ninth embodiment.

FIGS. 63 and 65 show applications of the antenna device according to the present embodiment. FIG. 63 shows that an antenna 6302 is installed on the surface of an elongate roof rail 6303 on the roof of an automobile body 6301 and FIG. 65 shows that an antenna 6502 is installed inside an elongate roof rail 6503 on the roof of an automobile body 6501.

Figure 64:
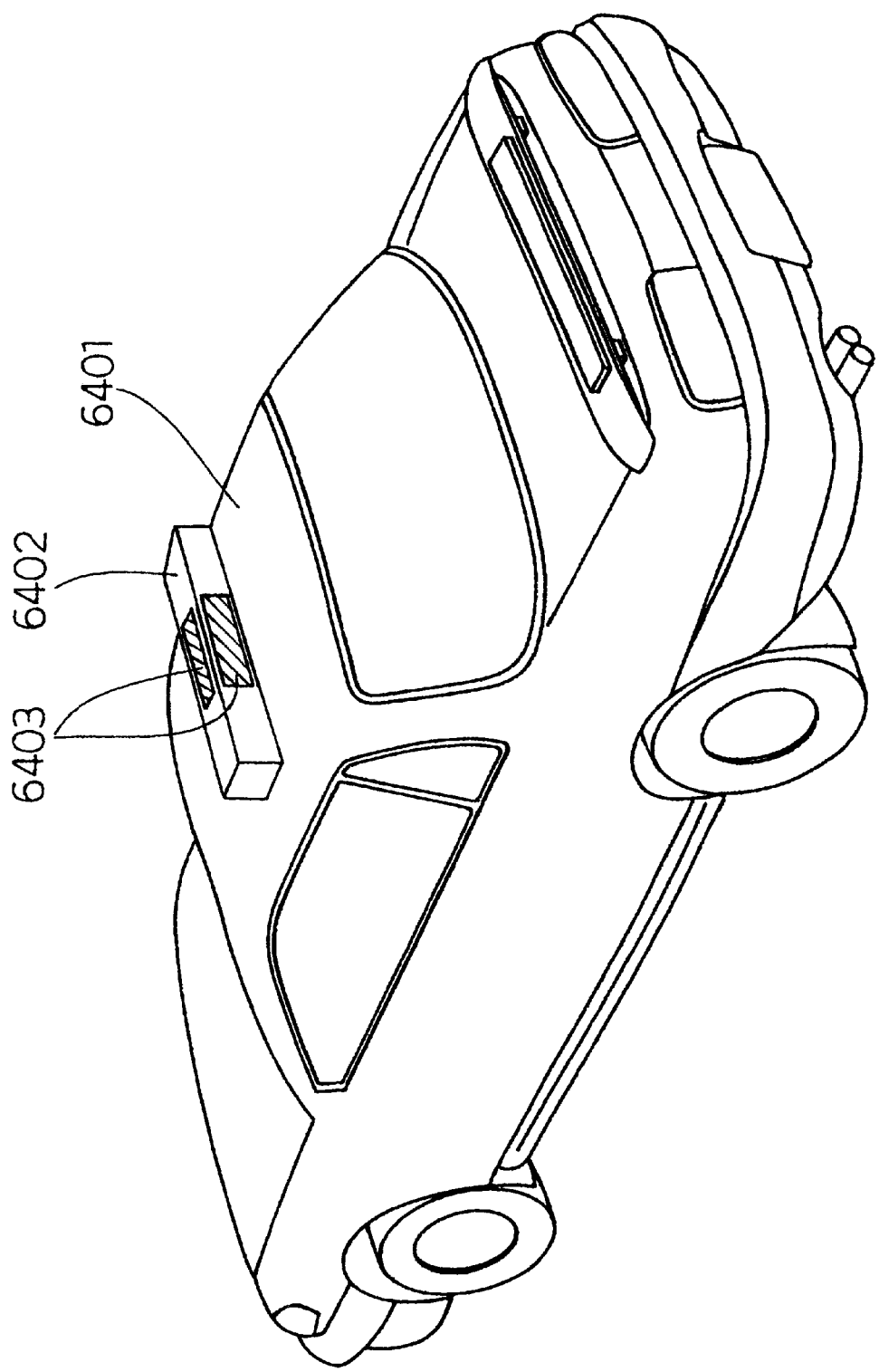
FIG. 64 shows another application of the antenna device according to the twenty-ninth embodiment.
Figure 66:
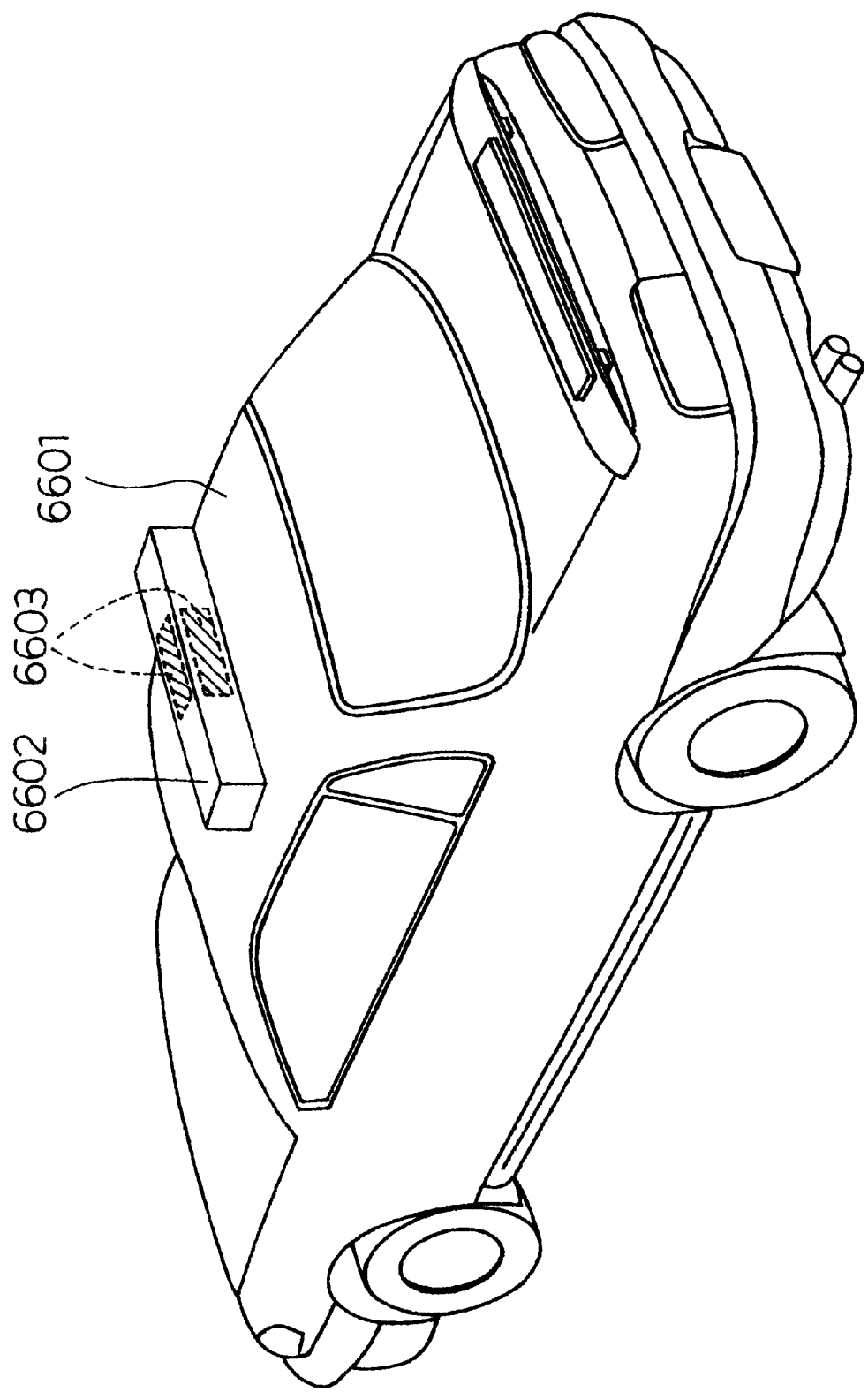
FIG. 66 shows still another application of the antenna device according to the twenty-ninth embodiment.

Moreover, FIGS. 64 and 66 show other applications of the antenna device according to the present embodiment. FIG. 64 shows that an antenna 6403 is installed on the surface of an elongate roof box 6402 on the roof of an automobile body 6401 and FIG. 66 shows that an antenna 6603 is installed inside an elongate roof box 6602 on the roof of an automobile body 6601.

(Embodiment 30)

FIGS. 60(a) and 60(b) are schematic diagrams showing the configuration of an example of an antenna device according to the thirtieth embodiment of the present invention. The antenna device according to the present embodiment comprises an antenna 6002 with three longer elements and an antenna 6003 with three shorter elements with respect to an grounded point connected to a conductive substrate 6001 and feeding points A 6005 and B 6004 are provided for these antennas 6002 and 6003, respectively. As shown in FIG. 60(c), the shorter antenna 6003 is tuned to the A band of relatively higher frequencies and the longer antenna 6002 is tuned to the B band of relatively lower frequencies, and thus, such a single antenna device can accommodate two tuning bands. It should be noted that the feeding points A 6005 and B 6004 may be connected to each other.

FIGS. 61(a) and 61(b) are schematic diagrams showing another example of the antenna of unbalanced type having two tuning bands. This antenna is a four-element antenna having an end connected to a conductive substrate 6101 and located in the proximity of the conductive substrate 6101 and in addition, an antenna 6102 with two relatively longer elements is provided with a feeding point B 6104 and an antenna 6103 with two relatively shorter elements is provided with a feeding point A 6105. As shown in FIG. 61(c), this configuration can accommodate two tuning bands, that is, the A band of relatively higher frequencies and the B band of relatively lower frequencies in a similar manner to that of the preceding example. It should be also noted that the feeding points A 6005 and B 6004 may be connected to each other.

FIGS. 62(a) and 62(b) are schematic diagrams showing still another example of the antenna of balanced type having two tuning bands. This antenna is a four-element antenna having the midpoint connected to a conductive substrate 6201 and located in the proximity of the conductive substrate 6201 and in addition, an antenna 6202 with two relatively longer elements is provided with a feeding point B 6204 and an antenna 6203 with two relatively shorter elements is provided with a feeding point A 6205. As shown in FIG. 62(c), this configuration can accommodate two tuning bands, that is, the A band of relatively higher frequencies and the B band of relatively lower frequencies in a similar manner to that of the preceding examples. It should be also noted that the feeding points A 6005 and B 6004 may be connected to each other.

Therefore, the present embodiment can provide an advanced antenna device which requires a minimum space for installation and which is capable of accommodating a plurality of tuning bands, and thus, such an antenna can be applicable in a narrow space such as an automobile or a portable telephone.

It should be noted that the present embodiment assumes two tuning bands but it may accommodate three or more bands. The latter case can be accomplished by providing a plurality of antennas each of which has an element length corresponding to each tuning band and providing a feeding point for each antenna.

(Embodiment 31)

Figure 67:
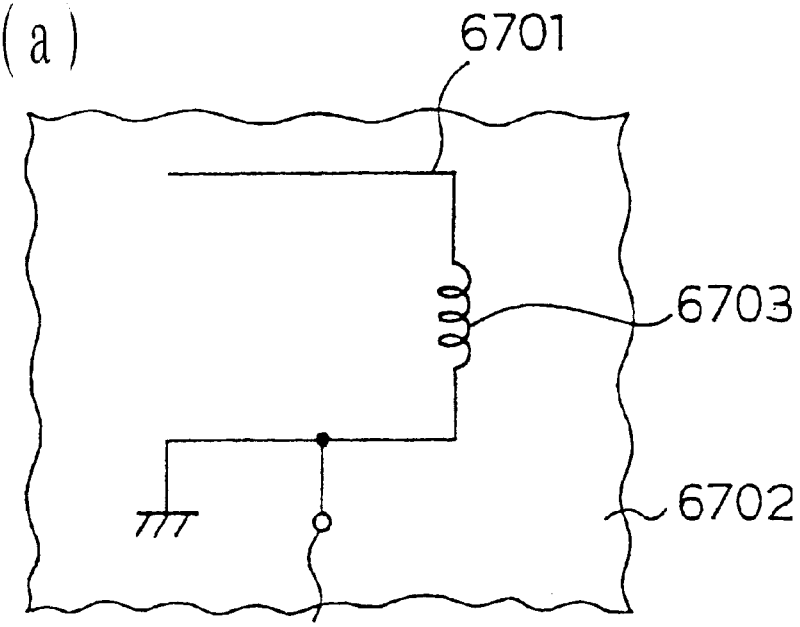
FIG. 67 is a schematic diagram showing the configuration of an example of an antenna according to a thirty-first embodiment of the present invention.
Figure 67:
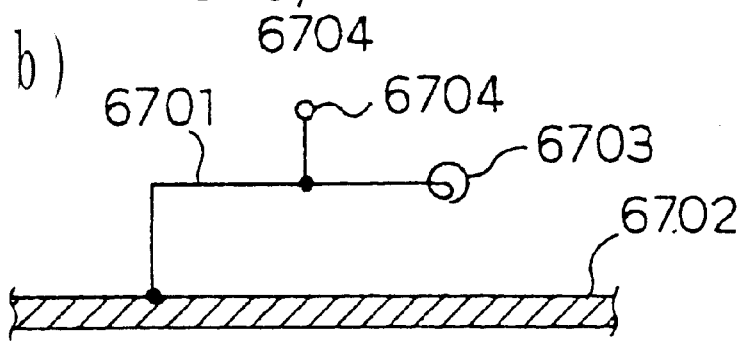

FIG. 67 is a schematic diagram showing the configuration of an example of an antenna device according to the thirty-first embodiment of the present invention. In the antenna device according to the present embodiment, a coil 6703 is provided in place on a three-edge antenna element 6701 located in the proximity of a conductive substrate 6702 and an end of the antenna element 6701 is connected to the conductive substrate 6702. In addition, a feeding section 6704 is provided on the antenna element 6701 between the coil 6703 and the conductive substrate 6702. This configuration can allow an electric current to concentrate in the coil and thus the antenna device can be reduced in size with the gain unchanged. For example, if the antenna element consists of a strip line, the area for the antenna can be reduced to a quarter. Moreover, its bandwidth can be narrowed with a sharp band characteristic.

Figure 68:
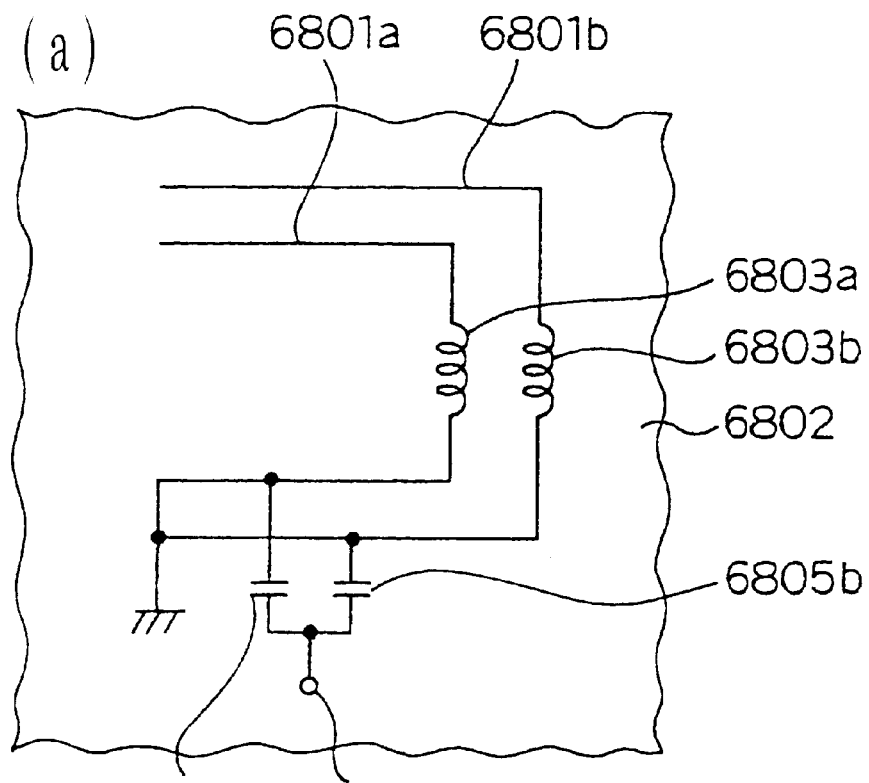
FIG. 68 is a schematic diagram showing the configuration of another example of the antenna according to the thirty-first embodiment.
Figure 68:
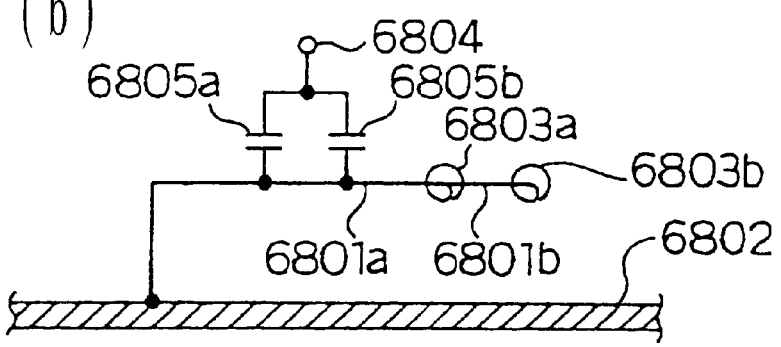

FIG. 68 shows that two antenna elements having the configuration of FIG. 67 are connected in parallel for band synthesis. Namely, two antenna elements 6801*a* and 6801*b* having different bands (lengths) and coils 6803*a* and 6803*b* provided in place on the elements, respectively, are located in parallel and an end of each element is connected to a conductive substrate 6802. In addition, the antenna elements 6801*a* and 6801*b* are connected to a common feeding section 6804 through reactance elements 6805*a* and 6805*b*, respectively. This configuration can synthesize the bands of the two antenna elements and thus, a broadband antenna device with the same effects as those described above can be implemented.

(Embodiment 32)

Figure 69:
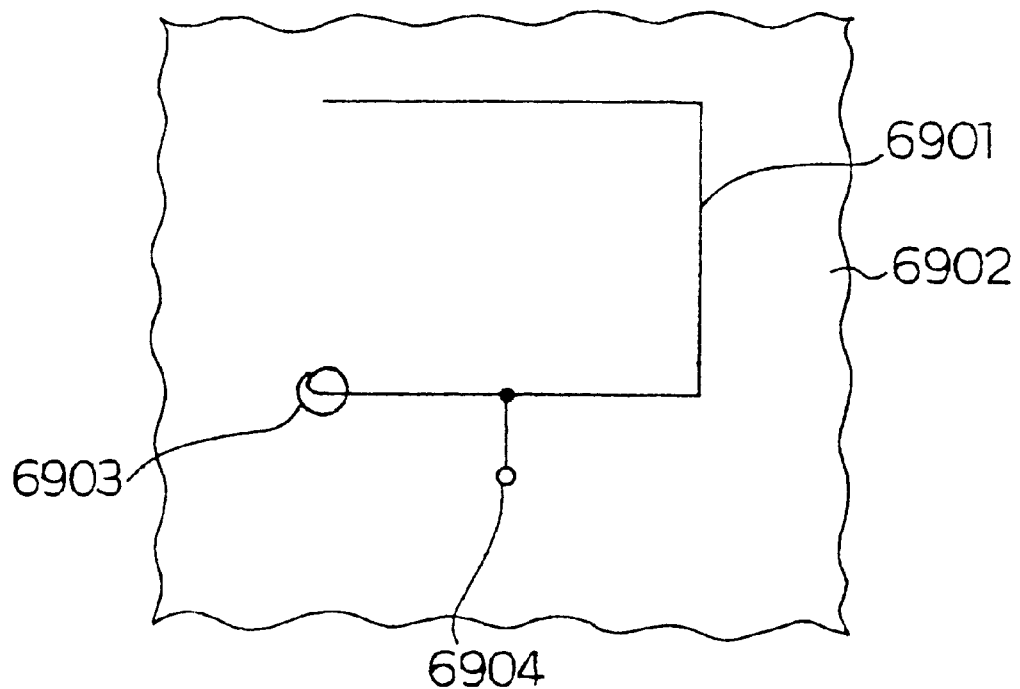
FIG. 69 is a schematic diagram showing the configuration of an example of an antenna according to a thirty-second embodiment of the present invention.
Figure 69:
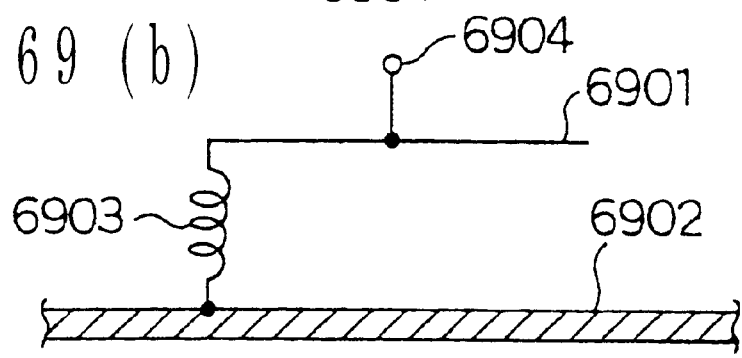

FIG. 69 is a schematic diagram showing the configuration of an example of an antenna device according to the thirty-second embodiment of the present invention. In the antenna device according to the present embodiment, a coil 6903 is provided between an end of a three-edge antenna element 6901 located in the proximity of a conductive substrate 6902 and the conductive substrate 6902 and the other end of the coil 6903 is connected to the conductive substrate 6902 for grounding. In addition, a feeding section 6904 is provided in place on the antenna element 6901. This configuration can allow an electric current to concentrate in the coil in a similar manner to that for the thirty-second embodiment described above and thus the antenna device can be reduced in size with the gain unchanged.

Figure 70:
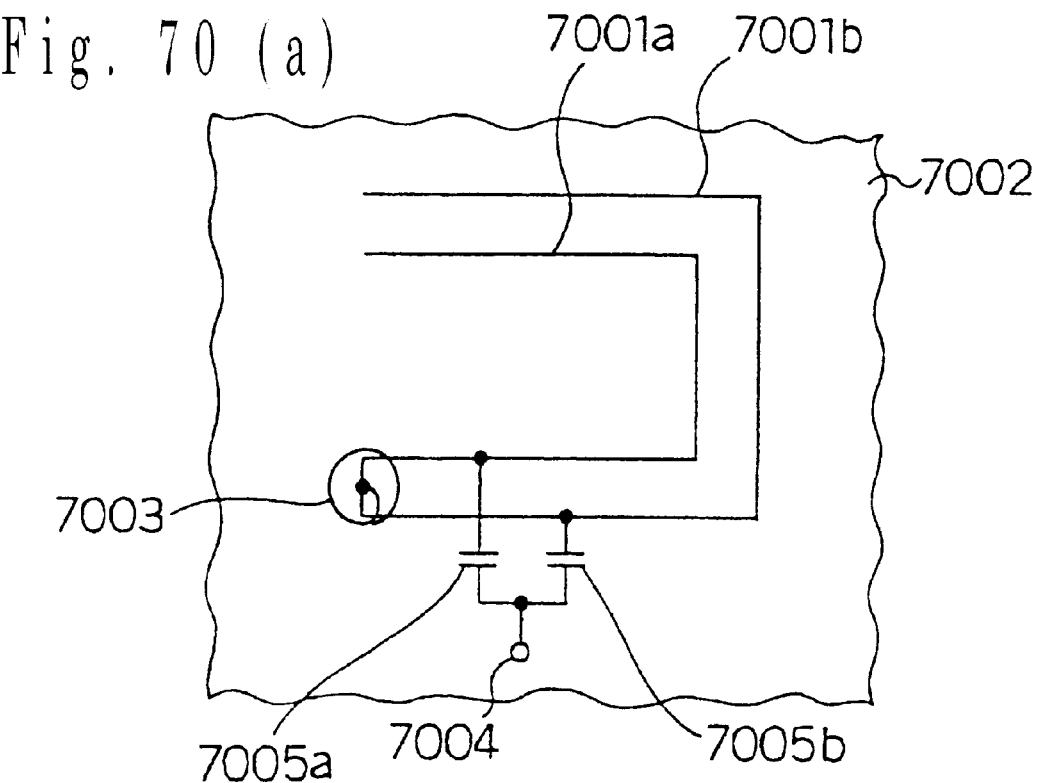
FIG. 70 is a schematic diagram showing the configuration of another example of the antenna according to the thirty-second embodiment.
Figure 70:
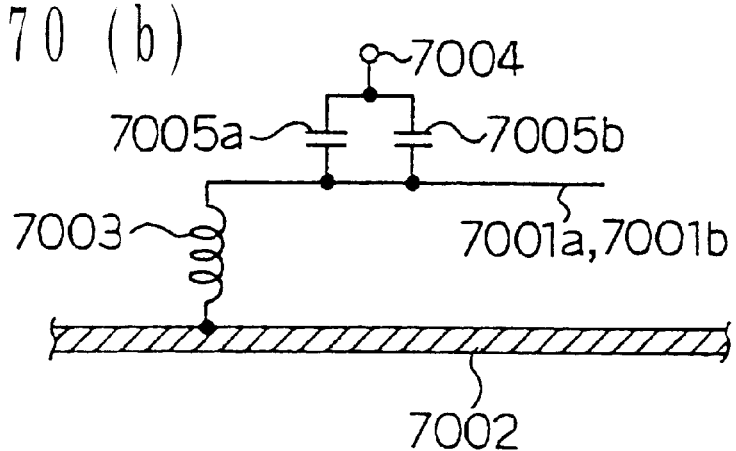

FIG. 70 shows that two antenna elements having the configuration of FIG. 69 are connected in parallel for band synthesis. Namely, two antenna elements 7001*a* and 7001*b* having different bands (lengths) are located in parallel with an end connected to an end of a common coil 7003 and the other end of the coil 7003 is connected to a conductive substrate 7002. In addition, the antenna elements 7001*a* and 7001*b* are connected to a common feeding section 7004 through reactance elements 7005*a* and 7005*b*, respectively. This configuration can synthesize the bands of the two antenna elements and thus, a broadband antenna device with the same effects as those described above can be implemented. It should be noted that the single coil which is shared by the two antenna elements can contribute to a simple configuration.

(Embodiment 33)

Figure 71:
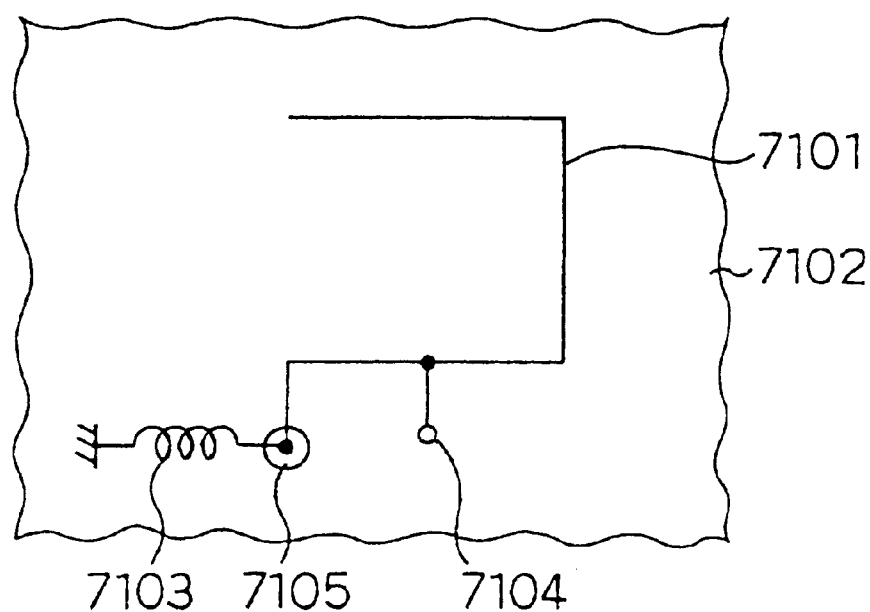
FIG. 71 is a schematic diagram showing the configuration of an example of an antenna according to a thirty-third embodiment of the present invention.
Figure 71:
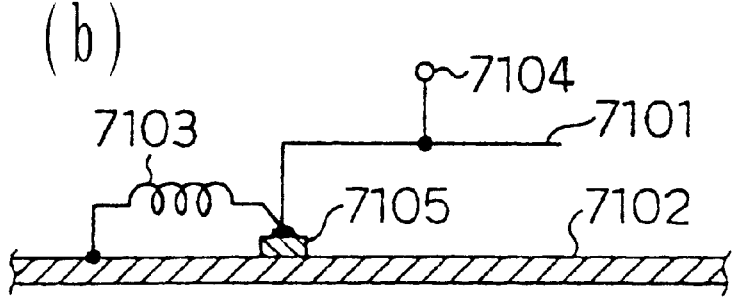
Figure 72:
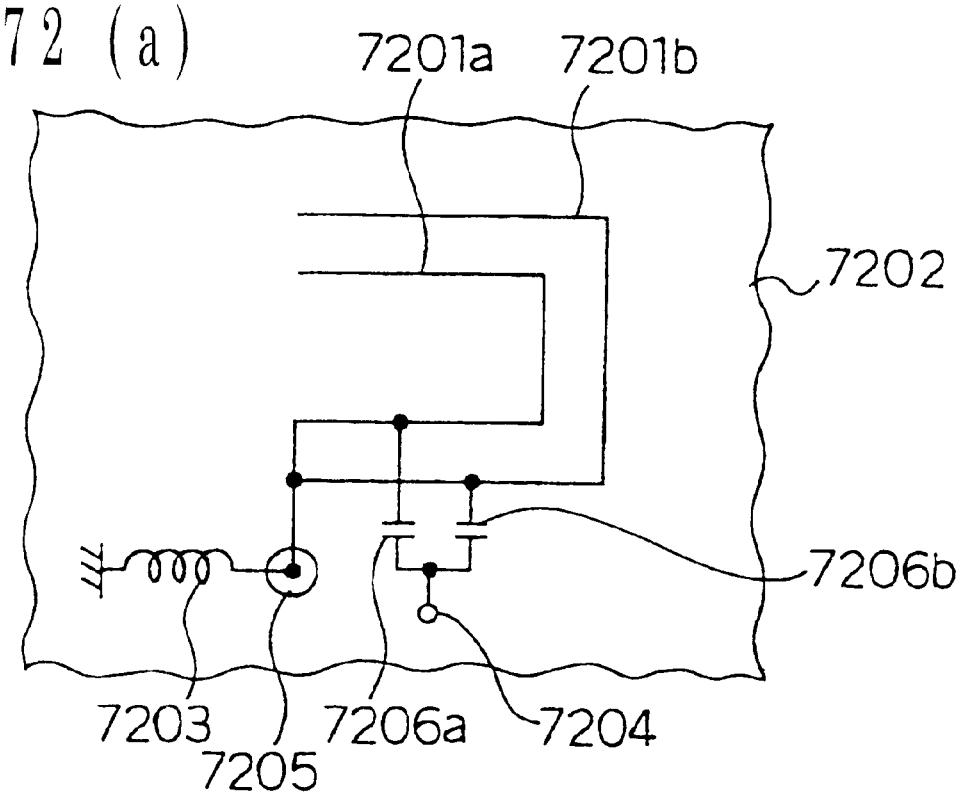
FIG. 72 is a schematic diagram showing the configuration of another example of the antenna according to the thirty-third embodiment.
Figure 72:
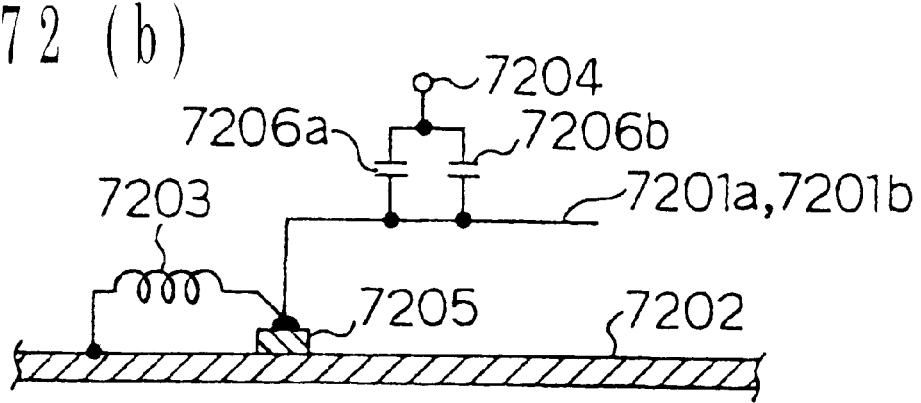

FIG. 71 is a schematic diagram showing an example of an antenna device according to the thirty-third embodiment of the present invention. The present embodiment differs from the thirty-second embodiment described above in that as shown in FIG. 71, an insulator 7105 is provided on a conductive substrate 7102 and an antenna element 7101 and a coil 7103 are connected on the insulator 7105. This configuration can allow easy installation of a coil 7103, which is useful for its implementation, and thus the coil can be stably installed. FIG. 72 shows the configuration of two antenna elements 7201*a* and 7201*b* arranged for band synthesis. As shown in the figure, although the connection between a coil 7203 and the antenna elements becomes more complex because of the more antenna elements as compared with the case of FIG. 71, a connection point provided on an insulator 7205 on a conductive substrate 7202 can make the connection between the antenna elements and the coil much easier.

(Embodiment 34)

Figure 73:
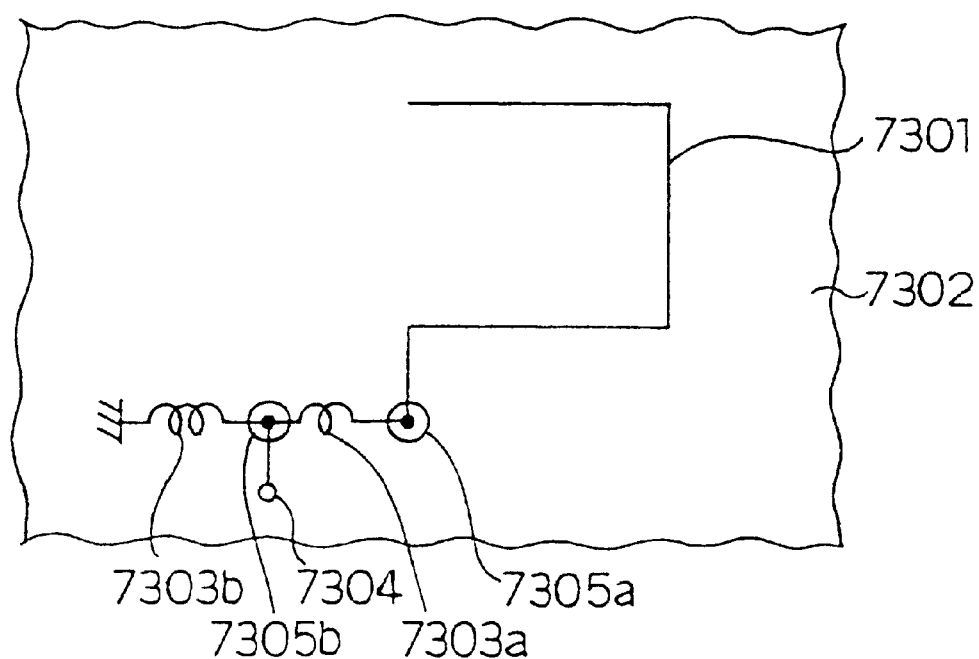
FIG. 73 is a schematic diagram showing the configuration of an example of an antenna according to a thirty-fourth embodiment of the present invention.
Figure 73:
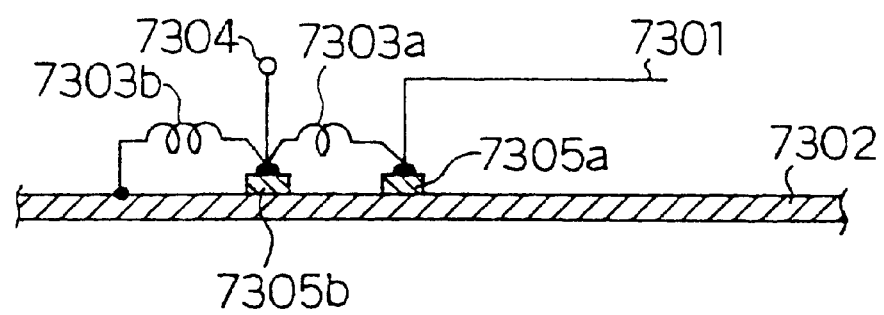
Figure 74:
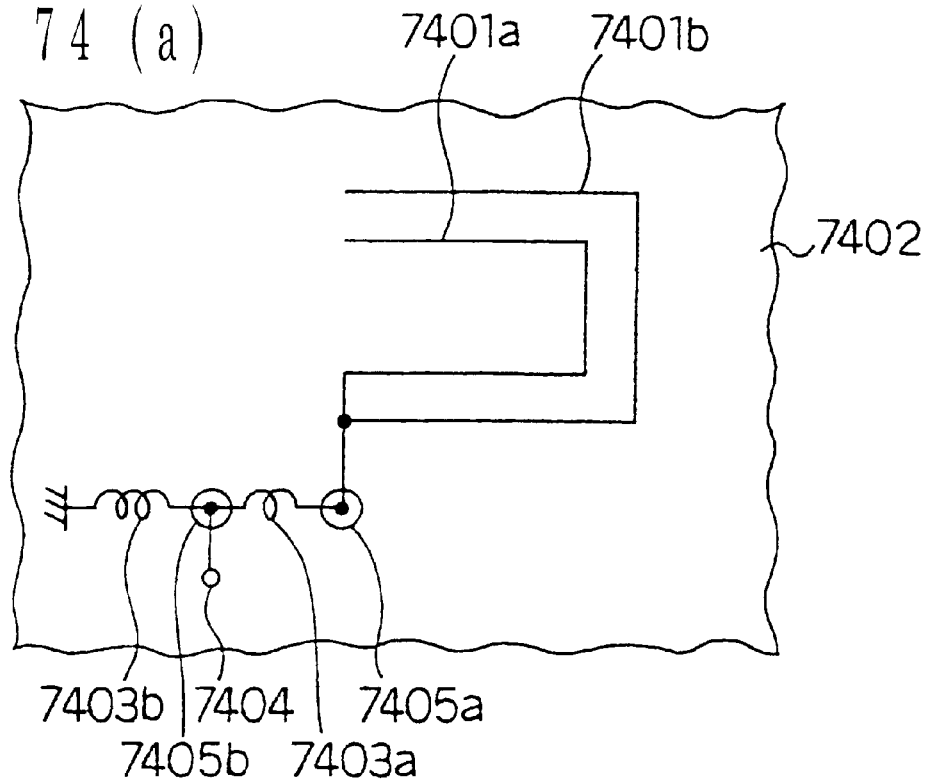
FIG. 74 is a schematic diagram showing the configuration of another example of the antenna according to the thirty-fourth embodiment.
Figure 74:
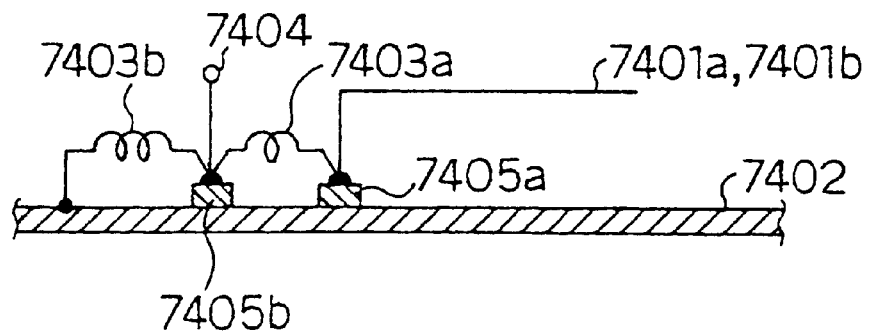

FIG. 73 is a schematic diagram showing an example of an antenna device according to the thirty-fourth embodiment of the present invention. In the antenna device according to the present embodiment, two coil sections are separately provided and two insulators 7305*a* and 7305*b* are provided on a conductive substrate 7302 to connect antenna elements and coils. Namely, an end of a three-edge antenna element 7301 provided in the proximity of a conductive substrate 7302 and an end of a coil 7303*a* are connected together on an insulator 7305, the other end of the coil 7303*a* and an end of another coil 7303*b* and a feeding section 7304 are connected together on another insulator 7305*b*, and the other end of the coil 7303*b* is connected to the conductive substrate 7302 for grounding. FIG. 74 shows an antenna device having two antenna elements 7401*a* and 7401*b* arranged for band synthesis and the antenna elements, coils, and a feeding section are connected in a similar manner to that shown in FIG. 73.

These configurations can allow easy connection to other circuit components because the feeding terminal is provided on a circuit board.

(Embodiment 35)

Figure 75:
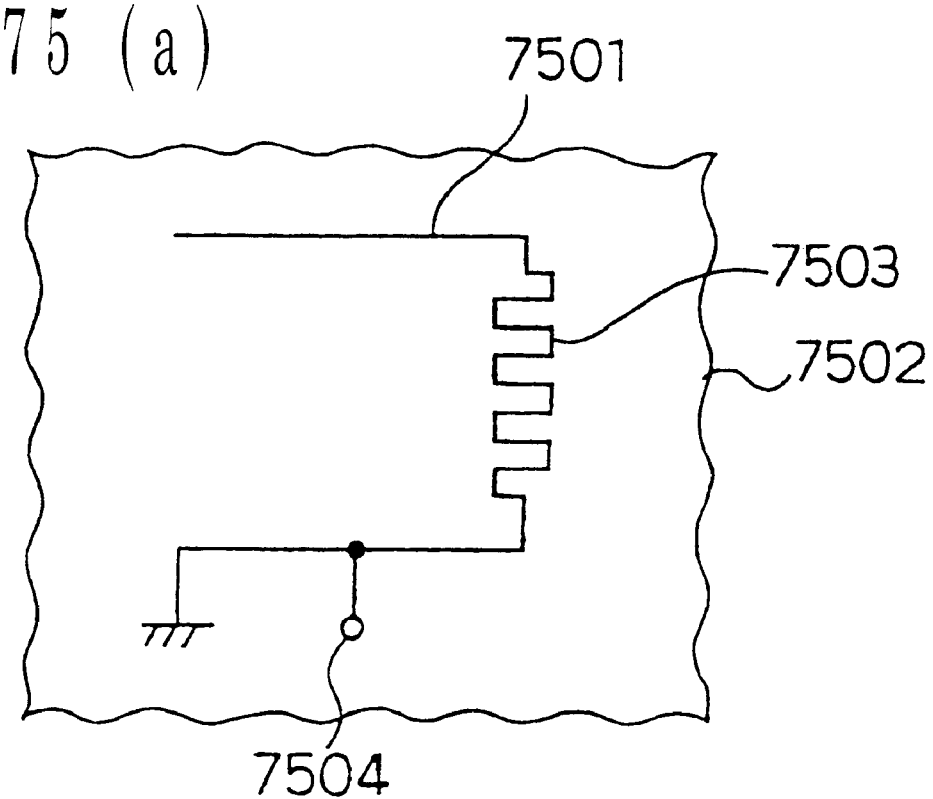
FIG. 75 is a schematic diagram showing the configuration of an example of an antenna according to a thirty-fifth embodiment of the present invention.
Figure 75:
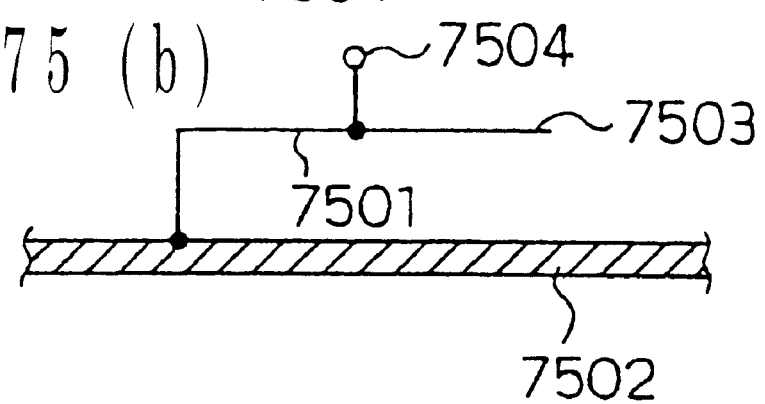
Figure 76:
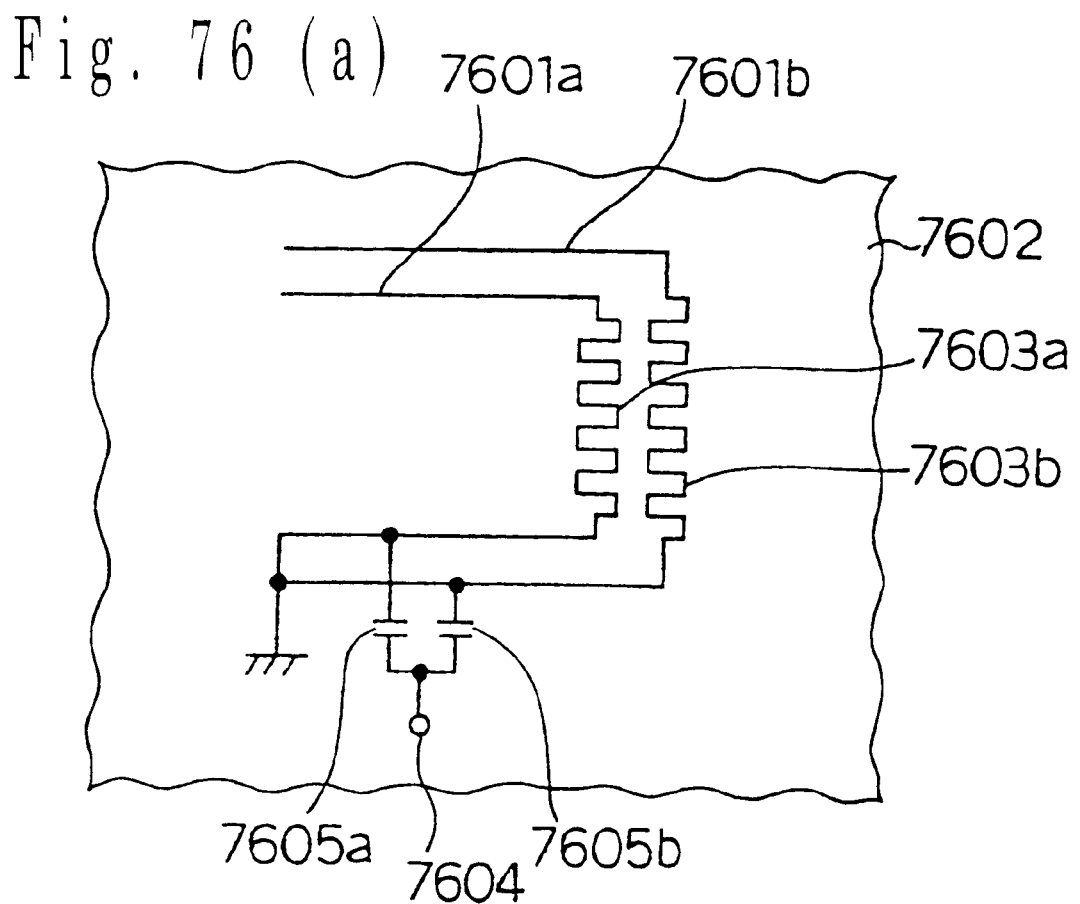
FIG. 76 is a schematic diagram showing the configuration of another example of the antenna according to the thirty-fifth embodiment.
Figure 76:
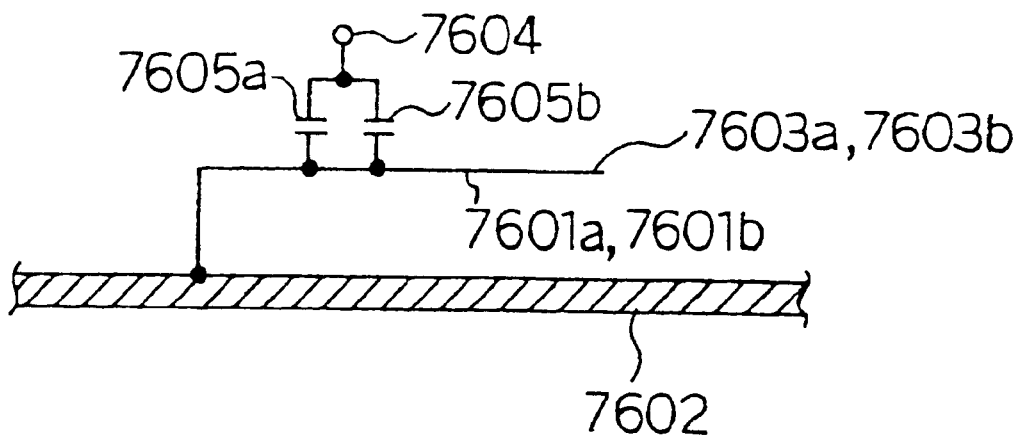
Figure 78:
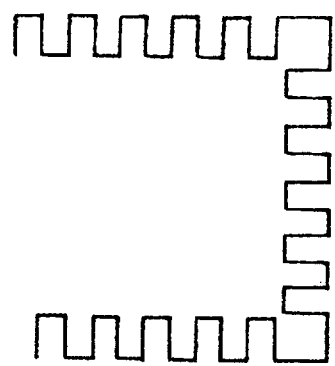
FIG. 78 is a schematic diagram showing another pattern according to the thirty-sixth embodiment.
Figure 78:
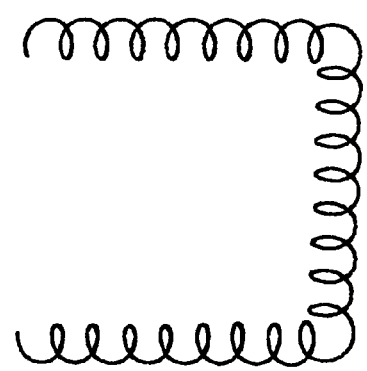
Figure 78:
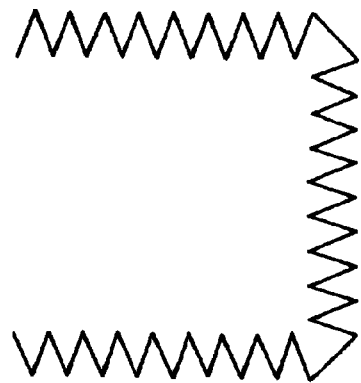

FIG. 75 is a schematic diagram showing the configuration of an example of an antenna according to the thirty-fifth embodiment of the present invention. In the antenna device according to the present embodiment, a zigzag pattern 7503 is inserted in an antenna element 7501 in place of the coil for the configuration of FIG. 67. Although the configuration having a coil can three-dimensionally extend, the configuration with this pattern 7503 can be formed on the same plane as the antenna element 7501 and fabricated through a printed-wiring technique. FIG. 76 shows an antenna device having two antenna elements 7601*a* and 7601*b* arranged for band synthesis and zigzag patterns 7603*a* and 7603*b* are inserted in antenna elements 7601*a* and 7601*b*, respectively. It should be noted that the zigzag patterns may be saw-toothed ones as shown in FIG. 78(*c*).

(Embodiment 36)

Figure 77:
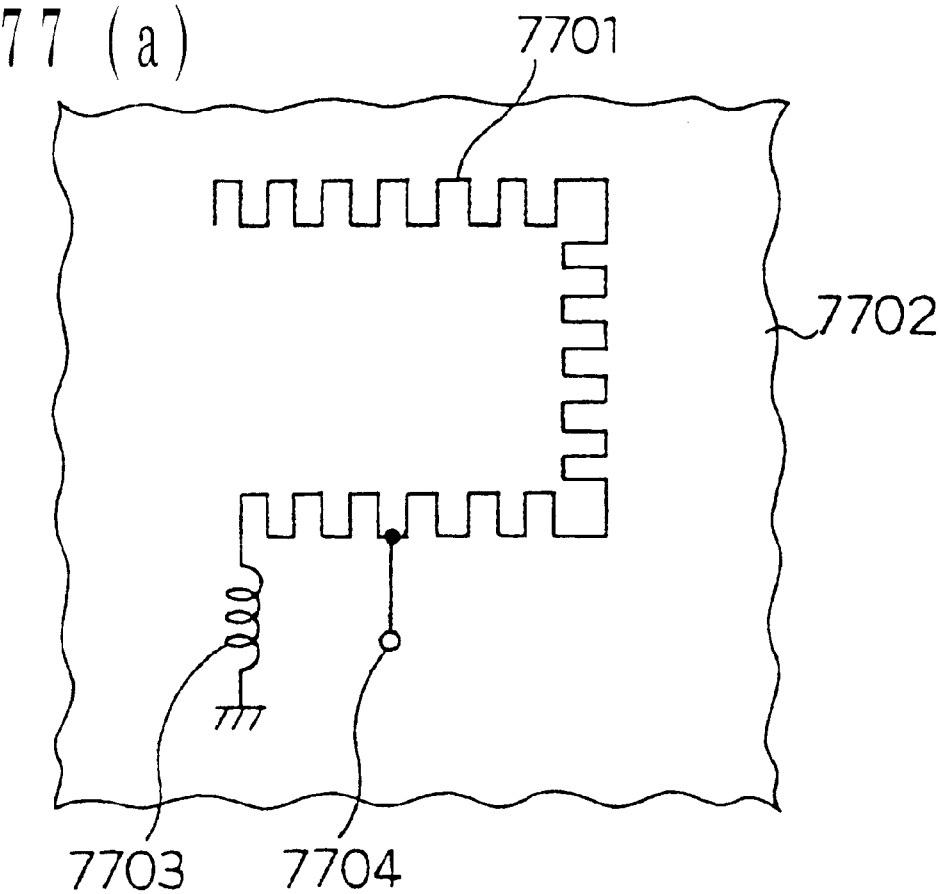
FIG. 77 is a schematic diagram showing the configuration of an example of an antenna according to a thirty-sixth embodiment of the present invention.
Figure 77:
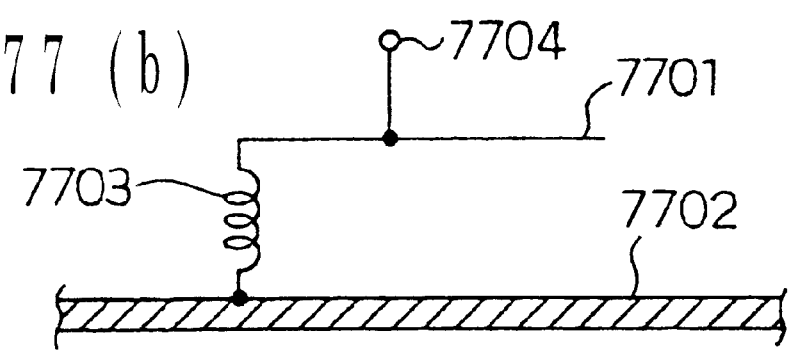

FIG. 77 is a schematic diagram showing the configuration of an example of an antenna according to the thirty-sixth embodiment of the present invention. In the antenna device according to the present embodiment, the whole antenna element 7701 located in the proximity of a conductive substrate 7702 is formed in a zigzag pattern and an end of the antenna element 7701 is connected to an end of a coil 7703 which is grounded at the other end. In addition, a feeding section 7704 is provided in place on the zigzag antenna element. This configuration can allow the antenna device to be further reduced in size, for example, to ⅙ or ⅛, although possible losses may be increased. It should be noted that the antenna element may be formed in other patterns, for example, those shown in FIGS. 78(b) and (c). The pattern shown in FIG. 78(b) is a three-dimensional coil.

(Embodiment 37)

Figure 79:
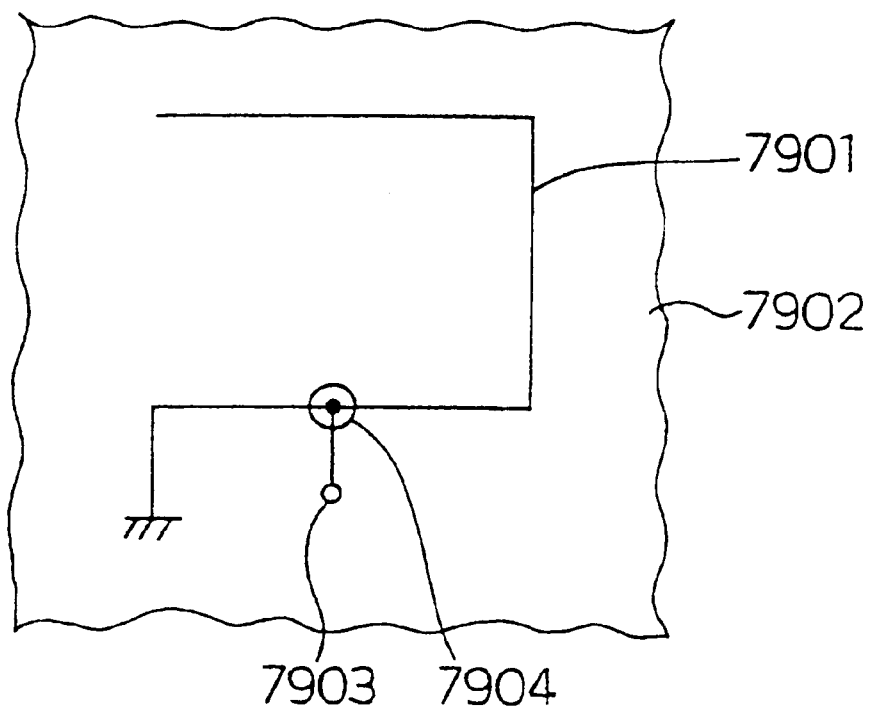
FIG. 79 is a schematic diagram showing the configuration of an example of an antenna according to a thirty-seventh embodiment of the present invention.
Figure 79:
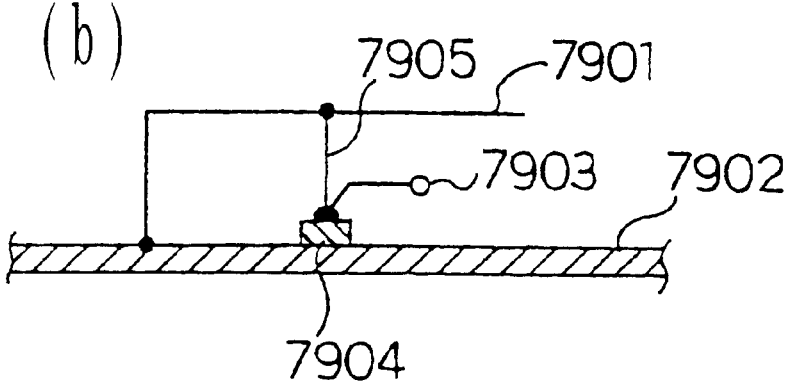

FIG. 79 is a schematic diagram showing the configuration of an example of an antenna according to the thirty-seventh embodiment of the present invention. In the antenna device according to the present embodiment, an insulator 7904 is provided on a conductive substrate 7902 and a lead 7905 from an antenna element 7901 and a feeding section 7903 are connected together on the insulator 7904. This configuration can allow easy connection with other circuit components because the feeding section 7903 is provided on a circuit board.

Figure 80:
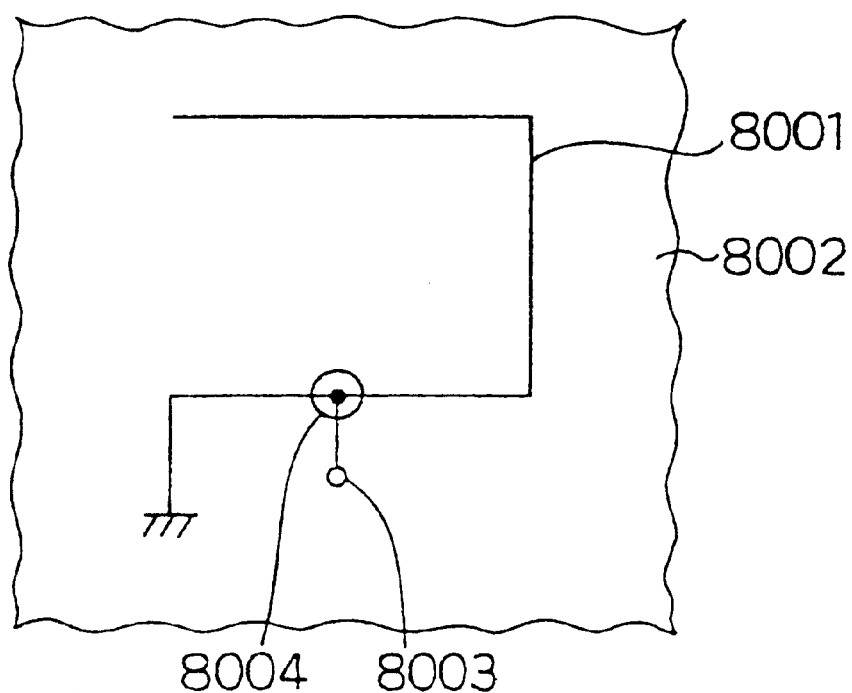
FIG. 80 is a schematic diagram showing the configuration of another example of the antenna according to the thirty-seventh embodiment.
Figure 80:
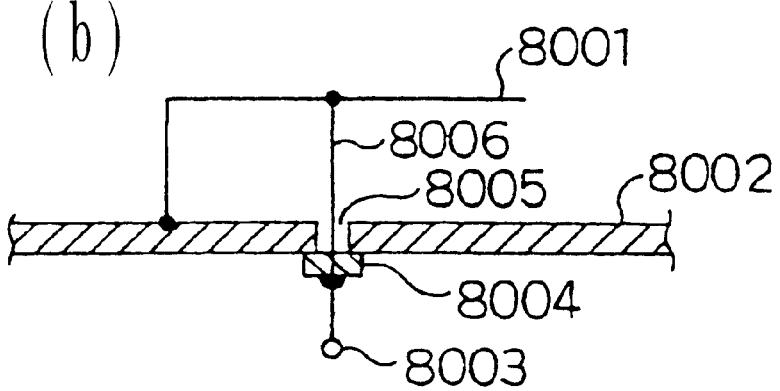

FIG. 80 shows that a through-hole 8005 is formed in a conductive substrate 8002 to provide an insulator 8004 on the opposite side of the conductive substrate 8002 to an antenna element 8001. A lead 8006 from the antenna element 8001 passes through the through-hole 8005 and the insulator 8004 and connects to a feeding section 8003 on the insulator 8004. This configuration can make it much easier than that of FIG. 79 described above to connect other circuit components to the feeding section 8003 because such circuit components can be connected on the back of the conductive substrate 8002.

Figure 81:
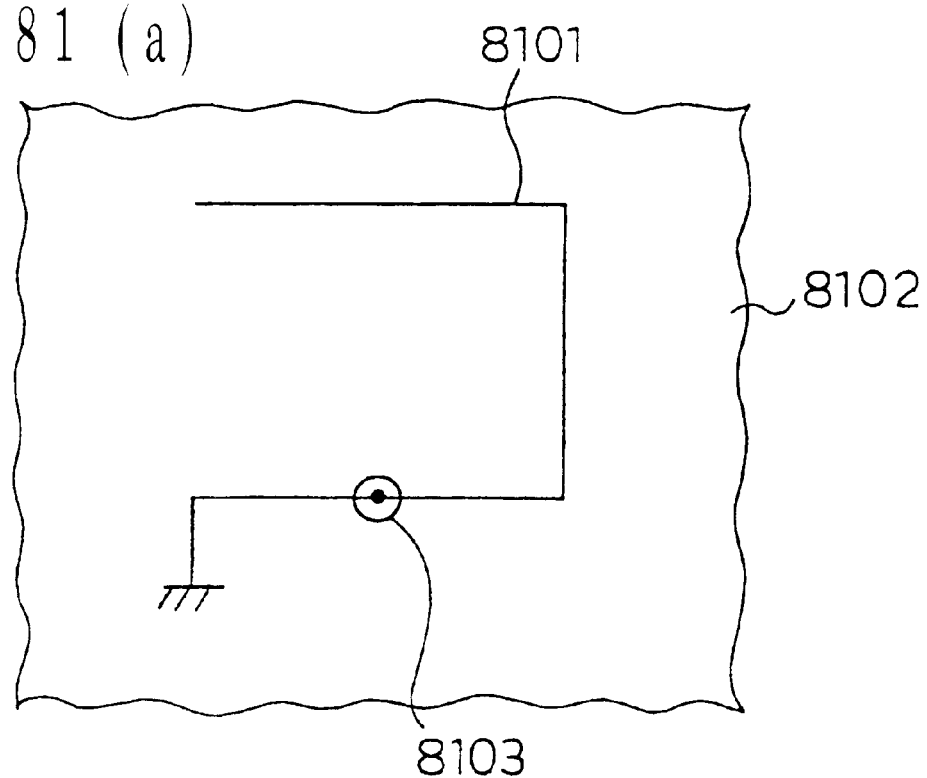
FIG. 81 is a schematic diagram showing the configuration of still another example of the antenna according to the thirty-seventh embodiment.
Figure 81:
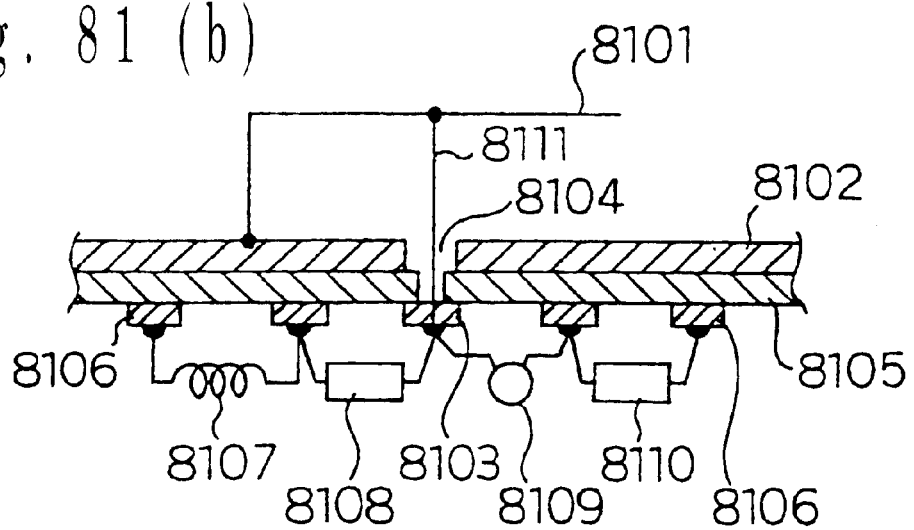

FIG. 81 shows that in addition to the configuration of FIG. 80 described above, another conductive plate is provided on the back of a conductive substrate (on the opposite side to an antenna element) to mount various circuit components thereon. Namely, a through-hole 8104 is formed in both a conductive substrate 8102 and a conductive plate 8105 to run a lead 8111 from an antenna element 8101 therethrough and an insulator 8103 is provided on the conductive plate 8105 over the through-hole 8104. In addition, a required number of insulators 8106 are provided on the conductive plate 8105 to connect various circuit components. The lead 8111 passes through the through-hole 8104 to the insulator 8103 and circuit components 8107 to 8110 are connected on the insulators 8103 and 8106.

This configuration can allow location of the circuit in the proximity of the antenna and easy shielding between the antenna and the circuit through the conductive plate, and thus, it can facilitate implementing a compact device.

Figure 82:
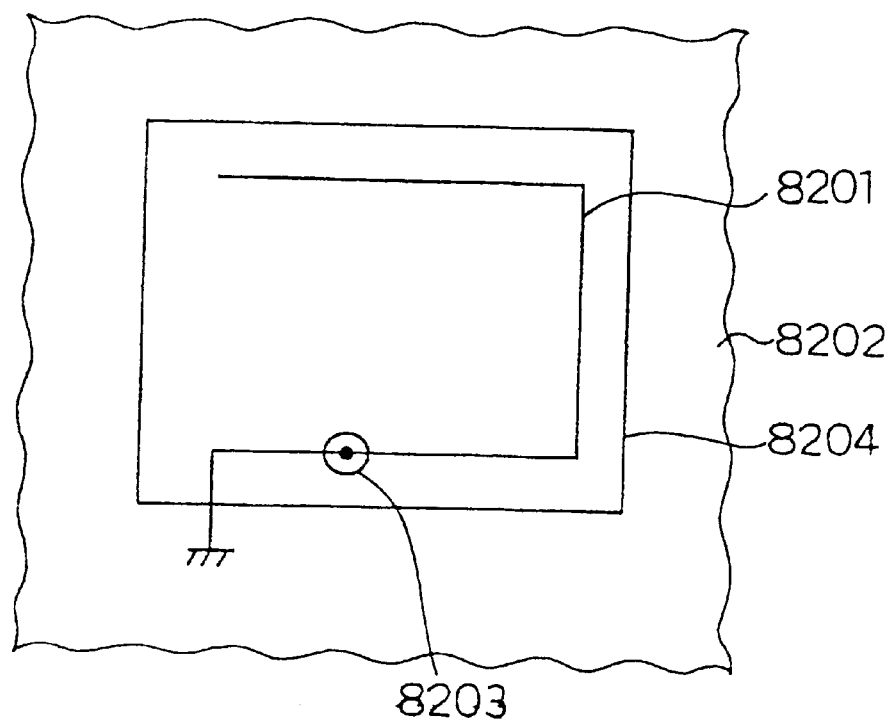
FIG. 82 is a schematic diagram showing the configuration of still another example of the antenna according to the thirty-seventh embodiment.
Figure 82:
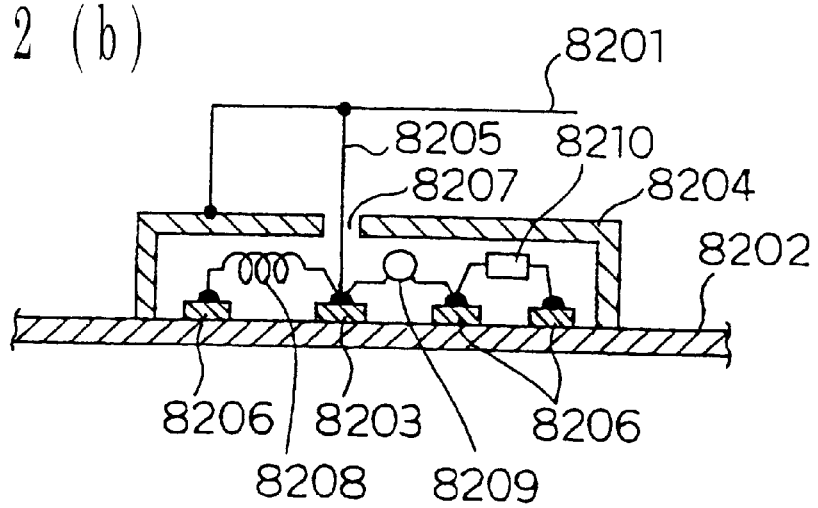

FIG. 82 shows still another example of the antenna in which circuit components are located on the same side as an antenna element. Namely, an insulator 8203 to connect a lead 8205 from an antenna element 8201 and a required number of insulators 8206 to connect various circuit components are provided on a conductive substrate 8202. In addition, a conductive shielding case 8204 is provided on the conductive substrate 8202 to shield the circuit components on the conductive substrate 8202 from the antenna element 8201 and a through-hole 8207 is formed for running the lead 8205 therethrough. The lead 8205 passes through the through-hole 8207 to connect to the insulator 8203 and circuit components 8208 to 8210 are connected on the insulators 8203 and 8206. An end of the antenna element 8201 is connected to the shielding case 8204 for grounding.

This configuration can allow the whole circuit to be held between the antenna element and the conductive substrate and to be shielded by the shielding case, and thus, it can facilitate implementing a more compact device than the configuration of FIG. 81 described above.

(Embodiment 38)

Figure 83:
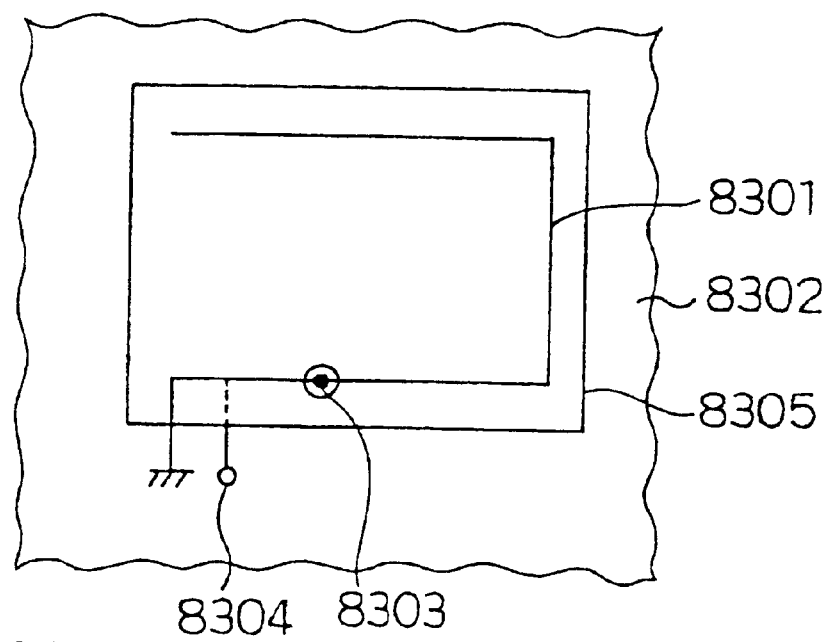
FIG. 83 is a schematic diagram showing the configuration of an example of an antenna according to a thirty-eighth embodiment of the present invention.
Figure 83:
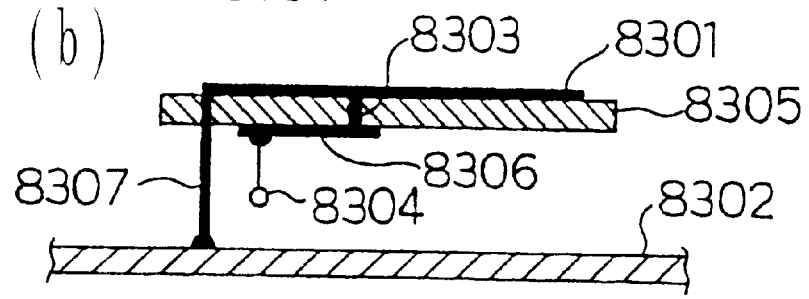

FIG. 83 is a schematic diagram showing the configuration of an example of an antenna according to the thirty-eighth embodiment of the present invention. In the antenna device according to the present embodiment, an antenna element 8301 is formed on one side of an insulation plate 8305 and one end 8307 of the antenna element 8301 passes through the insulation plate 8305. A lead 8303 from a point in the antenna element 8301 also passes through the insulation plate 8305 and another lead 8306 formed on the opposite side of the insulation plate 8305 and parallel to the antenna element 8305 is connected to the lead 8303 for connecting a feeding section 8304 to the lead 8306. It should be noted that the feeding section 8304 is provided in the proximity of the end 8307 of the antenna element 8301. In addition, the insulation plate 8305 is located parallel to a conductive substrate 8302, to which the end 8307 of the antenna element 8301 is connected.

This configuration can facilitate connecting coaxial cables because the grounded end of the antenna element is close to the feeding section.

(Embodiment 39)

Figure 84:
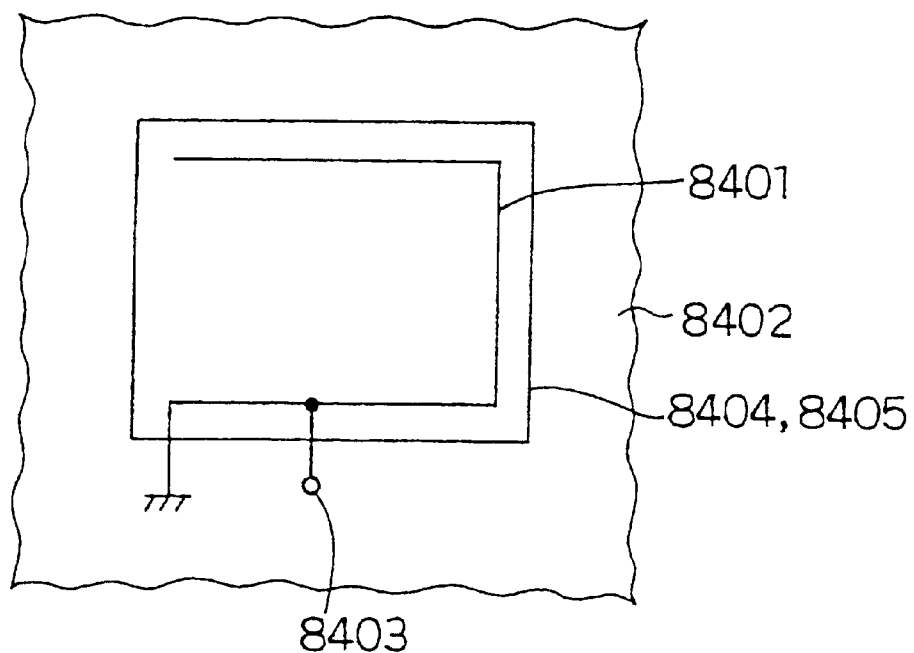
FIG. 84 is a schematic diagram showing the configuration of an example of an antenna according to a thirty-ninth embodiment of the present invention.
Figure 84:
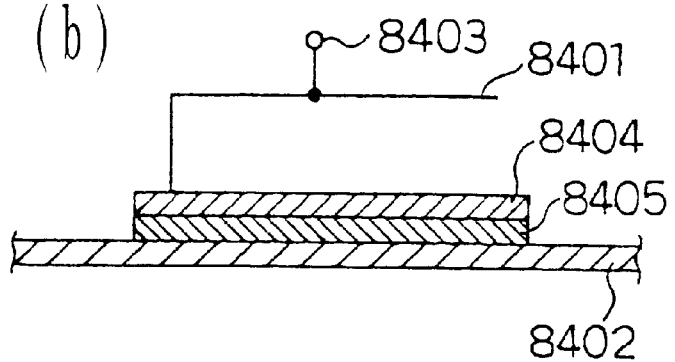

FIG. 84 is a schematic diagram showing the configuration of an example of an antenna according to the thirty-ninth embodiment of the present invention. In the antenna device according to the present embodiment, a conductive substrate 8404 is provided on another broader conductive substrate 8402 through an insulation plate 8405 and an antenna element 8401 is located in the proximity of the conductive substrate 8404. It should be noted that an end of the antenna element 8401 is connected to the conductive substrate 8404 for grounding. It should be preferable that the conductive substrate 8404 is equal to the antenna element 8401 in size. Specifically, the conductive substrate 8402 may be the body of an automobile or carriage, the metal case for a receiver or communication device, or any metal structure of a house and it may be installed inside or outside the room or compartment.

This configuration can achieve a nearly horizontal elevation angle with the maximum gain and thus, it will be suitable for receiving communication waves (vertically polarized waves) which come from a lateral direction.

It should be noted that any of the antenna devices according to the thirty-first through thirty-ninth embodiments can be installed at such locations as shown in FIGS. 36, 47, 48, 52, 53, and 54 to operate properly.

It should be also noted that one or two antenna elements are used in any of the antenna devices according to the thirty-first through thirty-ninth embodiments but of course, three or more antenna elements may be used.

It should be further noted that antenna elements used in any of the antenna devices according to the thirty-first through thirty-ninth embodiments are in a three-edge shape but they may be in a loop or any other shape.

It should be further noted that insulators used to provide connection points according to the thirty-seventh through thirty-ninth embodiments may apply to any other antenna devices according to the preceding embodiments described above.

Next, the fortieth through forty-eighth embodiments of the present invention will be descried below with reference to the drawings.

The principle of the embodiments will be first described below. As explained in the section "BACKGROUND ART" above, when a conventional antenna is located in the proximity of a conductive substrate, the antenna performance such as a directional gain may be affected by an automobile body which constitutes a conductive substrate, like in a monopole antenna. According to the present invention, a high-selectivity nondirectional antenna with an improved directional gain can be implemented by combining a cylindrical antenna and a planar antenna or combining planar antennas to take advantage of the influences of a conductive substrate on the antenna.

(Embodiment 40)

Figure 97:
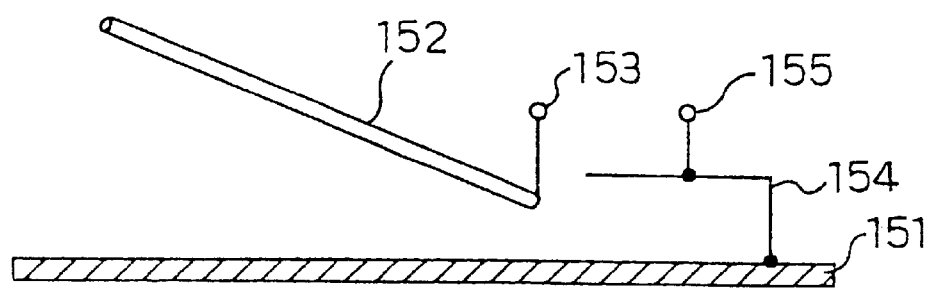
FIG. 97 is a schematic diagram showing an example of an antenna device according to a fortieth embodiment of the present invention.
Figure 97:
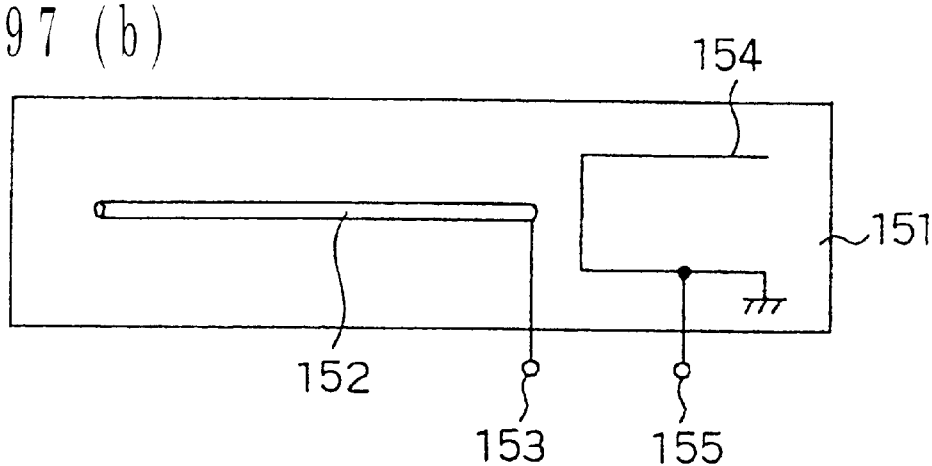

FIG. 97 is a schematic diagram showing the configuration of an antenna device according to the fortieth embodiment of the present invention and includes its side and plan views. Namely, in FIG. 97, a cylindrical monopole antenna 152 is located in the proximity of a conductive substrate 151 at a predetermined angle, and near an end of the monopole antenna 152 where a feeding section 153 is provided, an antenna element 154 with two bends is located with the antenna plane parallel to the conductive substrate 151. An end of the antenna element 154 farther from the monopole antenna 152 is connected to the conductive substrate 151 and a feeding section 155 of the antenna element 154 is provided independently of the feeding section 153 of the monopole antenna 152.

As shown in FIG. 97, the conductive substrate 151 is provided for the monopole antenna and it is also used as a substrate for the antenna element 154 which is a planar antenna. Although the monopole antenna 152 is applicable to both vertically and horizontally polarized waves, its gain is a little lower. On the other hand, the antenna element 154 which is a planar antenna has a sufficient capability of correctly receiving vertically polarized waves. Therefore, an antenna device intended for horizontally polarized waves which has also a sufficient capability of correctly receiving vertically polarized waves can be implemented by connecting an automatic diversity changeover switch between the feeding sections 153 and 155 for the antennas to select which antenna can achieve the maximum gain depending on the state of received waves.

Figure 98:
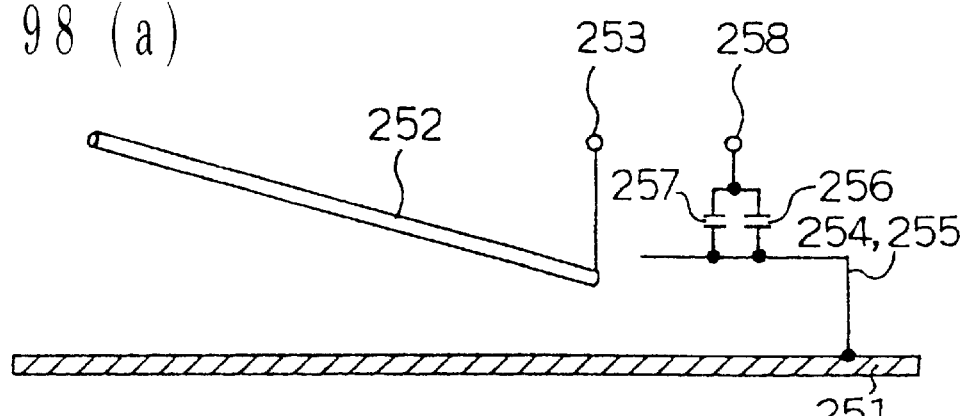
FIG. 98 is a schematic diagram showing another example of the antenna device according to the fortieth embodiment.
Figure 98:
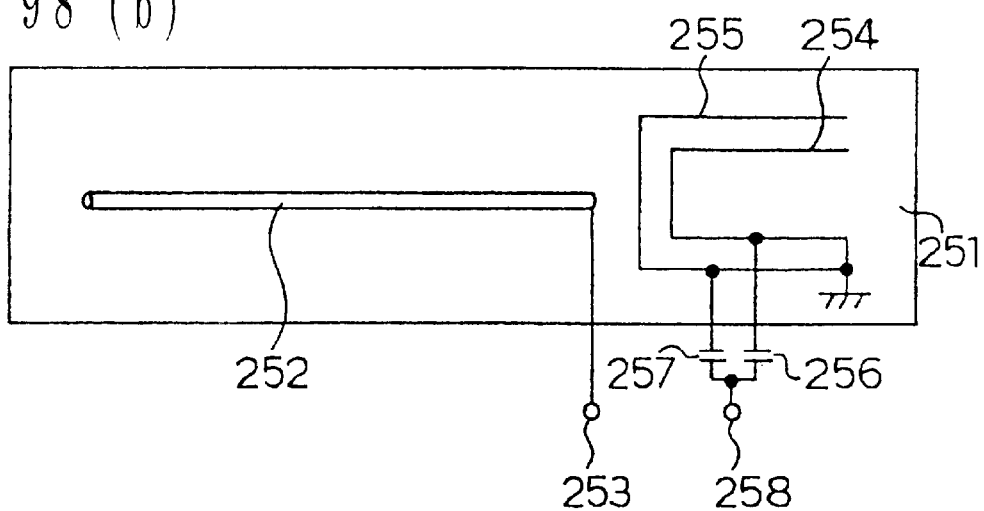

FIG. 98 shows that the planar antenna in the antenna device having the configuration described above consists of two antenna elements 254 and 255 of different wavelengths and these antenna elements 254 and 255 are connected to a single feeding section 258 through reactances 256 and 257. This configuration can allow the implementation of a broadband antenna and such an antenna can achieve a higher gain by using two antenna elements of the same wavelength.

(Embodiment 41)

Figure 99:
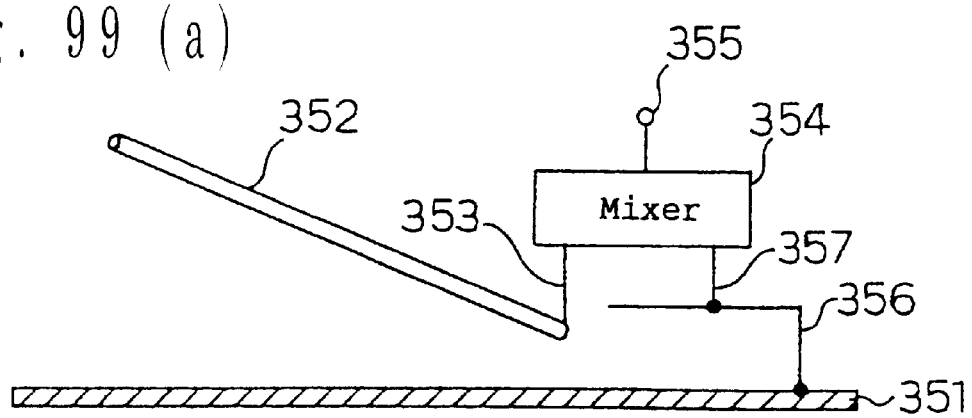
FIG. 99 is a schematic diagram showing an example of an antenna device according to a forty-first embodiment of the present invention.
Figure 99:
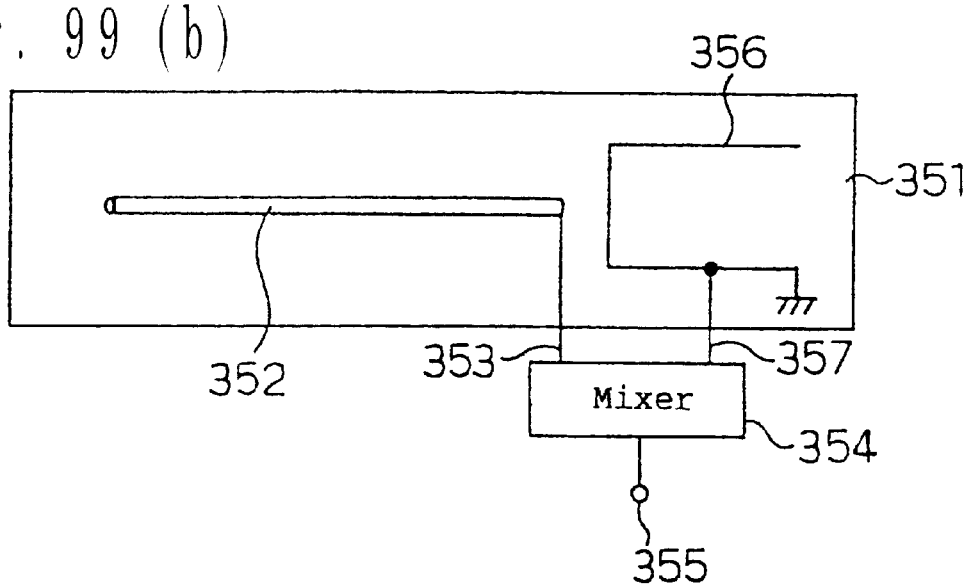

FIG. 99 is a schematic diagram showing the configuration of an antenna device according to the forty-first embodiment of the present invention and includes its side and plan views. Namely, in FIG. 99, a monopole antenna 352 is located in the proximity of a conductive substrate 351 at a predetermined angle, and near an end of the monopole antenna 352 where a feeding section 353 is provided, an antenna element 356 with two bends is located with the antenna plane parallel to the conductive substrate 351. An end of the antenna element 356 farther from the monopole antenna 352 is connected to the conductive substrate 351 and a feeding section 357 of the antenna element 356 and a feeding section 353 of the monopole antenna 352 are connected to a single feeding section 355 through a mixer 354.

According to the present embodiment, an antenna device intended for horizontally polarized waves which has also a sufficient capability of correctly receiving vertically polarized waves can be implemented by connecting the monopole antenna 352 which can achieve satisfactory gains for both vertically and horizontally polarized waves and the antenna element 356 which especially has a sufficient capability of correctly receiving vertically polarized waves.

Figure 100:
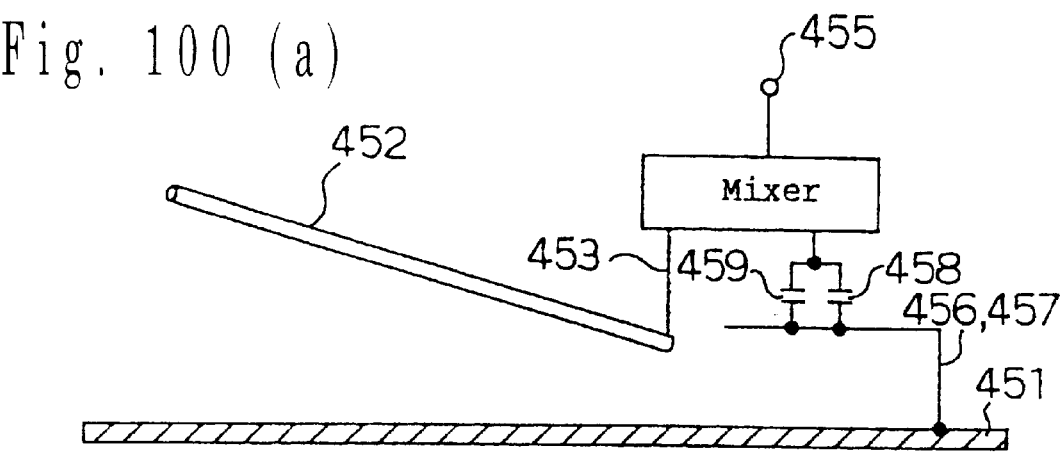
FIG. 100 is a schematic diagram showing another example of the antenna device according to the forty-first embodiment.
Figure 100:
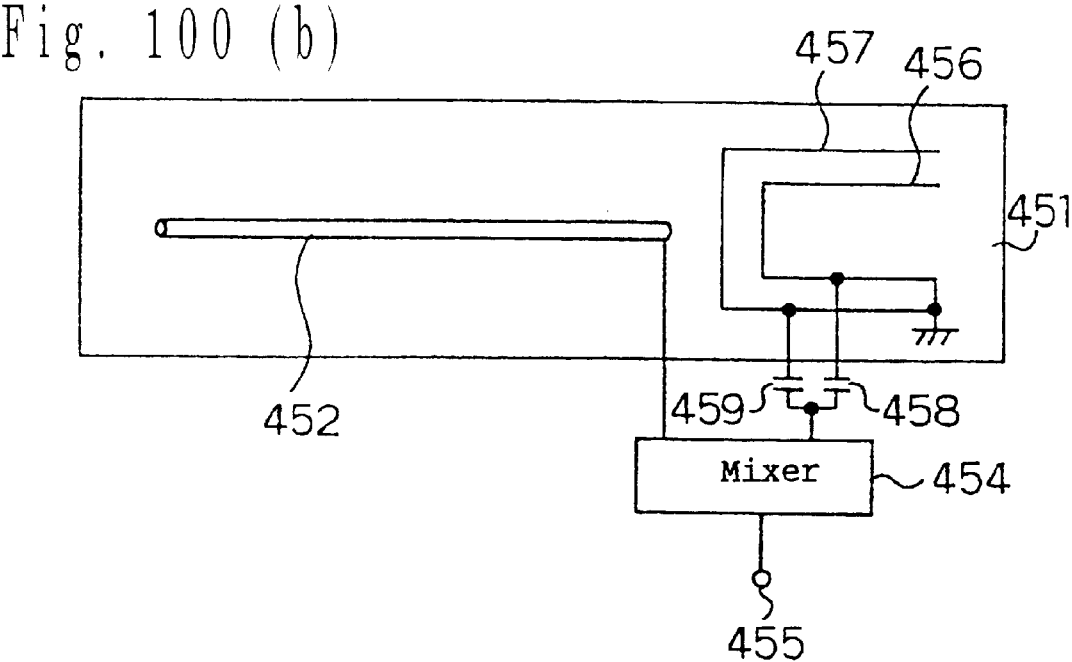

FIG. 100 shows that the planar antenna in the antenna device having the configuration described above consists of two antenna elements 456 and 457 of different wavelengths and these antenna elements 456 and 457 are connected to a single feeding section through reactances 458 and 459. This configuration can allow the implementation of a broadband antenna and such an antenna can achieve a higher gain by using two antenna elements of the same wavelength.

(Embodiment 42)

Figure 101:
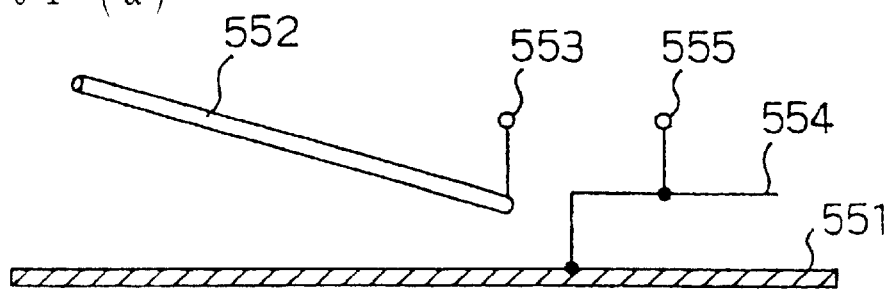
FIG. 101 is a schematic diagram showing an example of an antenna device according to a forty-second embodiment of the present invention.
Figure 101:
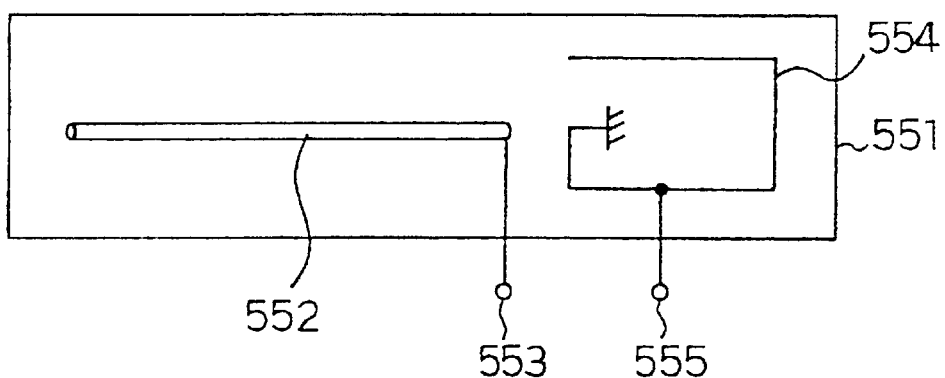

FIG. 101 is a schematic diagram showing the configuration of an antenna device according to the forty-second embodiment of the present invention and includes its side and plan views. Namely, in FIG. 101, a monopole antenna 552 is located in the proximity of a conductive substrate 551 at a predetermined angle, and near an end of the monopole antenna 552 where a feeding section 553 is provided, an antenna element 554 with two bends is located with the antenna plane parallel to the conductive substrate 551. An end of the antenna element 554 closer to the monopole antenna 552 is connected to the conductive substrate 551 and a feeding section 555 of the antenna element 554 is provided independently of the feeding section 553 of the monopole antenna 552.

According to the embodiment of FIG. 101, the grounded end of the antenna element 554 has a smaller amount of electric field and interference between antennas can be reduced by locating the grounded portion closer to the monopole antenna 552.

Figure 102:
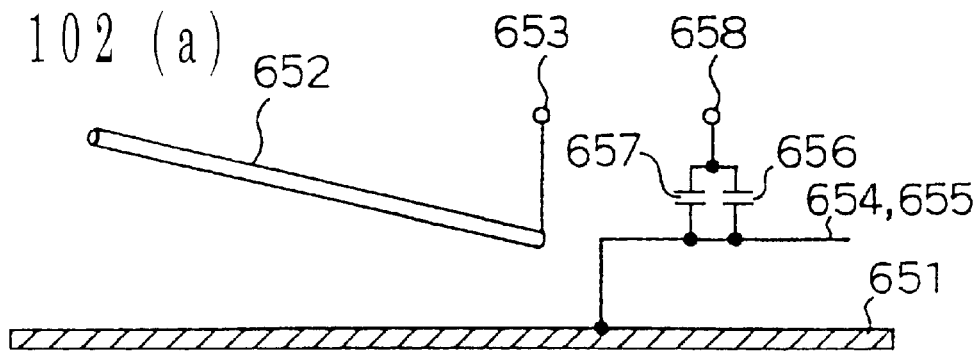
FIG. 102 is a schematic diagram showing another example of the antenna device according to the forty-second embodiment.
Figure 102:
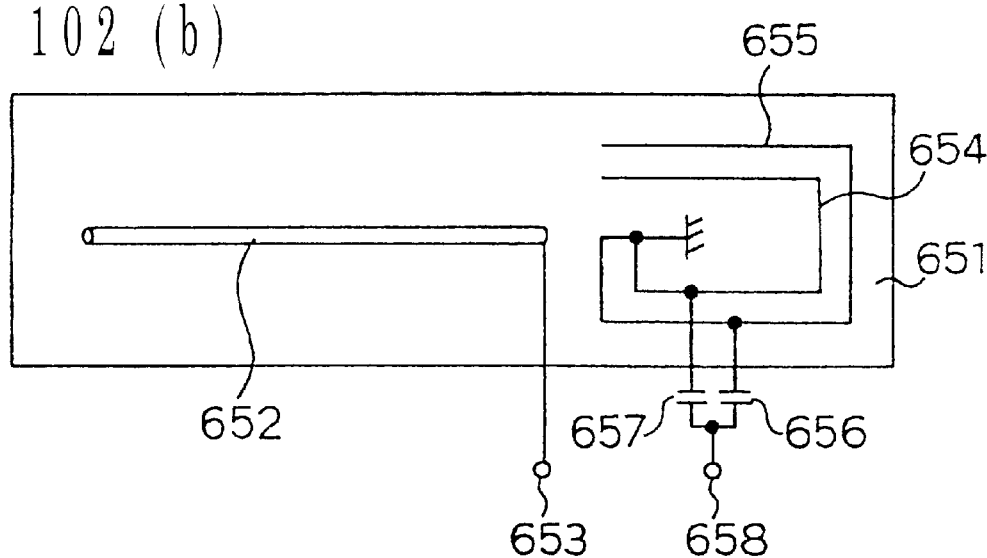

FIG. 102 shows that the planar antenna in the antenna device having the configuration described above consists of two antenna elements 654 and 655 of different wavelengths and these antenna elements 654 and 655 are connected to a single feeding section 658 through reactances 656 and 657. This configuration can allow the implementation of a broadband antenna and such an antenna can achieve a higher gain by using two antenna elements of the same wavelength.

(Embodiment 43)

Figure 103:
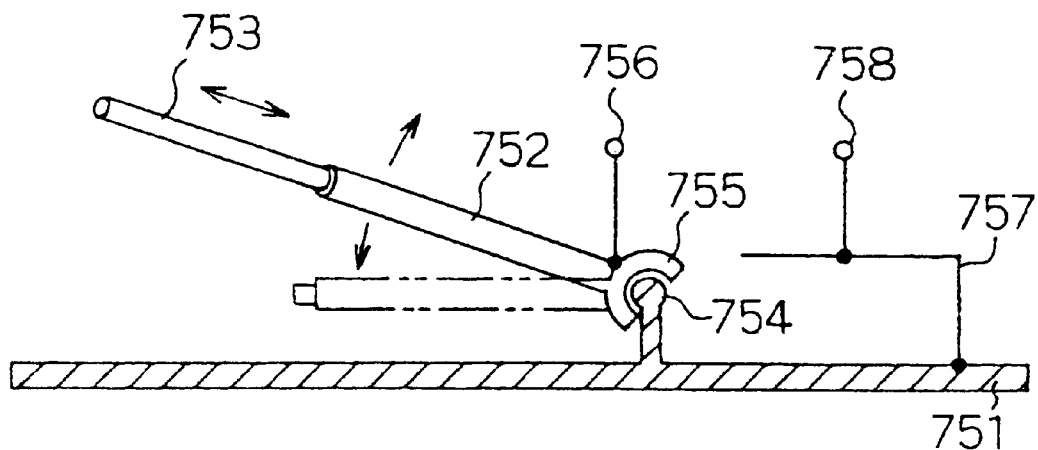
FIG. 103 is a schematic diagram showing an example of an antenna device according to a forty-third embodiment of the present invention.
Figure 103:
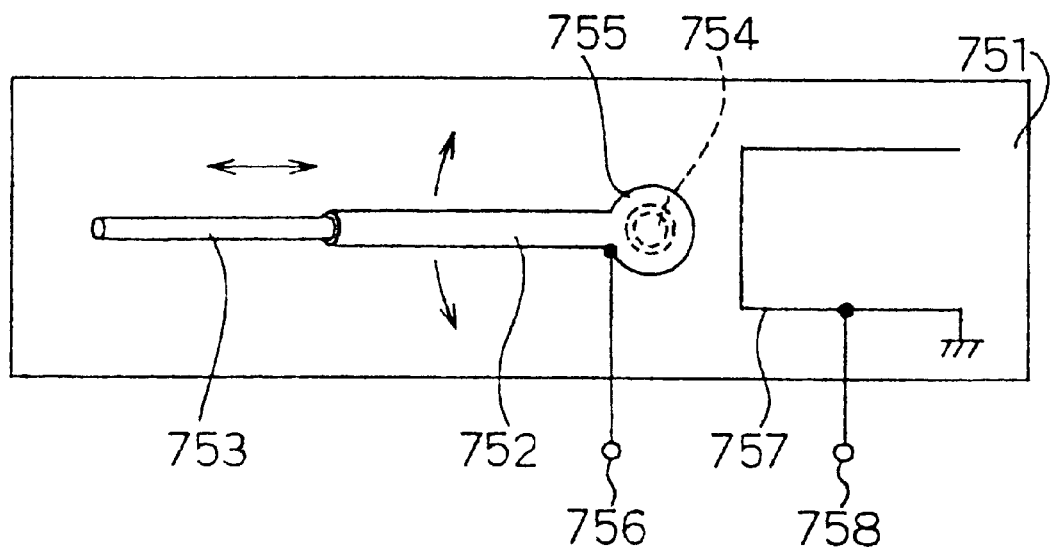

FIG. 103 is a schematic diagram showing the configuration of an antenna device according to the forty-third embodiment of the present invention and includes its side and plan views. Namely, in FIG. 103, a monopole antenna is coupled to a support section 754 provided on a conductive substrate 751 so that it can move up and down or turn right and left and an antenna element 757 which is a planar antenna is located in the proximity of the support section 754. The monopole antenna can be expanded or contracted by sliding a stick member 753 in a cylindrical member 752 and a feeding section 756 is provided at the root of the monopole antenna. In addition, a feeding section 758 is provided in place on the antenna element 757 and an end of the antenna element 757 is connected to the conductive substrate 751. With this configuration, the antenna, when not in use, can be made smaller by contracting it as shown by a dash-dot line in the figure.

Figure 104:
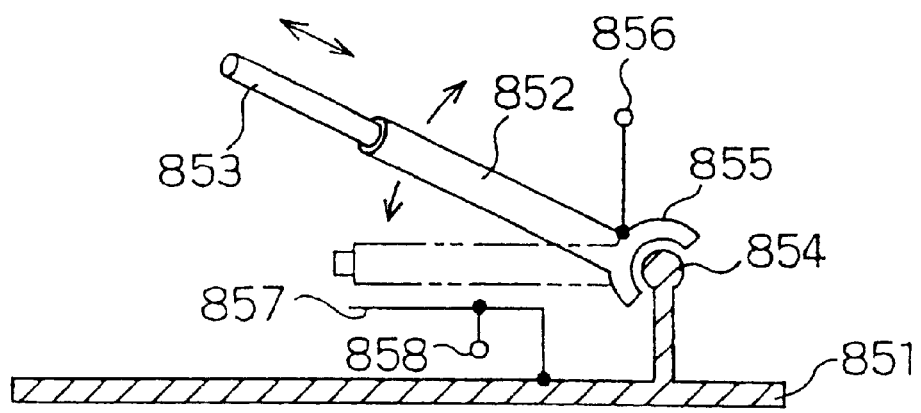
FIG. 104 is a schematic diagram showing another example of the antenna device according to the forty-third embodiment.
Figure 104:
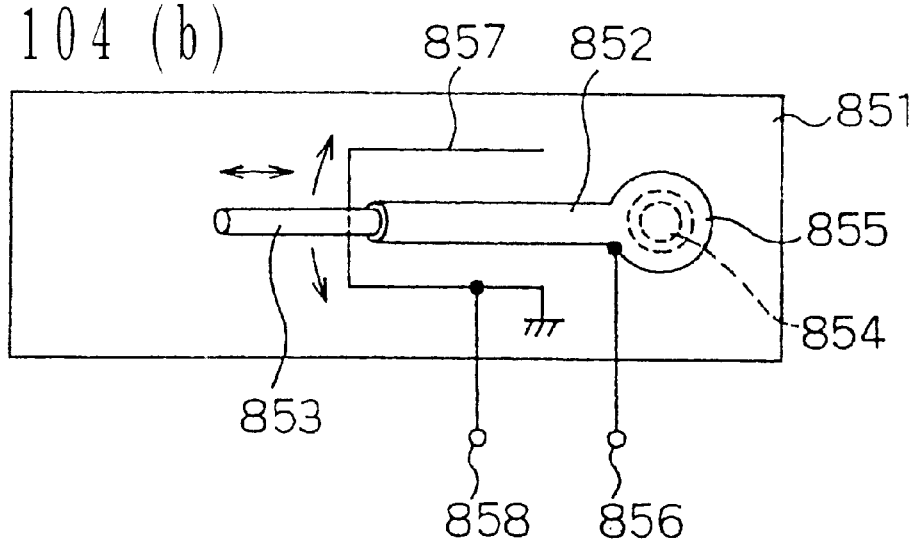

FIG. 104 shows that an antenna element 857 which is a planar antenna is located within a space between a contracted monopole antenna and a conductive substrate 851 and this configuration can make the antenna device still smaller than the configuration of FIG. 103. It should be noted, however, that this configuration may cause larger interference between the antennas than the case described above.

(Embodiment 44)

Figure 105:
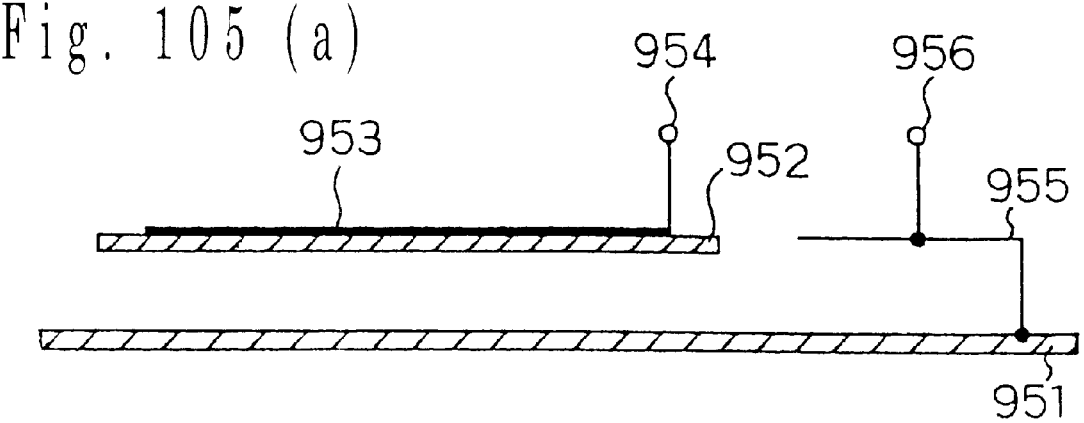
FIG. 105 is a schematic diagram showing an example of an antenna device according to a forty-fourth embodiment of the present invention.
Figure 105:
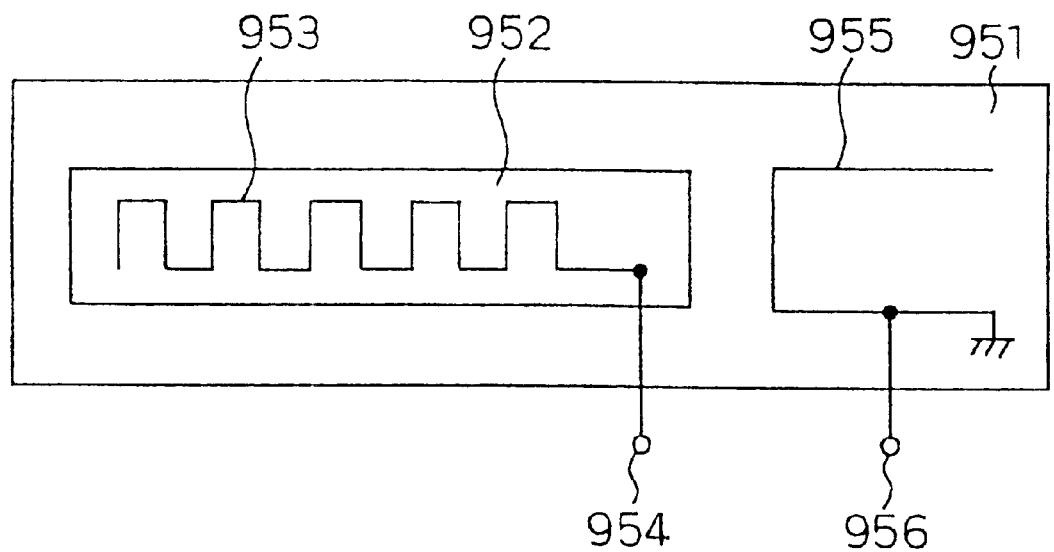

FIG. 105 is a schematic diagram showing the configuration of an antenna device according to the forty-fourth embodiment of the present invention and includes its side and plan views. Namely, in FIG. 105, an antenna comprised of a zigzag conductive pattern 953 formed on a printed circuit board 952 (hereinafter referred to as printed antenna) is located parallel to a conductive substrate 951 and an antenna element 955 which is a planar antenna is located in the proximity of the printed antenna. An end of the conductive pattern 953 in the printed antenna is connected to a feeding section 954 and an end of the antenna element 955 is connected to the conductive substrate 951. In addition, another feeding section 956 is connected to a point in the antenna element 955.

Figure 106:
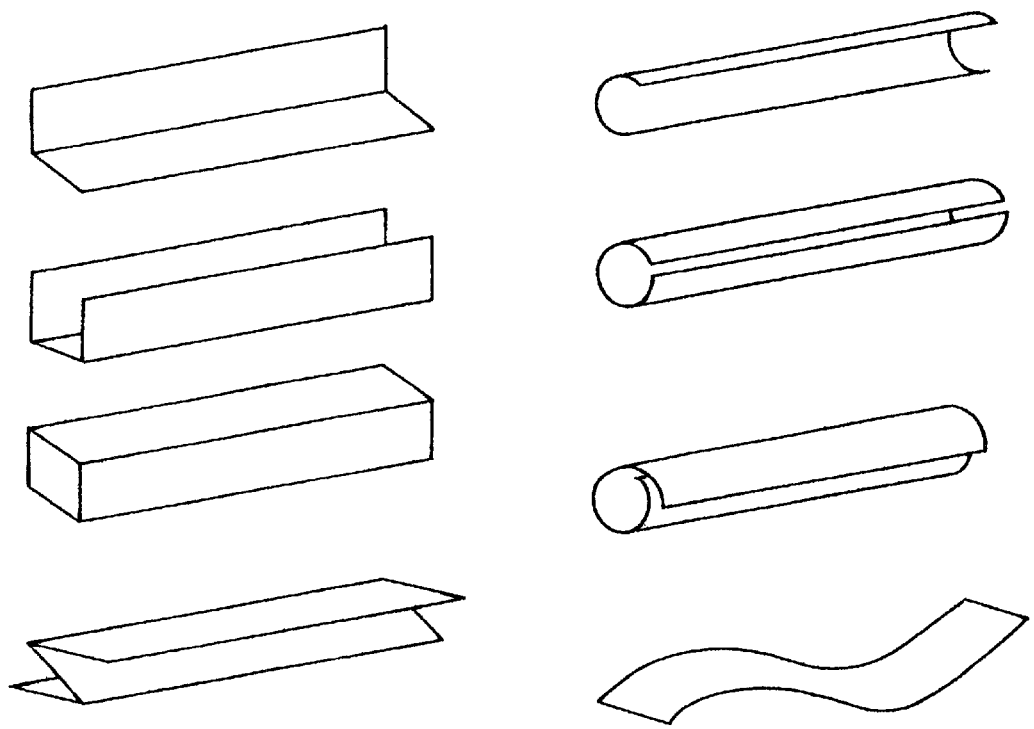
FIG. 106 is a schematic diagram showing other possible forms of the antenna according to the forty-fourth embodiment.
Figure 107:
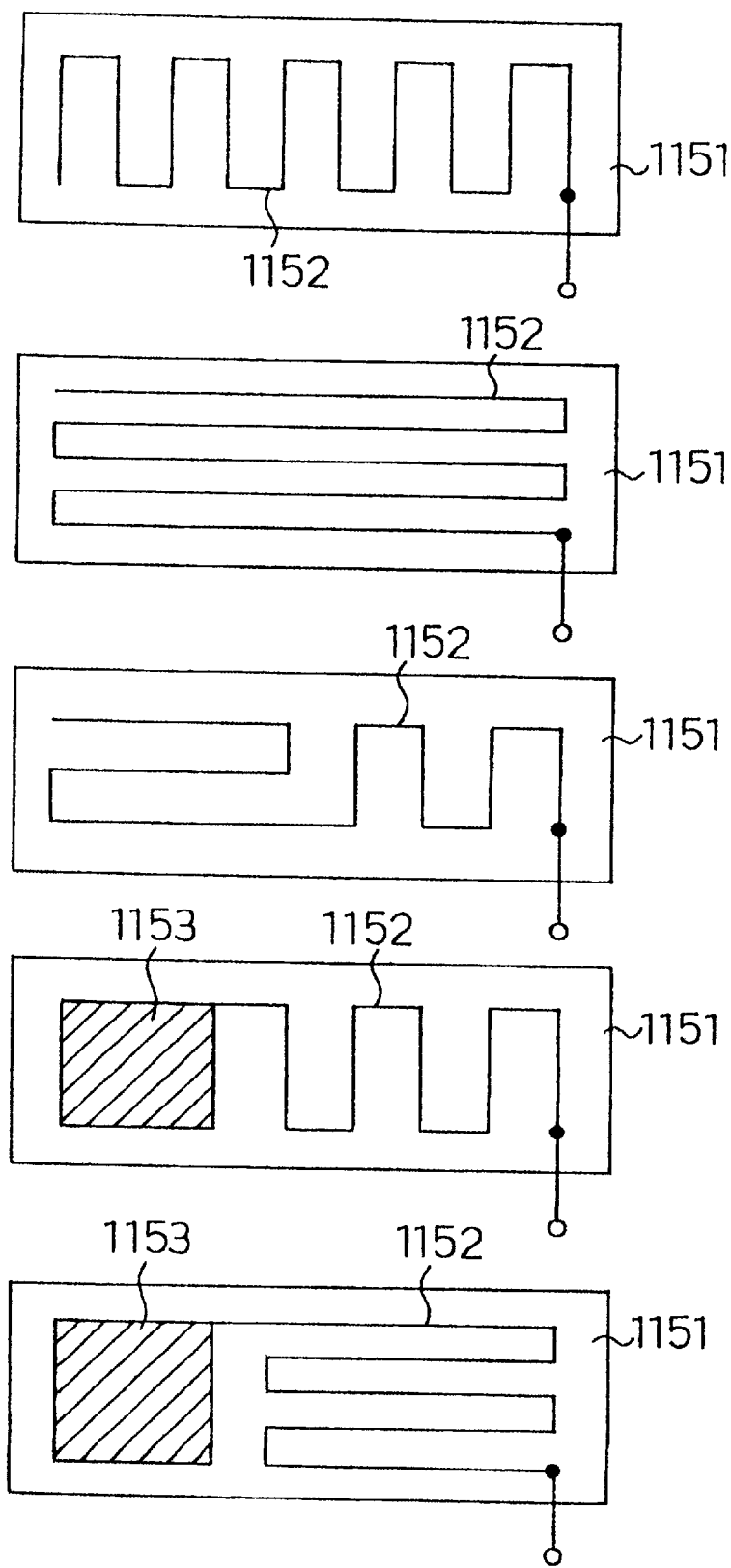
FIG. 107 is a schematic diagram showing other possible patterns of the antenna according to the forty-fourth embodiment.

It should be noted that as described above, the present embodiment uses a planar printed antenna but a three-dimensional antenna formed by bending or curving such a planar antenna, for example, an L-shaped antenna, a three-edge antenna, a quadrangular-prism antenna, a cylindrical antenna, or other antennas such as those shown in FIG. 106 may be used. It should be also noted that the conductive pattern 953 is not limited to that shown in FIG. 105 and for example, other patterns 1152 as shown in FIG. 107 may be formed on a printed circuit board 1151. It should be further noted that a section 1153 provided on one side of a conductive pattern 1152 as shown in the two lower figures is the top loading of the antenna.

(Embodiment 45)

Figure 108:
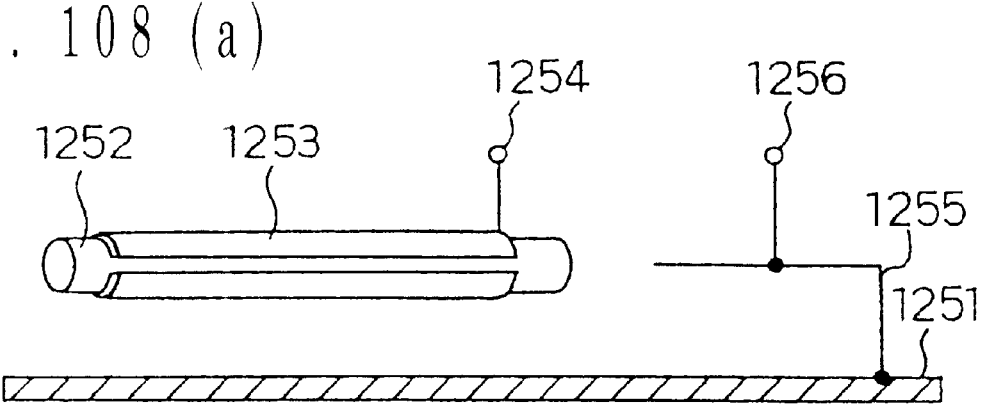
FIG. 108 is a schematic diagram showing an example of an antenna device according to a forty-fifth embodiment of the present invention.
Figure 108:
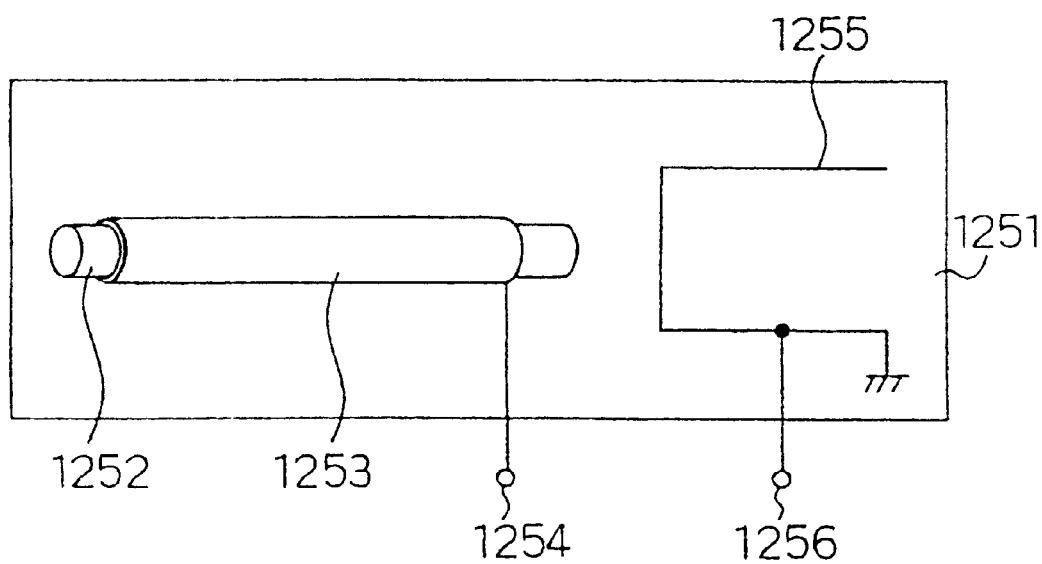

FIG. 108 is a schematic diagram showing the configuration of an antenna device according to the forty-fifth embodiment of the present invention and includes its side and planviews. As shown in FIG. 108, a cylindrical antenna is used in place of the planar printed antenna according to the forty-fourth embodiment described above and a support member 1252 is inserted therein. Namely, a printed antenna 1253 with a support member 1252 as its core is located in the proximity of a conductive substrate 1251 and near an end of the printed antenna 1253 where a feeding section 1254 is provided, an antenna element 1255 with two bends is located in the proximity of the conductive substrate 1251 with the antenna plane parallel to the substrate. In addition, an end of the antenna element 1255 farther from the printed antenna 1253 is connected to the conductive substrate 1251 and a feeding section 1256 of the antenna element 1255 is provided independently of the feeding section 1254 of the printed antenna 1253.

(Embodiment 46)

Figure 109:
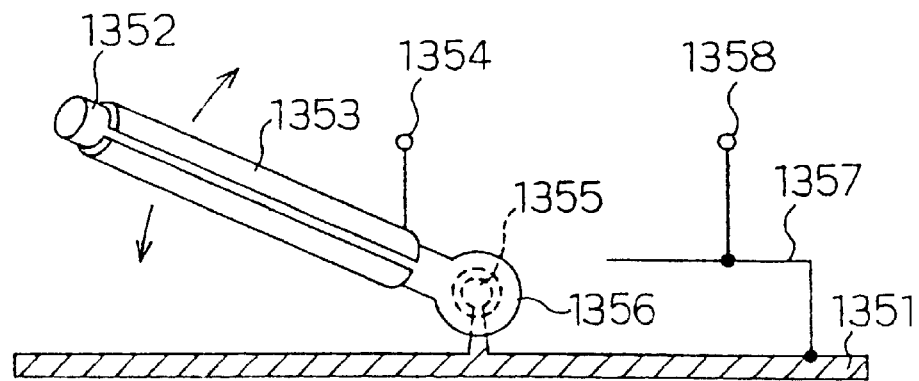
FIG. 109 is a schematic diagram showing an example of an antenna device according to a forty-sixth embodiment of the present invention.
Figure 109:
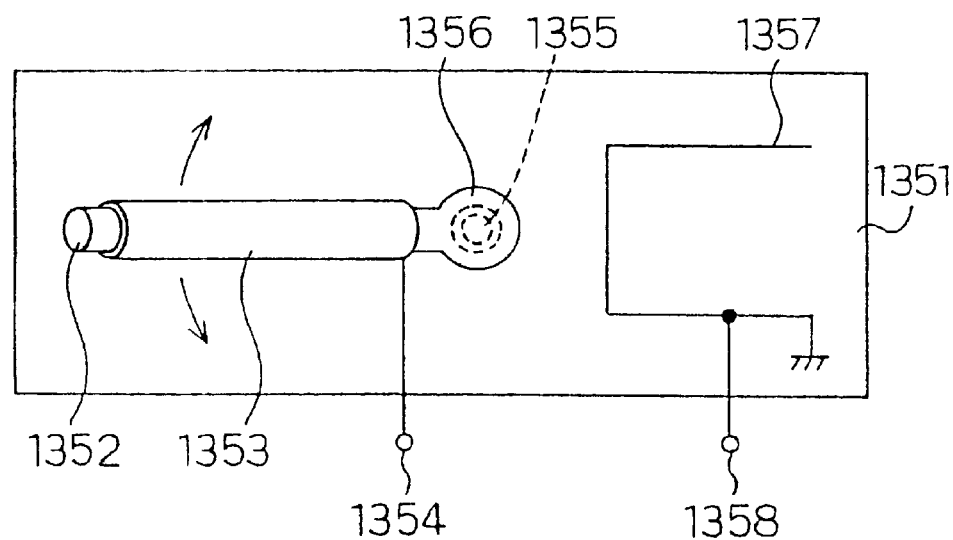

FIG. 109 is a schematic diagram showing the configuration of an antenna device according to the forty-sixth embodiment of the present invention and includes its side and plan views. Namely, in FIG. 109, a printed antenna 1353 with a support member 1352 as its core is coupled to a support section 1355 provided on a conductive substrate 1351 so that it can move up and down or turn right and left and an antenna element 1357 which is a planar antenna is located in the proximity of the support section 1355. In addition, a feeding section 1358 is provided in place on the antenna element 1357 and an end of the antenna element 1357 is connected to the conductive substrate 1351. With this configuration, the antenna, when not in use, can be made smaller by contracting it into a position parallel to the conductive substrate 1351.

Figure 110:
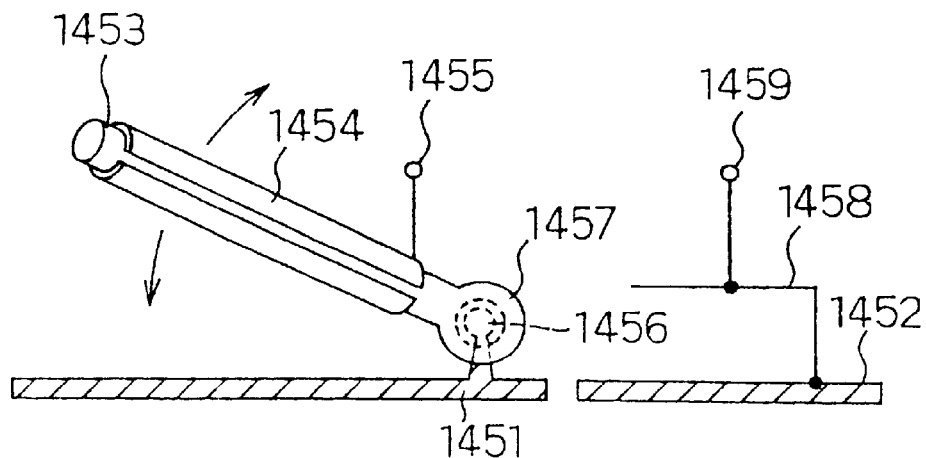
FIG. 110 is a schematic diagram showing another example of the antenna device according to the forty-sixth embodiment.
Figure 110:
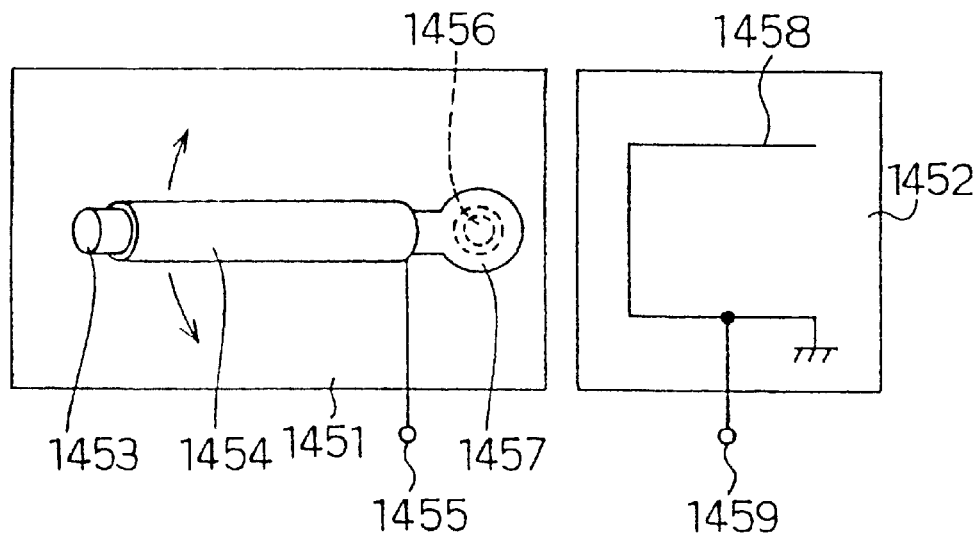

FIG. 110 shows that two separate conductive substrates, that is, a conductive substrate 1451 for a printed antenna 1455 and a conductive substrate 1452 for an antenna element 1458 are provided in place of the single conductive substrate in the configuration described above. This configuration can allow adjustment of the distance between both antennas for optimum arrangement.

Figure 111:
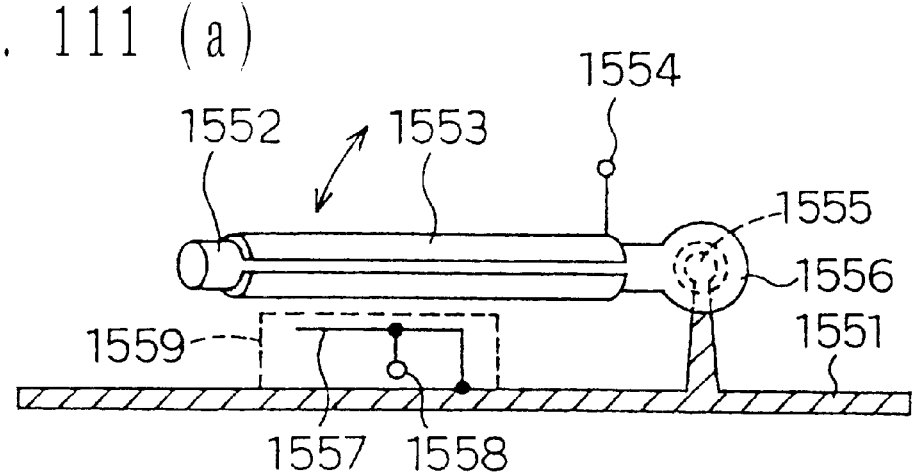
FIG. 111 is a schematic diagram showing still another example of the antenna device according to the forty-sixth embodiment.
Figure 111:
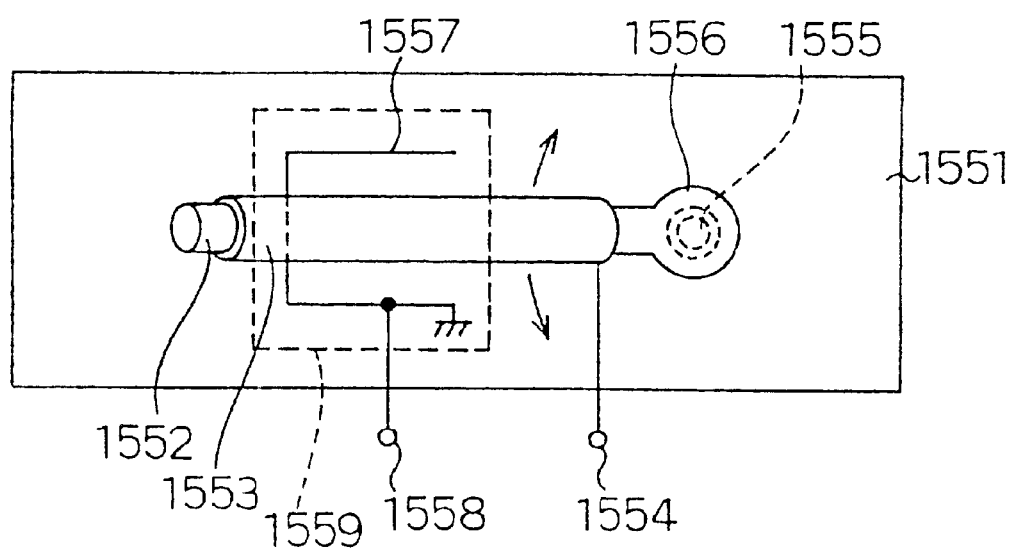

FIG. 111 shows that in a configuration similar to that of FIG. 109, an antenna element 1557 which is a planar antenna is located within a space between a contracted printed antenna 1553 and a conductive substrate 1551 and this configuration can make the antenna device still smaller than the configuration of FIG. 109. It should be noted that a shield 1559 is provided around the antenna element 1557 to prevent interference between the antennas from increasing.

(Embodiment 47)

Figure 112:
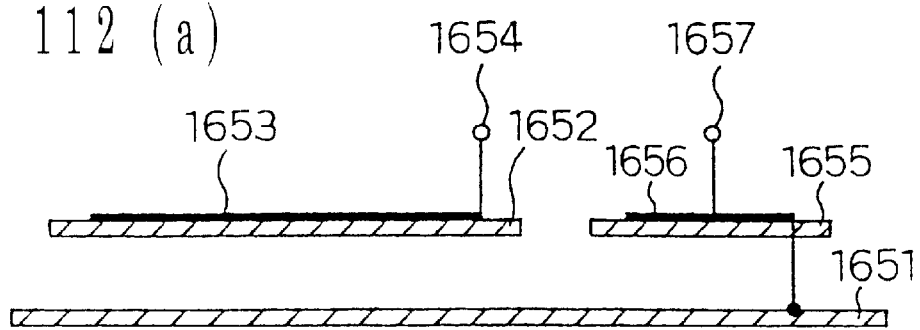
FIG. 112 is a schematic diagram showing an example of an antenna device according to a forty-seventh embodiment of the present invention.
Figure 112:
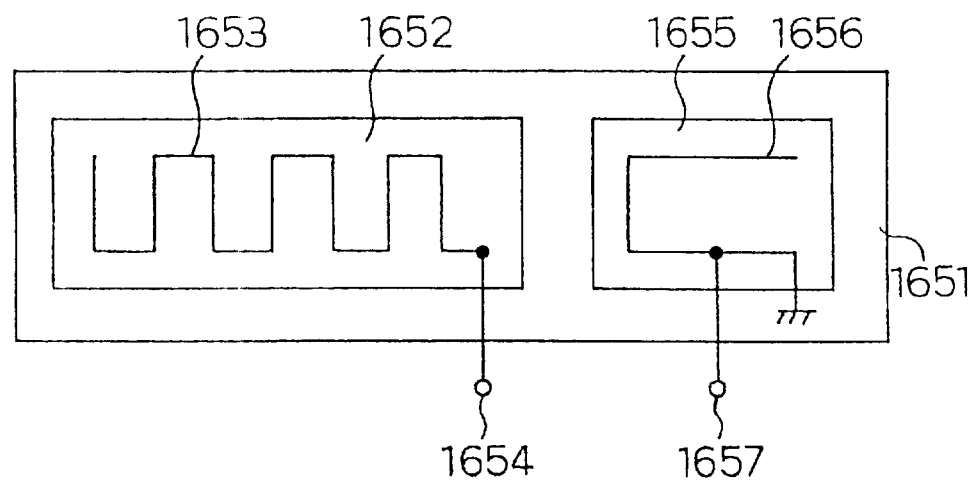

FIG. 112 is a schematic diagram showing the configuration of an antenna device according to the forty-seventh embodiment of the present invention and includes its side and plan views. In the antenna device according to the present embodiment, unlike the configuration of FIG. 105, an antenna element 1656 which is a planar antenna is also formed on a printed circuit board 1655. Namely, a printed antenna comprised of a zigzag conductive pattern 1653 formed on a printed circuit board 1652 is located parallel to a conductive substrate 1651 and the antenna element 1656 which is patterned on another printed circuit board 1655 is located in the proximity of the printed antenna. An end of the conductive pattern 1653 in the printed antenna is connected to a feeding section 1654 and an end of the antenna element 1656 is connected to the conductive substrate 1651 through the printed circuit board 1655. In addition, another feeding section 1657 is connected to a point in the antenna element 1656.

Figure 113:
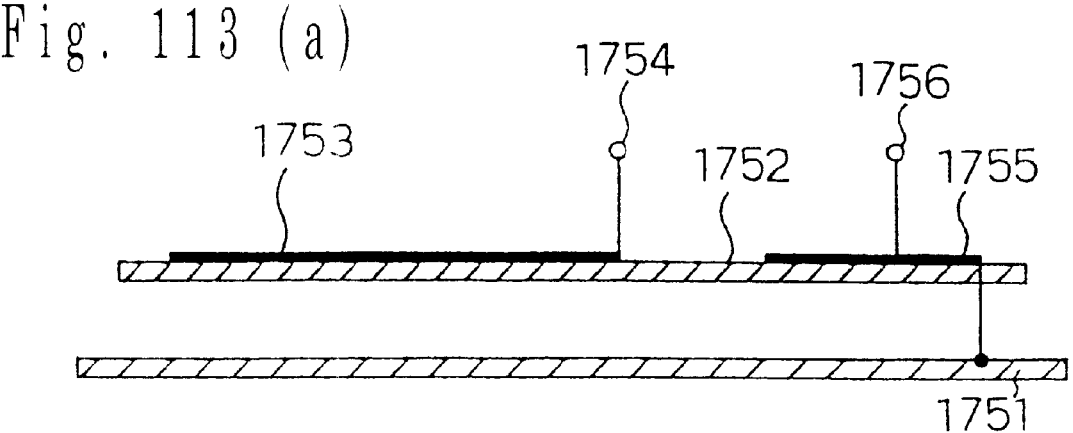
FIG. 113 is a schematic diagram showing another example of the antenna device according to the forty-seventh embodiment.
Figure 113:
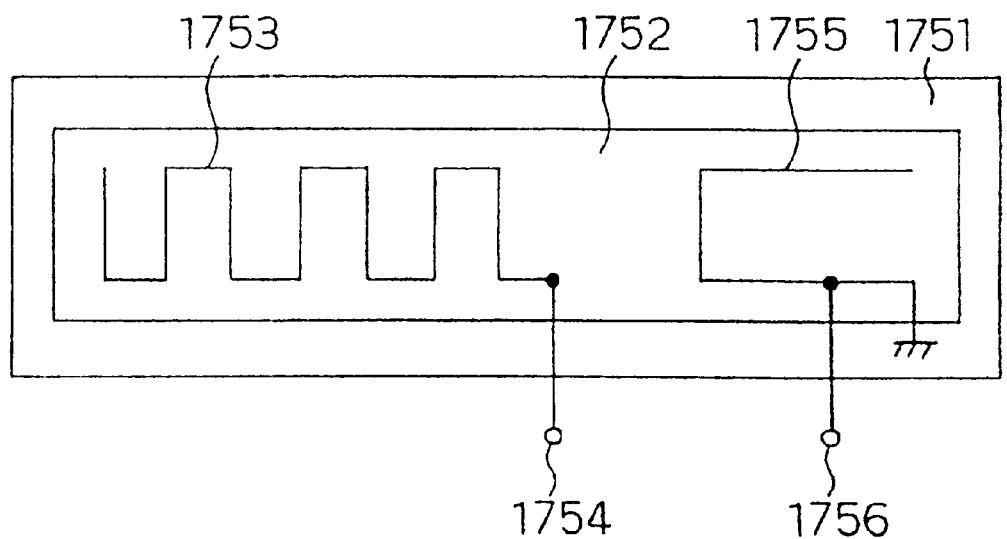

FIG. 113 shows that in the configuration described above, both a conductive pattern 1753 in a printed antenna and an antenna element 1755 which is a planar antenna are formed on a single printed circuit board 1755. It should be noted that although the distance between both antennas cannot be adjusted later, the fabrication of the antenna device can be facilitated by forming both antenna patterns on a single board.

Figure 114:
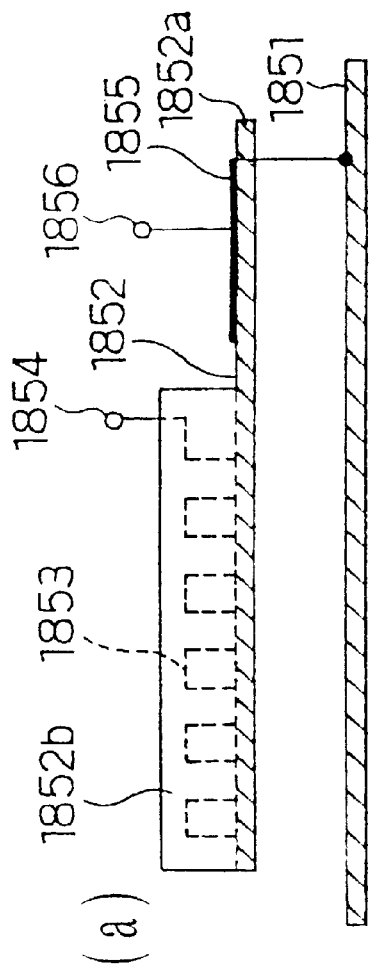
FIG. 114 is a schematic diagram showing still another example of the antenna device according to the forty-seventh embodiment.
Figure 114:
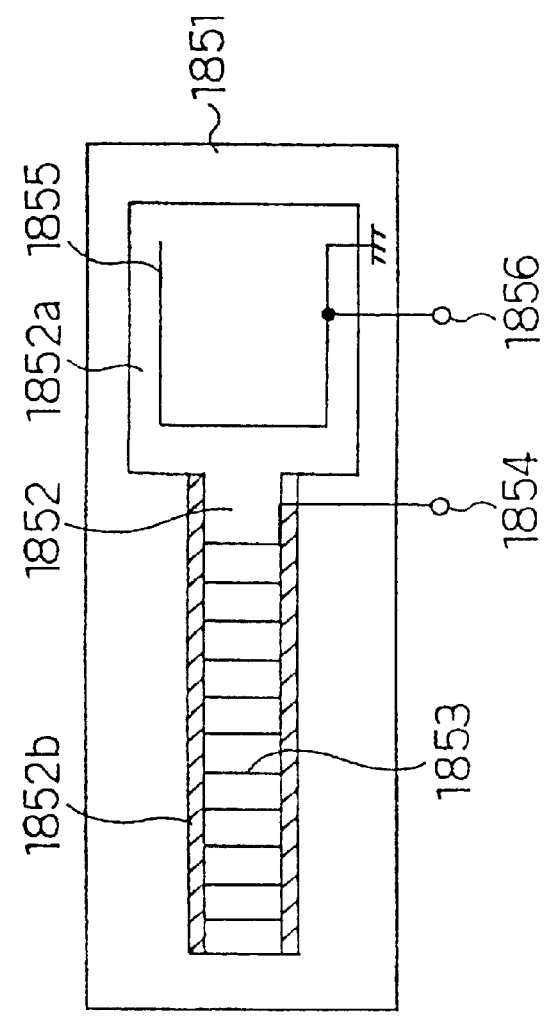
Figure 114:
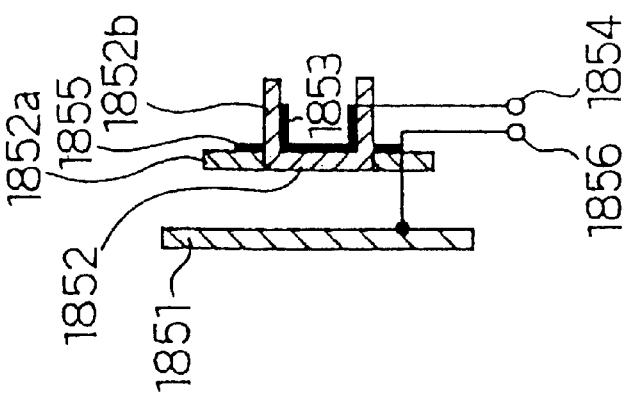

FIG. 114 shows that in the configuration of FIG. 113, a printed antenna is formed into three-edge shape and a printed circuit board 1852 integrally consists of a printed antenna board 1852b and a planar antenna board 1852a. It should be noted that the shape of the printed antenna board is not limited to that of FIG. 114 and it may be any of other shapes such as those shown in FIG. 115 like the forty-fourth embodiment.

Figure 116:
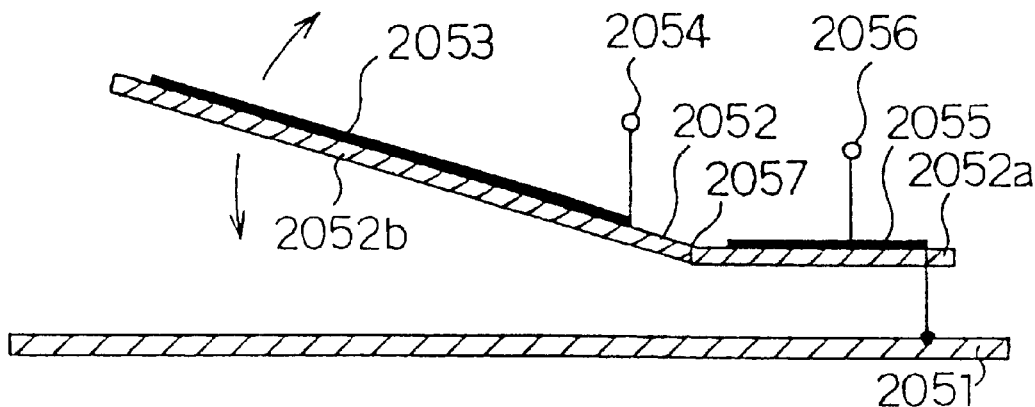
FIG. 116 is a schematic diagram showing still another example of the antenna device according to the forty-seventh embodiment.
Figure 116:
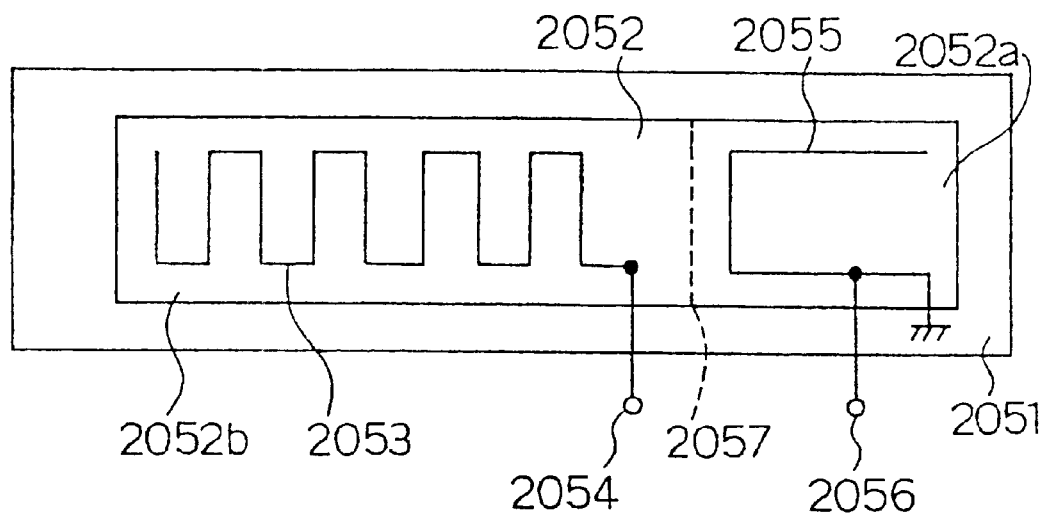

FIG. 116 shows that a printed circuit board 2052 in the configuration of FIG. 113 described above can be folded at a flexible section 2057 to move perpendicularly to the surface thereof and a printed antenna board 2052b can move up and down with respect to a planar antenna board 2052a.

(Embodiment 48)

Figure 117:
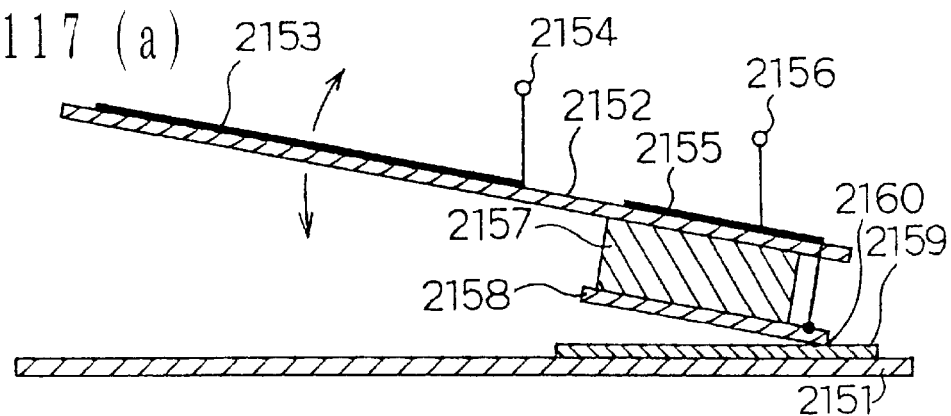
FIG. 117 is a schematic diagram showing an example of an antenna device according to the forty-eighth embodiment of the present invention.
Figure 117:
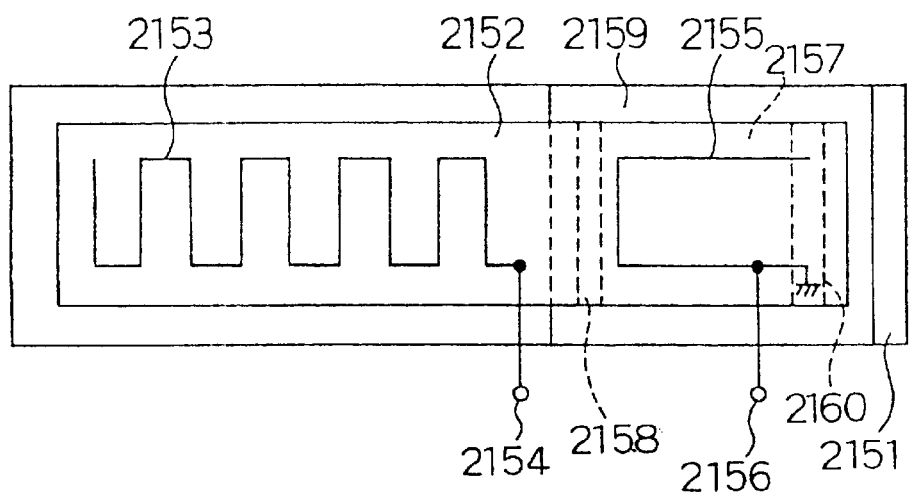

FIG. 117 is a schematic diagram showing the configuration of an antenna device according to the forty-eighth embodiment of the present invention and includes its side and plan views. In the antenna device according to the present embodiment, on a single printed circuit board 2152, a conductive pattern 2153 is formed as a printed antenna and an antenna element 2155 is formed as a planar antenna in the proximity of the conductive pattern 2153. A conductive plate 2158 which is a substrate for the antenna element 2155 is provided through an insulation support member 2157 and an end of the antenna element 2155 is connected to the conductive plate 2158. In addition, the whole antenna is supported at a support section 2160 through an insulation plate 2159 so that it can rotationally move in a direction perpendicular to the antenna plane with respect to another larger conductive substrate 2151.

Figure 115:
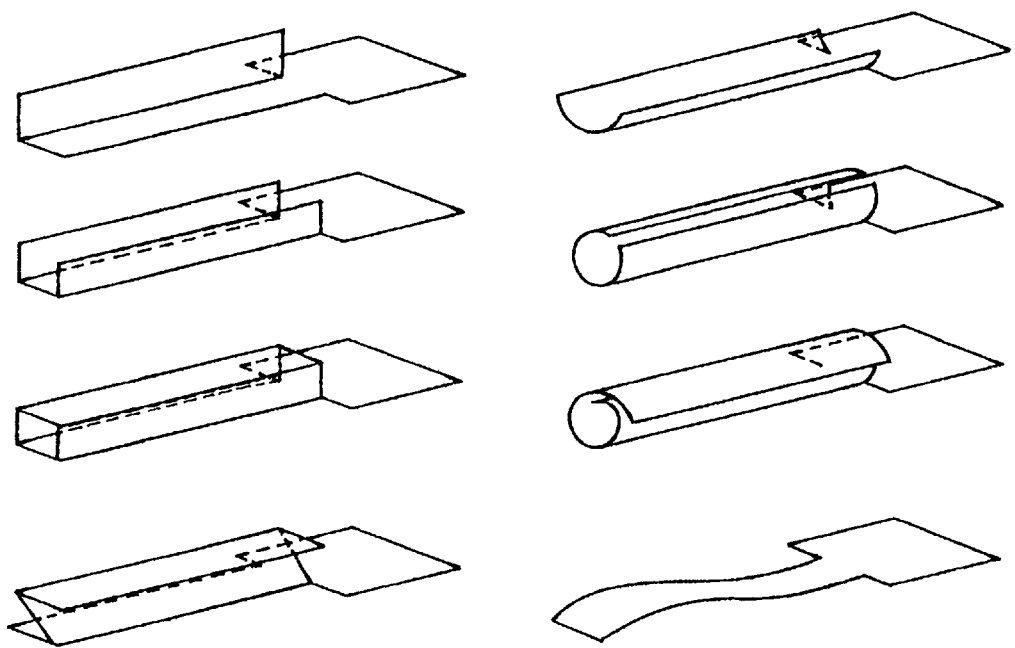
FIG. 115 is a schematic diagram showing other possible forms of the antenna according to the forty-seventh embodiment.

It should be noted that in the preceding embodiments, several antennas to be combined with a planar antenna are described and their shapes and patterns may be those shown in FIGS. 106, 107, and 115 or some others not shown.

It should be also noted that in the preceding embodiments, one or two three-edge antennas are used as a planar antenna but the shape and number of antenna elements are not limited to these embodiments.

Next, various antennas which may be used as a planar antenna in the fortieth through forty-eighth embodiments will be descried below with reference to the drawings described above.

FIG. 2(a) shows an antenna element 201 which may be used for the one-element antennas in the preceding embodiments and FIG. 2(b) shows another antenna device which comprises an antenna element 204 configured by a linear conductor with four bends, a feeding terminal 202 provided in place on the antenna element 204, and an end 203 connected to a conductive substrate 205 for grounding. The antennas can reduce their installation areas because the antenna elements are bent.

FIG. 4(a) shows an antenna device which comprises an antenna element 401 configured to be a dipole antenna configured by a linear conductor with four bends, a feeding terminal 402 provided in place on the antenna element, and a point 403 connected to a conductive substrate 405 for grounding. FIG. 4(b) shows another antenna device which comprises an antenna element 404 configured to be a dipole antenna configured by a linear conductor with eight bends, a feeding terminal 402 provided in place on the antenna element 404, and a point 403 connected for grounding. These antenna devices can reduce their installation areas because the antenna elements configured to be dipole antennas are bent like a winding.

FIG. 6(a) shows an antenna device which comprises three monopole antenna elements 601a, 601b, and 601c having two bends and different lengths and being located on the same plane, and reactance elements 602a, 602b, 602c, and 604 connected between the taps of the antenna elements 601a, 601b, and 601c and a feeding terminal 603 and between the feeding terminal 603 and a ground terminal 605, respectively, to adjust their impedance. FIG. 6(b) shows another antenna device which substitutes antenna elements 606a, 606b, and 606c having four bends for the antenna elements 601a, 601b, and 601c of the antenna device of FIG. 6(a) described above.

With these configurations, an antenna device having a desirable bandwidth can be implemented by setting the tuning frequencies of the antenna elements at regular intervals. FIG. 40 shows an example of band synthesis performed by an antenna having seven antenna elements and it may be seen from the figure that a broadband frequency characteristic can be achieved through such band synthesis even when each antenna element has only a small bandwidth.

Figure 8A:
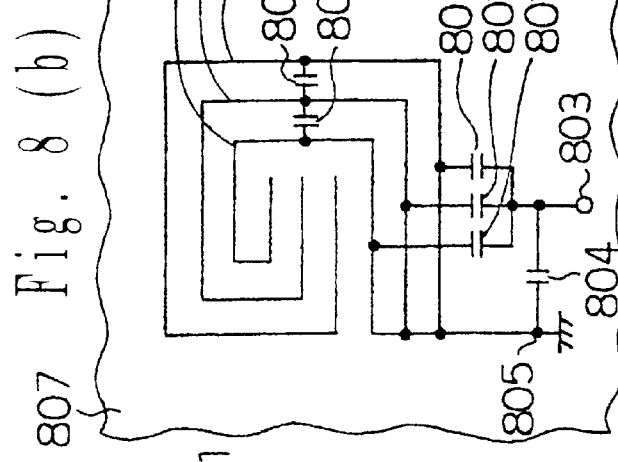
FIG. 8 is a schematic diagram showing another example of the antenna device according to the third embodiment.
Figure 8B:
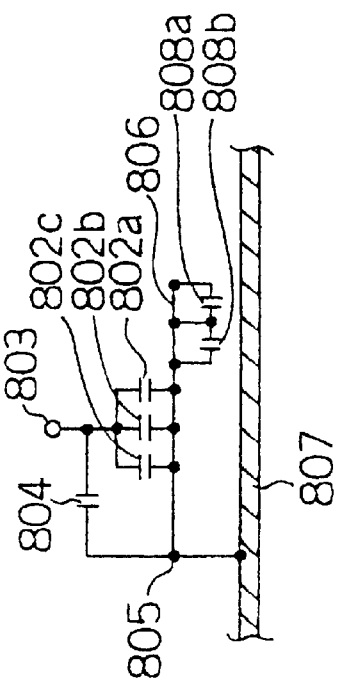
Figure 8C:
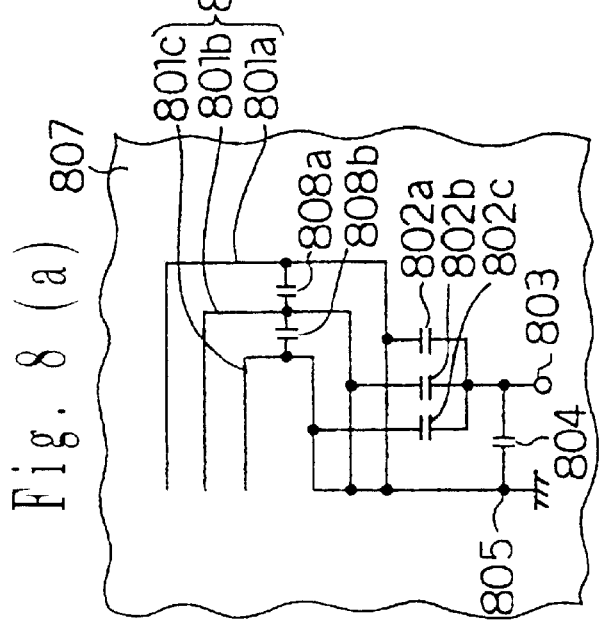
Figure 8D:
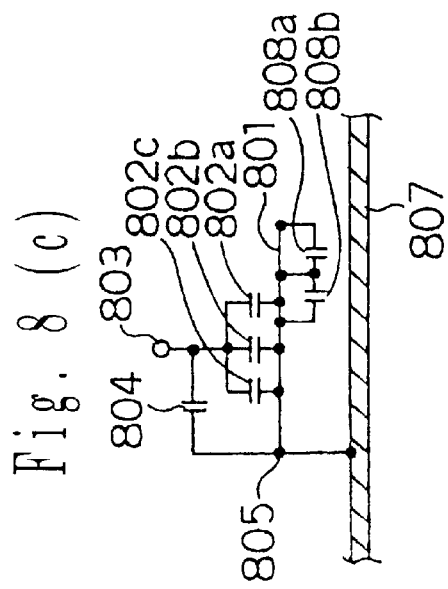

FIG. 8(a) shows that additional reactance elements 808a and 808b for band synthesis are provided between antenna elements 801a, 801b, and 801c in an antenna device having the configuration similar to that of FIG. 6(a) described above. FIG. 8(b) shows that additional reactance elements 808a and 808b for band synthesis are provided between antenna elements 806a, 806b, and 806c in an antenna device having the configuration similar to that of FIG. 6(b) described above. While in the configurations of FIGS. 6(a) and (b), each reactance element 602a, 602b, or 602c performs the band synthesis in addition to the impedance adjustment, the embodiment can facilitate the impedance adjustment and band synthesis because the band synthesis function is separated from the impedance adjustment.

FIG. 10(a) shows an antenna device which comprises three dipole antenna elements 1001, 1002, and 1003 having four bends and different lengths and being located on the same plane, and reactance elements 1004, 1005, 1006, and 1009 connected between the taps of the antenna elements 1001, 1002, and 1003 and a feeding terminal 1008 and between the feeding terminal 1008 and a ground terminal 1010, respectively, to adjust their impedance. FIG. 10(b) shows another antenna device which substitutes antenna elements 1011, 1012, and 1013 having eight bends for the antenna elements 1001, 1002, and 1003 of the antenna device of FIG. 10(a) described above.

With these configurations, an antenna device having a desirable bandwidth can be implemented by setting the tuning frequencies of the antenna elements at regular intervals.

FIG. 12(a) shows that additional reactance elements 1214, 1215, 1216, and 1217 for band synthesis are provided between antenna elements 1201, 1202, and 1203 at two separate locations in an antenna device having the configuration similar to that of FIG. 10(a) described above. FIG. 12(b) shows that additional reactance elements 1214, 1215, 1216, and 1217 for band synthesis are provided between antenna elements 1211, 1212, and 1213 at two separate locations in an antenna device having the configuration similar to that of FIG. 10(b) described above. While in the configurations of FIGS. 10(a) and (b), each reactance element 1004, 1005, or 1006 performs the band synthesis in addition to the impedance adjustment, the embodiment can facilitate the impedance adjustment and band synthesis because the band synthesis function is separated from the impedance adjustment.

FIG. 13(a) shows an antenna device which comprises three dipole antenna elements 1301, 1302, and 1303 having different lengths and being formed on a printed circuit board 1304. FIG. 13(b) shows another antenna device of the configuration similar to that of FIG. 13(a) described above, which has a conductive substrate 1308 formed on the opposite side of the printed circuit board 1304 to the antenna element 1320. Such a configuration where a printed circuit board is used to form the antenna elements 1301, 1302, and 1303 (1305, 1306, 1307) and the conductive substrate 1308 can save the space necessary for an antenna device as well as allow easy fabrication of the antenna device with improved performance reliability and stability.

FIG. 14(a) shows an antenna device which comprises three dipole antenna elements 1401, 1402, and 1403 having different lengths and being formed on a printed circuit board 1404 and two conductors 1405 formed on the opposite side of the printed circuit board 1404 to the antenna element 1410 in a direction perpendicular to the antenna element. FIG. 14(b) shows another antenna device of the configuration similar to that of FIG. 14(a) described above, which has a conductive substrate 1406 located in close proximity on the opposite side to the antenna element 1410. This conductive substrate 1406 may be formed on the printed circuit board through a multilayer printing technique. The configuration described above can allow easy fabrication of elements for band synthesis.

FIG. 15 shows an antenna device which has antenna elements 1501, 1502, and 1503 located within a recess 1505 in a conductive substrate 1504. This configuration can eliminate any protrusion from an automobile body and improve the directional gain performance through interaction between the edge of the antenna element 1510 and the conductive substrate 1504.

The antenna device of FIG. 16(a) comprises an antenna 1610 consisting of antenna elements 1601, 1602, and 1603 and an antenna 1620 consisting of antenna elements 1606, 1607, and 1608 and these antennas 1610 and 1620 are located in the same plane and within a recess 1605 in a conductive substrate 1604. It should be noted that the antennas 1610 and 1620 are different from each other in size and shape but they may be of the same size and shape. Feeding sections of these antennas are located in the proximity of each other. FIG. 16(b) shows that a similar antenna is located in the proximity of a planar conductive substrate 1609.

The antenna device of FIG. 17(a) comprises an upper antenna 1710 consisting of antenna elements 1701, 1702, and 1703 and a lower antenna 1720 also consisting of antenna elements 1701, 1702, and 1703 and these antennas 1710 and 1720 are located at two levels and within a recess 1705 in a conductive substrate 1704. It should be noted that the antennas 1710 and 1720 are of the same size and shape but they may be different from each other in size and shape. FIG. 17(b) shows that a similar antenna is located in the proximity of a planar conductive substrate 1706. If the antennas are of the same size, they will have the same tuning frequency. Therefore, the bandwidth of the whole antenna device is the same as that of a single element but this embodiment can implement a high-gain and high-selectivity antenna because the overall gain of the antenna device can be improved as compared with a single-element implementation by accumulating the gain of each antenna element, as shown FIG. 41.

The antenna device of FIG. 18(a) comprises three antennas 1801, 1802, and 1803 each having one or more bends and a plurality of dipole antenna elements and these antennas are formed to be a multilayer printed circuit board 1806 and located within a recess 1805 in a conductive substrate 1804. It should be noted that the three antennas 1801, 1802, and 1803 are of the same size and shape but they may be different from each other in size and shape. It should be also noted that the three antennas are layered in this embodiment but four or more antennas may be layered. FIG. 18(b) shows that a similar antenna is located in the proximity of a planar conductive substrate 1807. As described above, this embodiment can implement a high-gain and high-selectivity antenna easily by forming a plurality of antennas as a multilayer printed circuit board.

FIG. 19(a) shows an antenna device which has two linear conductors 1902 and 1903 bending in opposite directions to each other with respect to a feeding point 1901 and FIG. 19(b) shows another antenna device which has two linear conductors 1904 and 1905 bending in the same direction with respect to a feeding point 1901. This shape can allow implementation of a compact planar nondirectional antenna.

FIG. 20(a) shows an antenna device having an antenna element 2002 in which the length between a feeding section 2001 and a first bend P is relatively longer than the length between the first bend P and a second bend Q. FIG. 20(b) shows an antenna device having an antenna element 2002 in which the length between a feeding section 2001 and a first bend P is relatively shorter than the length between the first bend P and a second bend Q. This shape can allow the antenna device to be installed in a narrow area.

It should be noted that the configuration described above has two linear conductors with respect to a feeding section but the number of linear conductors is not limited to that of this embodiment and may be only one. In addition, the number of bends is not limited to that of this embodiment.

It should be noted that the configuration described above has two linear conductors with respect to a feeding section but the number of linear conductors is not limited to that of this embodiment and may be only one. In addition, the number of bends is not limited to that of this embodiment.

It should be also noted that the linear conductors in the configuration described above are bent but they may be curved or spiralled. For example, as shown in FIG. 21(a), this embodiment may have two linear conductors 2102 and 2103 curving in opposite directions to each other with respect to a feeding section 2101 or two linear conductors 2104 and 2105 curving in the same direction with respect to a feeding section 2101. Also, as shown in FIG. 21(b), this embodiment may have two linear conductors 2106 and 2107 spiralling in opposite directions to each other with respect to a feeding section 2101 or two linear conductors 2108 and 2109 spiralling in the same direction with respect to a feeding section 2101.

When such an antenna is fabricated, an antenna element can be formed, of course, by working metal members but it may be formed through printed-wiring on a circuit board. Such a printed-wiring technique can allow easy fabrication of an antenna as well as provide a more reliable compact antenna at a reduced cost.

The antenna device of FIG. 22 is located in the proximity of a conductive substrate with its ground terminal connected to the substrate. For example, as shown in FIG. 22(a), an antenna element 2201 is located in the proximity of a substrate 2204 with its ground terminal 2203 connected to the substrate 2204. It should be noted that in this antenna device, a feeding terminal 2202 is provided via a through-hole of the conductive substrate 2204. Such a configuration can provide a desired impedance characteristic and directivity.

FIG. 22(b) shows that a switching element is provided between a ground terminal and a conductive substrate in the antenna. As shown in the figure, a switching element 2205 is provided between a ground terminal 2203 of an antenna element 2201 and a conductive substrate 2204 to select which state, that is, whether or not the ground terminal is connected to the conductive substrate can effect the optimum radio-wave propagation. For this purpose, the switching element 2205 may be remotely operated to control the antenna device depending on the state of a received wave. This antenna device is used for a vertically polarized wave if the ground terminal 2203 is connected to the substrate, while it is used for a horizontally polarized wave if the ground terminal is not connected to the substrate.

It should be noted that the feeding terminal 2202 is provided via a through-hole of the conductive substrate 2204 in FIG. 22(b) but its location is not limited to this embodiment and that, as shown in FIG. 23, a feeding terminal 2302 and a ground terminal 2303 may be not to penetrate the conductive substrate 2304.

FIG. 24 shows the positional relationship between the antenna and the conductive substrate in the antenna device having the configuration described above. As shown in FIG. 24(a), a conductive substrate 2402 plane and an antenna 2401 plane are located parallel to each other at a distance of h. The directivity of the antenna 2401 can be changed to a desired direction by controlling the distance h. The tuning frequency is raised if the antenna 2401 is closer to the conductive substrate 2402, while the tuning frequency is lowered if the antenna is more distant from the substrate. Therefore, the antenna device may be configured to control the distance h depending on the state of a received wave. The control of the distance h may be accomplished, for example, by using a feed or slide mechanism (not shown) to move the antenna 2401 in a direction perpendicular to the antenna plane or by inserting an insulation spacer (not shown) between the antenna 2401 and the conductive substrate 2402 and moving the spacer in a direction parallel to the antenna plane to adjust the length of the spacer insertion. Also, the size of the spacer may be determined to obtain a desired antenna performance during the fabrication of the antenna. It should be noted that a spacer between the substrate and the antenna may be made of a low-permittivity material such as expanded styrol.

As shown in FIG. 24(b), the conductive substrate 2402 plane and the antenna 2403 plane may be located to form a predetermined angle θ (in this case, 90 degrees) between them. The directivity of the antenna 2403 can be controlled by adjusting the angle θ through a hinge mechanism.

It should be further noted that the number of antenna elements may be two or more. It should be also noted that the substrate consists of a single conductor according to this embodiment but the body of an automobile may be used as the substrate.

FIG. 25(a) shows that a plurality of antenna elements 2501, 2502, and 2503 are served by a single feeding mechanism to provide an antenna consisting of the group of antenna elements. For example, a broadband antenna which covers a desired bandwidth as a whole can be implemented by covering a different bandwidth with each of the antenna elements. Particularly, in the arrangement of FIG. 25(a), the outer antenna element 2501 is necessarily longer than the inner antenna element 2503 and it is easy to set the longer antenna element 2501 to a lower tuning frequency and the shorter antenna element 2503 to a higher tuning frequency, so that an antenna covering a broad band as a whole can be implemented. As shown in FIG. 25(b), a plurality of antenna elements may be separately arranged in an antenna plane without winding round each other. If each of the antenna elements covers the same band, the efficiency of the antenna can be improved.

To provide isolation between the antenna elements, a distance between them may be determined to keep them in predetermined isolation or an isolator or reflector may be connected to each of the antenna elements. It should be noted that the number of antenna elements is two or three in this antenna but it is not limited to this embodiment and may be any number equal to or more than two.

The antenna device of FIG. 26(a) has antenna elements 2601, 2602, and 2603 or antenna elements 2604, 2605, and 2606 layered in a direction perpendicular to the reference plane. It should be noted that the antenna elements may be arranged so that they are all exactly overlaid on the surface of projection as shown in the left of the figure or so that they are partially overlaid as shown in the right of the figure or so that they are separate from each other. FIG. 26(b) is a partial broken view showing an application of this embodiment, in which antennas 2611 and 2612 are formed on a multilayer printed circuit board 2609 through a printed-wiring technique and the antennas are arranged to be partially overlaid on the horizontal plane. Both elements can be coupled in place by running a conductor through a through-hole 2610.

Figure 27A:
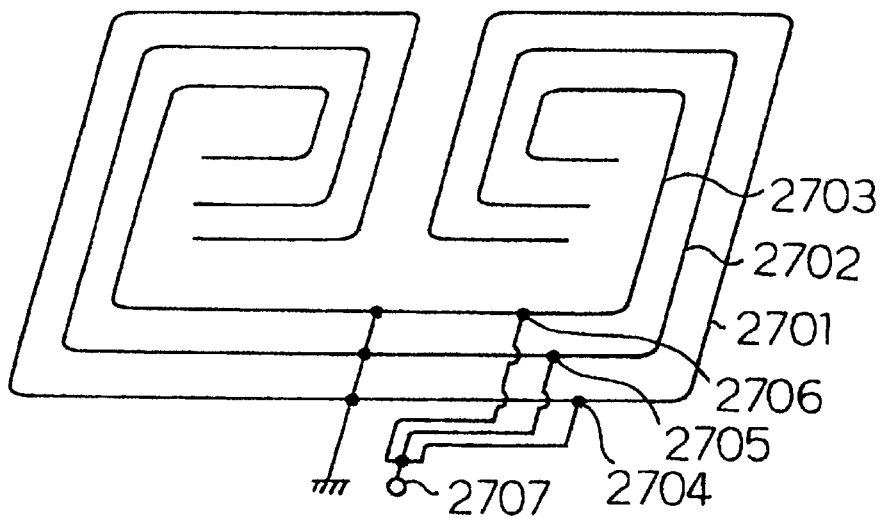
FIG. 27 is a schematic diagram showing an example of an antenna device according to an eleventh embodiment of the present invention.

FIG. 27(a) shows an example of a single antenna feeding section for serving a plurality of antenna elements. As shown in FIG. 27(a), antenna elements 2701, 2702, and 2703 have taps 2704, 2705, and 2706 formed in place thereon, respectively, to connect them to a feeding terminal 2707. It should be noted that the direction for tapping is identical for all the antenna elements but it may be arbitrarily determined for each of them.

Figure 27B:
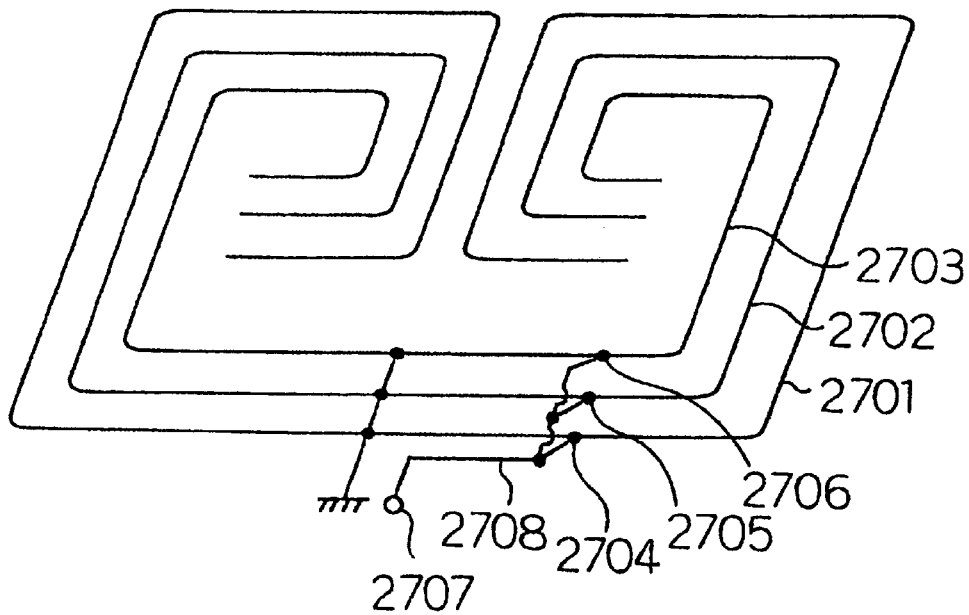

FIG. 27(b) shows an antenna having a common electrode between the tap of each antenna element and a feeding terminal. As shown in the figure, taps 2704, 2705, and 2706 are formed in place on antenna elements 2701, 2702, and 2703, respectively and a common electrode 2708 is provided between the taps and a feeding terminal 2707. This makes the configuration simple and in addition, a more compact antenna can be implemented by placing the electrode 2708, for example, parallel to the outermost antenna element 2701.

FIG. 28 shows an antenna with each antenna element tapped through a reactance element. As shown in FIG. 28(a), antenna elements 2801, 2802, and 2803 may be separately connected to a feeding terminal 2807 through reactance elements 2804, 2805, and 2806, respectively, or as shown in FIG. 28(b), a reactance element 2809 may be provided within a common electrode 2808 between a feeding terminal 2807 and taps. In the latter case, a reactance element may be provided between the feeding terminal and a ground terminal as shown in FIG. 10 described above. By using a proper reactance element in this way, a desired impedance, band, and maximum efficiency can be achieved. It should be noted that a variable reactance element may be used as such a reactance element for adjustment.

FIG. 29 shows that a plurality of antenna elements 2901, 2902, and 2903 are served by a single feeding terminal 2907 provided via a through-hole of a conductive substrate 2909 to the antenna elements to provide an antenna consisting of the group of antenna elements and a ground terminal 2908 of the feeding section is connected to the conductive substrate 2909. This configuration can allow a compact high-gain antenna to be provided in a plane in the proximity of the conductive substrate.

In the antenna device shown in FIG. 30(a), the tuning frequency is controlled by setting a distance between opposed portions 3001 and 3002 of an antenna element near its open terminals to a predetermined value to control the coupling between them.

The coupling between the opposed portions 3001 and 3002 of the antenna element near its open terminals can be established by providing a dielectric 3003 as shown in FIG. 30(b) or by connecting them through a reactance element 3004 as shown in FIG. 30(c). For this purpose, the dielectric 3003 may be movably provided to control the coupling or the reactance element 3004 may be implemented with a variable reactance to control the coupling. It should be noted that the number of antenna elements is one according to this embodiment but it may be two or more.

In the antenna device shown in FIG. 31(a), the tuning frequency is controlled by setting a distance between open-terminal portions 3101 and 3102 of an antenna element and the neutral point 3103 or their opposed portions 3111 and 3112 near the neutral point to a predetermined value. The coupling between the open-terminal portions of the antenna element and the neutral point or their opposed portions near the neutral point can be established, as shown in FIGS. 31(b) and (c) described above, by providing a dielectric 3104 or by connecting them through a reactance element 3105 or 3106. For this purpose, the dielectric 3104 may be movably provided to control the coupling or the reactance element 3101 or 3102 may be implemented with a variable reactance to control the coupling. It should be also noted that the number of antenna elements is one according to this embodiment but it may be two or more.

In the antenna device shown in FIG. 32(a), a coil 3 3203 has a linear conductor 3201 or 3202 at each end of the coil, a ground terminal 3206 is pulled out of the neutral point of the coil 3203, and a tap 3204 is formed in place on the linear conductor (in this case, 3202) to provide a feeding terminal 3205 at the end of the tapping cable. As shown in FIG. 32(b), a tap 3204 may be formed in place on a coil 3203 to provide a feeding terminal 3205. This configuration can allow the tuning frequency of the antenna to be adjusted by controlling the number of turns of coil winding and in addition, it can allow the implementation of a more compact and broadband antenna.

In the antenna device shown in FIG. 33(a), a coil 3307 has a plurality of linear conductors 3301, 3302, and 3303 or 3304, 3305, and 3306 at each end of the coil, a ground terminal 3311 is pulled out of the neutral point 3310 of the coil 3307, and a tap 3308 is formed in place on the linear conductors (in this case, 3304, 3305, and 3306) to provide a feeding terminal 3309 at the end of the tapping cable. As shown in FIG. 33(b), a tap 3312 may be formed in place on a coil 3307 to provide a feeding terminal 3309. It should be noted that the three linear conductors are provided on each side of the coil in this antenna but it is not limited to this embodiment and may be any number equal to or more than two.

It should be also noted that the conductors used as antenna elements in the embodiment described above are all linear but the shape of each conductor is not limited to this embodiment and any conductor may have at least one bend or curve or may be spiral.

In the antenna device shown in FIG. 34, a group of linear conductors 3401, 3402, and 3403 and another group of linear conductors 3404, 3405, and 3406 are connected to common electrodes 3407 and 3408, respectively, and these electrodes are connected to a feeding section 3411 through coils 3409 and 3410, respectively. This configuration can allow the tuning frequency of the antenna to be adjusted by controlling the number of turns of coil winding and in addition, it can allow the implementation of a more compact and broadband antenna.

In the antenna device of FIG. 35, two antennas 3501 and 3502 are switched by a diversity changeover switch 3503 connected to a feeding section of each antenna to select one of the antennas which can achieve the optimum radio-wave propagation. It should be noted that the number of antennas is not limited to two as described for this configuration but it may be three or more. It should be also noted that the type of antennas is not limited to that shown in FIG. 50 but other types of antennas as described for the preceding embodiments or different types of antennas may be used.

In addition, selection of the optimum antenna from a plurality of antennas may be accomplished by selecting one which can achieve the maximum receiver input or by selecting one which can achieve the minimum level of multipath disturbance.

It should be further noted that a feeding section for serving each antenna element or each antenna consisting of a plurality of antenna element groups according to the preceding embodiments described above may have a balance-to-unbalance transformer, a mode converter, or an impedance converter connected to it.

FIG. 42(a) shows a monopole-type broadband antenna which comprises a main antenna element 4202 having an end connected to a ground 4204, an antenna element 4201 located in the proximity of the main antenna element 4202 and having a length longer than the antenna element 4202 and no end connected to a ground, and an antenna element 4203 having a length shorter than the antenna element 4202 and no end connected to a ground. The main antenna element 4202 is provided with a tap which is connected to a feeding point 4206 through a reactance element 4205 for impedance adjustment. FIG. 42(b) shows another antenna device which is obtained by forming on a printed circuit board 4207 antenna elements 4201, 4202, and 4203 of the antenna device of FIG. 42(a) described above through a printed-wiring technique.

FIG. 43(a) shows a dipole-type broadband antenna which comprises a main antenna element 4302 having the center connected to a ground 4304, an antenna element 4301 located in the proximity of the main antenna element 4302 and having a length longer than the antenna element 4302 and no portion connected to a ground, and an antenna element 4303 having a length shorter than the antenna element 4302 and no portion connected to a ground. The main antenna element 4302 is provided with a tap which is connected to a feeding point 4306 through a reactance element 4305 for impedance adjustment. FIG. 43(b) shows another antenna device which is obtained by forming on a printed circuit board 4307 antenna elements 4301, 4302, and 4303 of the antenna device of FIG. 43(a) described above through a printed-wiring technique.

These configurations can implement a broadband and high-gain antenna device which is very simple and easy to adjust. It should be noted that a shorter antenna element and a longer antenna element are located in the proximity of a main antenna element in the configuration described above but two or more antenna elements may be located on each side of the main antenna.

FIG. 44(a) shows that a conductive substrate 4404 located in the proximity of antenna elements 4401, 4402, and 4403 is almost equal in size to or smaller than the outermost antenna element 4401. Such a configuration can improve the gain for horizontally polarized waves as compared with the case where a conductive substrate is larger than an antenna element.

FIG. 44(b) shows that the antenna device of FIG. 44(a) described above is located within a recess in a vehicle body, the case of a communication device, the wall of a house, or any other device case and that an antenna ground (conductive substrate) 4404 is not connected to a ground for such a case. This configuration can provide a higher gain for both horizontally and vertically polarized waves.

FIG. 45 shows how far adjacent to a conductive substrate an antenna element is to be located and FIG. 45(a) is an example where a single antenna element is located. Namely, the distance h between an antenna element 4501 (to speak properly, an antenna grounding connection) and a conductive substrate 4502 is set to a value within 0.01 to 0.25 times as large as a wavelength λ for the resonance frequency f of the antenna (that is, 0.01λ to 0.25λ). This configuration can implement a high-gain antenna which is very easy to adjust.

FIG. 45(b) is another example where four antenna elements 4503, 4504, 4505, and 4506 are located at different distances from a conductive substrate 4507, respectively. As shown in FIG. 45(b), when the antenna elements have different lengths, the shorter element can have the higher resonance frequency and the shorter wavelength. Therefore, the distance h1 for the shortest antenna element 4506 may be set to the smallest value, the distance h2 for the longest antenna element 4503 may be set to the largest value, and the distances for the medium antenna elements 4504 and 4505 may be set to values depending on the wavelengths at their resonance frequencies, respectively. Then the distance between each of the antenna elements 4503, 4504, 4505, and 4506 and the conductive substrate 4507 must satisfy the condition that it falls within the range of 0.01 to 0.25 times as large as a wavelength λ for the resonance frequency f of each antenna element (that is, 0.01λ to 0.25λ).

FIG. 46 shows that a high-permittivity material is provided between an antenna element 4601 and a conductive substrate 4602. Therefore, this configuration can apply to any other embodiment where a conductive substrate is located in the proximity of an antenna element. It should be also noted that the distance between the antenna element and the conductive substrate can be reduced equivalently by providing such a high-permittivity material between them.

FIG. 50(*a*) shows that an antenna 5002 of three antenna elements is installed parallel to a conductive substrate 5001 at a distance and a grounded end of the antenna 5002 is connected to the conductive substrate 5001, which faces toward the outside. This antenna has symmetrical directional characteristics on the upper region of the conductive substrate 5001 corresponding to the area covered by the antenna 5002 (on the opposite side to the antenna 5002) and on the lower region thereof as shown in FIG. 50(*b*). Therefore, even if the antenna 5002 and the conductive substrate 5001 are located inversely, it can achieve the same effect as those of the antennas according to the preceding embodiments described above. In addition, even if a conductive substrate 5003 is formed as a sealed case as shown in FIG. 50(*c*), an antenna 5002 inside the conductive substrate 5003 can have similar characteristics and communicate with the outside through the conductive substrate 5003 when it is fed.

FIG. 51 shows an example of an antenna device of balanced type which can achieve the same effect as those described above, while FIG. 50 shows an antenna device of unbalanced type.

FIG. 55 shows that a conductive substrate 5501 and an antenna 5502 installed parallel to and in the proximity of the substrate can be turned (or rotated) together on the axis as shown by a dash-dot line. As shown in FIG. 55(*a*), when an antenna 5502 is in a vertical position, the electric field is horizontal as shown in the right of the figure and its sensitivity for horizontally polarized waves becomes high. As shown in FIG. 55(*b*), when the antenna 5502 is in a horizontal position, the electric field is in turn vertical as shown in the right of the figure and its sensitivity for vertically polarized waves becomes high and therefore, the antenna can be directed in the optimum position depending on the state of polarized waves. Of course, it may be directed in a tilted position.

FIG. 56(*a*) shows the configuration of another antenna device which can achieve the same effects as those described above without turning the antenna. Namely, a ferroelectric 5603 is located between a conductive substrate 5601 and an antenna 5602 so that it can sandwich the antenna 5602. As shown in the right of FIG. 56(*b*), this configuration can allow the electric field between a conductive substrate 5604 and an antenna 5605 to be extended in a horizontal direction through a ferroelectric 5606, so that the vertical component is decreased and the horizontal component is increased as compared with the case where no ferroelectric is used as shown in the left of the figure. The antenna can be set for vertically polarized waves or horizontally polarized waves depending on whether a ferroelectric is used or not. It should be noted that if the antenna is installed in a vertical position, such a ferroelectric will have an inverse effect on the antenna. It should be further noted that the ferroelectric 5603 may be installed during the manufacture or later and it may be made easily removable by providing grooves for this purpose.

FIG. 57(*a*) shows that a linear antenna 5702 with three elements is located in the proximity of the surface of an elongate platelike conductive substrate 5701. FIG. 57(*b*) shows that a linear antenna 5704 with three elements is located in the proximity of the surface of a cylindrical conductive substrate 5703 so that each element is at the same distance from the conductive substrate 5703. FIG. 57(*c*) shows that a linear antenna 5706 with three elements is located in the proximity of the surface of a quadrangular-prism conductive substrate 5705 so that each element is at the same distance from the conductive substrate 5705.

FIG. 58 shows variations of the embodiment shown in FIG. 57, in which elements are curved or bent in accordance with a curved or bent conductive substrate. FIG. 58(*a*) shows that an antenna 5802 with three curved elements is located in the proximity of the surface of a curved cylindrical conductive substrate 5801 so that each element is at the same distance from the conductive substrate 5801. FIG. 58(*b*) shows that an antenna 5804 with three bent elements is located in the proximity of the surface of a bent quadrangular-prism conductive substrate 5803 so that each element is at the same distance from the conductive substrate 5803. FIG. 58(*c*) shows that an antenna 5806 with three bent elements is located in the proximity of the surface of a bent platelike conductive substrate 5805.

Figure 59:
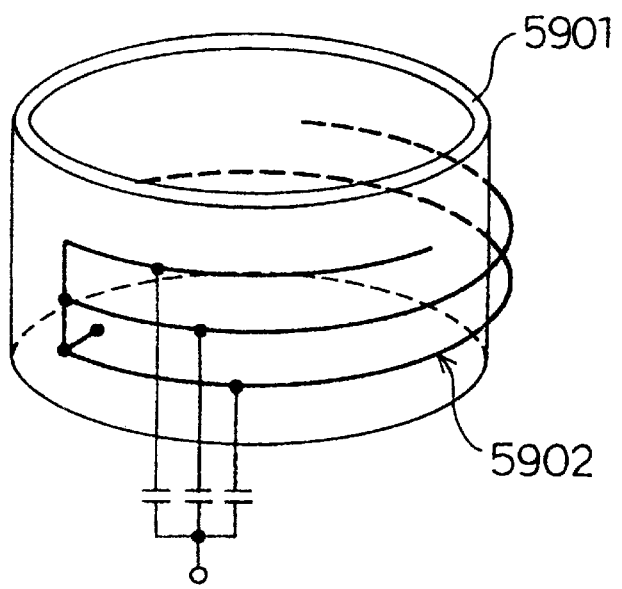
FIG. 59 is a schematic diagram showing the configuration of still another example of the antenna according to the twenty-ninth embodiment.
Figure 59:
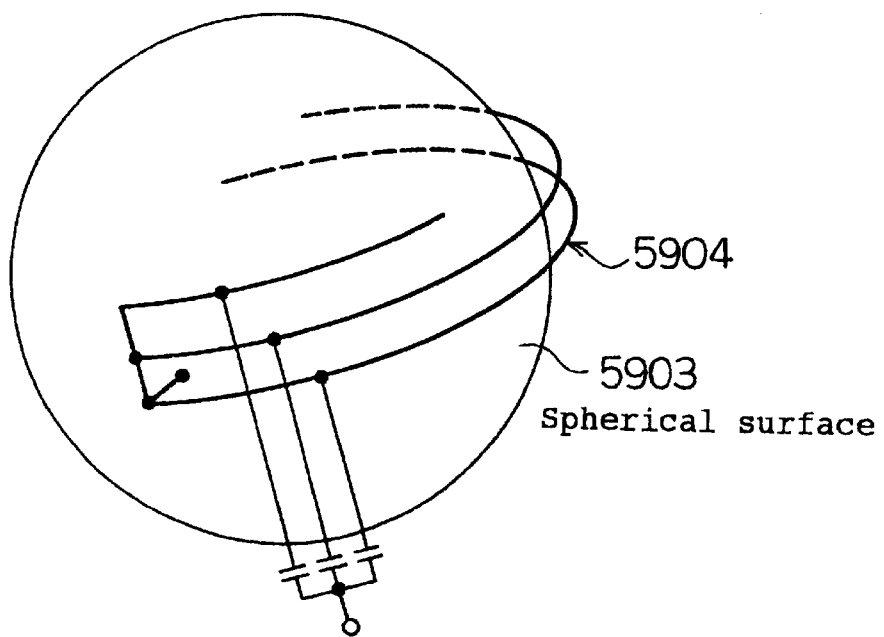

In addition, FIG. 59(*a*) shows that an antenna 5902 is located along the surface of a cylindrical conductive substrate 5901 and FIG. 59(*b*) shows that an antenna 5904 is located along the surface of a spherical conductive substrate 5903.

It should be noted that the antenna of this configuration is located outside a component which constitutes a conductive substrate but it is not limited to this embodiment and it may be located inside a platelike component or on the inner surface of a cylindrical component.

The antenna device shown in FIGS. 60(*a*) and 60(*b*) comprises an antenna 6002 with three longer elements and an antenna 6003 with three shorter elements with respect to an grounded point connected to a conductive substrate 6001 and feeding points A 6005 and B 6004 are provided for these antennas 6002 and 6003, respectively. As shown in FIG. 60(*c*), the shorter antenna 6003 is tuned to the A band of relatively higher frequencies and the longer antenna 6002 is tuned to the B band of relatively lower frequencies, and thus, such a single antenna device can accommodate two tuning bands. It should be noted that the feeding points A 6005 and B 6004 may be connected to each other.

FIGS. 61(*a*) and 61(*b*) show another example of the antenna of unbalanced type having two tuning bands. This antenna is a four-element antenna having an end connected to a conductive substrate 6101 and located in the proximity of the conductive substrate 6101 and in addition, an antenna 6102 with two relatively longer elements is provided with a feeding point B 6104 and an antenna 6103 with two relatively shorter elements is provided with a feeding point A 6105. As shown in FIG. 61(*c*), this configuration can accommodate two tuning bands, that is, the A band of relatively higher frequencies and the B band of relatively lower frequencies in a similar manner to that described above. It should be also noted that the feeding points A 6005 and B 6004 may be connected to each other.

FIGS. 62(*a*) and 62(*b*) show still another example of the antenna of balanced type having two tuning bands. This antenna is a four-element antenna having the midpoint connected to a conductive substrate 6201 and located in the proximity of the conductive substrate 6201 and in addition, an antenna 6202 with two relatively longer elements is provided with a feeding point B 6204 and an antenna 6203 with two relatively shorter elements is provided with a feeding point A 6205. As shown in FIG. 62(*c*), this configuration can accommodate two tuning bands, that is, the A band of relatively higher frequencies and the B band of relatively lower frequencies in a similar manner to that described above. It should be also noted that the feeding points A 6005 and B 6004 may be connected to each other. This configuration can provide an advanced antenna device which requires a minimum space for installation and which is capable of accommodating a plurality of tuning bands, and thus, such an antenna can be applicable in a narrow space such as an automobile or a portable telephone. It should be noted that this embodiment assumes two tuning bands but it may accommodate three or more bands. The latter case can be accomplished by providing a plurality of antennas each of which has an element length corresponding to each tuning band and providing a feeding point for each antenna.

In the antenna device shown in FIG. 67, a coil 6703 is inserted in place on a three-edge antenna element 6701 located in the proximity of a conductive substrate 6702 and an end of the antenna element 6701 is connected to the conductive substrate 6702. In addition, a feeding section 6704 is provided on the antenna element 6701 between the coil 6703 and the conductive substrate 6702. This configuration can allow an electric current to concentrate in the coil and thus the antenna device can be reduced in size with the gain unchanged. For example, if the antenna element consists of a strip line, the area for the antenna can be reduced to a quarter. Moreover, its bandwidth can be narrowed and the band characteristics can be sharpened.

FIG. 68 shows that two antenna elements having the configuration of FIG. 67 are connected in parallel for band synthesis. Namely, two antenna elements 6801*a* and 6801*b* having different bands (lengths) and coils 6803*a* and 6803*b* provided in place on the elements, respectively, are located in parallel and an end of each element is connected to a conductive substrate 6802. In addition, the antenna elements 6801*a* and 6801*b* are commonly connected to a feeding section 6804 through reactance elements 6805*a* and 6805*b*, respectively. This configuration can synthesize the bands of the two antenna elements and thus, a broadband antenna device with the same effects as those described above can be implemented.

In the antenna device shown in FIG. 69, a coil 6903 is provided between an end of a three-edge antenna element 6901 located in the proximity of a conductive substrate 6902 and the conductive substrate 6902 and the other end of the coil 6903 is connected to the conductive substrate 6902 for grounding. In addition, a feeding section 6904 is provided in place on the antenna element 6901. This configuration can allow an electric current to concentrate in the coil and thus the antenna device can be reduced in size with the gain unchanged.

FIG. 70 shows that two antenna elements having the configuration of FIG. 69 are connected in parallel for band synthesis. Namely, two antenna elements 7001*a* and 7001*b* having different bands (lengths) are located in parallel with an end connected in common to an end of a coil 7003 and the other end of the coil 7003 is connected to a conductive substrate 7002. In addition, the antenna elements 7001*a* and 7001*b* are connected to a feeding section 7004 in common through reactance elements 7005*a* and 7005*b*, respectively.

This configuration can synthesize the bands of the two antenna elements and thus, a broadband antenna device with the same effects as those described above can be implemented. It should be noted that the single coil which is shared by the two antenna elements can contribute to a simple configuration.

In the antenna device shown in FIG. 71, an insulator 7105 is provided on a conductive substrate 7102 and an antenna element 7101 and a coil 7103 are connected on the insulator 7105. This configuration can allow easy installation of a coil 7103, which is useful for its implementation, and thus the coil can be stably installed. FIG. 72 shows the configuration of two antenna elements 7201*a* and 7201*b* arranged for band synthesis and that although the connection between a coil 7203 and the antenna elements becomes more complex because of the more antenna elements as compared with the case of FIG. 71, a connection point provided on an insulator 7205 on a conductive substrate 7202 can make the connection between the antenna elements and the coil much easier.

In the antenna device shown in FIG. 73, a coil section are divided to two parts and two insulators 7305*a* and 7305*b* are provided on a conductive substrate 7302 to connect antenna elements and coils. Namely, an end of a three-edge antenna element 7301 provided in the proximity of a conductive substrate 7302 and an end of a coil 7303*a* are connected together on an insulator 7305*a*, the other end of the coil 7303*a* and an end of another coil 7303*b* and a feeding section 7304 are connected together on another insulator 7305*b*, and the other end of the coil 7303*b* is connected to the conductive substrate 7302 for grounding. FIG. 74 shows an antenna device having two antenna elements 7401*a* and 7401*b* arranged for band synthesis and the antenna elements, coils, and a feeding section are connected in a similar manner to that shown in FIG. 73. These configurations can allow easy connection to other circuit components because the feeding terminal is provided on a circuit board.

In the antenna device shown in FIG. 75, a zigzag pattern 7503 is inserted in an antenna element 7501 in place of the coil for the configuration of FIG. 67. Although the configuration having a coil can three-dimensionally extend, the configuration with this pattern 7503 can be formed on the same plane as the antenna element 7501 and fabricated through a printed-wiring technique. FIG. 76 shows an antenna device having two antenna elements 7601*a* and 7601*b* arranged for band synthesis and zigzag patterns 7603*a* and 7603*b* are inserted in antenna elements 7601*a* and 7601*b*, respectively. It should be noted that the zigzag patterns may be sawtoothed ones as shown in FIG. 78 In the antenna device shown in FIG. 77, the whole antenna element 7701 located in the proximity of a conductive substrate 7702 is formed in a zigzag pattern and an end of the antenna element 7701 is connected to an end of a coil 7703 which is grounded at the other end. In addition, a feeding section 7704 is provided in place on the zigzag antenna element. This configuration can allow the antenna device to be further reduced in size, for example, to ⅙ or ⅛, although possible losses may be increased. It should be noted that the antenna element may be formed in other patterns, for example, those shown in FIGS. 78(*b*) and (*c*). The pattern shown in FIG. 78(*b*) is a three-dimensional coil.

In the antenna device shown in FIG. 79, an insulator 7904 is provided on a conductive substrate 7902 and a lead 7905 from an antenna element 7901 and a feeding section 7903 are connected together on the insulator 7904. This configuration can allow easy connection with other circuit components because the feeding section 7903 is provided on a circuit board.

FIG. 80 shows that a through-hole 8005 is formed in a conductive substrate 8002 to provide an insulator 8004 on the opposite side of the conductive substrate 8002 to an antenna element 8001. A lead 8006 from the antenna element 8001 passes through the through-hole 8005 and the insulator 8004 and connects to a feeding section 8003 on the insulator 8004. This configuration can make it much easier than that of FIG. 79 described above to connect other circuit components to the feeding section 8003 because such circuit components can be connected on the back of the conductive substrate 8002.

FIG. 81 shows that in addition to the configuration of FIG. 80 described above, another conductive plate is provided on the back of a conductive substrate (on the opposite side to an antenna element) to mount various circuit components thereon. Namely, a through-hole 8104 is formed in both a conductive substrate 8102 and a conductive plate 8105 to run a lead 8111 from an antenna element 8101 therethrough and an insulator 8103 is provided on the conductive plate 8105 over the through-hole 8104. In addition, a required number of insulators 8106 are provided on the conductive plate 8105 to connect various circuit components. The lead 8111 passes through the through-hole 8104 to the insulator 8103 and circuit components 8107 to 8110 are connected on the insulators 8103 and 8106. This configuration can allow location of the circuit in the proximity of the antenna and easy shielding between the antenna and the circuit through the conductive plate, and thus, it can facilitate implementing a compact device.

FIG. 82 shows still another example of the antenna in which circuit components are located on the same side as an antenna element. Namely, an insulator 8203 to connect a lead 8205 from an antenna element 8201 and a required number of insulators 8206 to connect various circuit components are provided on a conductive substrate 8202. In addition, a conductive shielding case 8204 is provided on the conductive substrate 8202 to shield the circuit components on the conductive substrate 8202 from the antenna element 8201 and a through-hole 8207 is formed for running the lead 8205 therethrough. The lead 8205 passes through the through-hole 8207 to connect to the insulator 8203 and circuit components 8208 to 8210 are connected on the insulators 8203 and 8206. An end of the antenna element 8201 is connected to the shielding case 8204 for grounding. This configuration can allow the whole circuit to be held between the antenna element and the conductive substrate and to be shielded by the shielding case, and thus, it can facilitate implementing a more compact device than the configuration of FIG. 81 described above.

In the antenna device shown in FIG. 83, an antenna element 8301 is formed on one side of an insulation plate 8305 and one end 8307 of the antenna element 8301 passes through the insulation plate 8305. A lead 8303 from a point in the antenna element 8301 also passes through the insulation plate 8305 and another lead 8306 formed on the opposite side of the insulation plate 8305 and parallel to the antenna element 8305 is connected to the lead 8303 for connecting a feeding section 8304 to the lead 8306. It should be noted that the feeding section 8304 is provided in the proximity of the end 8307 of the antenna element 8301. In addition, the insulation plate 8305 is located parallel to a conductive substrate 8302, to which the end 8307 of the antenna element 8301 is connected. This configuration can facilitate connecting coaxial cables because the grounded end of the antenna element is close to the feeding section.

In the antenna device shown in FIG. 84, a conductive substrate 8404 is provided on another broader conductive substrate 8402 through an insulation plate 8405 and an antenna element 8401 is located in the proximity of the conductive substrate 8404. It should be noted that an end of the antenna element 8401 is connected to the conductive substrate 8404 for grounding. It should be preferable that the conductive substrate 8404 is equal to the antenna element 8401 in size. Specifically, the conductive substrate 8402 may be the body of an automobile or carriage, the metal case for a receiver or communication device, or any metal structure of a house and it may be installed inside or outside the room or compartment. This configuration can achieve a nearly horizontal elevation angle with the maximum gain and thus, it will be suitable for receiving communication waves (vertically polarized waves) which come from a lateral direction.

FIG. 47 is a schematic diagram showing a possible automobile application of an antenna device according to the present invention. Namely, any one of the antenna devices according to the preceding embodiments described above is installed at five locations in total, that is, one on each of the four pillars 4701 and one on the roof, to provide a diversity configuration of these flat antennas. This configuration can offer a good capability of receiving and transmitting both horizontally and vertically polarized waves. It should be noted that the antenna device is installed at five locations according to this embodiment but it may be installed at more or less locations.

FIG. 48 is a schematic diagram showing possible locations where an antenna device according to the present invention is to be installed for automobile applications. Namely, any one of the antenna devices according to the preceding embodiments described above is installed at any one or more locations on the roof panel, hood, pillars, side faces, bumpers, wheels, floor, or other surface portions of an automobile body 4801. In FIG. 48, an antenna 4802 is installed at a location where the antenna plane is almost in a horizontal position, an antenna 4803 is installed at a location where the antenna plane is in a tilted position, and an antenna 4804 is installed at a location where the antenna plane is almost in a vertical position. It should be noted that this figure shows possible locations for antenna installation by way of example and all the locations shown are not provided with antennas. Of course, it should be also noted that an antenna may be installed at any location other than those shown. It should be further noted that the automobile type is not limited to such a passenger car as shown and an antenna according to the present invention may be installed on a bus, truck, or any other type of automobile.

In addition, since an antenna 4805 is installed at a location where the antenna plane is in a horizontal position, and specifically, on the back (undersurface) of the floor with its directivity facing the roadbed, it is suitable for communication with a wave source installed on the road (or embedded therein) which is to be used for communication or detection of vehicle positions.

Figure 49:
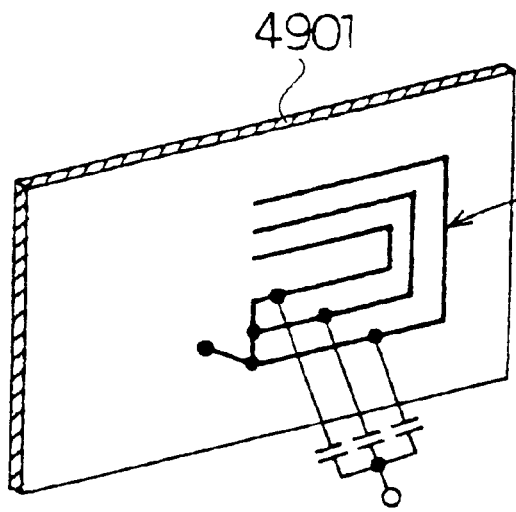
FIG. 49 is a schematic diagram for explaining the properties of the antenna according to the twenty-sixth embodiment.
Figure 49:
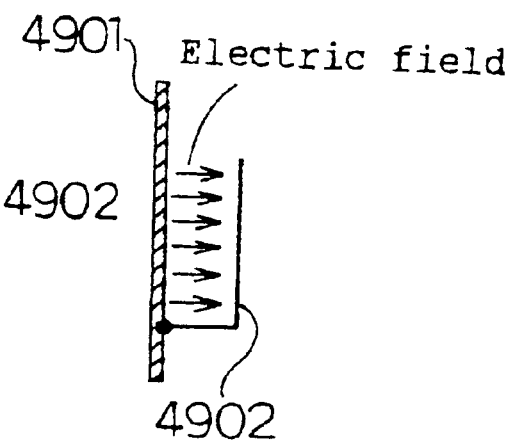
Figure 49:
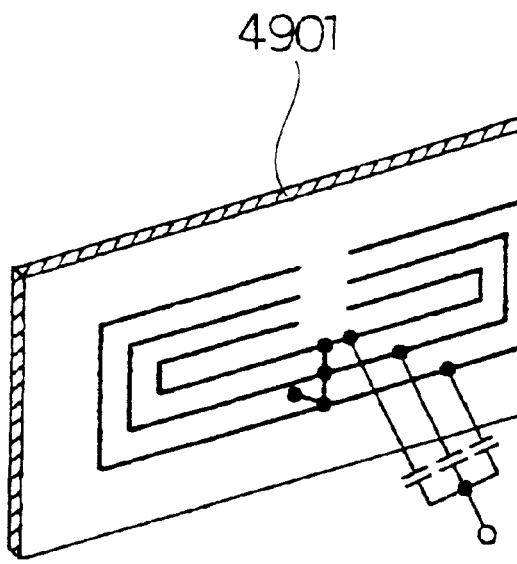
Figure 49:
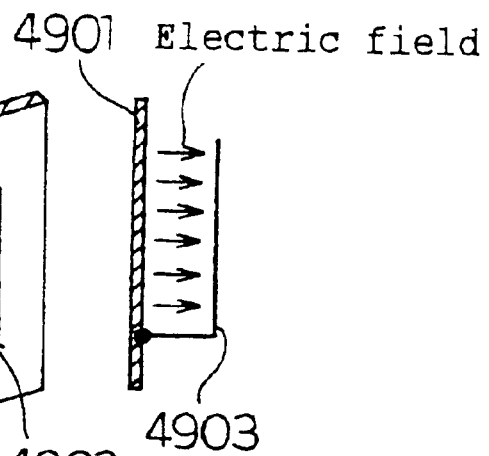

Generally, airwaves for TV or FM broadcasting mainly consist of horizontally polarized waves, while waves for portable telephone or radio communication mainly consist of vertically polarized waves. Whether an antenna is suitable for horizontally polarized waves or vertically polarized waves depends on the direction of its installation. As shown in FIG. 49(a), an antenna 4902 which is installed parallel to a conductive substrate 4901, that is, a vertical surface portion of an automobile body 4801 and comprises three antenna elements of unbalanced type with their grounded ends connected together is effective for horizontally polarized waves, since its sensitivity to horizontally polarized waves can be raised because of the horizontal electric field as shown in the right of the figure. This can be accomplished by installing an antenna 4804 as shown in FIG. 48. On the other hand, an antenna 4802 which is installed parallel to a horizontal surface portion of the automobile body 4801 is effective for vertically polarized waves, since its sensitivity to vertically polarized waves can be raised because of the vertical electric field. In addition, an antenna 4803 which is installed in a tilted position can be used regardless of the direction of polarization, since its sensitivity is balanced between horizontally and vertically polarized waves depending on the degree of tilt. FIG. 49(*b*) shows an example of antenna of balanced type, which is effective for horizontally polarized waves in a similar manner to that described above.

FIG. 52 is a schematic diagram showing possible locations where the antenna device according to the present embodiment is to be installed for automobile applications similar to those of FIG. 48. In FIG. 52, like in FIG. 48, an antenna 5202 is installed at a location where the antenna plane is almost in a horizontal position, an antenna 5203 is installed at a location where the antenna plane is in a tilted position, and an antenna 5204 is installed at a location where the antenna plane is almost in a vertical position. In addition, since an antenna 5205 is installed at a location where the antenna plane is in a horizontal position, and specifically, on the inner surface of the floor, it is suitable for communication with a wave source installed on the road in a similar manner to that of FIG. 48. Although these antennas shown are all installed inside an automobile body 5201, they can achieve the same performance as that for the antennas installed on the outer surface of the automobile body for the reasons described above and in addition, they are very advantageous in appearance, damages, or risk of being stolen because they are not exposed to the outside of the body. Moreover, as shown in FIG. 52, the antenna device according to the present embodiment may be installed on a rearview mirror, in-car sun visor, number plate, or any other location where it cannot be otherwise installed on the outer surface, by embedding it within the inside space of such a component.

If an antenna is to be installed in a vertical position, for example, it may be installed on the end 3703 of an automobile spoiler 3701 or 3702 or the end 3703 of a sun visor as shown in FIG. 37(*a*) or on a pillar section 3704 as shown in FIG. 37(*b*). Of course, installation locations are not limited to them and the antenna may be installed on any other locations which are tilted to some extent with respect to any horizontal plane. Therefore, the reception of a desired polarized wave can be made very easy by positioning the antenna at such locations.

FIGS. 63 and 65 show applications of the antenna device according to the present invention. FIG. 63 shows that an antenna 6302 is installed on the surface of an elongate roof rail 6303 on the roof of an automobile body 6301 and FIG. 65 shows that an antenna 6502 is installed inside an elongate roof rail 6503 on the roof of an automobile body 6501.

Moreover, FIGS. 64 and 66 show applications of the antenna device according to the present invention. FIG. 64 shows that an antenna 6403 is installed on the surface of an elongate roof box 6402 on the roof of an automobile body 6401 and FIG. 66 shows that an antenna 6603 is installed inside an elongate roof box 6602 on the roof of an automobile body 6601.

It should be noted that the antenna device described above is installed on an automobile but it may be installed on other vehicles such as an airplane or ship. Alternatively, it may be installed not only on such vehicles but also on the roadbed, shoulder, tollgate, or tunnel wall of any expressway or highway, or on the wall or window of any building.

FIG. 53 is a schematic diagram showing a possible application to a portable telephone of the antenna according to the present invention, in which an antenna 5302 is installed inside a conductive grounded case 5301 with an antenna ground connected thereto. This configuration can allow the antenna to be used in a similar manner to the case where the antenna is installed outside the grounded case 5301 and it can make the antenna very advantageous in handling because the antenna is not exposed to the outside. It should be noted that the antenna is used with a portable telephone according to this embodiment but it can also apply to a TV, PHS, or other radio set.

FIG. 39(*a*) shows an example in which a conductive shielding case 3902 provided inside a resinous case 3901 of a portable telephone is used as a conductive substrate and an antenna 3903 is located along the inner side of the case 3901 to be parallel to the shielding case 3902. FIG. 39(*b*) shows another example in which an antenna 3904 is located on the top surface outside a resinous case 3901 of a portable telephone and a conductive substrate 3905 is provided on the inner wall of the case 3901 opposite to the antenna 3904. In the latter case, the top of a shielding case 3902 is too small to be used as a conductive substrate. The antennas used in both FIGS. 24(*a*) and (*b*) are preferably those having more bends or more turns of winding which can easily allow the implementation of a compact antenna.

With these configurations, the directional gain on the conductive substrate side is very small to the antenna and therefore, possible influence of electromagnetic waves on human body can be reduced without any degradation of antenna efficiency if the antenna device is used with the conductive substrate side turned to the user. It should be further noted that the antenna device is implemented in a portable telephone but it may apply to other portable radio sets, for example, a PHS device, a pager, or a navigation system.

FIG. 54 is a schematic diagram showing a possible application to an ordinary house of the antenna according to the present invention. Namely, an antenna 5402 is installed inside a conductive door of a house 5401, an antenna 5403 is installed inside a conductive window (for example, storm window), an antenna 5404 is installed inside a conductive wall, and an antenna 5405 is installed inside a conductive roof. Therefore, when an antenna is installed inside a conductive structure of the house 5401 in this way, the antenna can be protected against weather-induced damage or degradation with an elongated service life because it is not exposed to the outside.

It should be further noted that even if a house consists of nonconductive structures, such an antenna can be installed at any location by attaching a conductor to the outer surface thereof.

As described above, each antenna device according to the present invention can be installed without any portion protruding from the body plane of an automobile because it can be located with its antenna plane parallel to and in the proximity of the body plane which is a conductive substrate and in addition, it can be installed even in a narrow space because it takes up only a small area. Therefore, its appearance can be improved with little wind soughing brought about around it and in addition, some other problems such as a risk of its being stolen and labors involved in removing it before car wash can be eliminated.

FIG. 38 is a schematic diagram showing an example of a mobile communication device with an antenna device according to the present invention. As shown in FIG. 38, an antenna 3801 according to any one of the preceding embodiments described above is installed on the ceiling of an automobile body 3805. In this case, if the antenna 3801 is located within a recess 3806 in the ceiling, any portion of the antenna will not protrude from the outline of the body 3805. As seen from the figure, the antenna 3801 is connected to a communication device 3804 which is installed inside the body 3805 and consists of an amplifier 3802 and a modem 3803. It should be noted that the antenna device described above is used with a mobile communication device but it may be used with any other device which receives or transmits radio waves, for example, a television set, a radio-cassette player, or a radio set.

(Embodiment 49)

Figure 118:
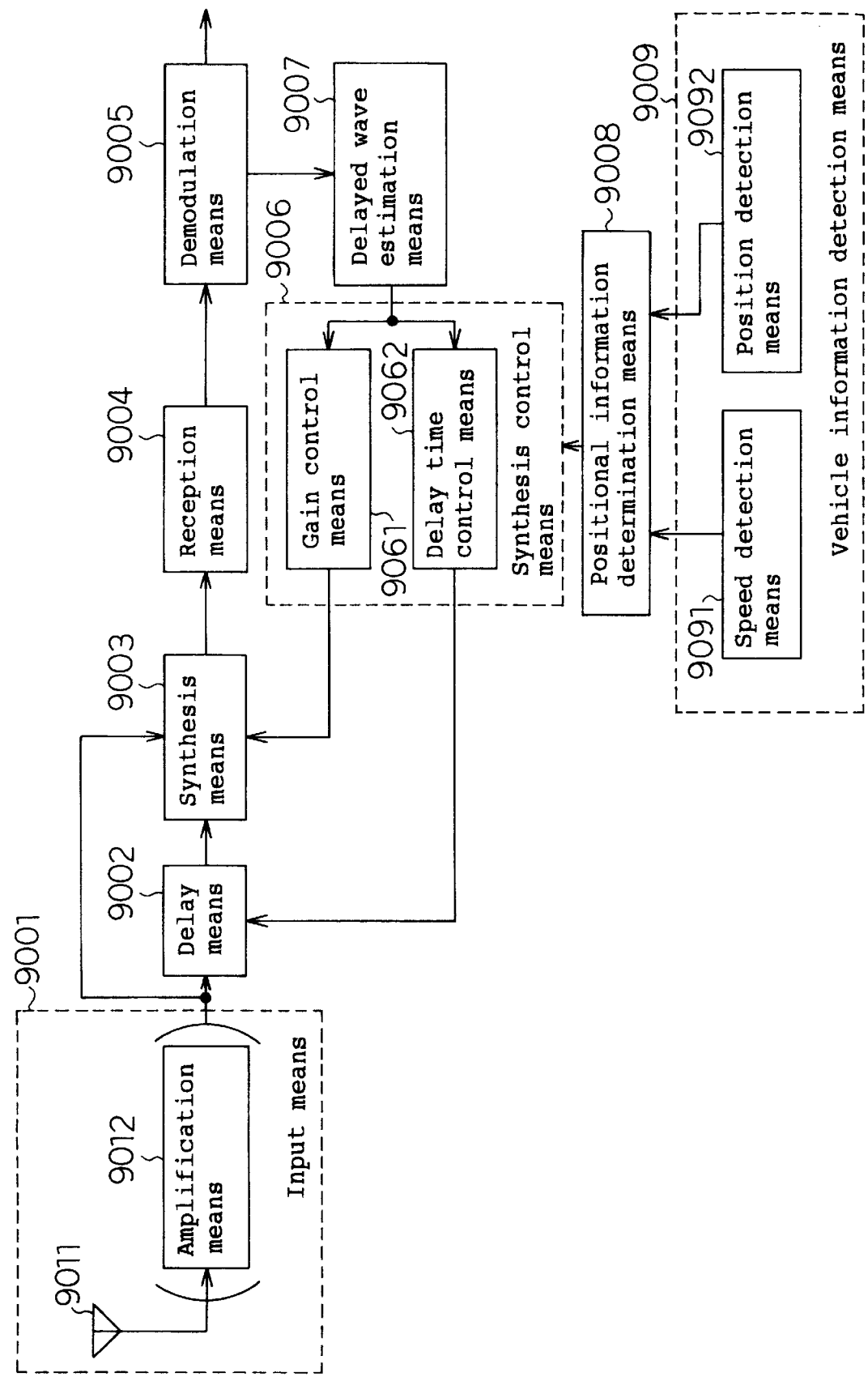
FIG. 118 is a block diagram showing the configuration of a digital television broadcasting receiving device according to an embodiment of the present invention.

FIG. 118 is a block diagram showing the configuration of a digital television broadcasting receiving device according to the forty-ninth embodiment of the present invention. In FIG. 118, the reference numeral 9001 designates an input means, 9002 designates a delay means, 9003 designates a synthesis means, 9004 designates a reception means, 9005 designates a demodulation means, 9007 designates a delayed wave estimation means, 9008 designates a positional information determination means, and 9009 designates a vehicle information detection means. The operation for receiving digital television broadcasting at a vehicle will be described below with reference to FIG. 118.

A television broadcasting wave is converted to an electric signal by the input means 9001 such as a receiving antenna and then supplied to the delay means 9002 and the synthesis means 9003. The television broadcasting wave converted to such an electric signal is delayed by the delay means 9002 in accordance with a delay control signal from a synthesis control means 9006 and then supplied to the synthesis means 9003. In the synthesis means 9003, in accordance with a synthesis control signal from the synthesis control means 9006, a signal from the input means 9001 and another signal from the delay means 9002 are provided with a predetermined gain for each signal and synthesized together and then supplied to the reception means 9004. As a synthesis technique used for this purpose, addition, maximum selection, or other simple operations can be used.

The reception means 9004 extracts only signals within a necessary band from those supplied by the synthesis means 9003 and converts them to signals of frequencies which can be handled by the demodulation means 9005. Thus converted signals are supplied to the demodulation means 9005, which in turn demodulates them for output. The demodulation means 9005 supplies demodulation information to the delayed wave estimation means 9007, which estimates a delayed wave contained in the received wave based on the demodulation information supplied by the demodulation means 9005.

The operations for demodulation and delayed wave estimation will be described below. In the ground wave digital broadcasting which is now being standardized in Japan, orthogonal frequency-division multiplexing (OFDM) is used for modulation and the demodulation means 9005 performs OFDM demodulation to decode transmitted codes. During the decoding process, frequency analysis is performed through an operation such as FFT. The transmission characteristics of a received signal can be estimated by using various pilot signals contained in the received signal for data demodulation. For example, a delay time can be detected by detecting dip locations and the number of dips in frequency components which are obtained from the FFT frequency analysis.

Figure 124:
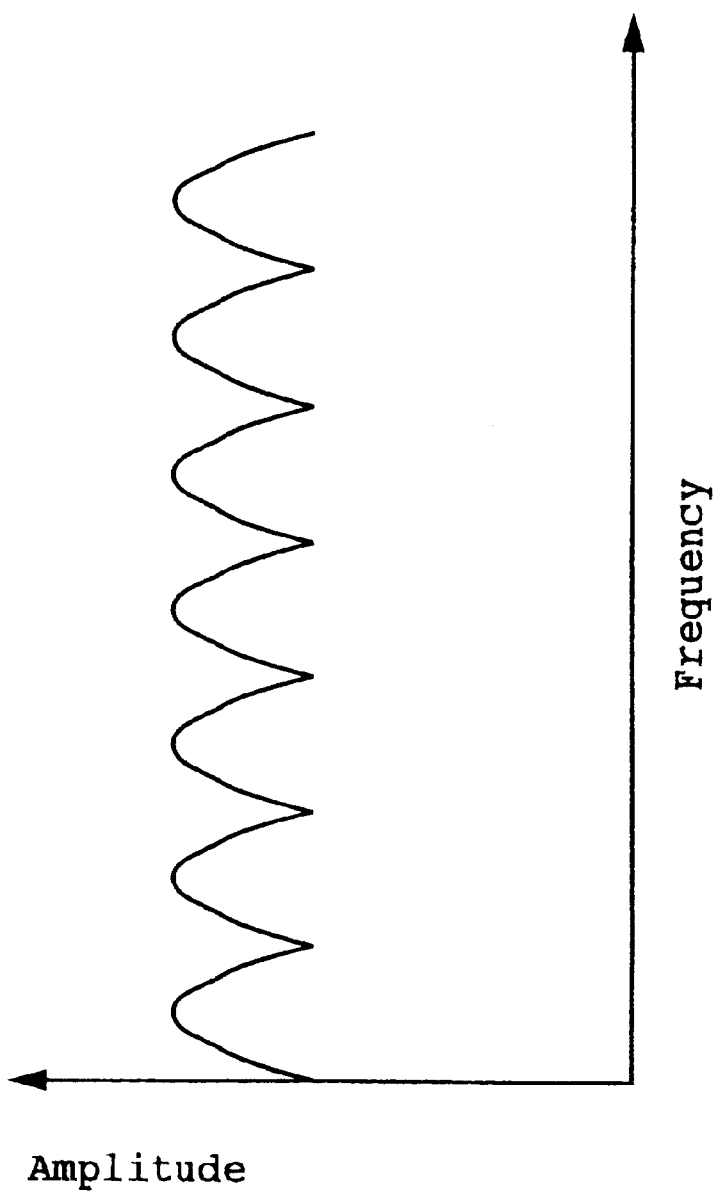

FIG. 124 shows a result of the frequency analysis performed for OFDM and the frequency characteristics may be flat when no delayed wave exists, while the frequency characteristics may have some dips as shown in FIG. 124 when some delayed waves exist. Alternatively, a delayed wave can be detected by observing any variation in or lack of pilot signals. The delay time of a disturbance wave can be estimated based on erroneous data positional information obtained through an error correction process performed after the FFT operation. It should be noted that the Japanese digital broadcasting has been described in the above paragraphs but this technique may apply also to analog broadcasting or foreign digital broadcasting.

Figure 125:
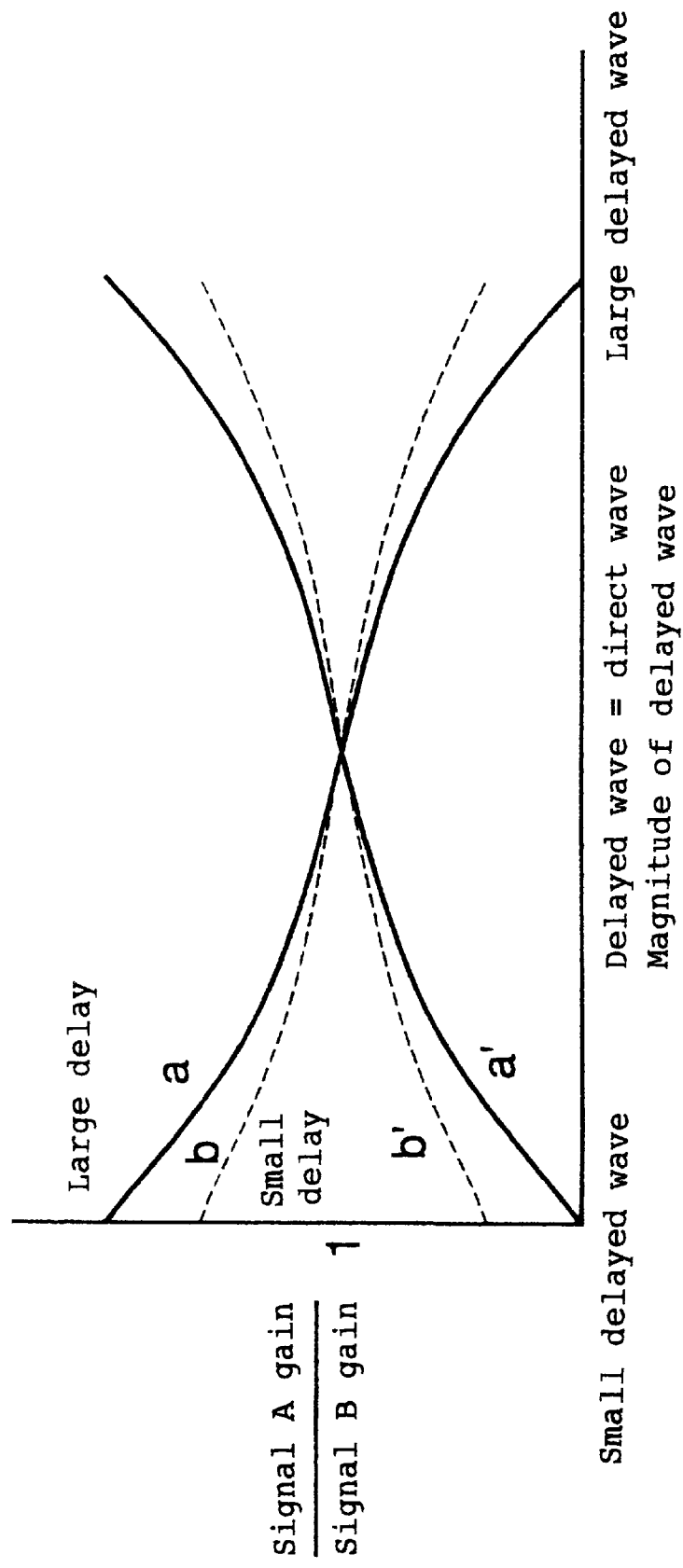

Next, the operations for synthesis control and delay control will be described below. The synthesis control means 9006 provides a signal to control the delay means 9002 and the synthesis means 9003 based on estimated delayed wave information supplied by the delayed wave estimation means 9007. The configuration of the synthesis control means 9006 which comprises a gain control means 9061 and a delay time control means 9062 will be described below. The gain control means 9061 establishes a synthesis gain in the synthesis means 9003 based on delayed wave information supplied by the delayed wave estimation means 9007. This establishing operation will be described below with reference to FIG. 125. In FIG. 125, the axis of abscissas shows the magnitude of a delayed wave and the axis of ordinates shows a ratio of the gain of a signal supplied by the input means 9001 (signal A gain) to the gain of a signal supplied by the delay means 9002 (signal B gain) (=signal A gain/signal B gain). The synthesis gain is controlled so that both gains can be identical when the level of a delayed wave is small, or it is large and in particular, it is equal to the level of a direct wave or so that a difference between both gains can be obtained by decreasing the gain of a signal supplied by the delay means or that of a signal supplied by the input means when the level of a delayed wave is small, or it is larger than that of a direct wave. In addition, if the gain control is accomplished based on the delay time of a delayed wave supplied by the delayed wave estimation means 9007, the gain difference becomes larger for the case of a large delay time (the curve a in FIG. 125) than the case of a small delay time (the curve b in FIG. 125).

Figure 126:
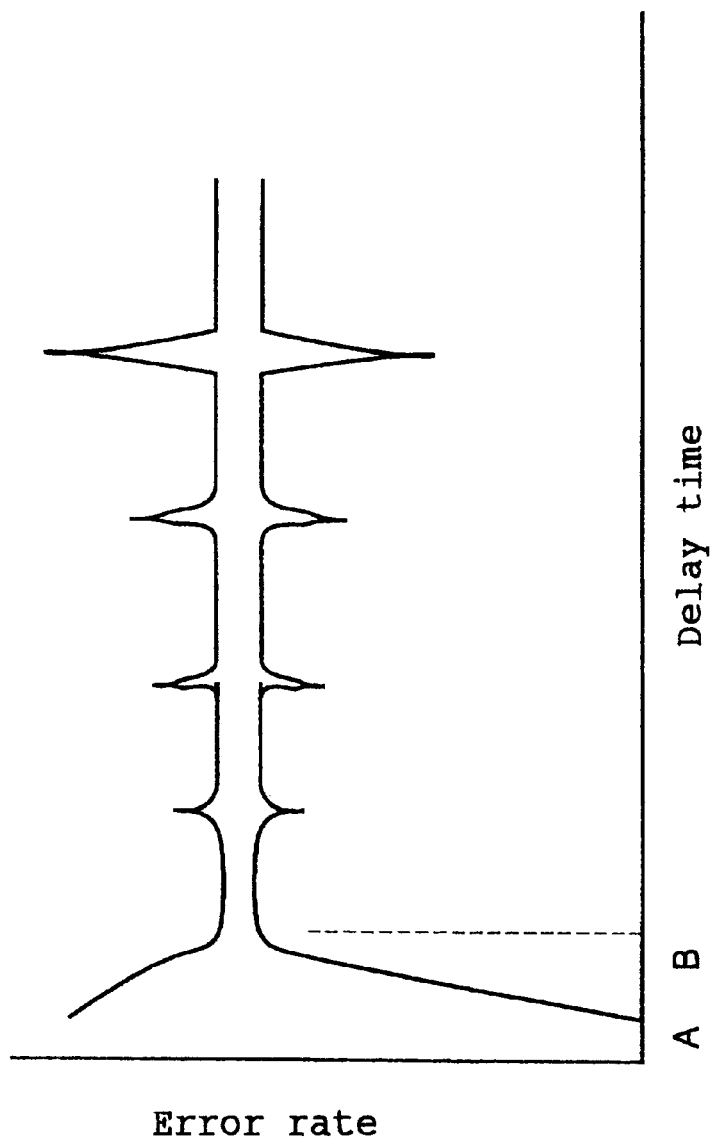

Next, the operation of the delay time control means 9062 will be described below. It controls the establishment of a delay time to be used by the delay means 9002 so that the delay means 9002 delays the time by a length almost equal to the delay time estimated by the delayed wave estimation means 9007. For example, the relationship between error rates of a delayed wave and a demodulated signal is shown in FIG. 126. As shown in the figure, although the error rate may deteriorate abruptly when a delay time is small (point B: about 2.5 μs or less), such a deterioration in error rate can be effectively avoided by using a fixed delay time, for example, a delay time exceeding the point B in FIG. 126, rather than a delay time estimated by the delayed wave estimation means 9007 when the estimated delay time is small. It should be noted that such a delay time to be established here must be at most shorter than a guard period added to an OFDM signal. In order to prevent such a deterioration in error rate from occurring due to the small delay time of a delayed wave, the delay means 9002 can always establish a predetermined delay time. For this purpose, any influence of a short delay time can be eliminated by setting such a delay time to a value nearly twice as large as the point B. If a signal is received by a single antenna as shown in FIG. 118, a delay time smaller than the reciprocal of the bandwidth of a received signal can be added to the signal to decrease the noise level of the received signal with an improved error rate. This is because dips caused by the added signal will appear outside the signal bandwidth. For example, if the signal bandwidth is 500 kHz, a delay time must be established to be 2 $\mu$s or less. The operation for adding a signal with a short delay time as described above can be effective in improving the reception level of signal bandwidth for narrowband broadcasting which is used as broadcasting services for mobile communication.

Next, the usage of the vehicle information detection means 9009 will be described below. The vehicle information detection means 9009 detects information on a moving reception vehicle. For example, this means may consist of a speed (vehicle speed) detection means 9091 which detects the speed of a moving reception vehicle and a position detection means 9092 which detects the position of such a vehicle. It goes without saying that the vehicle information detection means 9009 can be implemented by a navigation system and that the position detection means can be implemented by using a GPS system or by detecting locations through a PHS, a portable telephone set, or a traffic control system such as VICS. Detected vehicle information is supplied to the positional information determination means 9008.

The positional information determination means 9008 checks which broadcast station covers the current location and estimates the delay time and the strength of a wave received at the receiving location, taking account of the distance from such a station as well as possible reflections from mountains and buildings. To this end, this means has previously obtained information including the transmission frequency and location or transmission power of each transmitting station such as a broadcast station or relay station or downloaded it through any communication means such as broadcasting or telephone into its storage to compare it with the positional information supplied by the vehicle information detection means 9009 for estimation. From this information, the delay time and magnitude of a wave received at that receiving location can be estimated.

Moreover, the delay time and magnitude of a received wave can be obtained more accurately, by marking in a map information including the location, magnitude, and height of each building located near the receiving location in addition to the location of each broadcasting station and taking account of possible reflections therefrom. It goes without saying that a navigation system can be used to handle such information on the transmitting stations, buildings, and mountains. It should be also noted that a delayed wave can be tracked more quickly because the following delayed wave can be estimated by knowing the speed of a moving reception vehicle through the speed detection means 9091.

The synthesis control means 9006 controls the synthesis gain and the delay time based on the delayed wave information supplied by the positional information determination means 9008. These control operations can be performed in a similar manner to those based on the delayed wave information supplied by the delayed wave estimation means 9007. In addition, the information from the delayed wave estimation means 9007 can be used in combination with that from the positional information determination means 8 and then the gain and delay time may be controlled only if these two kinds of delay information are similar to each other or they may be controlled to remain unchanged or they may be controlled in accordance with the information containing a larger level of delayed wave if these two kinds of delay information are quite different from each other. It should be noted that in the description above, the vehicle information detection means 9009 is provided for mobile reception but both mobile and stationary reception can be accomplished by using the position detection means 9092 only.

Figure 119:
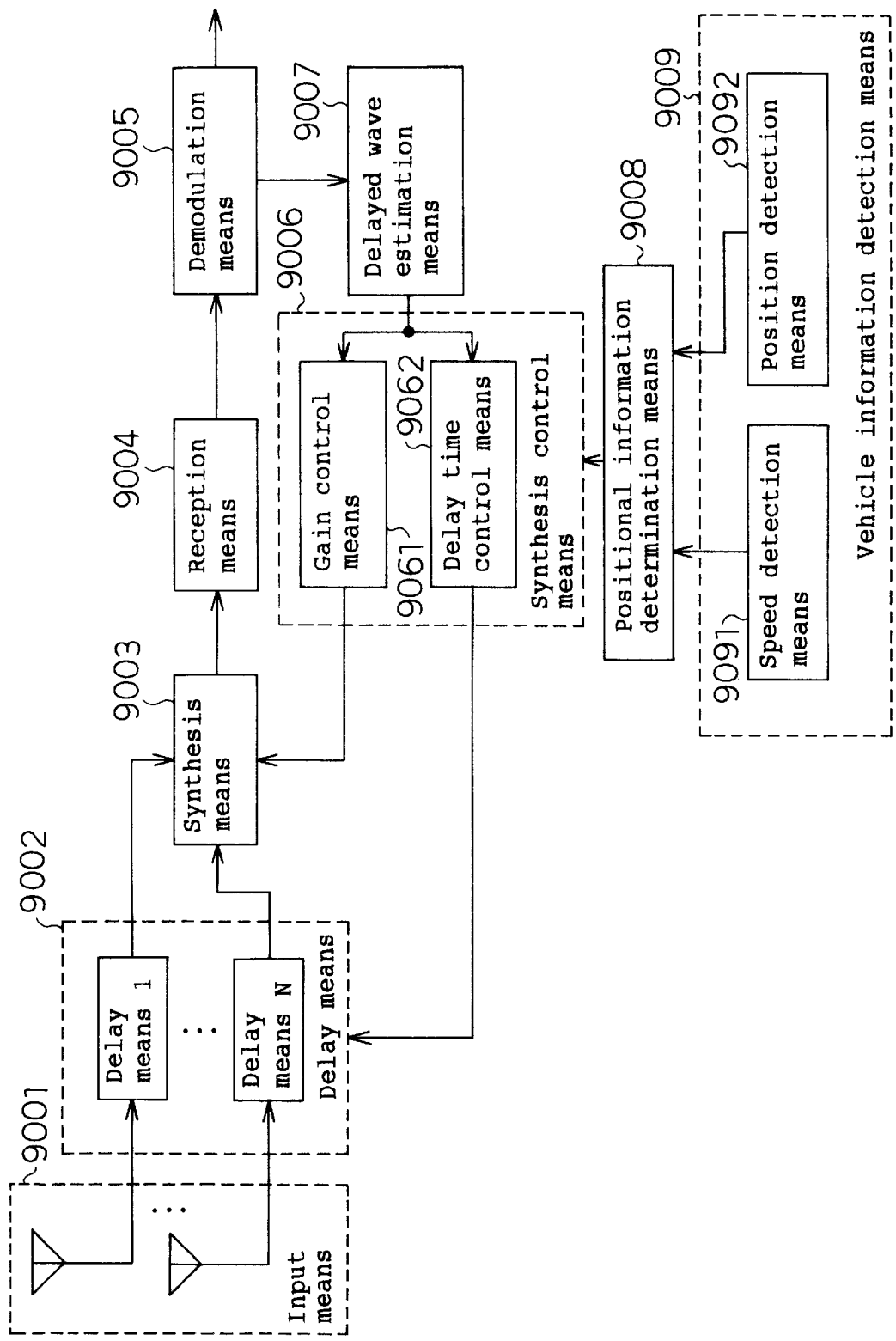
FIG. 119 is a block diagram showing the configuration of a digital television broadcasting receiving device according to another embodiment of the present invention.

The configuration described above has only one input means as shown in FIG. 118 but another configuration shown in FIG. 119 which has a plurality of input means and a plurality of delay means corresponding to the input means, respectively, is also effective for mobile reception. Each input means of this configuration is provided with a different input signal because it is affected by a different level of multipath interference even when it receives the same broadcasting wave. This may cause dips at different locations (frequencies) and different depths as shown in FIG. 124. Therefore, a plurality of different input signals can be added together to provide another signal at a different location and depth, resulting in a lower signal error rate. The reception operation of the device shown in FIG. 119 is almost identical to that described for FIG. 118. Under the control of the delay means 9002 and the synthesis means 9003, a desired delay time is established with the delay means 1 through N in a relative manner and the gain can be set in accordance with the delayed signal. If the distance between antenna locations is sufficiently shorter than the wavelength of the baseband, the level of received signals can be improved by adding a plurality of input signals within the baseband.

As described above, the digital television broadcasting receiving device according to the forty-ninth embodiment can reduce signal dips through analysis of a plurality of signals, resulting in an improved error rate of digital data. Any deterioration in error rate can be avoided by establishing a delay time to prevent any influence of a signal with a shorter delay time. In addition, signal dips can be avoided more accurately by producing an accurate delayed wave through the delayed wave estimation means, the vehicle information detection means, and the positional information determination means and thus, the error rate can be further improved.

Figure 127:
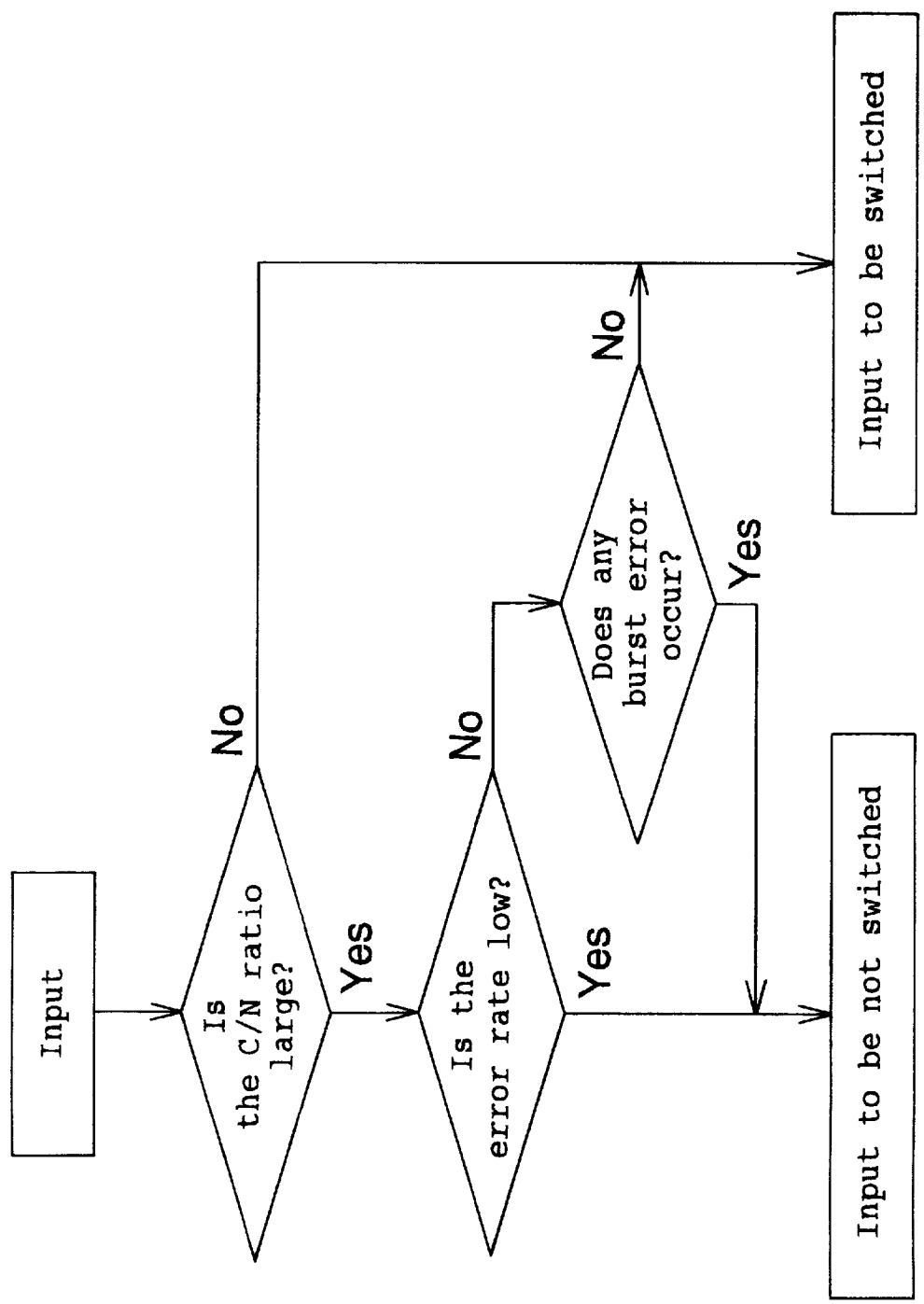

Signals received through a plurality of antennas can be switched depending on their error conditions. The antenna switching conditions for changing over from one antenna to another will be described below with reference to FIG. 127. First, the C/N ratio of an input signal and the length of a past period such as a frame period thereof are determined and antenna switching is not performed if the C/N ratio is large and the error rate is low. If an error is a burst one of very short period and does not continue for a while even when the error rate is high, antenna switching is not performed. If the C/N level of an input signal is lowered or if a high error rate continues for a while, antenna switching is performed. The timing for antenna switching may be set to a guard interval appended to an OFDM signal. Alternatively, such an antenna switching timing may be calculated from a combination of vehicle speed information and positional information. It should be noted that the timing for antenna switching may be set to a guard interval appended to an OFDM signal. This can allow optimum antenna switching in accordance with varying reception conditions during the mobile reception. It should be also noted that by providing an antenna 9011 and an amplification means 9012 as components of the input means shown in FIGS. 118 and 119, any signal attenuation or matching loss due to distribution can be avoided to perform the succeeding operation accurately.

(Embodiment 50)

Figure 120:
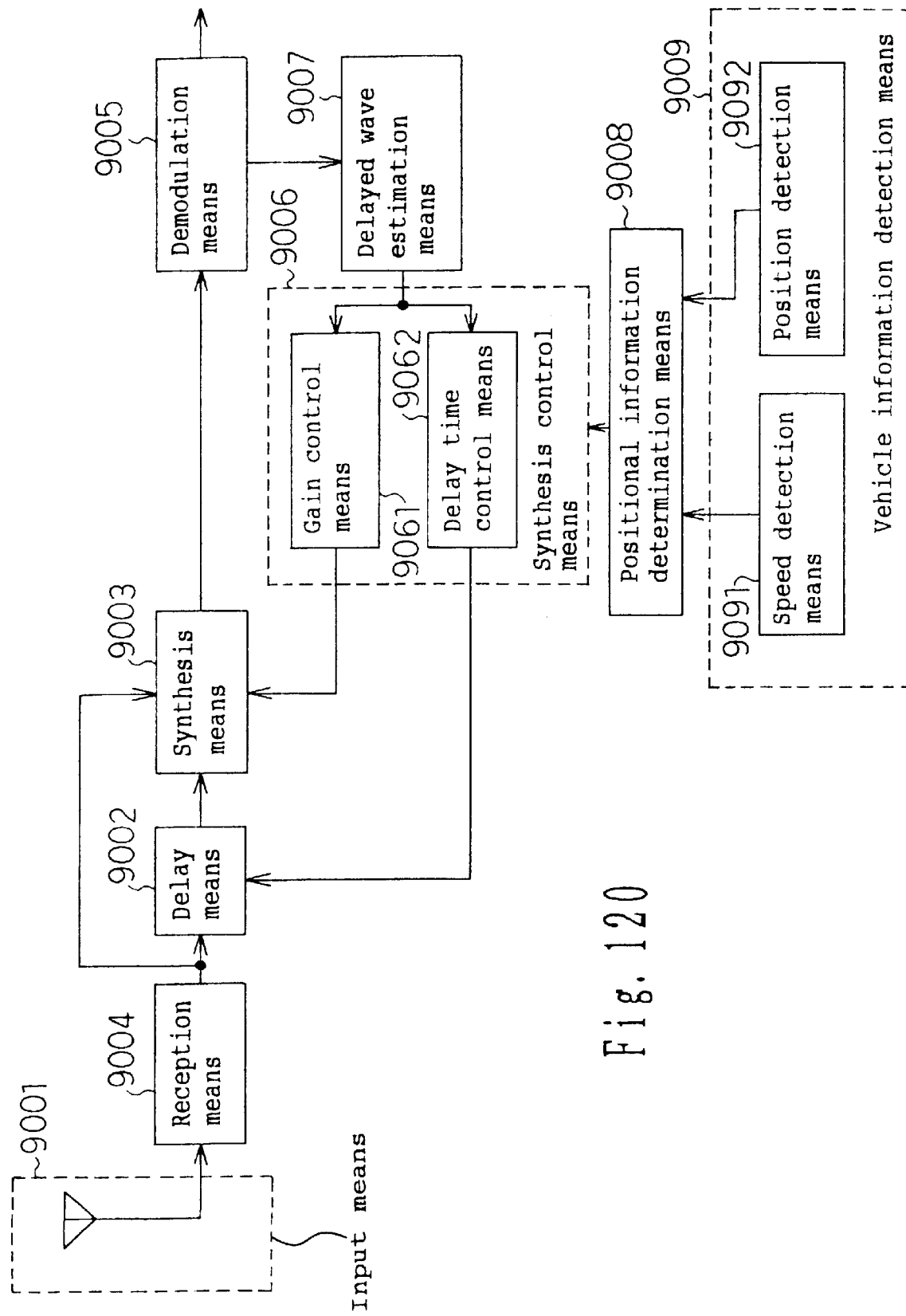

FIG. 120 is a block diagram showing the configuration of a digital television broadcasting receiving device according to the fiftieth embodiment of the present invention. In FIG. 120, the reference numeral 1 designates an input means, 2 designates a delay means, 3 designates a synthesis means, 4 designates a reception means, 5 designates a demodulation means, 7 designates a delayed wave estimation means, 8 designates a positional information determination means, and 9 designates a vehicle information detection means. The configuration of the fiftieth embodiment as shown in FIG. 120 differs from that of the forty-ninth embodiment described above in that the reception means 9004 is connected directly to the input means 9001. The operation for receiving digital television broadcasting at a vehicle according to the fiftieth embodiment will be described below.

A television broadcasting wave is converted to an electric signal by the input means 9001 such as a receiving antenna and then supplied to the reception means 9004. The reception means 9004 extracts only signals within a necessary band from those supplied by the input means 9001 and supplies them to the delay means 9002 and the synthesis means 9003. Those signals supplied by the reception means 9004 are delayed by the delay means 9002 in accordance with a delay control signal from a synthesis control means 9006 and then supplied to the synthesis means 9003. In the synthesis means 9003, in accordance with a synthesis control signal from the synthesis control means 9006, a signal from the reception means 9004 and another signal from the delay means 9002 are weighted with a predetermined gain added to each signal and synthesized together and then supplied to the demodulation means 9005. As a synthesis technique used for this purpose, addition, maximum selection, or other simple operations can be used similarly to the forty-ninth embodiment. The demodulation means 9005 demodulates them for output.

In a similar manner to that for the forty-ninth embodiment, a delayed wave is estimated in the delayed wave estimation means 9007 and the positional information determination means 9008 from demodulation information supplied by the demodulation means 9005 and mobile reception information supplied by the vehicle information detection means 9009, respectively, and then supplied to the synthesis control means 9006, which in turn controls the delay and synthesis operations by producing control signals to be supplied to the delay means 9002 and the synthesis means 9003. The detailed operations of the synthesis control means and the vehicle information detection means performed during the reception operation described above are identical to those for the forty-ninth embodiment. In the receiving device according to the fiftieth embodiment, the operations of the delay means 9002 and the synthesis means 9003 can be simplified because the frequencies and bands are limited by the reception means 1, but the same effects as those of the forty-ninth embodiment can be achieved.

Figure 121:
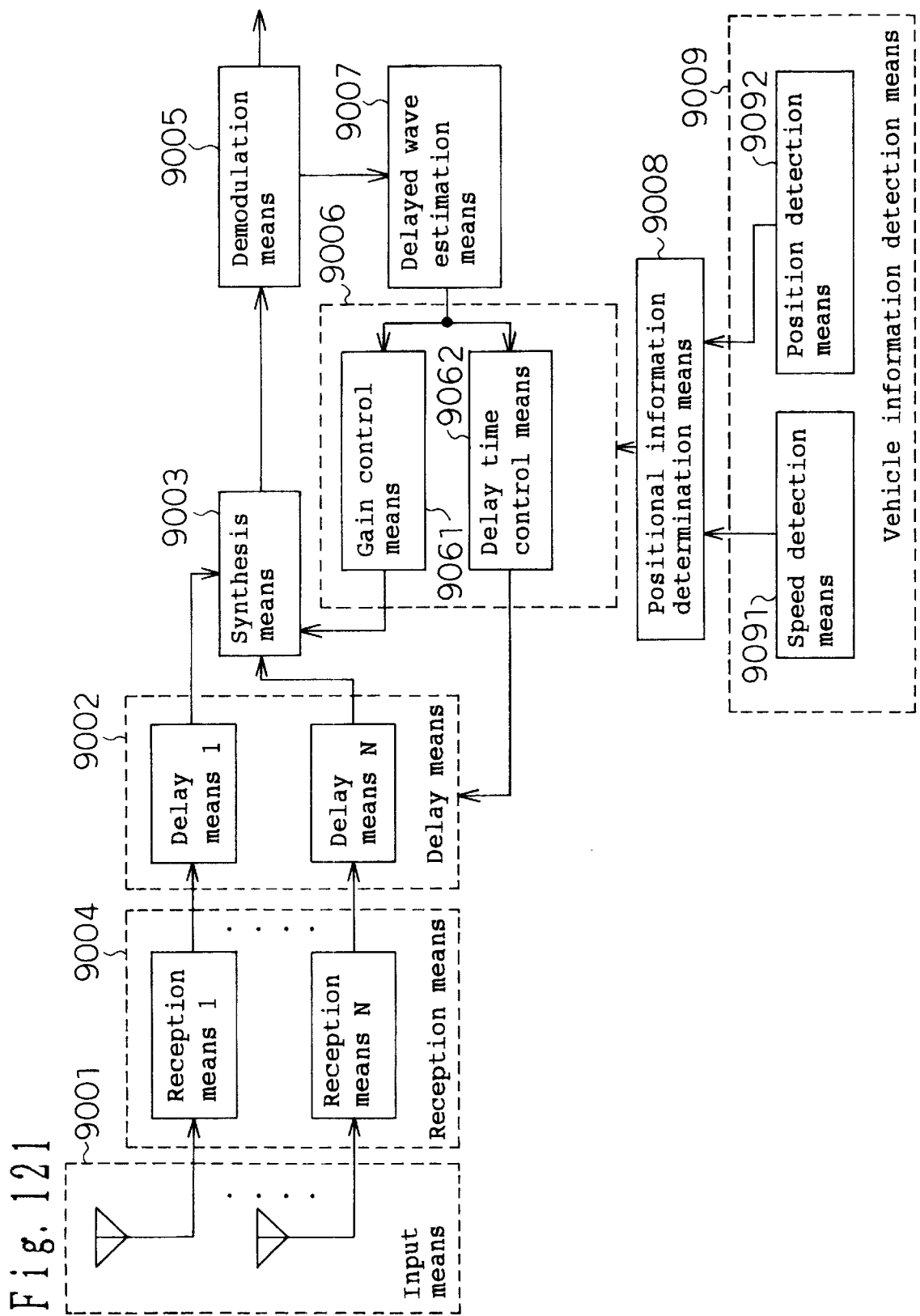

As shown in FIG. 121, a plurality of input means 9001, a plurality of reception means 9004, and a plurality of delay means 9002 can be provided for reception. The operation of this configuration shown in FIG. 121 is identical to that for the preceding embodiment described above and will not be described here in detail. Because a plurality of input means 9001, a plurality of reception means 9004, and a plurality of delay means 9002 are provided, each input means of this configuration is provided with a different input signal due to a different level of interference even when it receives the same broadcasting wave. This may cause dips at different locations (frequencies) and different depths as shown in FIG. 124. Therefore, a plurality of different input signals can be added together to provide another signal at a different location and depth, resulting in a lower signal error rate.

(Embodiment 51)

Figure 122:
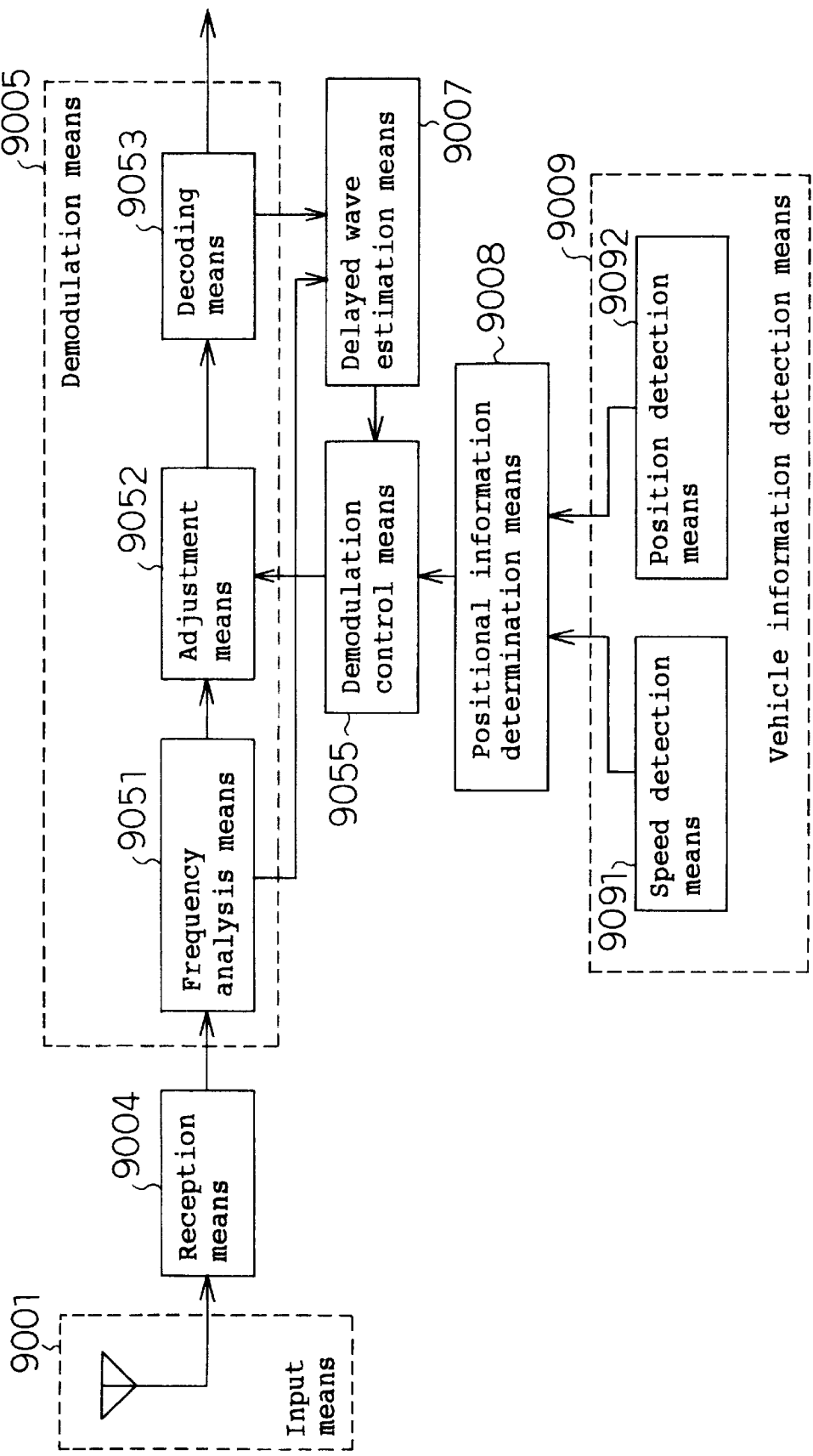

FIG. 122 is a block diagram showing the configuration of a digital television broadcasting receiving device according to the fifty-first embodiment of the present invention. In FIG. 122, the reference numeral 1 designates an input means, 4 designates a reception means, 5 designates a demodulation means, 7 designates a delayed wave estimation means, 55 designates a demodulation control means, 8 designates a positional information determination means, and 9 designates a vehicle information detection means. The operation for receiving digital television broadcasting at a moving vehicle or a fixed location will be described below with reference to FIG. 122.

A television broadcasting wave is converted to an electric signal by the input means 9001 such as a receiving antenna and then supplied to the reception means 9004. The reception means 9004 extracts only signals within a necessary band from those supplied by the input means 9001 and supplies them to the demodulation means 9005. The demodulation means demodulates the signals supplied by the reception means 9004 to provide digital signals for output and supplies the demodulation conditions to the delayed wave estimation means 9007.

Now, the operation of the demodulation means 9005 will be described below. More specifically, the operation of the demodulation means 9005 consisting of a frequency analysis means 9051, an adjustment means 9052, and a decoding means 9053 will be described. A signal supplied by the reception means 9004 is frequency-analyzed by the frequency analysis means 9051 which performs an FFT, real FFT, DFT, or FHT frequency analysis technique to convert it to a signal on the frequency axis and such a converted signal is supplied to the adjustment means 9052. The adjustment means 9052 operates the signal on the frequency axis from the frequency-analyzed signal 51 based on a control signal supplied by the demodulation control means 9055. That operation may be accomplished by performing a transfer function on a signal supplied by the frequency analysis means 9051 based on the control signal from the demodulation control means 9055, by performing an arithmetic operation through filtering, by emphasizing a specific frequency component, or by interpolating a possibly missing frequency component. The signal supplied by the adjustment means 9052 is decoded by the decoding means 9053 into a digital code. The delayed wave estimation means 9007 estimates a delayed wave based on a signal from the decoding means 9005. Such reference signals include a frequency spectrum supplied by the frequency analysis means 9051 and a pilot signal obtained during the decoding process in the decoding means 9053. The frequency spectrum of a received signal has dips in response to the presence of delayed waves as shown in FIG. 124. Since the frequency spectrum becomes flat in the ODFM modulation which is usually used for digital television broadcasting, the magnitude of a delayed wave and the delay time can be estimated. The magnitude of a delayed wave and the delay time also can be estimated from any change in phase or missing of a pilot signal. The demodulation control means 9055 controls the adjustment means 9052 based on delayed wave information supplied by the delayed wave estimation means 9007 or the positional information determination means 9008. Such a control can be accomplished by supplying a control parameter determined in accordance with the adjustment means 9052 and for example, by supplying a transfer function determined by the demodulation control means 9055 in accordance with a delayed wave when the transfer function is to be applied to the adjustment means 9052. Alternatively, a filter factor is supplied when filtering is to be performed or an interpolation value is supplied when interpolation is to be performed. The positional information determination means 9008 and the vehicle information detection means 90092 are identical to those for the forty-ninth and fiftieth embodiments described above and will not be described here in detail.

As described above, according to the present embodiment, accurate decoding can be accomplished with an improved error rate of received digital signals, since the adjustment means 9052 serves to reduce any influence of delayed waves.

Figure 123:
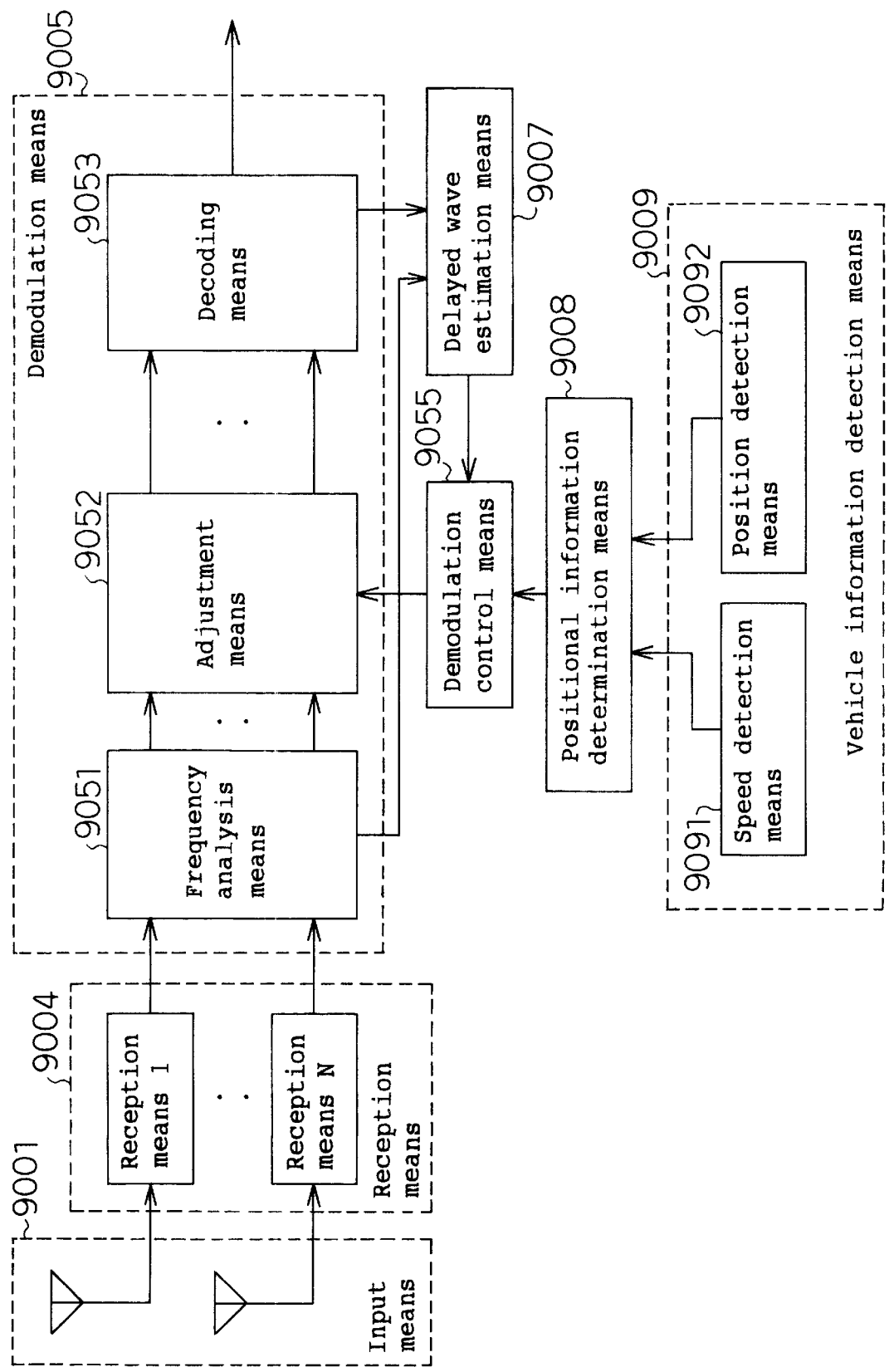

FIG. 123 shows the configuration having a plurality of input means 9001. This configuration requires the same number of reception means as that of the input means as well as a plurality of frequency analysis means. However, it does not necessarily require a plurality of adjustment means nor a plurality of decoding means and it may do with a single adjustment means and a single decoding means by selecting signals to be processed thereby. It should be noted that for simplicity, only a single frequency analysis means 9051, a single adjustment 9052, and a single decoding means 9053 are shown in FIG. 123 but the present embodiment actually comprises the same number of these means as that of the input means as described above.

In the configuration of FIG. 123, the magnitude of a delayed wave and the delay time can be estimated for each input means because a frequency analysis operation is performed for each input means. Therefore, the adjustment means 9052 can select a signal of the best reception conditions. In addition, an appropriate adjustment can be performed on each signal through such a transfer function, filtering, or interpolation technique as described above to decode such a signal in the decoding means 9053. The decoding means 9053 or the adjustment means 9052 can select only signals having a frequency spectrum of good reception conditions among the frequency-analyzed signals from these input means and thus, satisfactory decoding of digital codes can be accomplished. From the foregoing, the configuration of FIG. 123 can correct reception errors by providing a plurality of input means.

It should be noted that in the different digital television broadcasting receiving devices according to the present invention, the maximum gain can be achieved with respect to a wave having a different plane of polarization by designing each antenna element to have a different angle when an antenna consists of a plurality of antenna elements.

Industrial Applicability

As apparent from the foregoing, according to the present invention, a high-performance antenna device which can be installed in the proximity of an automobile body or on a plane integrated with an automobile body and which can be downsized enough to be located in a narrow space, can be provided by connecting to a conductive substrate a ground terminal of an antenna which comprises a plurality of antenna elements, each having one or two linear conductors with at least one bend or curve or one or two spiral linear conductors connected to a single feeding section.

Also, according to the present invention, a high-performance antenna device which has a capability of correctly receiving vertically polarized waves, which can be installed in the proximity of an automobile body or on a plane integrated with an automobile body and which can be downsized enough to be located in a narrow space, can be provided by locating in the proximity of a cylindrical antenna or printed antenna a planar antenna having an antenna element with at least one bend or curve.

In a digital television broadcasting receiving device according to the present invention, disturbance due to delayed waves contained in input signals can be reduced with an improved error rate after demodulation by delaying input signals immediately after the input or after the reception and then synthesizing them.

Also, in a digital television broadcasting receiving device according to the present invention, disturbance due to delayed waves can be eliminated properly with an improved error rate after demodulation by estimating the delay time and magnitude of delay from a demodulated signal or a signal being demodulated to control such delay and synthesis operations and then controlling the delay and synthesis operations based on the estimated delay time and magnitude of delay.

What is claimed is:

1. An antenna device comprising a conductive substrate, two or more antenna elements of different lengths located in a proximity of said conductive substrate, and a coil or zigzag conductor connected to a common connection at an end of each of said antenna elements, wherein the other end of said coil or zigzag conductor is connected to said conductive substrate for grounding.

2. The antenna device according to claim 1, wherein said coil or zigzag conductor and another portion of each of said antenna elements are connected together on an insulator provided on said conductive substrate.

3. The antenna device according to claim 2, wherein said coil or zigzag conductor is divided into two pieces, said two pieces are connected together on an insulator provided on said conductive substrate, and a feeding section is also connected at where said two pieces are connected.

4. An antenna device comprising a conductive substrate, an antenna element located in a proximity of said conductive substrate, and a conductive case provided between said antenna element and said conductive substrate and having a through-hole in a certain place, wherein an end of said antenna element is connected to said conductive case for grounding, a feeding section is connected to one of a plurality of insulators provided on said conductive substrate within said conductive case by using said through-hole, and circuit components are connected between said plurality of insulators.

5. An antenna device comprising a planar antenna having at least one bend or curve and an end connected to a conductive substrate and a cylindrical antenna located in a proximity of said planar antenna, wherein an end of said planar antenna is connected to said conductive substrate at a side of said planar antenna farther from said cylindrical antenna, and wherein a feeding section for said planar antenna and a feeding section for said cylindrical antenna are coupled to a single feeding section through a mixer.

6. The antenna device according to claim 5, wherein said planar antenna has a plurality of antenna elements and said plurality of antenna elements are connected to a single feeding section.

7. The antenna device according to claim 6, wherein said plurality of antenna elements are corresponding to a plurality of bands obtained by dividing a target frequency band, respectively, and said antenna elements realize a desired band.

8. The antenna device according to claim 7, wherein said cylindrical antenna is supported on said conductive substrate so that it can turn to two directions orthogonal to each other and is capable of expanding and contracting in a longitudinal direction.

9. An antenna device comprising
   a planar antenna having at least one antenna element having at least one bend or curve and an end connected to a conductive substrate and
   a printed antenna located in a proximity of said planar antenna and having a zigzag conductive pattern formed on a printed circuit board, wherein said planar antenna and said printed antenna exist substantially on the same plane, and wherein said printed antenna is formed into a three-dimensional shape through one or more bends or curves.

10. The antenna device according to claim 9, wherein said printed antenna is formed into a cylindrical shape which surrounds a cylindrical support member.

11. The antenna device according to claim 10, wherein said printed antenna is supported on said conductive substrate so that it can turn to two directions orthogonal to each other.

12. The antenna device according to claim 11, wherein said conductive substrate is divided into a substrate portion for said planar antenna and a substrate portion for said printed antenna.

13. The antenna device according to claim 10, wherein said planar antenna is provided between said printed antenna and said conductive substrate.

14. The antenna device according to claim 9, wherein said planar antenna is formed on a board other than a board for said printed antenna.

15. The antenna device according to claim 9, wherein said planar antenna is formed on the board for said printed antenna.

16. The antenna device according to claim 9, wherein a portion of the board for said printed antenna is formed into a planar shape and said planar antenna is formed on the planar shaped board portion.

17. The antenna device according to claim 16, wherein said board portion on which said printed antenna is formed is coupled to the board portion on which said planar antenna is formed so that it can turn to a direction perpendicular to the board plane.

18. The antenna device according to claim 9, wherein said planar antenna has a plurality of antenna elements and said plurality of antenna elements are connected to a single feeding section.

19. The antenna device according to claim 18, wherein said plurality of antenna elements are corresponding to a plurality of bands obtained by dividing a target frequency band, respectively, and said antenna elements realize a desired band.

20. A digital television broadcasting receiving device comprising
   an input means which is an antenna device according to claim 18,
   a delay means for receiving a signal from said input means and delaying it,
   a synthesis means for synthesizing a signal from said delay means and a signal from said input means,
   a reception means for performing frequency conversion on a signal from said synthesis means, and
   a demodulation means for converting a signal from said reception means into a baseband signal, wherein the delay time used in said delay means and the synthesis ratio used in said synthesis means can be established arbitrarily.

21. A digital television proadcasting receiving device according to claim 20, wherein
   said device has a plurality of antenna elements and each antenna element is installed so that it can have the maximum gain for a wave of a different polarization plane.

22. A digital television broadcasting receiving device comprising
   an input means which is an antenna device according to claim 18,
   a delay means for receiving a signal from said input means and delaying it,
   a synthesis means for synthesizing a signal from said delay means and a signal from said input means,
   a reception means for performing frequency conversion on a signal from said synthesis means,
   a demodulation means for converting a signal from said reception means into a baseband signal,
   a delayed wave estimation means for receiving a signal indicating the demodulation conditions from said demodulation means and estimating a delayed wave contained in a signal from said input means, and
   a synthesis control means for controlling said synthesis means and said delay means in accordance with a signal from said delayed wave estimation means, wherein either the signal synthesis ratio used in said synthesis means or the delay time used in said delay means can be controlled in accordance with a signal from said synthesis control means.

23. A digital television broadcasting receiving device according to claim 22, wherein
   said device has a plurality of antenna elements and each antenna element is installed so that it can have the maximum gain for a wave of a different polarization plane.

24. A digital television broadcasting receiving device comprising
   an input means which is an antenna device according to claim 18,
   a reception means for performing frequency conversion on a signal from said input means,
   a delay means for receiving a signal from said reception means and delaying it, a synthesis means for synthesizing a signal from said delay means and a signal from said reception means, and
   a demodulation means for converting a signal from said synthesis means into a baseband signal, wherein
   the delay time used in said delay means and the synthesis ratio used in said synthesis means can be established arbitrarily.

25. A digital television broadcasting receiving device according to claim 24, wherein
   said device has a plurality of antenna elements and each antenna element is installed so that it can have the maximum gain for a wave of a different polarization plane.

26. A digital television broadcasting receiving device comprising an input means which is an antenna device according to claim 18, a reception means for performing frequency conversion on a signal from said input means, a delay means for receiving a signal from said reception means and delaying it, a synthesis means for synthesizing a signal from said delay means and a signal from said reception means, a demodulation means for converting a signal from said synthesis means into a baseband signal, a delayed wave estimation means for receiving a signal indicating the demodulation conditions from said demodulation means and estimating a delayed wave contained in a signal from said input means, and a synthesis control means for controlling said synthesis means and said delay means in accordance with a signal from said delayed wave estimation means, wherein either the signal synthesis ratio used in said synthesis means or the delay time used in said delay means can be controlled in accordance with a signal from said synthesis control means.

27. A digital television broadcasting receiving device according to claim 26, wherein said device has a plurality of antenna elements and each antenna element is installed so that it can have the maximum gain for a wave of a different polarization plane.

28. A digital television broadcasting receiving device comprising an input means which is an antenna device according to claim 18, a reception means for performing frequency conversion on a signal from said input means, a demodulation means for converting a signal from said reception means into a baseband signal, a delayed wave estimation means for receiving information on the demodulation conditions from said demodulation means and estimating a delayed wave contained in a signal from said input means, and a demodulation control means for controlling said demodulation means based on delayed wave information from said delayed wave estimation means, wherein a transfer function to be handled by said demodulation means is controlled based on a control signal from said demodulation control means.

29. A digital television broadcasting receiving device according to claim 28, wherein said device has a plurality of antenna elements and each antenna element is installed so that it can have the maximum gain for a wave of a different polarization plane.

30. An antenna device comprising a conductive substrate and an antenna element located in a proximity of said conductive substrate, wherein a portion of said antenna element is formed of a coil or zigzag conductor and an end of said antenna element is connected to said conductive substrate for grounding, wherein said coil or zigzag conductor is formed at said end of said antenna element and said coil or zigzag conductor and another portion of said antenna element are connected together on an insulator provided on said conductive substrate, and wherein said coil or zigzag conductor is divided into two pieces, said two pieces are connected together on an insulator provided on said conductive substrate, and a feeding section is also connected at where said two pieces are connected.

31. An antenna device comprising a planar antenna having at least one antenna element having at least one bend or curve and an end connected to a conductive substrate, and a cylindrical antenna located in a proximity of said planar antenna, wherein an end of said planar antenna is connected to said conductive substrate at a side of said planar antenna closer to said cylindrical antenna, and wherein a feeding section for said planar antenna and a feeding section for said cylindrical antenna are coupled to a single feeding section through a mixer.

32. An antenna device comprising a cylindrical antenna provided in a proximity of a conductive substrate and a planar antenna provided between said cylindrical antenna and said conductive substrate and having at least one antenna element with at least one bend or curve and an end connected to a conductive substrate, wherein a feeding section for said planar antenna and a feeding section for said cylindrical antenna are coupled to a single feeding section through a mixer.

33. An antenna device comprising a planar antenna having at least one antenna element with at least one bend or curve and a printed antenna having a zigzag conductive pattern, both antennas being formed in a proximity of each other on the same board, a conductive plate connected to an end of said antenna element and corresponding to said planar antenna, and an insulation member which insulates said conductive plate from a conductive substrate which is larger than said planar antenna and said printed antenna, wherein said planar antenna, said printed antenna, and said conductive plate are capable to turn together to a direction perpendicular to the plane of said conductive substrate, wherein said planar antenna has a plurality of antenna elements and said plurality of antenna elements are connected to a single feeding section.

* * * * *

UNITED STATES PATENT AND TRADEMARK OFFICE
CERTIFICATE OF CORRECTION

PATENT NO. : 6,362,784 B1
DATED : March 26, 2002
INVENTOR(S) : Joji Kane et al.

It is certified that error appears in the above-identified patent and that said Letters Patent is hereby corrected as shown below:

<u>Title page,</u>
Item [73] Assignee, change "Matsuda Electric Industrial Co., Ltd., Osaka (JP)"
-- to Matsushita Electric Industrial Co., Ltd., Osaka (JP) --

Signed and Sealed this

Thirtieth Day of July, 2002

Attest:

JAMES E. ROGAN
Attesting Officer          Director of the United States Patent and Trademark Office

UNITED STATES PATENT AND TRADEMARK OFFICE
CERTIFICATE OF CORRECTION

PATENT NO. : 6,362,784 B1
DATED : March 26, 2002
INVENTOR(S) : Joji Kane et al.

It is certified that error appears in the above-identified patent and that said Letters Patent is hereby corrected as shown below:

Title page,
Item [56], References Cited, FOREIGN PATENT DOCUMENTS, the fifth-listed patent, change "3-346210" to -- 3-46210 --.

Signed and Sealed this

Thirty-first Day of August, 2004

JON W. DUDAS
*Director of the United States Patent and Trademark Office*